*AND-GATE*

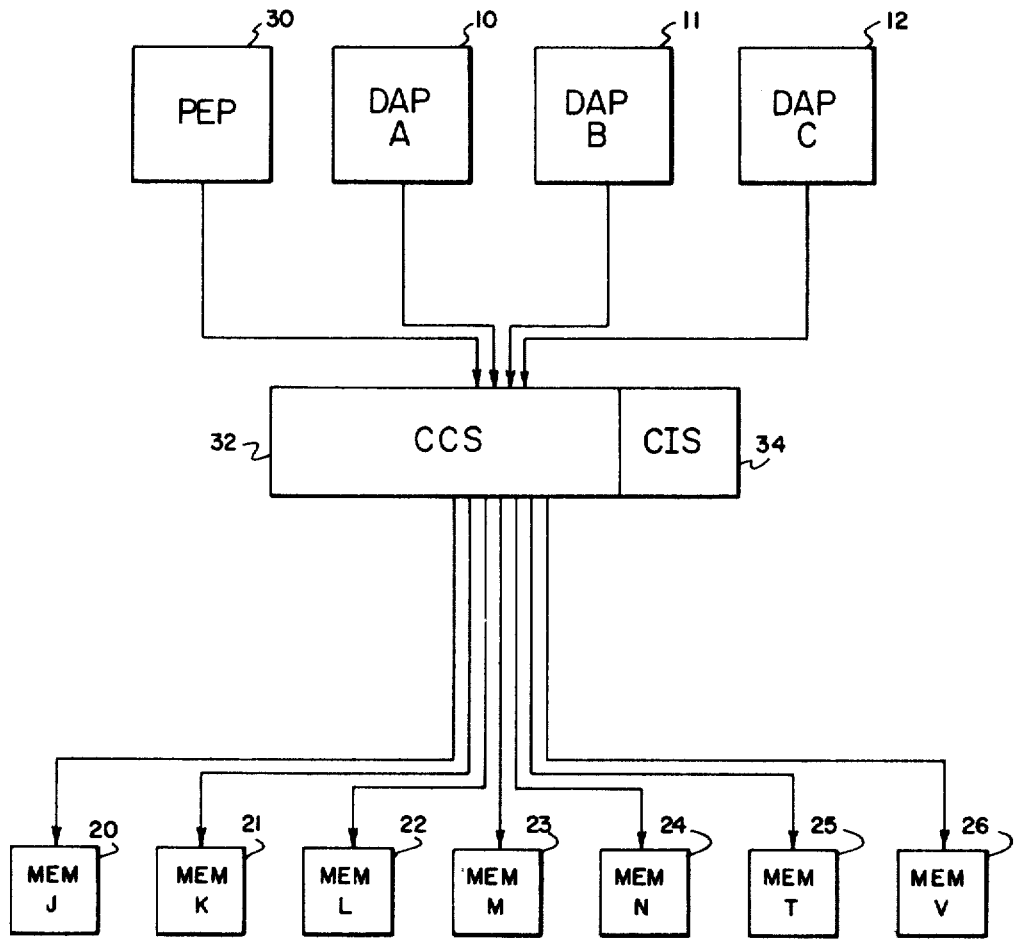

*OR-GATE*

*INVERTER*

*FLIP-FLOP*

*FLIP-FLOP*

*ONE-SHOT*

*CIRCUIT ELEMENT SYMBOLS*

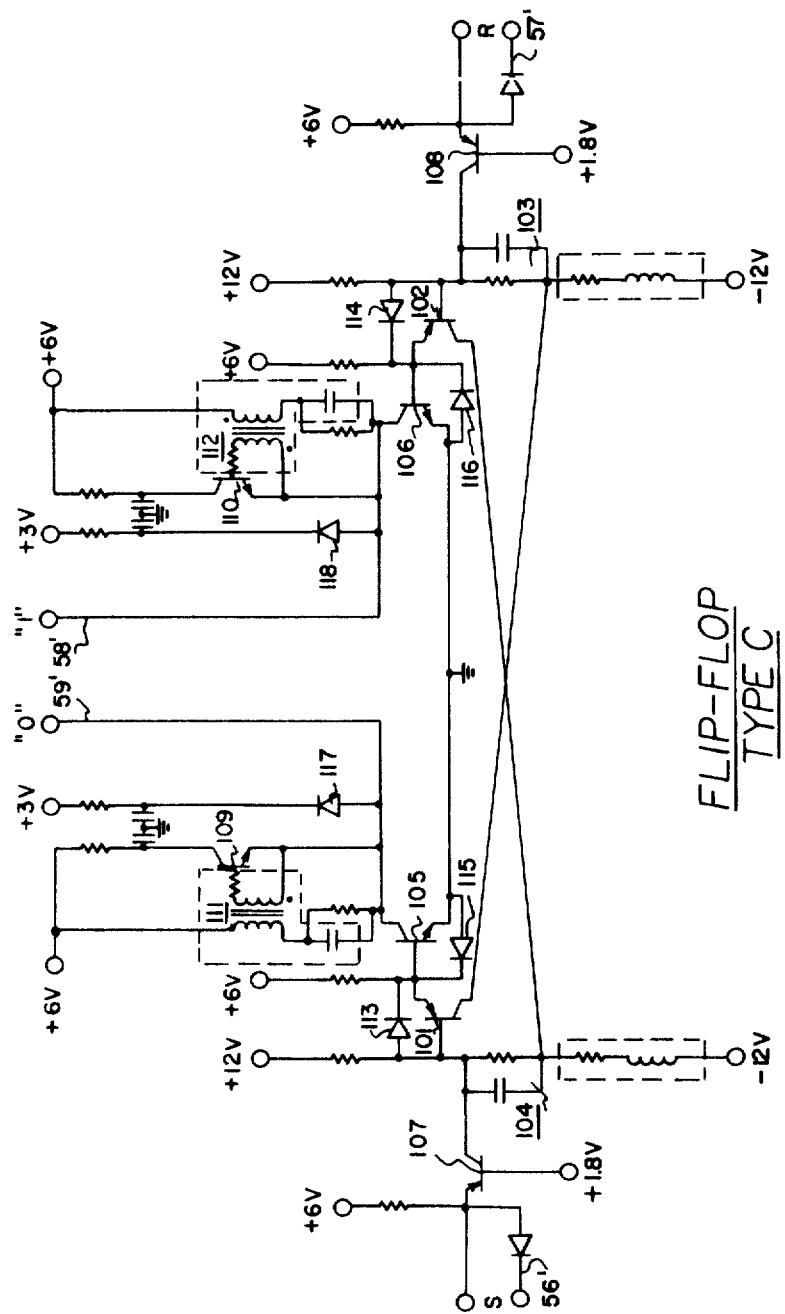

*FLIP-FLOP TYPE B*

ONE-SHOT TYPE H

LOGICAL BLOCK DIAGRAM

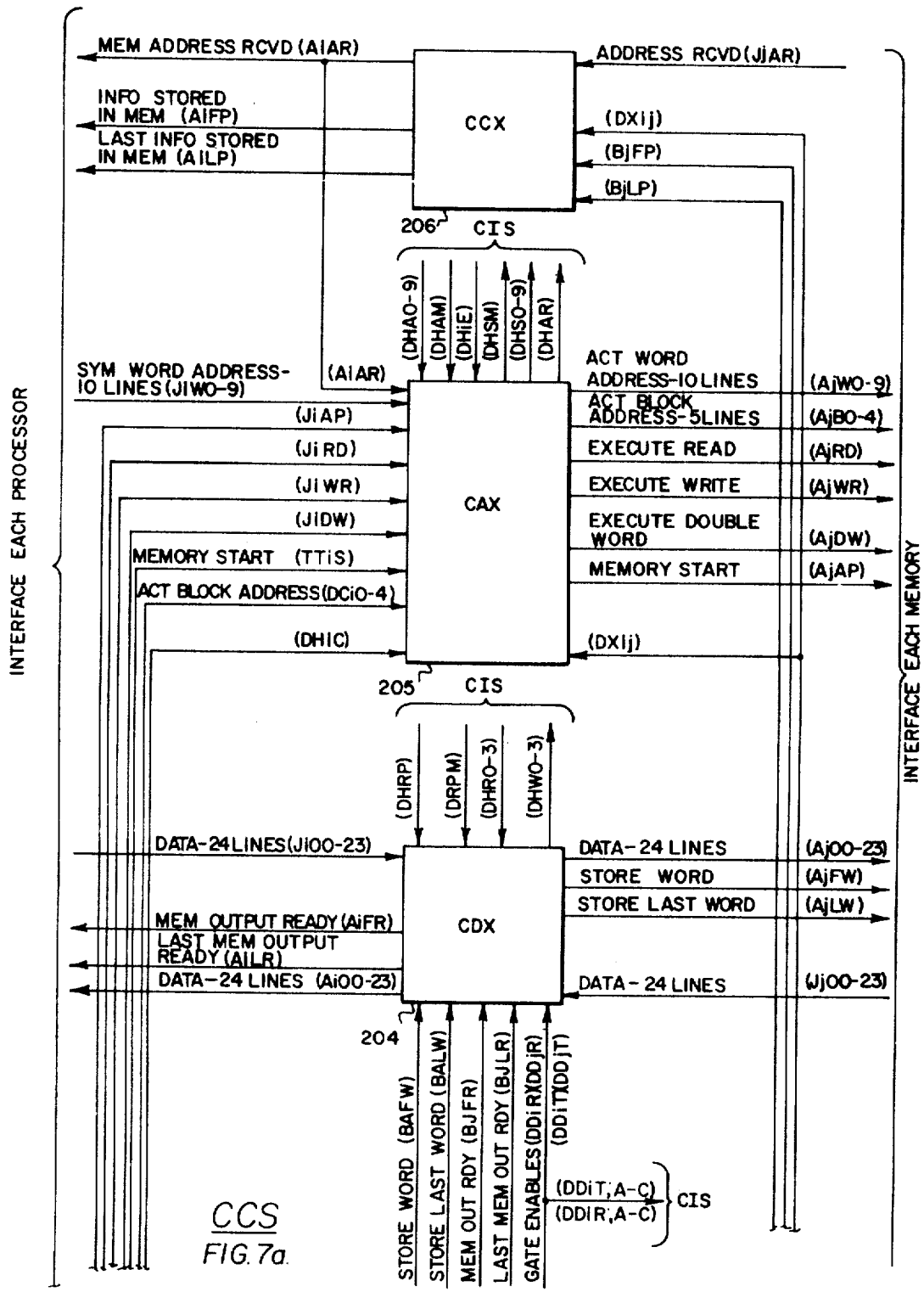

CCS

CIS
EXT. SIGNALS

CAX
INPUT GATE SECTION

CAX OUTPUT GATE SECTION-A

CDX

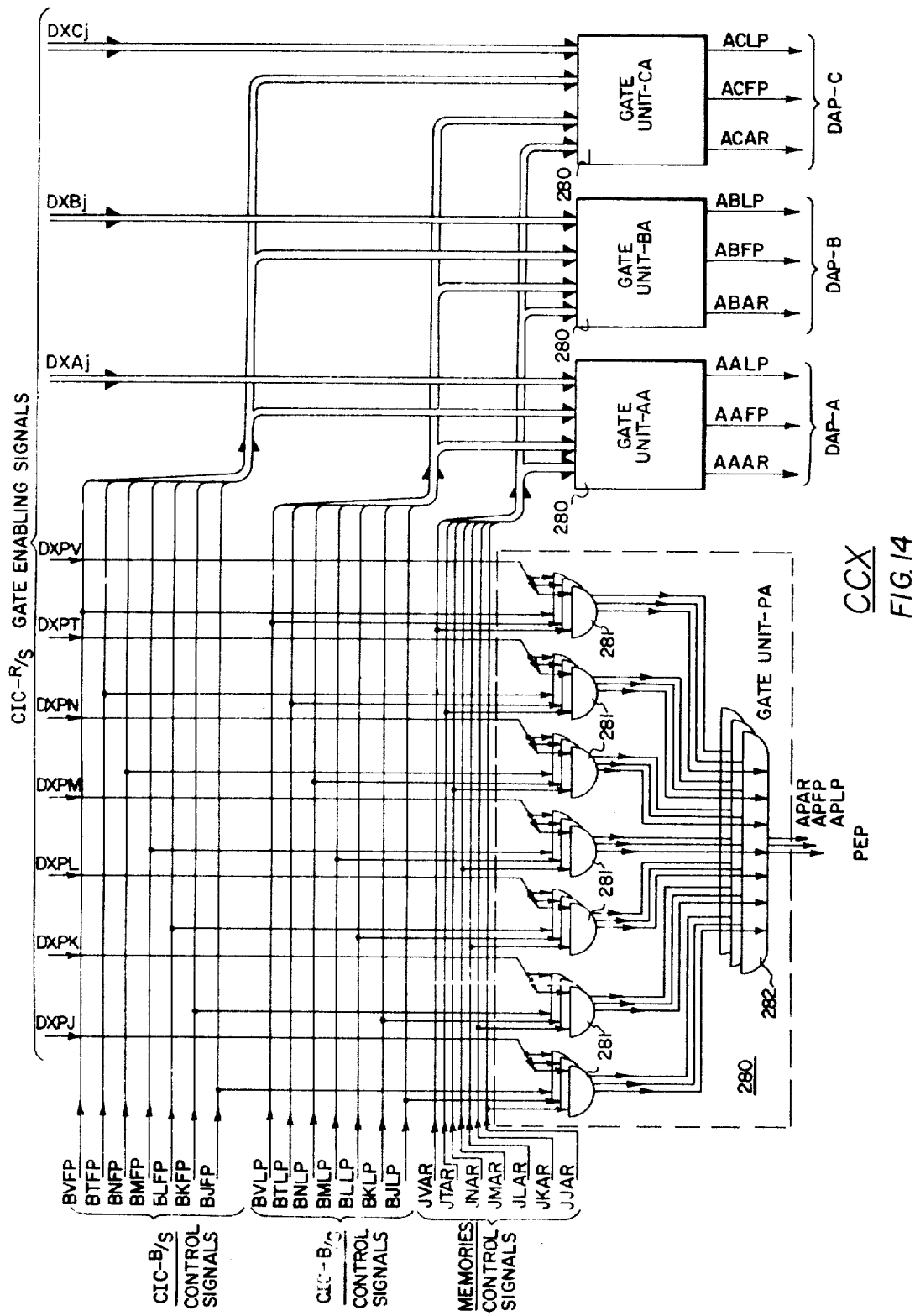

CENTRAL ADDRESS TRANSLATOR (CAT)

CIC BUS SCHEDULER, SECTION-A

CENTRAL INTERRUPT SCHEDULER (CIS)
SECTION-A

CIS SECTION-C

INPUT SCANNER $\overline{DTBG}$ $\overline{DTCG}$ = S-T1A → S   I → FT1A

FT1A $\overline{DTPG}$ $\overline{DTAG}$ = R-T1A → R   O → $\overline{FT1A}$
                                       C $\overline{DTAG}$ + $\overline{FT1A}$ = S-T2A → S   I → FT2A

FT2A $\overline{DTPG}$ + $\overline{FT1A}$ = R-T2A → R   O → $\overline{FT2A}$
                                       C $\overline{DTCG}$ + FT1A = S-T3A → S   I → FT3A

FT3A $\overline{DTBG}$ + FT1A = R-T3A → R   O → $\overline{FT3A}$
                                   C

TIMER-CONTROLLER

TTOA          = S-T1L → S   I → FT1L

FT1L

TTMS          = R-T1L → R   O → $\overline{FT1L}$
                        A

CAT
FIG. 26.

TIMER-CONTROLLER
$\overline{DTPA}$ $\overline{DTAA}$ $\overline{DTBA}$ $\overline{DTCA}$    = T-TOA ⟶
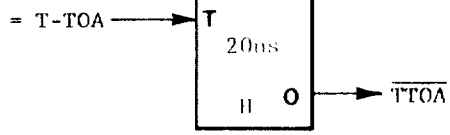
$\overline{TTOA}$ FTIL $\overline{TTMA}$    = T-TMS ⟶
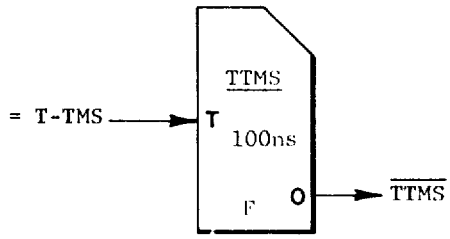
TTMS    = T-TMA ⟶
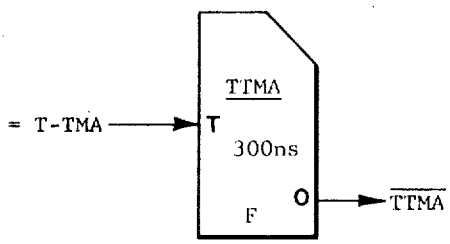
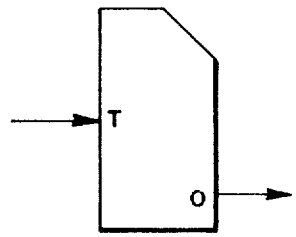
CAT
FIG.27.

MEMORY REQUEST SIGNAL GEN
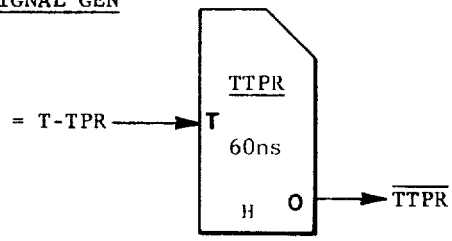
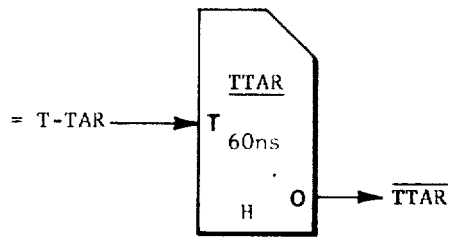
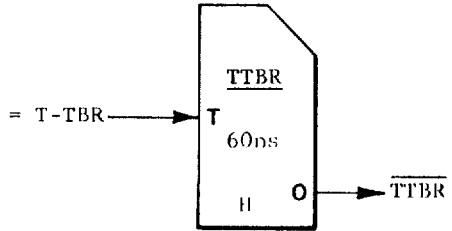
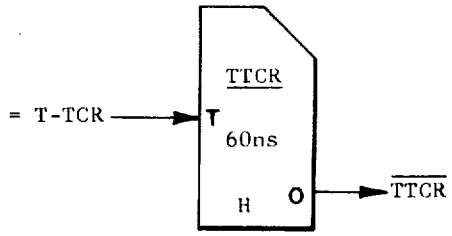
*CAT*
*FIG. 28.*

MEMORY START SIGNAL GEN
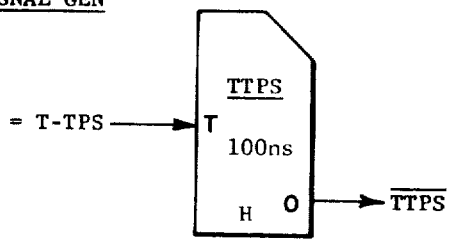
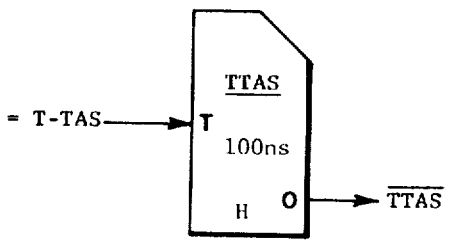
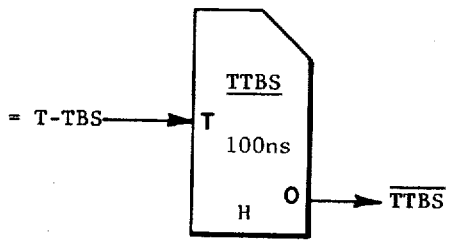
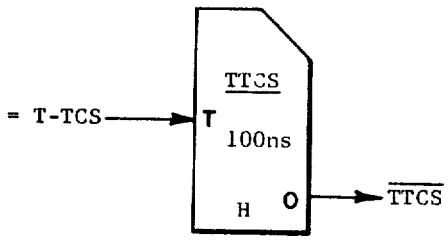
CAT
*FIG. 29.*

OUTPUT REGISTER
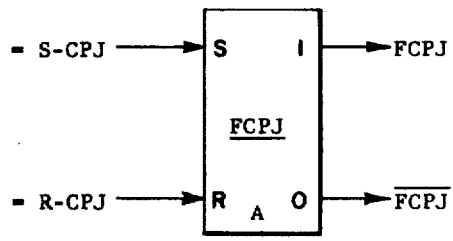
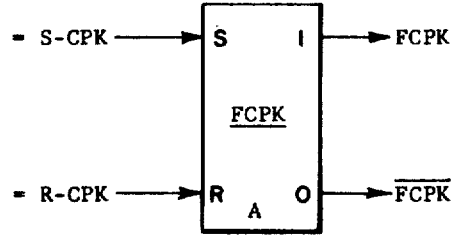
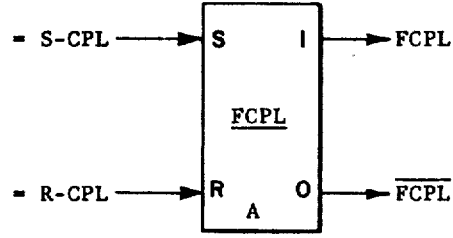
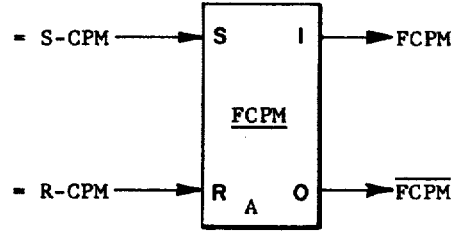
CAT
FIG.30.

OUTPUT REGISTER

MACN DTPE — = S-CPN → S  I → FCPN
                      FCPN
FRNQ FRPA — = R-CPN → R  A  O → $\overline{FCPN}$ MACT DTPE — = S-CPT → S  I → FCPT
                      FCPT
FRTQ FRPA — = R-CPT → R  A  O → $\overline{FCPT}$ MACV DTPE — = S-CPV → S  I → FCPV
                      FCPV
FRVQ FRPA — = R-CPV → R  A  O → $\overline{FCPV}$

CAT

OUTPUT REGISTER
MACJ DTAE = S-CAJ → FCAJ
FRJQ FRAA = R-CAJ → $\overline{FCAJ}$
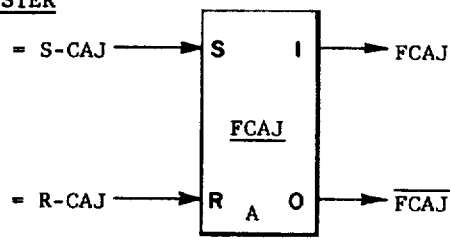
MACK DTAE = S-CAK → FCAK
FRKQ FRAA = R-CAK → $\overline{FCAK}$
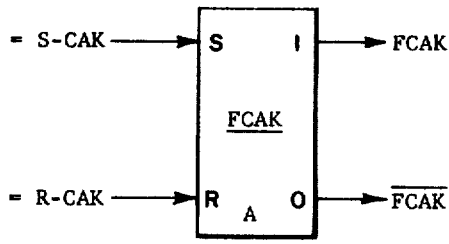
MACL DTAE = S-CAL → FCAL
FRLQ FRAA = R-CAL → $\overline{FCAL}$
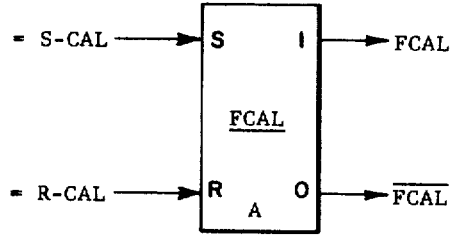
MACM DTAE = S-CAM → FCAM
FRMQ FRAA = R-CAM → $\overline{FCAM}$
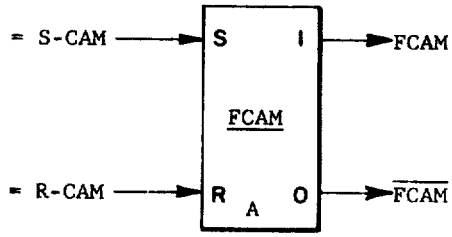
CAT
FIG. 32.

OUTPUT REGISTER

MACN DTAE → = S-CAN → S I → FCAN
                           FCAN
FRNQ FRAA → = R-CAN → R A O → $\overline{FCAN}$ MACT DTAE → = S-CAT → S I → FCAT
                           FCAT
FRTQ FRAA → = R-CAT → R A O → $\overline{FCAT}$ MACV DTAE → = S-CAV → S I → FCAV
                           FCAV
FRVQ FRAA → = R-CAV → R A O → $\overline{FCAV}$ MACS DTAE → = S-CAS → S I → FCAS
                           FCAS
DDRA DSRW FRAA → = R-CAS → R A O → $\overline{FCAS}$

CAT
*FIG. 33.*

OUTPUT REGISTER
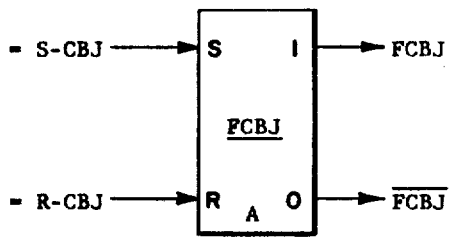
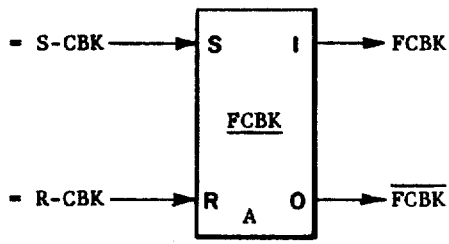
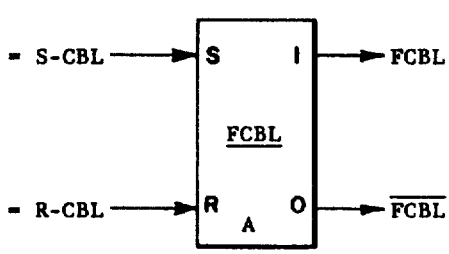
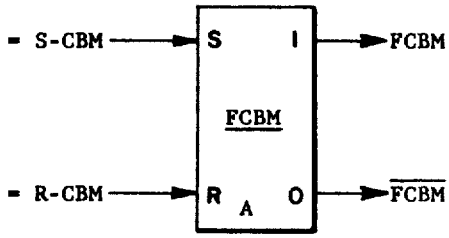
CAT
*FIG. 34.*

OUTPUT REGISTER

MACN DTBE — = S-CBN → S  I → FCBN
                         FCBN
FRNQ FRBA — = R-CBN → R  O → $\overline{FCBN}$
                         A MACT DTBE — = S-CBT → S  I → FCBT
                         FCBT
FRTQ FRBA — = R-CBT → R  O → $\overline{FCBT}$
                         A MACV DTBE — = S-CBV → S  I → FCBV
                         FCBV
FRVQ FRBA — = R-CBV → R  O → $\overline{FCBV}$
                         A MACS DTBE — = S-CBS → S  I → FCBS
                         FCBS
DDRB DSRW FRBA — = R-CBS → R  O → $\overline{FCBS}$
                         A

CAT
FIG. 35.

OUTPUT REGISTER

MACJ DTCE — = S-CCJ → S  I → FCCJ
                         FCCJ
FRJQ FRCA — = R-CCJ → R A O → $\overline{FCCJ}$ MACK DTCE — = S-CCK → S  I → FCCK
                         FCCK
FRKQ FRCA — = R-CCK → R A O → $\overline{FCCK}$ MACL DTCE — = S-CCL → S  I → FCCL
                         FCCL
FRLQ FRCA — = R-CCL → R A O → $\overline{FCCL}$ MACM DTCE — = S-CCM → S  I → FCCM
                         FCCM
FRMQ FRCA — = R-CCM → R A O → $\overline{FCCM}$

CAT
FIG. 36.

OUTPUT REGISTER
MACN DTCE
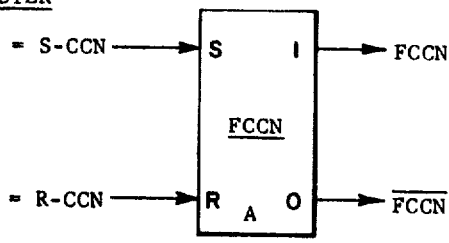
FRNQ FRCA
MACT DTCE
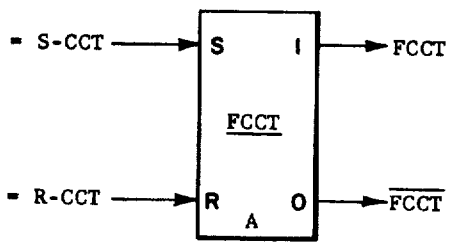
FRTQ FRCA
MACV DTCE
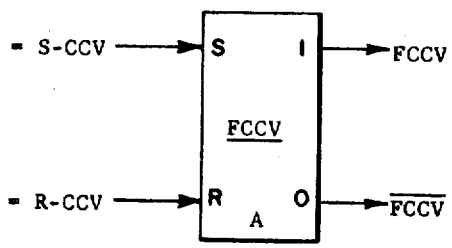
FRVQ FRCA
MACS DTCE
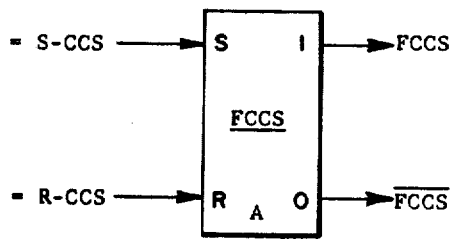
DDRC DSRW FRCA
CAT
FIG.37

INPUT SCANNER

| | |
|---|---|
| JPAP (JPRD + JPWR) $\overline{\text{DCPC}}$ $\overline{\text{DTPZ}}$ $\overline{\text{FRPA}}$ | = DTPG |
| JAAP (JARD + JAWR) $\overline{\text{DCAC}}$ $\overline{\text{DTAZ}}$ $\overline{\text{FRAA}}$ | = DTAH |
| DTAH ($\overline{\text{DTPG}}$ + $\overline{\text{FT2A}}$) | = DTAG |
| JBAP (JBRD + JBWR) $\overline{\text{DCBC}}$ $\overline{\text{DTBZ}}$ $\overline{\text{FRBA}}$ | = DTBH |
| DTBH ($\overline{\text{DTPG}}$ $\overline{\text{DTAH}}$ + FT3A) | = DTBG |
| JCAP (JCRD + JCWR) $\overline{\text{DCCC}}$ $\overline{\text{DTCZ}}$ $\overline{\text{FRCA}}$ | = DTCH |
| DTCH ($\overline{\text{DTPG}}$ $\overline{\text{DTAH}}$ $\overline{\text{DTBH}}$ + FT3A) | = DTCG |
| | |
| FT2A (DTEA + DTPA) | = DTPA |
| $\overline{\text{FT2A}}$ (DTEA + DTAA) | = DTAA |
| FT3A (DTEA + DTBA) | = DTBA |
| $\overline{\text{FT3A}}$ (DTEA + DTCA) | = DTCA |

<u>CAT</u>
FIG. 38.

INPUT GATES

| | |
|---|---|
| JPB0 DTPA + JAB0 DTAA + JBB0 DTBA + JCB0 DTCA | - DLB0 |
| JPB1 DTPA + JAB1 DTAA + JBB1 DTBA + JCB1 DTCA | - DLB1 |
| JPB2 DTPA + JAB2 DTAA + JBB2 DTBA + JCB2 DTCA | - DLB2 |
| JPB3 DTPA + JAB3 DTAA + JBB3 DTBA + JCB3 DTCA | - DLB3 |
| JPB4 DTPA + JAB4 DTAA + JBB4 DTBA + JCB4 DTCA | - DLB4 |
| | |
| JPP0 DTPA + JAP0 DTAA + JBP0 DTBA + JCP0 DTCA | - DLP0 |
| JPP1 DTPA + JAP1 DTAA + JBP1 DTBA + JCP1 DTCA | - DLP1 |
| JPP2 DTPA + JAP2 DTAA + JBP2 DTBA + JCP2 DTCA | - DLP2 |
| JPP3 DTPA + JAP3 DTAA + JBP3 DTBA + JCP3 DTCA | - DLP3 |
| JPP4 DTPA + JAP4 DTAA + JBP4 DTBA + JCP4 DTCA | - DLP4 |

TIMER-CONTROLLER

| | |
|---|---|
| FTIL TTOA $\overline{\text{DTPA}}$ $\overline{\text{DTAA}}$ $\overline{\text{DTBA}}$ $\overline{\text{DTCA}}$ | - DTEA |
| DTPA $\overline{\text{FTIL}}$ | - DTPE |
| DTAA $\overline{\text{FTIL}}$ | - DTAE |
| DTBA $\overline{\text{FTIL}}$ | - DTBE |
| DTCA $\overline{\text{FTIL}}$ | - DTCE |

CAT

FIG. 39.

OUTPUT LATCHES

MAB0 DTPE + DCP0 JPAP = DCP0

MAB1 DTPE + DCP1 JPAP = DCP1

MAB2 DTPE + DCP2 JPAP = DCP2

MAB3 DTPE + DCP3 JPAP = DCP3

MAB4 DTPE + DCP4 JPAP = DCP4

MAB5 DTPE + DHPC JPAP = DHPC

MAB6 DTPE + DCP6 JPAP = DCP6

MAB0 DTAE + DCA0 JAAP = DCA0

MAB1 DTAE + DCA1 JAAP = DCA1

MAB2 DTAE + DCA2 JAAP = DCA2

MAB3 DTAE + DCA3 JAAP = DCA3

MAB4 DTAE + DCA4 JAAP = DCA4

MAB5 DTAE + DHAC JAAP = DHAC

MAB6 DTAE + DCA6 JAAP = DCA6

MAB0 DTBE + DCB0 JBAP = DCB0

MAB1 DTBE + DCB1 JBAP = DCB1

MAB2 DTBE + DCB2 JBAP = DCB2

MAB3 DTBE + DCB3 JBAP = DCB3

MAB4 DTBE + DCB4 JBAP = DCB4

MAB5 DTBE + DHBC JBAP = DHBC

MAB6 DTBE + DCB6 JBAP = DCB6

CAT

FIG. 40.

OUTPUT LATCHES: (Cont'd.)

MAB0 DTCE + DCC0 JCAP = DCC0

MAB1 DTCE + DCC1 JCAP = DCC1

MAB2 DTCE + DCC2 JCAP = DCC2

MAB3 DTCE + DCC3 JCAP = DCC3

MAB4 DTCE + DCC4 JCAP = DCC4

MAB5 DTCE + DHCC JCAP = DHCC

MAB6 DTCE + DCC6 JCAP = DCC6

DCP0 + DCP1 + DCP2 + DCP3 + DCP4 = DTPZ

DCA0 + DCA1 + DCA2 + DCA3 + DCA4 = DTAZ

DCB0 + DCB1 + DCB2 + DCB3 + DCB4 = DTBZ

DCC0 + DCC1 + DCC2 + DCC3 + DCC4 = DTCZ

OUTPUT REGISTERS

FCPJ + FCPK + FCPL + FCPM + FCPN + FCPT + FCPV = DCPC

FCAJ + FCAK + FCAL + FCAM + FCAN + FCAT + FCAV = DCAC

FCBJ + FCBK + FCBL + FCBM + FCBN + FCBT + FCBV = DCBC

FCCJ + FCCK + FCCL + FCCM + FCCN + FCCT + FCCV = DCCC

*CAT*
FIG. 41.

TIME PROTECTION, TIME BALANCING, SCOPE CONTROLLER
FRPA RASM SMT1 — T-RT1 → 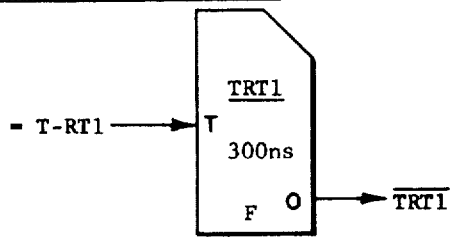 → $\overline{TRT1}$
FRPA RASM SMT2 — T-RT2 → 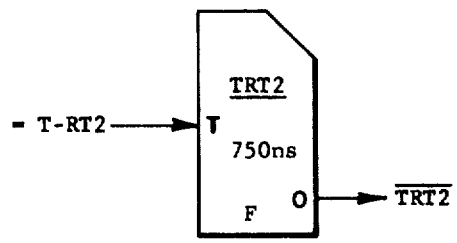 → $\overline{TRT2}$
FRPA RASM SMT3 — T-RT3 → 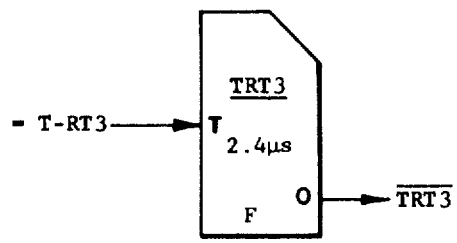 → $\overline{TRT3}$
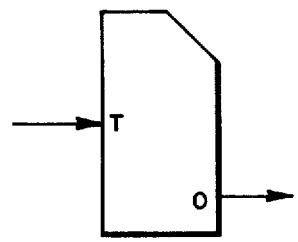
CIC-R/S
*FIG. 42.*

PROCESSOR ACCESS REQUEST REGISTER

DRPR FRCE = S-RPR → S I → FRPR
FRPR
$\overline{\text{DRPR}}$ FRCE = R-RPR → R A O → $\overline{\text{FRPR}}$ DRAR FRCE = S-RAR → S I → FRAR
FRAR
$\overline{\text{DRAR}}$ FRCE = R-RAR → R A O → $\overline{\text{FRAR}}$ DRBR FRCE = S-RBR → S I → FRBR
FRBR
$\overline{\text{DRBR}}$ FRCE = R-RBR → R A O → $\overline{\text{FRBR}}$ DRCR FRCE = S-RCR → S I → FRCR
FRCR
$\overline{\text{DRCR}}$ FRCE = R-RCR → R A O → $\overline{\text{FRCR}}$

CIC-R/S
FIG. 43.

MEMORY REQUEST REGISTER
JJEC
(FRPR FCPJ + FRAR FCAJ + FRBR FCBJ
+ FRCR FCCJ) FRCE
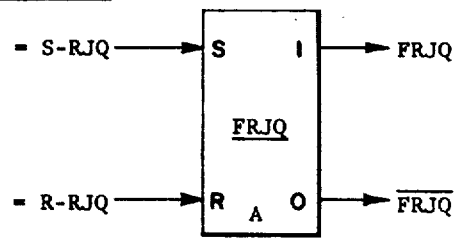
JKEC
(FRPR FCPK + FRAR FCAK + FRBR FCBK
+ FRCR FCCK) FRCE
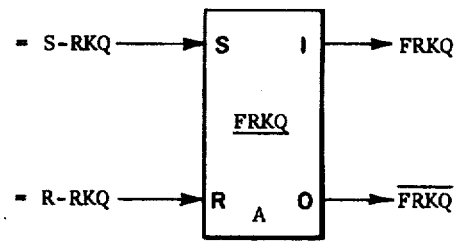
JLEC
(FRPR FCPL + FRAR FCAL + FRBR FCBL
+ FRCR FCCL) FRCE
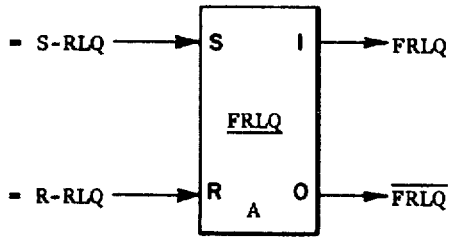
JMEC
(FRPR FCPM + FRAR FCAM + FRBR FCBM
+ FRCR FCCM) FRCE
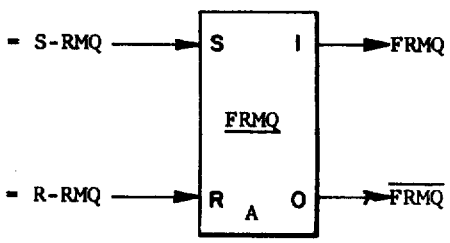
*CIC-R/S*
FIG. 44.

MEMORY REQUEST REGISTER
JNEC
(FRPR FCPN + FRAR FCAN + FRBR FCBN
+ FRCR FCCN) FRCE
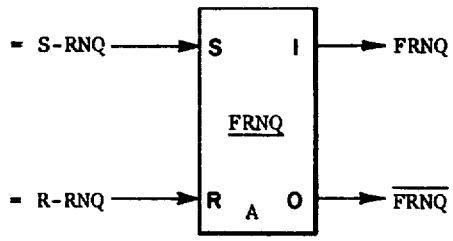
JTEC
(FRPR FCPT + FRAR FCAT + FRBR FCBT
+ FRCR FCCT) FRCE
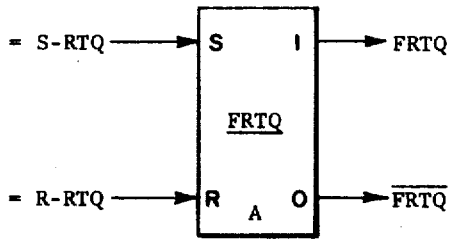
JVEC
(FRPR FCPV + FRAR FCAV + FRBR FCBV
+ FRCR FCCV) FRCE
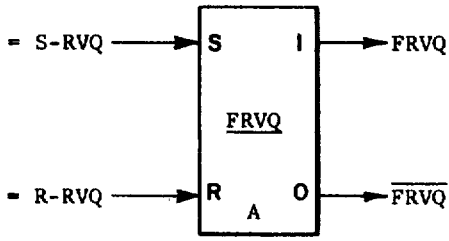
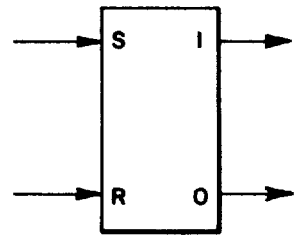
CIC-R/S
FIG.45.

PROCESSOR ACCESS GRANTING REGISTER

FRPR $\overline{\text{FRCE}}$ ($\overline{\text{DHPC}}$ + DHAM DHPE)   = S-RPA

TTPR   = R-RPA

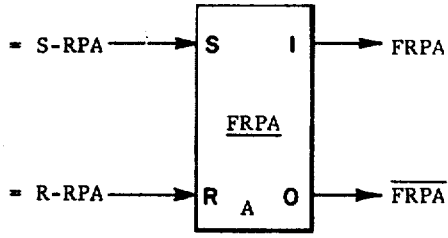

FRAR $\overline{\text{FRCE}}$ ($\overline{\text{DRPA}}$ + $\overline{\text{FRPR}}$)
· ($\overline{\text{DHAC}}$ + DHAM DHAE)
· ($\overline{\text{FCAS}}$ + DSRW DDRA)   = S-RAA

TTAR   = R-RAA

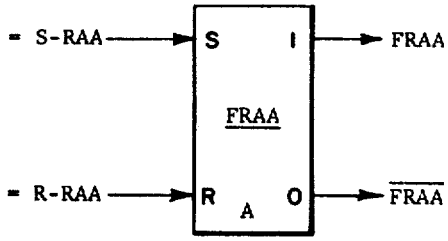

FRBR $\overline{\text{FRCE}}$ ($\overline{\text{DRPB}}$ + $\overline{\text{FRPR}}$) ($\overline{\text{DRAB}}$ + $\overline{\text{FRAR}}$)
· ($\overline{\text{DHBC}}$ + DHAM DHBE)
· ($\overline{\text{FCBS}}$ + DSRW DDRB)   = S-RBA

TTBR   = R-RBA

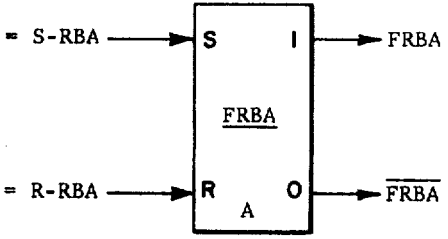

FRCR $\overline{\text{FRCE}}$ ($\overline{\text{DRPC}}$ + $\overline{\text{FRPR}}$) ($\overline{\text{DRAC}}$ + $\overline{\text{FRAR}}$)
· ($\overline{\text{DRBC}}$ + $\overline{\text{FRBR}}$) ($\overline{\text{DHCC}}$ + DHAM DHCE)
· ($\overline{\text{FCCS}}$ + DSRW DDRC)   = S-RCA

TTCR   = R-RCA

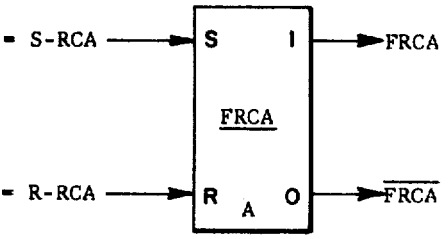

_CIC-R/S_

FIG. 46.

MEMORY ASSIGNMENT REGISTER

FRJQ $\overline{FRCE}$ = S-RJP → S    I → FRJP
                        FRJP $\overline{FRJQ}$ $\overline{FRCE}$ = R-RJP → R $_A$ O → $\overline{FRJP}$ FRKQ $\overline{FRCE}$ = S-RKP → S    I → FRKP
                        FRKP $\overline{FRKQ}$ $\overline{FRCE}$ = R-RKP → R $_A$ O → $\overline{FRKP}$ FRLQ $\overline{FRCE}$ = S-RLP → S    I → FRLP
                        FRLP $\overline{FRLQ}$ $\overline{FRCE}$ = R-RLP → R $_A$ O → $\overline{FRLP}$ FRMQ $\overline{FRCE}$ = S-RMP → S    I → FRMP
                        FRMP $\overline{FRMQ}$ $\overline{FRCE}$ = R-RMP → R $_A$ O → $\overline{FRMP}$

CIC-R/S
FIG. 47

MEMORY ASSIGNMENT REGISTER

FRNQ $\overline{\text{FRCE}}$ = S-RNP → S, FRNP, I → FRNP $\overline{\text{FRNQ}}$ $\overline{\text{FRCE}}$ = R-RNP → R, A, O → $\overline{\text{FRNP}}$ FRTQ $\overline{\text{FRCE}}$ = S-RTP → S, FRTP, I → FRTP $\overline{\text{FRTQ}}$ $\overline{\text{FRCE}}$ = R-RTP → R, A, O → $\overline{\text{FRTP}}$ FRVQ $\overline{\text{FRCE}}$ = S-RVP → S, FRVP, I → FRVP $\overline{\text{FRVQ}}$ $\overline{\text{FRCE}}$ = R-RVP → R, A, O → $\overline{\text{FRVP}}$

TIMER

DRC1 = S-RCE → S, FRCE, I → FRCE

DRC0 = R-RCE → R, A, O → $\overline{\text{FRCE}}$

*CIC-R/S*

*FIG. 48.*

INPUT SCANNER $(\text{FCPJ FRJP} + \text{FCPK FRKP} + \text{FCPL FRLP} + \text{FCPM FRMP}$
$\quad + \text{FCPN FRNP} + \text{FCPT FRTP} + \text{FCPV FRVP}) \text{ DRTP } \overline{\text{TTPR}}$ = DRPR $(\text{FCAJ FRJP} + \text{FCAK FRKP} + \text{FCAL FRLP} + \text{FCAM FRMP}$
$\quad + \text{FCAN FRNP} + \text{FCAT FRTP} + \text{FCAV FRVP}) \text{ DRTA } \overline{\text{TTAR}}$ = DRAR $(\text{FCBJ FRJP} + \text{FCBK FRKP} + \text{FCBL FRLP} + \text{FCBM FRMP}$
$\quad + \text{FCBN FRNP} + \text{FCBT FRTP} + \text{FCBV FRVP}) \text{ DRTB } \overline{\text{TTBR}}$ = DRBR $(\text{FCCJ FRJP} + \text{FCCK FRKP} + \text{FCCL FRLP} + \text{FCCM FRMP}$
$\quad + \text{FCCN FRNP} + \text{FCCT FRTP} + \text{FCCV FRVP}) \text{ DRTC } \overline{\text{TTCR}}$ = DRCR

TIME-PROTECTION, TIME-BALANCING, SCOPE CONTROLLER $\overline{\text{TRT1}} \ \overline{\text{TRT2}} \ \overline{\text{TRT3}} + \overline{\text{RASM}}$ = DRTP $(\overline{\text{FCAJ}} + \overline{\text{SCPJ}}) \ (\overline{\text{FCAK}} + \overline{\text{SCPK}}) (\overline{\text{FCAL}} + \overline{\text{SCPL}}) \ (\overline{\text{FCAM}} + \overline{\text{SCPM}})$
$\quad \cdot (\overline{\text{FCAN}} + \overline{\text{SCPN}}) \ (\overline{\text{FCAT}} + \overline{\text{SCPT}}) \ (\overline{\text{FCAV}} + \overline{\text{SCPV}})$
$\quad + \text{TRT1} + \text{TRT2} + \text{TRT3} + \overline{\text{RASM}}$ = DRTA $(\overline{\text{FCBJ}} + \overline{\text{SCPJ}}) \ (\overline{\text{FCBK}} + \overline{\text{SCPK}}) \ (\overline{\text{FCBL}} + \overline{\text{SCPL}}) \ (\overline{\text{FCBM}} + \overline{\text{SCPM}})$
$\quad \cdot (\overline{\text{FCBN}} + \overline{\text{SCPN}}) \ (\overline{\text{FCBT}} + \overline{\text{SCPT}}) (\overline{\text{FCBV}} + \overline{\text{SCPV}})$
$\quad + \text{TRT1} + \text{TRT2} + \text{TRT3} + \overline{\text{RASM}}$ = DRTB $(\overline{\text{FCCJ}} + \overline{\text{SCPJ}}) \ (\overline{\text{FCCK}} + \overline{\text{SCPK}}) \ (\overline{\text{FCCL}} + \overline{\text{SCPL}}) \ (\overline{\text{FCCM}} + \overline{\text{SCPM}})$
$\quad \cdot (\overline{\text{FCCN}} + \overline{\text{SCPN}}) \ (\overline{\text{FCCT}} + \overline{\text{SCPT}}) \ (\overline{\text{FCCV}} + \overline{\text{SCPV}})$
$\quad + \text{TRT1} + \text{TRT2} + \text{TRT3} + \overline{\text{RASM}}$ = DRTC $\text{JPCM} + \text{JPLM} + \text{JPSM}$ = RASM

PROCESSOR PRIORITY ALLOCATION LOGIC

FCPJ FCAJ + FCPK FCAK + FCPL FCAL + FCPM FCAM
 + FCPN FCAN + FCPT FCAT + FCPV FCAV = DRPA

FCPJ FCBJ + FCPK FCBK + FCPL FCBL + FCPM FCBM
 + FCPN FCBN + FCPT FCBT + FCPV FCBV = DRPB

FCPJ FCCJ + FCPK FCCK + FCPL FCCL + FCPM FCCM
 + FCPN FCCN + FCPT FCCT + FCPV FCCV = DRPC

FCAJ FCBJ + FCAK FCBK + FCAL FCBL + FCAM FCBM
 + FCAN FCBN + FCAT FCBT + FCAV FCBV = DRAB

FCAJ FCCJ + FCAK FCCK + FCAL FCCL + FCAM FCCM
 + FCAN FCCN + FCAT FCCT + FCAV FCCV = DRAC

FCBJ FCCJ + FCBK FCCK + FCBL FCCL + FCBM FCCM
 + FCBN FCCN + FCBT FCCT + FCBV FCCV = DRBC

*CIC-R/S*

FIG. 49.

GATE ENABLING SIGNAL GENERATOR

| | | |
|---|---|---|
| FRPA FCPJ | = | DXPJ |
| FRPA FCPK | = | DXPK |
| FRPA FCPL | = | DXPL |
| FRPA FCPM | = | DXPM |
| FRPA FCPN | = | DXPN |
| FRPA FCPT | = | DXPT |
| FRPA FCPV | = | DXPV |
| | | |
| FRAA FCAJ | = | DXAJ |
| FRAA FCAK | = | DXAK |
| FRAA FCAL | = | DXAL |
| FRAA FCAM | = | DXAM |
| FRAA FCAN | = | DXAN |
| FRAA FCAT | = | DXAT |
| FRAA FCAV | = | DXAV |
| | | |
| FRBA FCBJ | = | DXBJ |
| FRBA FCBK | = | DXBK |
| FRBA FCBL | = | DXBL |
| FRBA FCBM | = | DXBM |
| FRBA FCBN | = | DXBN |
| FRBA FCBT | = | DXBT |
| FRBA FCBV | = | DXBV |

CIC-R/S
FIG.50.

GATE ENABLING SIGNAL GENERATOR: (Cont'd.)

| | |
|---|---|
| FRCA FCCJ | = DXCJ |
| FRCA FCCK | = DXCK |
| FRCA FCCL | = DXCL |
| FRCA FCCM | = DXCM |
| FRCA FCCN | = DXCN |
| FRCA FCCT | = DXCT |
| FRCA FCCV | = DXCV |

TIMER $[\overline{DRPR\ FRPR}\ (\overline{FCPJ}\ FRJQ + \overline{FCPK}\ FRKQ + \overline{FCPL}\ FRLQ + \overline{FCPM}\ FRMQ$
$+ \overline{FCPN}\ FRNQ + \overline{FCPT}\ FRTQ + \overline{FCPV}\ FRVQ) + \overline{DRPR\ FRPR}]$
$\cdot [\overline{DRAR\ FRAR}\ (\overline{FCAJ}\ FRJQ + \overline{FCAK}\ FRKQ + \overline{FCAL}\ FRLQ + \overline{FCAM}\ FRMQ$
$+ \overline{FCAN}\ FRNQ + \overline{FCAT}\ FRTQ + \overline{FCAV}\ FRVQ) + \overline{DRAR\ FRAR}]$
$\cdot [\overline{DRBR\ FRBR}\ (\overline{FCBJ}\ FRJQ + \overline{FCBK}\ FRKQ + \overline{FCBL}\ FRLQ + \overline{FCBM}\ FRMQ$
$+ \overline{FCBN}\ FRNQ + \overline{FCBT}\ FRTQ + \overline{FCBV}\ FRVQ) + \overline{DRBR\ FRBR}]$
$\cdot [\overline{DRCR\ FRCR}\ (\overline{FCCJ}\ FRJQ + \overline{FCCK}\ FRKQ + \overline{FCCL}\ FRLQ + \overline{FCCM}\ FRMQ$
$+ \overline{FCCN}\ FRNQ + \overline{FCCT}\ FRTQ + \overline{FCCV}\ FRVQ) + \overline{DRCR\ FRCR}] \quad = DRC0$ $(FRPA + \overline{FRPR})(FRAA + \overline{FRAR} + FRPR\ DRPA)$
$\cdot (FRBA + \overline{FRBR} + FRPR\ DRPB + FRAR\ DRAB)$
$\cdot (FRCA + \overline{FRCR} + FRPR\ DRPC + FRAR\ DRAC + FRBR\ DRBC)$
$\cdot (FRJQ\ FRJP + \overline{FRJQ}\ \overline{FRJP})(FRKQ\ FRKP + \overline{FRKQ}\ \overline{FRKP})$
$\cdot (FRLQ\ FRLP + \overline{FRLQ}\ \overline{FRLP})(FRMQ\ FRMP + \overline{FRMQ}\ \overline{FRMP})$
$\cdot (FRNQ\ FRNP + \overline{FRNQ}\ \overline{FRNP})(FRTQ\ FRTP + \overline{FRTQ}\ \overline{FRTP})$
$\cdot (FRVQ\ FRVP + \overline{FRVQ}\ \overline{FRVP}) \quad = DRC1$

*CIC-R/S*
FIG.51.

DATA BUS REQUEST REGISTER
DKJR FKCL $\overline{FKJN}$ = S-KJM
AJLA + JJLP + $\overline{DKJR}$ = R-KJM
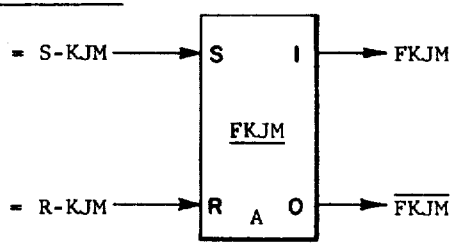
DKKR FKCL $\overline{FKKN}$ = S-KKM
AKLA + JKLP + $\overline{DKKR}$ = R-KKM
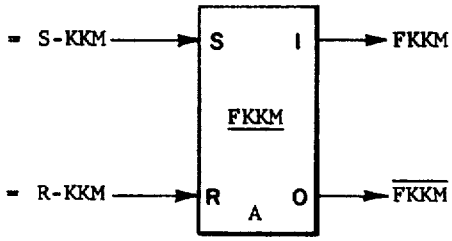
DKLR FKCL $\overline{FKLN}$ = S-KLM
ALLA + JLLP + $\overline{DKLR}$ = R-KLM
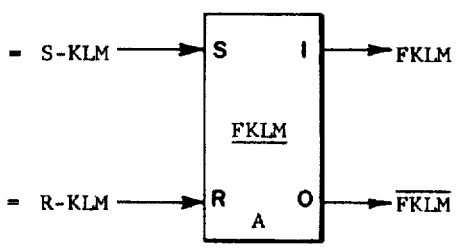
DKMR FKCL $\overline{FKMN}$ = S-KMM
AMLA + JMLP + $\overline{DKMR}$ = R-KMM
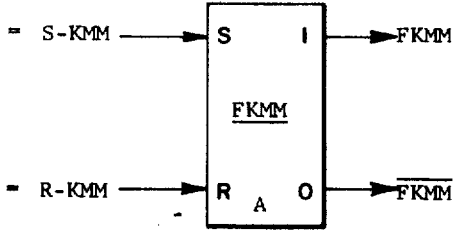
CIC-B/S
FIG.52.

DATA BUS REQUEST REGISTER
DKNR FKCL $\overline{\text{FKNN}}$
ANLA + JNLP + $\overline{\text{DKNR}}$
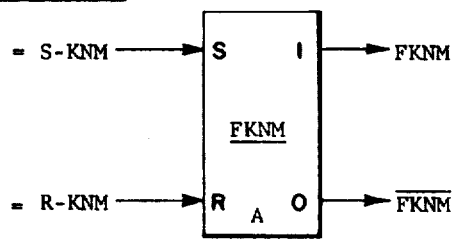
DKTR FKCL $\overline{\text{FKTN}}$
ATLA + JTLP + $\overline{\text{DKTR}}$
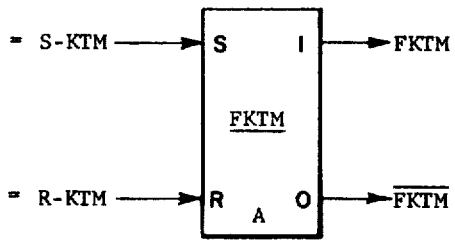
DKVR FKCL $\overline{\text{FKVN}}$
AVLA + JVLP + $\overline{\text{DKVR}}$
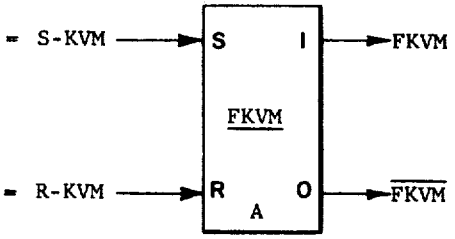
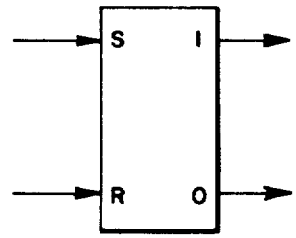
*CIC-B/S*
FIG. 53.

DATA BUS GRANTING REGISTER

FKJM F̄K̄C̄L̄ D̄K̄Ē̄N̄      = S-KJN → S   I → FKJN

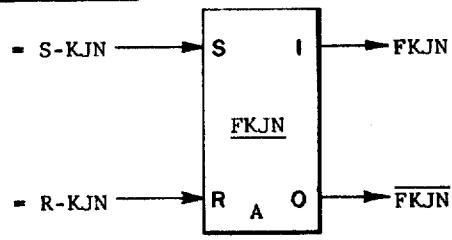

D̄K̄J̄R̄      = R-KJN → R   O → F̄K̄J̄N̄

FKKM F̄K̄J̄M̄ F̄K̄C̄L̄ D̄K̄Ē̄N̄      = S-KKN → S   I → FKKN

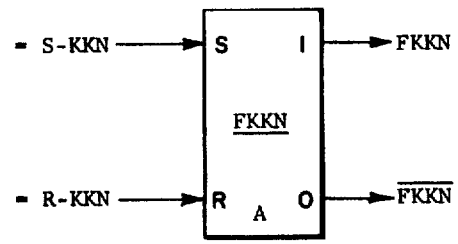

D̄K̄K̄R̄      = R-KKN → R   O → F̄K̄K̄N̄

FKLM F̄K̄K̄M̄ F̄K̄J̄M̄ F̄K̄C̄L̄ D̄K̄Ē̄N̄      = S-KLN → S   I → FKLN

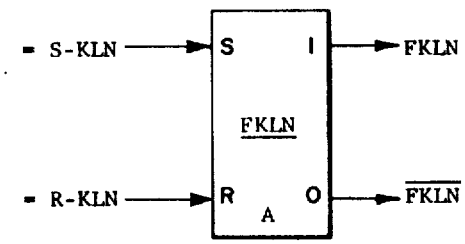

D̄K̄L̄R̄      = R-KLN → R   O → F̄K̄L̄N̄

FKMM F̄K̄L̄M̄ F̄K̄K̄M̄ F̄K̄J̄M̄ F̄K̄C̄L̄ D̄K̄Ē̄N̄      = S-KMN → S   I → FKMN

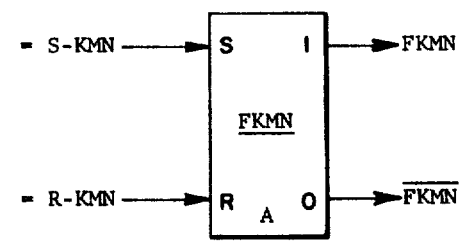

D̄K̄M̄R̄      = R-KMN → R   O → F̄K̄M̄N̄

*CIC-B/S*
FIG.54.

DATA BUS GRANTING REGISTER

FKNM $\overline{FKMM}$ $\overline{FKLM}$ $\overline{FKKM}$ $\overline{FKJM}$ $\overline{FKCL}$ $\overline{DKEN}$ $\overline{DKNR}$

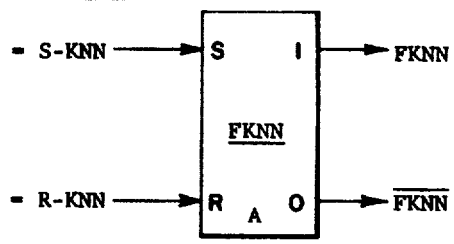

FKTM $\overline{FKNM}$ $\overline{FKMM}$ $\overline{FKLM}$ $\overline{FKKM}$ $\overline{FKJM}$
· $\overline{FKCL}$ $\overline{DKEN}$ $\overline{DKTR}$

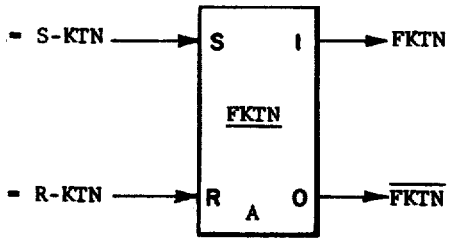

FKVM $\overline{FKTM}$ $\overline{FKNM}$ $\overline{FKMM}$ $\overline{FKLM}$ $\overline{FKKM}$ $\overline{FKJM}$
· $\overline{FKCL}$ $\overline{DKEN}$ $\overline{DKVR}$

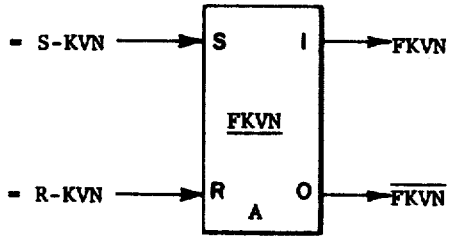

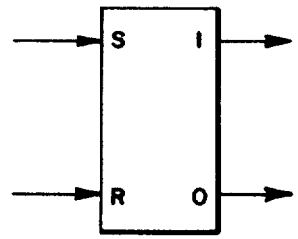

*CIC-B/S*
*FIG. 55.*

DOUBLE-WORD DATA BUS CLEARING REGISTER

JPLW FCPJ + JALW FCAJ + JBLW FCBJ
  + JCLW FCCJ + JJLR + DKJR                = S-KJT (JPDW FRPA FCPJ + JADW FRAA FCAJ
  + JBDW FRBA FCBJ + JCDW FRCA FCCJ)
  · (AJFA + JJFP)                          = R-KJT

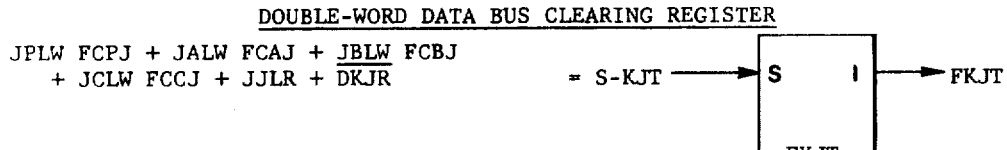

JPLW FCPK + JALW FCAK + JBLW FCBK
  + JCLW FCCK + JKLR + DKKR                = S-KKT (JPDW FRPA FCPK + JADW FRAA FCAK
  + JBDW FRBA FCBK + JCDW FRCA FCCK)
  · (AKFA + JKFP)                          = R-KKT

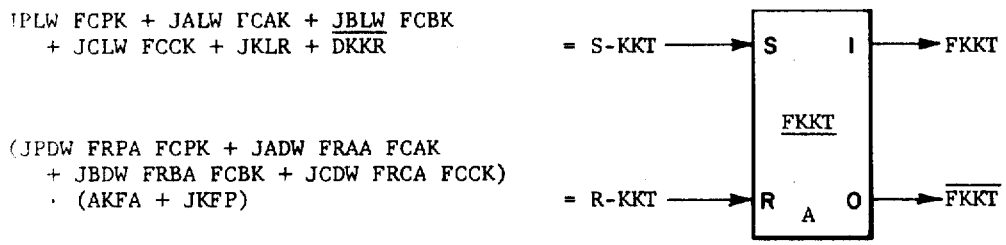

JPLW FCPL + JALW FCAL + JBLW FCBL
  + JCLW FCCL + JLLR + DKLR                = S-KLT (JPDW FRPA FCPL + JADW FRAA FCAL
  + JBDW FRBA FCBL + JCDW FRCA FCCL)
  · (ALFA + JLFP)                          = R-KLT

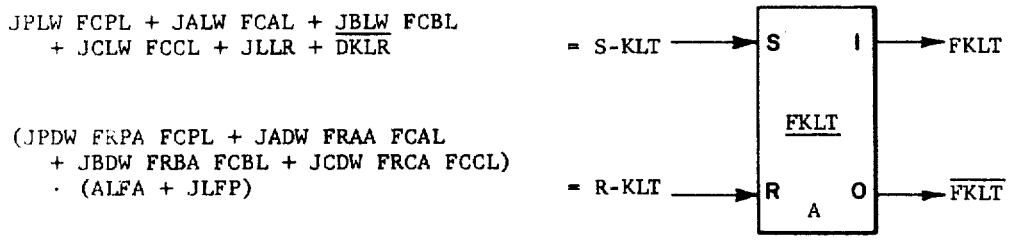

JPLW FCPM + JALW FCAM + JBLW FCBM
  + JCLW FCCM + JMLR + DKMR                = S-KMT (JPDW FRPA FCPM + JADW FRAA FCAM
  + JBDW FRBA FCBM + JCDW FRCA FCCM)
  · (AMFA + JMFP)                          = R-KMT

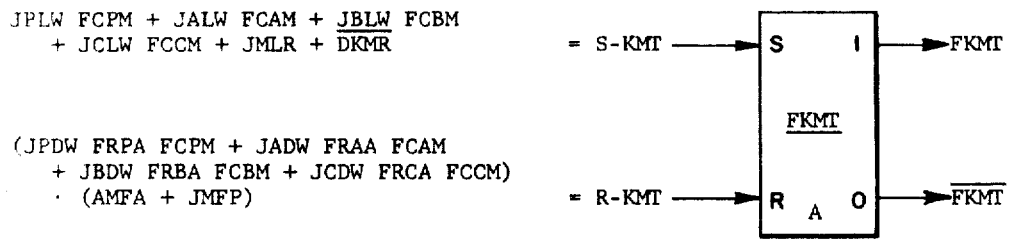

*CIC-B/S*
*FIG.56.*

DOUBLE-WORD DATA BUS CLEARING REGISTER

JPLW FCPN + JALW FCAN + JBLW FCBN
+ JCLW FCCN + JNLR + DKNR    = S-KNT → FKNT (JPDW FRPA FCPN + JADW FRAA FCAN
+ JBDW FRBA FCBN + JCDW FRCA FCCN)
· (ANFA + JNFP)    = R-KNT → $\overline{\text{FKNT}}$

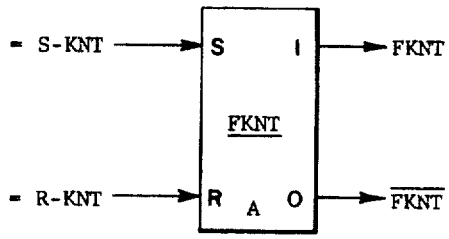

JPLW FCPT + JALW FCAT + JBLW FCBT
+ JCLW FCCT + JTLR + DKTR    = S-KTT → FKTT (JPDW FRPA FCPT + JADW FRAA FCAT
+ JBDW FRBA FCBT + JCDW FRCA FCCT)
· (ATFA + JTFP)    = R-KTT → $\overline{\text{FKTT}}$

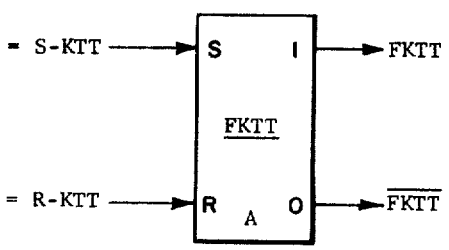

JPLW FCPV + JALW FCAV + JBLW FCBV
+ JCLW FCCV + JVLR + DKVR    = S-KVT → FKVT (JPDW FRPA FCPV + JADW FRAA FCAV
+ JBDW FRBA FCBV + JCDW FRCA FCCV)
· (AVFA + JVFP)    = R-KVT → $\overline{\text{FKVT}}$

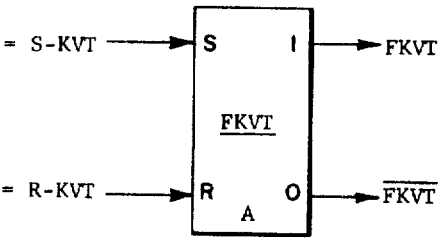

TIMER-CONTROLLER $\overline{\text{FKJM}}$ $\overline{\text{FKKM}}$ $\overline{\text{FKLM}}$ $\overline{\text{FKMM}}$ $\overline{\text{FKNM}}$ $\overline{\text{FKTM}}$ $\overline{\text{FKVM}}$    = S-KCL → FKCL (FKJM $\overline{\text{DKJR}}$ + $\overline{\text{FKJM}}$ DKJR) (FKKM $\overline{\text{DKKR}}$
+ $\overline{\text{FKKM}}$ DKKR) (FKLM $\overline{\text{DKLR}}$ + $\overline{\text{FKLM}}$ DKLR)
· (FKMM $\overline{\text{DKMR}}$ + $\overline{\text{FKMM}}$ DKMR) (FKNM $\overline{\text{DKNR}}$
+ $\overline{\text{FKNM}}$ DKNR) (FKTM $\overline{\text{DKTR}}$ + $\overline{\text{FKTM}}$ DKTR)
· (FKVM $\overline{\text{DKVR}}$ + $\overline{\text{FKVM}}$ DKVR)
· (FKJM + FKKM + FKLM + FKMM
+ FKNM + FKTM + FKVM)    = R-KCL → $\overline{\text{FKCL}}$

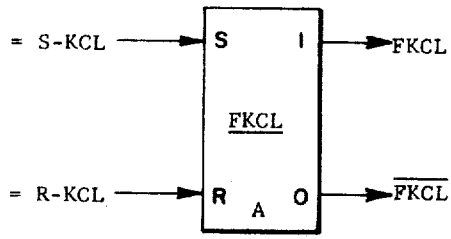

CIC-B/S
FIG. 57.

INPUT REQUEST LOGIC

JPFW FRPA FCPJ + JAFW FRAA FCAJ + JBFW FRBA FCBJ
  + JCFW FRCA FCCJ + $\overline{FRJQ}$ (JJFR + FKJN)
  · (FRPA FCPJ + FRAA FCAJ + FRBA FCBJ + FRCA FCCJ)     = DKJR JPFW FRPA FCPK + JAFW FRAA FCAK + JBFW FRBA FCBK
  + JCFW FRCA FCCK + $\overline{FRKQ}$ (JKFR + FKKN)
  · (FRPA FCPK + FRAA FCAK + FRBA FCBK + FRCA FCCK)     = DKKR JPFW FRPA FCPL + JAFW FRAA FCAL + JBFW FRBA FCBL
  + JCFW FRCA FCCL + $\overline{FRLQ}$ (JLFR + FKLN)
  · (FRPA FCPL + FRAA FCAL + FRBA FCBL + FRCA FCCL)     = DKLR JPFW FRPA FCPM + JAFW FRAA FCAM + JBFW FRBA FCBM
  + JCFW FRCA FCCM + $\overline{FRMQ}$ (JMFR + FKMN)
  · (FRPA FCPM + FRAA FCAM + FRBA FCBM + FRCA FCCM)     = DKMR JPFW FRPA FCPN + JAFW FRAA FCAN + JBFW FRBA FCBN
  + JCFW FRCA FCCN + $\overline{FRNQ}$ (JNFR + FKNN)
  · (FRPA FCPN + FRAA FCAN + FRBA FCBN + FRCA FCCN)     = DKNR JPFW FRPA FCPT + JAFW FRAA FCAT + JBFW FRBA FCBT
  + JCFW FRCA FCCT + $\overline{FRTQ}$ (JTFR + FKTN)
  · (FRPA FCPT + FRAA FCAT + FRBA FCBT + FRCA FCCT)     = DKTR JPFW FRPA FCPV + JAFW FRAA FCAV + JBFW FRBA FCBV
  + JCFW FRCA FCCV + $\overline{FRVQ}$ (JVFR + FKVN)
  · (FRPA FCPV + FRAA FCAV + FRBA FCBV + FRCA FCCV)     = DKVR

CONTROL SIGNAL TRANSMITTER

JPFW DDPR + JAFW DDAR + JBFW DDBR + JCFW DDCR     = BAFW

JPLW DDPR + JALW DDAR + JBLW DDBR + JCLW DDCR     = BALW

JJFR DDJR + JKFR DDKR + JLFR DDLR + JMFR DDMR
  + JNFR DDNR + JTFR DDTR + JVFR DDVR     = BJFR

JJLR DDJR + JKLR DDKR + JLLR DDLR + JMLR DDMR
  + JNLR DDNR + JTLR DDTR + JVLR DDVR     = BJLR

TIMER-CONTROLLER

DDPT + DDAT + DDBT + DDCT
  + DDPR + DDAR + DDBR + DDCR
  + DDJR + DDKR + DDLR + DDMR + DDNR + DDTR + DDVR
  + DDJT + DDKT + DDLT + DDMT + DDNT + DDTT + DDVT     = DKEN

<u>CIC-B/S</u>

FIG. 58.

READ GATE ENABLING SIGNAL GENERATOR (JPRD FRPA FCPJ + JARD FRAA FCAJ + JBRD FRBA FCBJ
   + JCRD FRCA FCCJ) FKJM FKJN FKJT           = DDJR (JPRD FRPA FCPK + JARD FRAA FCAK + JBRD FRBA FCBK
   + JCRD FRCA FCCK) FKKM FKKN FKKT          = DDKR (JPRD FRPA FCPL + JARD FRAA FCAL + JBRD FRBA FCBL
   + JCRD FRCA FCCL) FKLM FKLN FKLT          = DDLR (JPRD FRPA FCPM + JARD FRAA FCAM + JBRD FRBA FCBM
   + JCRD FRCA FCCM) FKMM FKMN FKMT          = DDMR (JPRD FRPA FCPN + JARD FRAA FCAN + JBRD FRBA FCBN
   + JCRD FRCA FCCN) FKNM FKNN FKNT          = DDNR (JPRD FRPA FCPT + JARD FRAA FCAT + JBRD FRBA FCBT
   + JCRD FRCA FCCT) FKTM FKTN FKTT          = DDTR (JPRD FRPA FCPV + JARD FRAA FCAV + JBRD FRBA FCBV
   + JCRD FRCA FCCV) FKVM FKVN FKVT          = DDVR (FCPJ FKJM FKJN FKJT + FCPK FKKM FKKN FKKT
   + FCPL FKLM FKLN FKLT + FCPM FKMM FKMN FKMT
   + FCPN FKNM FKNN FKNT + FCPT FKTM FKTN FKTT
   + FCPV FKVM FKVN FKVT) JPRD FRPA          = DDPT (FCAJ FKJM FKJN FKJT + FCAK FKKM FKKN FKKT
   + FCAL FKLM FKLN FKLT + FCAM FKMM FKMN FKMT
   + FCAN FKNM FKNN FKNT + FCAT FKTM FKTN FKTT
   + FCAV FKVM FKVN FKVT) JARD FRAA          = DDAT (FCBJ FKJM FKJN FKJT + FCBK FKKM FKKN FKKT
   + FCBL FKLM FKLN FKLT + FCBM FKMM FKMN FKMT
   + FCBN FKNM FKNN FKNT + FCBT FKTM FKTN FKTT
   + FCBV FKVM FKVN FKVT) JBRD FRBA          = DDBT (FCCJ FKJM FKJN FKJT + FCCK FKKM FKKN FKKT
   + FCCL FKLM FKLN FKLT + FCCM FKMM FKMN FKMT
   + FCCN FKNM FKNN FKNT + FCCT FKTM FKTN FKTT
   + FCCV FKVM FKVN FKVT) JCRD FRCA          = DDCT

CIC-B/S
FIG.59.

WRITE GATE ENABLING SIGNAL GENERATOR (JPWR FRPA FCPJ + JAWR FRAA FCAJ + JBWR FRBA FCBJ
    + JCWR FRCA FCCJ) FKJM FKJN FKJT     = DDJT (JPWR FRPA FCPK + JAWR FRAA FCAK + JBWR FRBA FCBK
    + JCWR FRCA FCCK) FKKM FKKN FKKT     = DDKT (JPWR FRPA FCPL + JAWR FRAA FCAL + JBWR FRBA FCBL
    + JCWR FRCA FCCL) FKLM FKLN FKLT     = DDLT (JPWR FRPA FCPM + JAWR FRAA FCAM + JBWR FRBA FCBM
    + JCWR FRCA FCCM) FKMM FKMN FKMT     = DDMT (JPWR FRPA FCPN + JAWR FRAA FCAN + JBWR FRBA FCBN
    + JCWR FRCA FCCN) FKNM FKNN FKNT     = DDNT (JPWR FRPA FCPT + JAWR FRAA FCAT + JBWR FRBA FCBT
    + JCWR FRCA FCCT) FKTM FKTN FKTT     = DDTT (JPWR FRPA FCPV + JAWR FRAA FCAV + JBWR FRBA FCBV
    + JCWR FRCA FCCV) FKVM FKVN FKVT     = DDVT (FCPJ FKJM FKJN FKJT + FCPK FKKM FKKN FKKT
    + FCPL FKLM FKLN FKLT + FCPM FKMM FKMN FKMT
    + FCPN FKNM FKNN FKNT + FCPT FKTM FKTN FKTT
    + FCPV FKVM FKVN FKVT) JPWR FRPA     = DDPR (FCAJ FKJM FKJN FKJT + FCAK FKKM FKKN FKKT
    + FCAL FKLM FKLN FKLT + FCAM FKMM FKMN FKMT
    + FCAN FKNM FKNN FKNT + FCAT FKTM FKTN FKTT
    + FCAV FKVM FKVN FKVT) JAWR FRAA     = DDAR (FCBJ FKJM FKJN FKJT + FCBK FKKM FKKN FKKT
    + FCBL FKLM FKLN FKLT + FCBM FKMM FKMN FKMT
    + FCBN FKNM FKNN FKNT + FCBT FKTM FKTN FKTT
    + FCBV FKVM FKVN FKVT) JBWR FRBA     = DDBR (FCCJ FKJM FKJN FKJT + FCCK FKKM FKKN FKKT
    + FCCL FKLM FKLN FKLT + FCCM FKMM FKMN FKMT
    + FCCN FKNM FKNN FKNT + FCCT FKTM FKTN FKTT
    + FCCV FKVM FKVN FKVT) JCWR FRCA     = DDCR

CIC-B/S
FIG.60.

READ ACKNOWLEDGMENT SIGNAL TRANSMITTER

FCPJ JPFA + FCAJ JAFA + FCBJ JBFA + FCCJ JCFA   = AJFA

FCPK JPFA + FCAK JAFA + FCBK JBFA + FCCK JCFA   = AKFA

FCPL JPFA + FCAL JAFA + FCBL JBFA + FCCL JCFA   = ALFA

FCPM JPFA + FCAM JAFA + FCBM JBFA + FCCM JCFA   = AMFA

FCPN JPFA + FCAN JAFA + FCBN JBFA + FCCN JCFA   = ANFA

FCPT JPFA + FCAT JAFA + FCBT JBFA + FCCT JCFA   = ATFA

FCPV JPFA + FCAV JAFA + FCBV JBFA + FCCV JCFA   = AVFA

FCPJ JPLA + FCAJ JALA + FCBJ JBLA + FCCJ JCLA   = AJLA

FCPK JPLA + FCAK JALA + FCBK JBLA + FCCK JCLA   = AKLA

FCPL JPLA + FCAL JALA + FCBL JBLA + FCCL JCLA   = ALLA

FCPM JPLA + FCAM JALA + FCBM JBLA + FCCM JCLA   = AMLA

FCPN JPLA + FCAN JALA + FCBN JBLA + FCCN JCLA   = ANLA

FCPT JPLA + FCAT JALA + FCBT JBLA + FCCT JCLA   = ATLA

FCPV JPLA + FCAV JALA + FCBV JBLA + FCCV JCLA   = AVLA

*CIC-B/S*

*FIG. 61.*

WRITE ACKNOWLEDGMENT SIGNAL TRANSMITTER

JJFP = BJFP

JKFP = BKFP

JLFP = BLFP

JMFP = BMFP

JNFP = BNFP

JTFP = BTFP

JVFP = BVFP

JJLP = BJLP

JKLP = BKLP

JLLP = BLLP

JMLP = BMLP

JNLP = BNLP

JTLP = BTLP

JVLP = BVLP

CIC-B/S
FIG.62.

REQUEST REGISTER
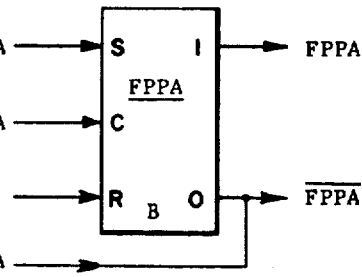
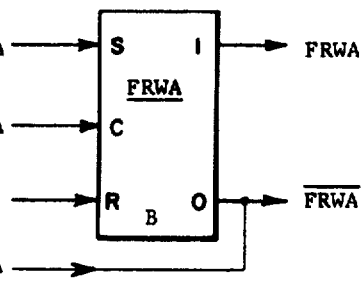
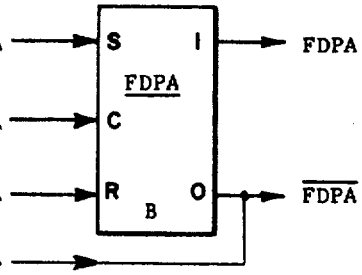
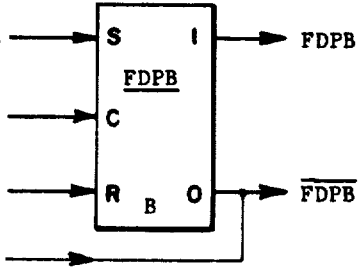
CIS
FIG. 63.

REQUEST REGISTER

DHCC $\overline{\text{DSDC}}$ = S-DPC → S  I → FDPC
                                    FDPC
$\overline{\text{FSRC}}$ FSRA + DAB2   = C-DPC → C DSDC                = R-DPC → R$_B$  O → $\overline{\text{FDPC}}$ FSRC $\overline{\text{FSRB}}$ FSRA ──→

SEQUENCER $\overline{\text{FSRC}}$
DCDC $\overline{\text{FSRB}}$ $\overline{\text{FSRA}}$ $\overline{\text{DAB1}}$ $\overline{\text{DAB2}}$  = S-SRC → S  I → FSRC
 + $\overline{\text{DHSM}}$ $\overline{\text{IRCA}}$ FSRB FSRA                                          FSRC
 + $\overline{\text{DRWC}}$ FSRB FSRA                            = C-SRC → C FSRC                                                = R-SRC → R$_B$  O → $\overline{\text{FSRC}}$ $\overline{\text{FSRB}}$                                                 = S-SRB → S  I → FSRB
                                                                                   FSRB
DADS $\overline{\text{FSRC}}$ FSRA
  + DHAR FSRC FSRB + DAB1                           = C-SRB → C FSRB                                                = R-SRB → R$_B$  O → $\overline{\text{FSRB}}$ $\overline{\text{FSRA}}$                                                 = S-SRA → S  I → FSRA
                                                                                   FSRA
DBPR.$\overline{\text{FSRC}}$ $\overline{\text{FSRB}}$ + DHSM $\overline{\text{FSRC}}$ FSRB
  + FSRC FSRB + $\overline{\text{DADS}}$ $\overline{\text{DSRW}}$ FSRC $\overline{\text{FSRB}}$   = C-SRA → C FSRA                                                = R-SRA → R$_B$  O → $\overline{\text{FSRA}}$

CIS
FIG. 64

TRANSFER CONTROL REGISTER
| | | |
|---|---|---|
| DCTM | = S-TAA | |
| $\overline{DSDA}$ | = C-TAA | |
| FTAA | = R-TAA | |
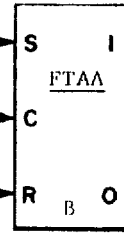
Outputs: FTAA, $\overline{FTAA}$
| | | |
|---|---|---|
| DCTM | = S-TAB | |
| $\overline{DSDB}$ | = C-TAB | |
| FTAB | = R-TAB | |
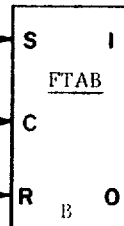
Outputs: FTAB, $\overline{FTAB}$
| | | |
|---|---|---|
| DCTM | = S-TAC | |
| $\overline{DSDC}$ | = C-TAC | |
| FTAC | = R-TAC | |
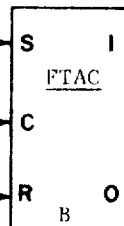
Outputs: FTAC, $\overline{FTAC}$
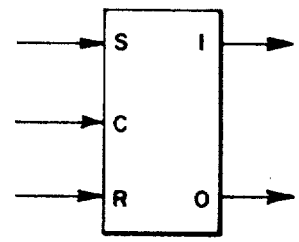
CIS
FIG. 65.

SELF-INTERRUPT CONTROL REGISTER

DSDA = S-SCA

DCAN DHS5 FSRC FSRB
 + DSSA + DSSB + DSSC = C-SCA

FSCA = R-SCA

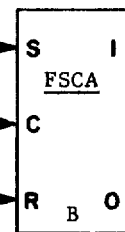

→ FSCA

→ $\overline{FSCA}$

DSDB = S-SCB

DCAN DHS5 FSRC FSRB
 + DSSA + DSSB + DSSC = C-SCB

FSCB = R-SCB

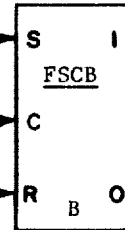

→ FSCB

→ $\overline{FSCB}$

DSDC = S-SCC

DCAN DHS5 FSRC FSRB
 + DSSA + DSSB + DSSC = C-SCC

FSCC = R-SCC

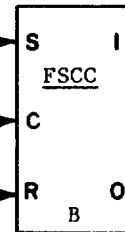

→ FSCC

→ $\overline{FSCC}$

REQUEST-INTERRUPT SELECTOR (DCAN DHS4 + DRWC) $\overline{FRDA}$ $\overline{FRDB}$ $\overline{FRDC}$ = T-RCA

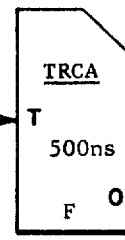

→ $\overline{TRCA}$

CIS
FIG. 66.

REQUEST-INTERRUPT CONTROL REGISTER

DQRH DC31 DC21 $\overline{\text{FRDA}}$ $\overline{\text{FRDB}}$ $\overline{\text{FRDC}}$      = S-RDA → S   I → FRDA $\overline{\text{TRCA}}$ $\overline{\text{FRDA}}$ $\overline{\text{FRDB}}$ $\overline{\text{FRDC}}$     FRDA
  + DSRA + DSRB + DSRC      = C-RDA → C FRDA      = R-RDA → R   O → $\overline{\text{FRDA}}$
          B

FSCA + DANA →

DQRH DC32 $\overline{\text{DC21}}$ $\overline{\text{FRDA}}$ FRDB $\overline{\text{FRDC}}$      = S-RDB → S   I → FRDB $\overline{\text{TRCA}}$ $\overline{\text{FRDA}}$ $\overline{\text{FRDB}}$ $\overline{\text{FRDC}}$     FRDB
  + DSRA + DSRB + DSRC      = C-RDB → C FRDB      = R-RDB → R   O → $\overline{\text{FRDB}}$
          B

FSCB + DANB →

DQRH $\overline{\text{DC32}}$ $\overline{\text{DC31}}$ $\overline{\text{FRDA}}$ $\overline{\text{FRDB}}$ FRDC      = S-RDC → S   I → FRDC $\overline{\text{TRCA}}$ $\overline{\text{FRDA}}$ $\overline{\text{FRDB}}$ $\overline{\text{FRDC}}$     FRDC
  + DSRA + DSRB + DSRC      = C-RDC → C FRDC      = R-RDC → R   O → $\overline{\text{FRDC}}$
          B

FSCC + DANC →

PASSIVE MODE CONTROL

DSRW $\overline{\text{FCWP}}$      = S-CWP → S   I → FCWP

DWPM DSRW $\overline{\text{FCWP}}$     FCWP
  +DPWA + DPWB + DPWC      = C-CWP → C FCWP      = R-CWP → R   O → $\overline{\text{FCWP}}$
          B <u>CIS</u>
FIG. 67

May 13, 1969  J. P. BARLOW ET AL  3,444,525
CENTRALLY CONTROLLED MULTICOMPUTER SYSTEM
Original Filed Nov. 16, 1965  Sheet _74_ of 117
PASSIVE MODE REQUEST REGISTER
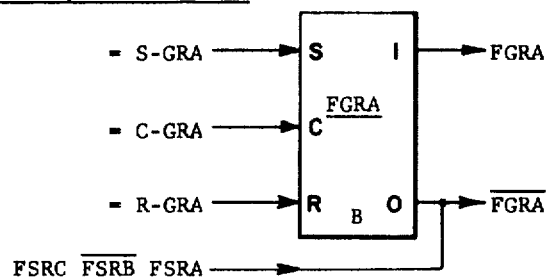
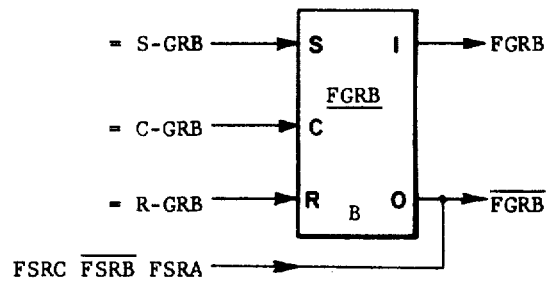
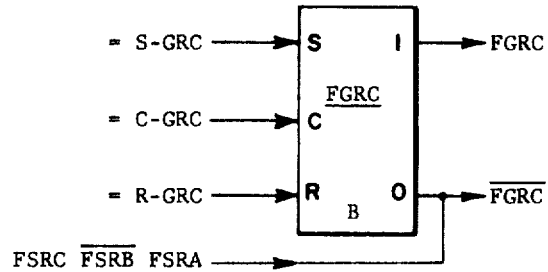
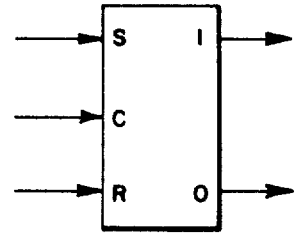
*CIS*
*FIG.68.*

PASSIVE MODE CONTROL

DSRW $\overline{\text{FCRP}}$       = S-CRP  → FCRP

DRPM $\overline{\text{FCRP}}$ + $\overline{\text{DRPM}}$   = C-CRP

FCRP         = R-CRP  → $\overline{\text{FCRP}}$

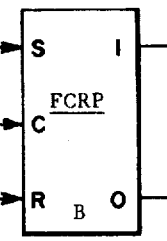

INTERRUPT RESPONSE CONTROL REGISTER

DADA DDRA $\overline{\text{FPCA}}$ $\overline{\text{FPCB}}$ $\overline{\text{FPCC}}$   = S-PCA  → FPCA FCRP + $\overline{\text{DLSA}}$ $\overline{\text{DLRA}}$ (FPCA + FPCB + FPCC) = C-PCA FPCA         = R-PCA  → $\overline{\text{FPCA}}$

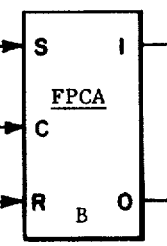

DADB DDRB $\overline{\text{FPCA}}$ $\overline{\text{FPCB}}$ $\overline{\text{FPCC}}$   = S-PCB  → FPCB FCRP + $\overline{\text{DLSA}}$ $\overline{\text{DLRA}}$ (FPCA + FPCB + FPCC) = C-PCB FPCB         = R-PCB  → $\overline{\text{FPCB}}$

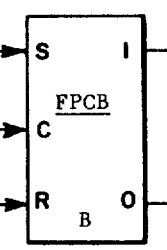

DADC DDRC $\overline{\text{FPCA}}$ $\overline{\text{FPCB}}$ $\overline{\text{FPCC}}$   = S-PCC  → FPCC FCRP + $\overline{\text{DLSA}}$ $\overline{\text{DLRA}}$ (FPCA + FPCB + FPCC) = C-PCC FPCC         = R-PCC  → $\overline{\text{FPCC}}$

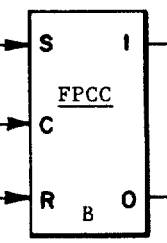

CIS
FIG. 69.

PL REGISTER-A
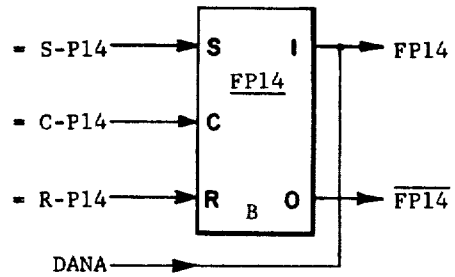
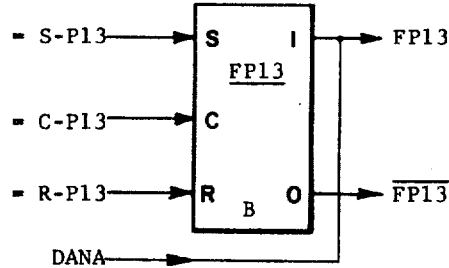
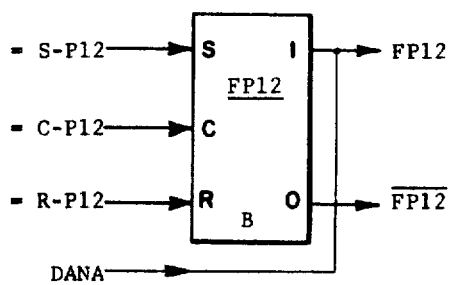
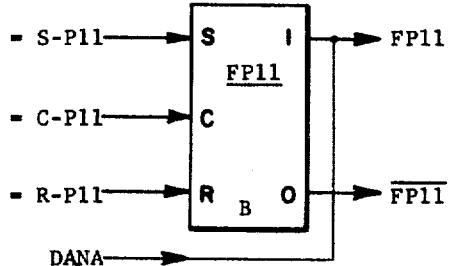
CIS
FIG.70.

PL REGISTER-B
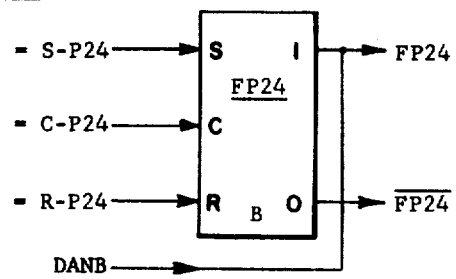
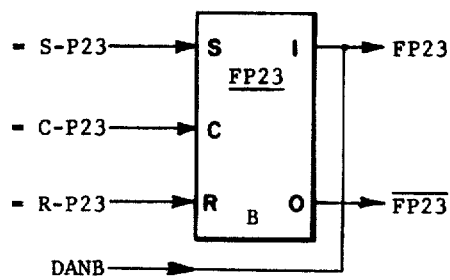
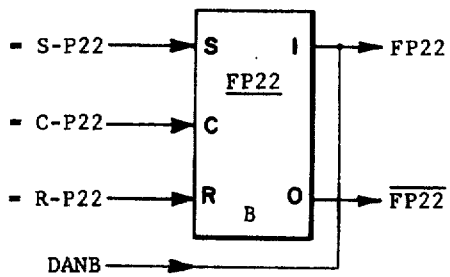
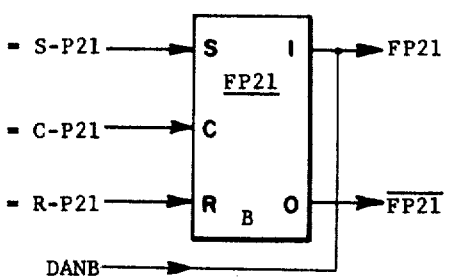
*CIS*
*FIG.71.*

PL REGISTER-C
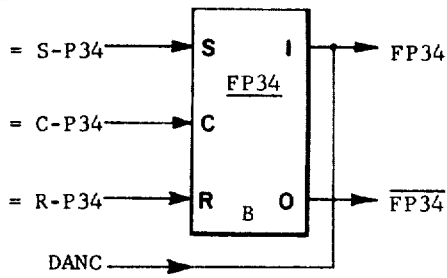
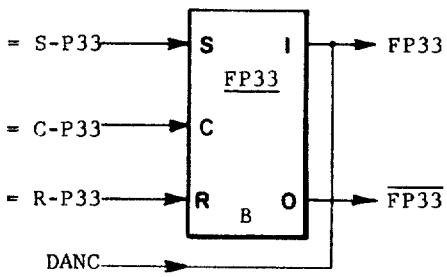
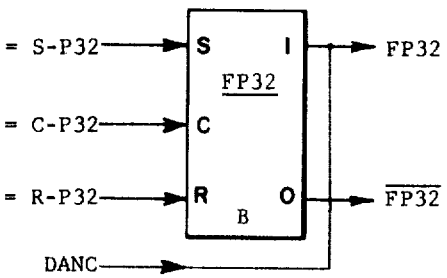
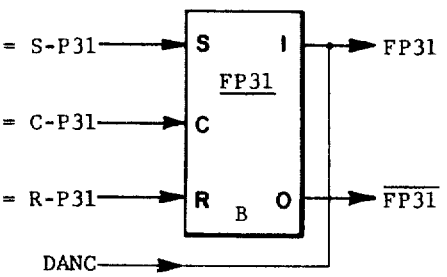
CIS
FIG.72.

SELF-INTERRUPT FL REGISTER
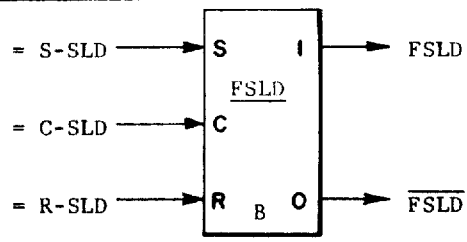
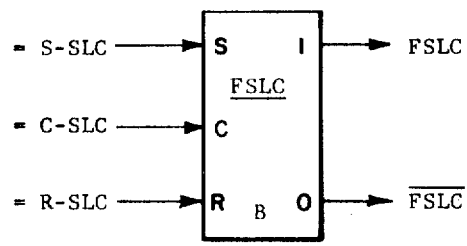
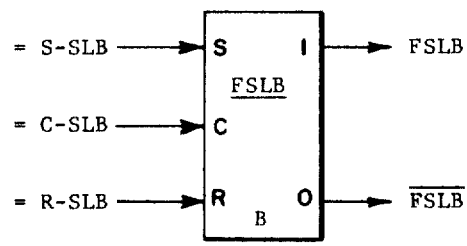
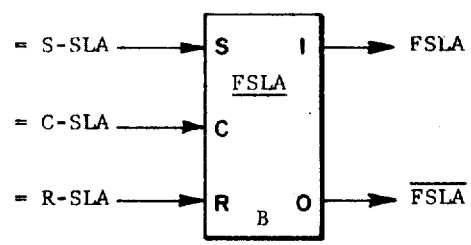
CIS
FIG.73.

QUEUED PL REGISTER
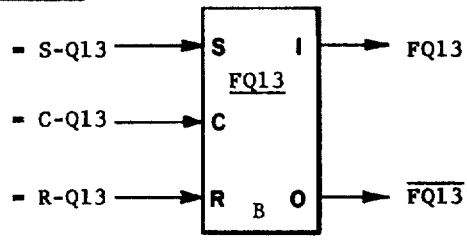
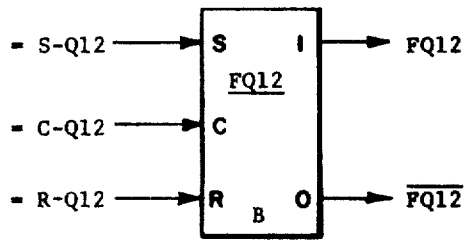
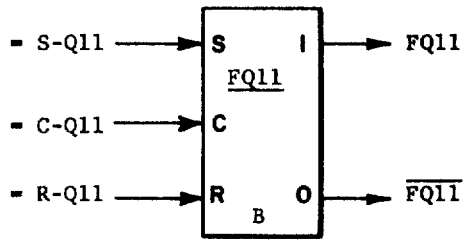
DSQK
DCAN DHS4
 + $\overline{DHS9}$ $\overline{DHS8}$ $\overline{DHS0}$ (DHS7 + DHS6)
DHS7 DHS6
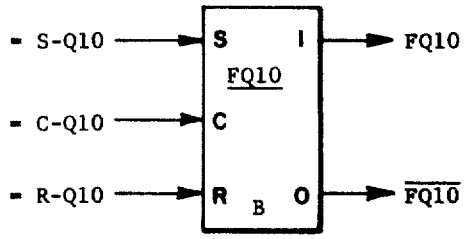
*CIS*
*FIG.74.*

QUEUED PL REGISTER

DSQJ  = S-Q09

DCAN DHS4
+ $\overline{DHS9}$ $\overline{DHS8}$ $\overline{DHS0}$ (DHS7 + DHS6)  = C-Q09

DHS7 $\overline{DHS6}$  = R-Q09

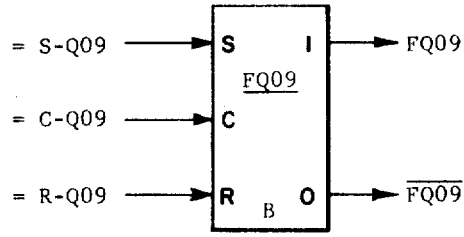

DSQH  = S-Q08

DCAN DHS4
+ $\overline{DHS9}$ $\overline{DHS8}$ $\overline{DHS0}$ (DHS7 + DHS6)  = C-Q08

$\overline{DHS7}$ DHS6  = R-Q08

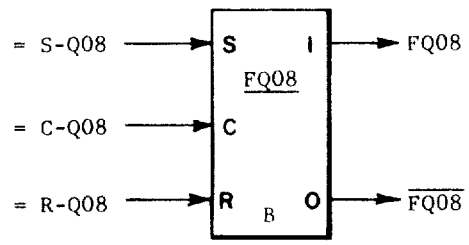

DSQG  = S-Q07

DCAN DHS4 + DSRA + DSRB + DSRC  = C-Q07

$\overline{DHQD}$ DHQC DHQB DHQA DSRW  = R-Q07

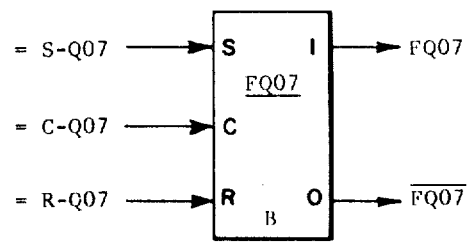

DSQF  = S-Q05

DCAN DHS4 + DSRA + DSRB + DSRC  = C-Q05

$\overline{DHQD}$ DHQC $\overline{DHQB}$ DHQA DSRW  = R-Q05

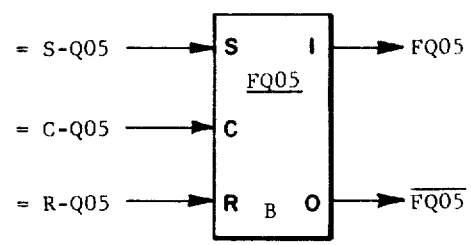

CIS
FIG. 75.

DEFINER COUNTER PL 10
$\overline{F105}$ = S-105 → F105
$\overline{F104}$ = C-105 →
F105 = R-105 → $\overline{F105}$
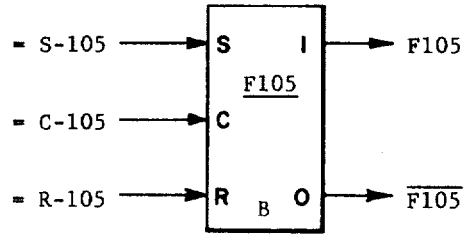
$\overline{F104}$ = S-104 → F104
$\overline{F103}$ = C-104 →
F104 = R-104 → $\overline{F104}$
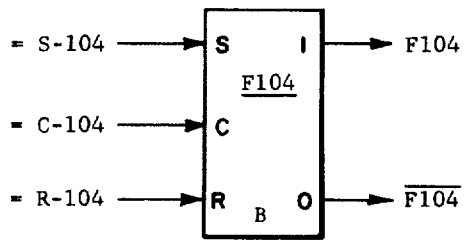
$\overline{F103}$ = S-103 → F103
$\overline{F102}$ = C-103 →
F103 = R-103 → $\overline{F103}$
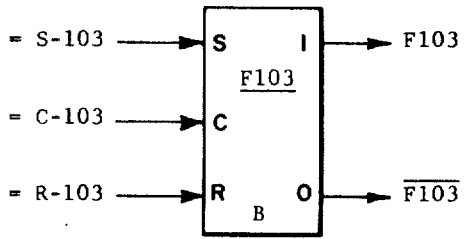
$\overline{F102}$ = S-102 → F102
$\overline{F101}$ = C-102 →
F102 = R-102 → $\overline{F102}$
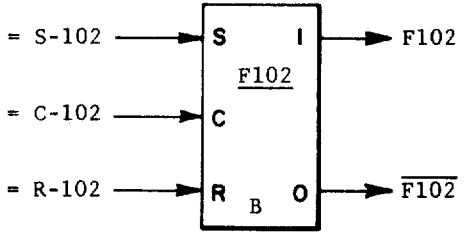
*CIS*
*FIG.76.*

May 13, 1969  J. P. BARLOW ET AL  3,444,525
CENTRALLY CONTROLLED MULTICOMPUTER SYSTEM
Original Filed Nov. 16, 1965  Sheet 83 of 117
DEFINER COUNTER PL 10
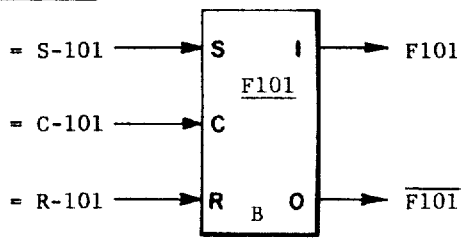
DEFINER COUNTER PL 9
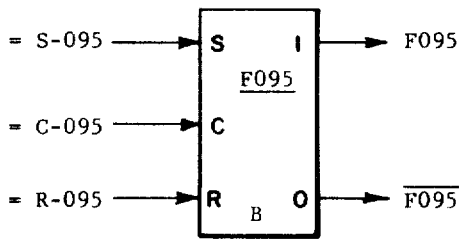
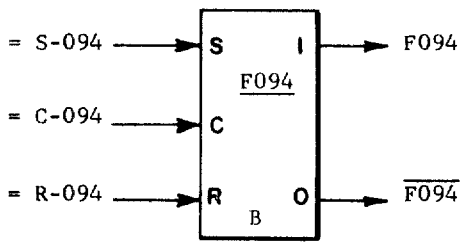
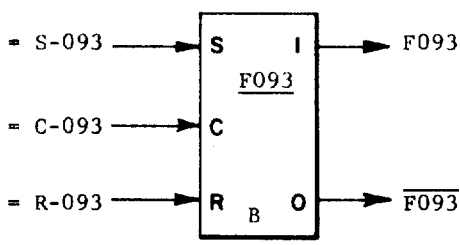
CIS
FIG.77.

DEFINER COUNTER PL 9
$\overline{F092}$            = S-092
$\overline{F091}$            = C-092
F092            = R-092
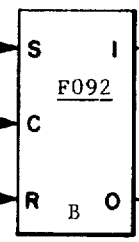
$\overline{F091}$            = S-091
($\overline{DSQJ}$ $\overline{DCAN}$ $\overline{DHS4}$)    = C-091
F091            = R-091
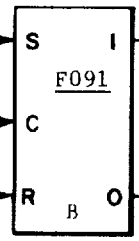
DEFINER COUNTER PL 8
$\overline{F085}$            = S-085
$\overline{F084}$            = C-085
F085            = R-085
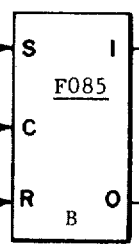
$\overline{F084}$            = S-084
$\overline{F083}$            = C-084
F084            = R-084
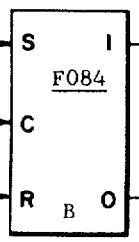
*CIS*
*FIG. 78.*

DEFINER COUNTER PL 8

| | | |
|---|---|---|
| $\overline{F083}$ | = S-083 → S  I → F083 | |
| $\overline{F082}$ | = C-083 → C  F083 | |
| F083 | = R-083 → R  B  O → $\overline{F083}$ | |

| | | |
|---|---|---|
| $\overline{F082}$ | = S-082 → S  I → F082 | |
| $\overline{F081}$ | = C-082 → C  F082 | |
| F082 | = R-082 → R  B  O → $\overline{F082}$ | |

| | | |
|---|---|---|
| $\overline{F081}$ | = S-081 → S  I → F081 | |
| $\overline{(DSQH\ DCAN\ DHS4)}$ | = C-081 → C  F081 | |
| F081 | = R-081 → R  B  O → $\overline{F081}$ | |

CIS

CIS PRIORITY ALLOCATION LOGIC

FPPA  =  DSPA

FRWA $\overline{\text{FPPA}}$  =  DSRW

FDPA [DADA + $(\overline{\text{FDPB}} + \overline{\text{DADB}})$ $(\overline{\text{FDPC}} + \overline{\text{DADC}})$] $\overline{\text{FPPA}}$ $\overline{\text{FRWA}}$  =  DSDA FDPB [$\overline{\text{FDPA}}$ $(\overline{\text{FDPC}} + \overline{\text{DADC}})$ + DADB $(\overline{\text{FDPA}} + \overline{\text{DADA}})$] $\overline{\text{FPPA}}$ $\overline{\text{FRWA}}$  =  DSDB FDPC [$\overline{\text{FDPA}}$ $\overline{\text{FDPB}}$ + DADC $(\overline{\text{FDPA}}$ $\overline{\text{DADB}}$
+ $\overline{\text{FDPB}}$ $\overline{\text{DADA}}$ + $\overline{\text{DADA}}$ $\overline{\text{DADB}}$)] $\overline{\text{FPPA}}$ $\overline{\text{FRWA}}$  =  DSDC

DSPA + DSDA + DSDB + DSDC  =  DADS

DSPA FSRB  =  DHPE

DSDA FSRB  =  DHAE

DSDB FSRB  =  DHBE

DSDC FSRB  =  DHCE

SEQUENCER

DHAC + DHBC + DHCC + DHPC + FCAS + FCBS + FCCS  =  DBPR

DSRW $\overline{\text{FCRP}}$ $\overline{\text{FCWP}}$
 ·[DDRA $(\overline{\text{FCAS}}$ $\overline{\text{FRAA}})$ + DDRB $(\overline{\text{FCBS}}$ $\overline{\text{FRBA}})$ + DDRC $(\overline{\text{FCCS}}$ $\overline{\text{FRCA}})$]  =  DRWC DSAQ DCAN DHS5 $\overline{\text{DMPR}}$ $\overline{\text{FSRC}}$ $\overline{\text{FSRB}}$ $\overline{\text{FSRA}}$  =  DAB1

DSAQ DCAN DHS5 DMPR  =  DAB2

<u>CIS</u>

FIG.80

SYMBOLIC WORD ADDRESS DECODER (DHS5 + DHS4)(DHS3 + DHS2) $\overline{\text{DCT0}}$ FSRB = DCAN $\overline{\text{DHS5}}$ $\overline{\text{DHS4}}$ $\overline{\text{DHS3}}$
· ($\overline{\text{DHS2}}$ DHS1 + DHS2 $\overline{\text{DHS1}}$ + $\overline{\text{DHS1}}$ DHS0 + DHS1 $\overline{\text{DHS0}}$)
· $\overline{\text{DCT0}}$ FSRB = DCXR $\overline{\text{DHS5}}$ $\overline{\text{DHS4}}$ $\overline{\text{DHS3}}$ $\overline{\text{DHS2}}$ $\overline{\text{DHS1}}$ $\overline{\text{DHS0}}$ $\overline{\text{DCT0}}$ FSRB = DCST $\overline{\text{DHS5}}$ $\overline{\text{DHS4}}$ $\overline{\text{DHS3}}$ DHS2 DHS1 DHS0 $\overline{\text{DCT0}}$ FSRB = DCAM $\overline{\text{DHS5}}$ $\overline{\text{DHS4}}$ DHS3 $\overline{\text{DHS2}}$ $\overline{\text{DCT0}}$ FSRB = DCAA $\overline{\text{DHS5}}$ $\overline{\text{DHS4}}$ DHS3 DHS2 $\overline{\text{DHS1}}$ $\overline{\text{DHS0}}$ $\overline{\text{DCT0}}$ FSRB = DCTV $\overline{\text{DHS5}}$ $\overline{\text{DHS4}}$ DHS3 DHS2 $\overline{\text{DHS1}}$ DHS0 $\overline{\text{DCT0}}$ FSRB = DCTM

DCT0 FSRB = DCTA

FTAA DSDA + FTAB DSDB + FTAC DSDC
 + DHS5 DHS4 DHSM + DHS9 + DHS8 + DHS7 + DHS6 + $\overline{\text{DHSM}}$ = DCT0

$\overline{\text{FTAA DSDA}}$ $\overline{\text{FTAB DSDB}}$ $\overline{\text{FTAC DSDC}}$
· (DHS5 + DHS4) $\overline{\text{DHS9}}$ $\overline{\text{DHS8}}$ $\overline{\text{DHS7}}$ $\overline{\text{DHS6}}$ DHSM = $\overline{\text{DCT0}}$

DCAN + DCXR + DCST + DCAM + DCAA + DCTV + DCTM + DCTA = DCDC

PASSIVE MODE CONTROL

FCRP = DHRP

MISCELLANEOUS LOGICAL COMBINATION SIGNALS

FSCA + FRDA = DADA

FSCB + FRDB = DADB

FSCC + FRDC = DADC

FSRC FSRB FSRA + DCTA = DHAM

FSCA + FSCB + FSCC = DSAQ

FDPA FDPB + FDPA FDPC + FDPB FDPC = DMPR

CIS
FIG. 81.

ACTUAL WORD ADDRESS ENCODER

[DCST (DSDB + DSDC)] FSRC FSRB FSRA + DCTA DHS9 = DHA9

[DGDC + DCXR + DCST DSDA] FSRC FSRB FSRA + DCTA DHS8 = DHA8

[DCAN DHS4 (DSQJ + DSQK) + DCST DSDA] FSRC FSRB FSRA
   + DCTA DHS7 = DHA7

[DCAN DHS4 (DSQH + DSQK) + DCXR DSLD DSLC + DCST DSDA
   + DPL8 DSLD] FSRC FSRB FSRA + DCTA DHS6 = DHA6

[DGDC + DDL5 + DCXR $\overline{\text{DSLC}}$ + DPL4 DSLD DSLC + DPL8 $\overline{\text{DSLD}}$ DSLC
   + DCAM] FSRC FSRB FSRA + DCTA DHS5 = DHA5

[DDL4 + DCXR DSLB + DPL4 $\overline{\text{DSLC}}$ + DPL8 DSLC
   + DCAM] FSRC FSRB FSRA + DCTA DHS4 = DHA4

[DGDC + DDL3 + DCXR DSLA + DPL4 DSLB + DPL8 DSLB
   + DCAM (DSDA + DSDB)] FSRC FSRB FSRA + DCTA DHS3 = DHA3

[DGDC + DDL2 + DCXR DHS2 (DHS1 + DHS0) + DPL4 DSLA
   + DPL8 DSLA + DCAM (DSPA + DSDB)] FSRC FSRB FSRA
   + DCTA DHS2 = DHA2

[DGDC + DDL1 + DCXR (DHS1 DHS0 + $\overline{\text{DHS1}}$ $\overline{\text{DHS0}}$)
   + DCTV (DSDA + DSDB)] FSRC FSRB FSRA + DCTA DHS1 = DHA1

[DCXR $\overline{\text{DHS0}}$ + DCTV DSDB] FSRC FSRB FSRA + DCTA DHS0 = DHA0

$\overline{\text{DHS1}}$ $\overline{\text{DHS0}}$ DCAA = DFPC

DHS1 $\overline{\text{DHS0}}$ DCAA = DFAC $\overline{\text{DHS1}}$ DHS0 DCAA = DFBC

DHS1 DHS0 DCAA = DFCC

DCST (DSDA + DSDB) + DCTV = DPL4

DCST DSDC = DPL8

DCAN (DHS3 + DHS2 + DHS1 DHS0) + DCAA + DCTM = DGDC

*CIS*
FIG. 82.

PASSIVE PRIORITY ALLOCATION LOGIC

FGRA = DDRA

FGRB $\overline{\text{FGRA}}$ = DDRB

FGRC $\overline{\text{FGRA}}$ $\overline{\text{FGRB}}$ = DDRC

INITIATE R/W PL TABLE LOGIC

DDRA DDAT + DDRB DDBT + DDRC DDCT = DRPM

DDRA DDAR + DDRB DDBR + DDRC DDCR = DWPM

WRITE PL TABLE LOGIC

FCWP DDRA = DPWA

FCWP DDRB = DPWB

FCWP DDRC = DPWC

SELF-REQUEST SELECT LOGIC

FPCA FRDA + FPCB FRDB + FPCC FRDC = DLRA

FPCA FSCA + FPCB FSCB + FPCC FSCC = DLSA

MODIFY PL TABLE LOGIC

DLRA $\overline{\text{FCRP}}$ FRDA = DSRA

DLRA $\overline{\text{FCRP}}$ FRDB = DSRB

DLRA $\overline{\text{FCRP}}$ FRDC = DSRC

DLSA $\overline{\text{FCRP}}$ FSCA = DSSA

DLSA $\overline{\text{FCRP}}$ FSCB = DSSB

DLSA $\overline{\text{FCRP}}$ FSCC = DSSC

*CIS*

FIG.83.

PL TABLE INPUT GATES

| | |
|---|---|
| DWPM DHW3 + DLSA FSLD + DLRA DHQD | = DPLD |
| DWPM DHW2 + DLSA FSLC + DLRA DHQC | = DPLC |
| DWPM DHW1 + DLSA FSLB + DLRA DHQB | = DPLB |
| DWPM DHW0 + DLSA FSLA + DLRA DHQA | = DPLA |

SELECTED PL SIGNAL GATES

FP14 (DSDA + FRWA DDRA)
    + FP24 (DSDB + FRWA DDRB) + FP34 (DSDC + FRWA DDRC)    = DSLD

FP13 (DSDA + FRWA DDRA)
    + FP23 (DSDB + FRWA DDRB) + FP33 (DSDC + FRWA DDRC)    = DSLC

FP12 (DSDA + FRWA DDRA)
    + FP22 (DSDB + FRWA DDRB) + FP32 (DSDC + FRWA DDRC)    = DSLB

FP11 (DSDA + FRWA DDRA)
    + FP21 (DSDB + FRWA DDRB) + FP31 (DSDC + FRWA DDRC)    = DSLA

PL SIGNAL TRANSMITTER

| | |
|---|---|
| DSLD FCRP | = DHR3 |
| DSLC FCRP | = DHR2 |
| DSLB FCRP | = DHR1 |
| DSLA FCRP | = DHR0 |

*CIS*
*FIG.84.*

HIGHEST QUEUED PL ENCODER

FQ13 + FQ12 + FQ11 + FQ10 $\overline{DP10}$ + FQ09 $\overline{DP09}$ + FQ08 $\overline{DP08}$ = DHQD FQ13 + FQ12
  + (FQ07 + FQ05) $\overline{FQ11}$ $(\overline{FQ10}$ + DP10)($\overline{FQ09}$ + DP09)($\overline{FQ08}$
  + DP08) = DHQC (FQ11 + FQ10 $\overline{DP10}$) $\overline{FQ13}$ $\overline{FQ12}$
  + FQ07 $\overline{FQ13}$ $\overline{FQ12}$ ($\overline{FQ09}$ + DP09)($\overline{FQ08}$ + DP08) = DHQB FQ13 + FQ11 $\overline{FQ12}$
  + FQ09 $\overline{DP09}$ $\overline{FQ12}$ ($\overline{FQ10}$ + DP10)
  + (FQ07 + FQ05) $\overline{FQ12}$ ($\overline{FQ10}$ + DP10)($\overline{FQ08}$ + DP08) = DHQA

LOWEST PROCESSOR PL ENCODER

FP34 $\overline{DC31}$ $\overline{DC32}$ + FP24 DC32 $\overline{DC21}$ + FP14 DC21 DC31 = DLCD FP33 $\overline{DC31}$ $\overline{DC32}$ + FP23 DC32 $\overline{DC21}$ + FP13 DC21 DC31 = DLCC FP32 $\overline{DC31}$ $\overline{DC32}$ + FP22 DC32 $\overline{DC21}$ + FP12 DC21 DC31 = DLCB FP31 $\overline{DC31}$ $\overline{DC32}$ + FP21 DC32 $\overline{DC21}$ + FP11 DC21 DC31 = DLCA FP34 $\overline{FP14}$ + (FP34 + $\overline{FP14}$)($\overline{FP34}$ + FP14) FP33 $\overline{FP13}$
  + (FP34 + $\overline{FP14}$)($\overline{FP34}$ + FP14)(FP33 + $\overline{FP13}$)($\overline{FP33}$ + FP13)
  · FP32 $\overline{FP12}$ + (FP34 + $\overline{FP14}$)($\overline{FP34}$ + FP14)(FP33 + $\overline{FP13}$)
  · ($\overline{FP33}$ + FP13)(FP32 + $\overline{FP12}$)($\overline{FP32}$ + FP12) FP31 $\overline{FP11}$ = DC31

FP34 $\overline{FP24}$ + (FP34 + $\overline{FP24}$)($\overline{FP34}$ + FP24) FP33 $\overline{FP23}$
  + (FP34 + $\overline{FP24}$)($\overline{FP34}$ + FP24)(FP33 + $\overline{FP23}$)($\overline{FP33}$ + FP23)
  · FP32 $\overline{FP22}$ + (FP34 + $\overline{FP24}$)($\overline{FP34}$ + FP24)(FP33 + $\overline{FP23}$)
  · ($\overline{FP33}$ + FP23)(FP32 + $\overline{FP22}$)($\overline{FP32}$ + FP22) FP31 $\overline{FP21}$ = DC32

FP24 $\overline{FP14}$ + (FP24 + $\overline{FP14}$)($\overline{FP24}$ + FP14) FP23 $\overline{FP13}$
  + (FP24 + $\overline{FP14}$)($\overline{FP24}$ + FP14)(FP23 + $\overline{FP13}$)($\overline{FP23}$ + FP13)
  · FP22 $\overline{FP12}$ + (FP24 + $\overline{FP14}$)($\overline{FP24}$ + FP14)(FP23 + $\overline{FP13}$)
  · ($\overline{FP23}$ + FP13)(FP22 + $\overline{FP12}$)($\overline{FP22}$ + FP12) FP21 $\overline{FP11}$ = DC21

HQL v LPL COMPARATOR

DHQD $\overline{DLCD}$ + (DHQD + $\overline{DLCD}$)($\overline{DHQD}$ + DLCD) DHQC $\overline{DLCC}$
  + (DHQD + $\overline{DLCD}$)($\overline{DHQD}$ + DLCD)(DHQC + $\overline{DLCC}$)($\overline{DHQC}$ + DLCC)
  · DHQB $\overline{DLCB}$ + (DHQD + $\overline{DLCD}$)($\overline{DHQD}$ + DLCD)(DHQC + $\overline{DLCC}$)
  · ($\overline{DHQC}$ + DLCC)(DHQB + $\overline{DLCB}$)($\overline{DHQB}$ + DLCB) DHQA $\overline{DLCA}$ = DQRH

CIS
FIG. 85.

PRIORITY LEVEL DECODER

DHS3 $\overline{\text{DHS2}}$ DHS1 $\overline{\text{DHS0}}$ = DSQK

DHS3 $\overline{\text{DHS2}}$ $\overline{\text{DHS1}}$ DHS0 = DSQJ

DHS3 $\overline{\text{DHS2}}$ $\overline{\text{DHS1}}$ $\overline{\text{DHS0}}$ = DSQH $\overline{\text{DHS3}}$ DHS2 DHS1 DHS0 = DSQG $\overline{\text{DHS3}}$ DHS2 $\overline{\text{DHS1}}$ DHS0 = DSQF

PL 8, 9, 10 DECODER

FP14 $\overline{\text{FP13}}$ $\overline{\text{FP12}}$ $\overline{\text{FP11}}$
+ FP24 $\overline{\text{FP23}}$ FP22 $\overline{\text{FP21}}$ + FP34 $\overline{\text{FP33}}$ FP32 $\overline{\text{FP31}}$  = DP10

FP14 $\overline{\text{FP13}}$ $\overline{\text{FP12}}$ FP11
+ FP24 $\overline{\text{FP23}}$ $\overline{\text{FP22}}$ FP21 + FP34 $\overline{\text{FP33}}$ $\overline{\text{FP32}}$ FP31  = DP09

FP14 $\overline{\text{FP13}}$ $\overline{\text{FP12}}$ $\overline{\text{FP11}}$
+ FP24 $\overline{\text{FP23}}$ $\overline{\text{FP22}}$ $\overline{\text{FP21}}$ + FP34 $\overline{\text{FP33}}$ $\overline{\text{FP32}}$ $\overline{\text{FP31}}$  = DP08

DEFINER COUNT OUTPUT GATES (F105 DSQK + F095 DSQJ + F085 DSQH) DDDC = DDL5

(F104 DSQK + F094 DSQJ + F084 DSQH) DDDC = DDL4

(F103 DSQK + F093 DSQJ + F083 DSQH) DDDC = DDL3

(F102 DSQK + F092 DSQJ + F082 DSQH) DDDC = DDL2

(F101 DSQK + F091 DSQJ + F081 DSQH) DDDC = DDL1

DCAN DHS4 DHS3 $\overline{\text{DHS2}}$ ($\overline{\text{DHS1}}$ + $\overline{\text{DHS0}}$) = DDDC

CIS
FIG. 86.

CAT TRANSLATION TIMING SEQUENCE

| MEM-ORY | CELLS | TOPOLOGIES | | | | | CELLS | MEM-ORY |
|---|---|---|---|---|---|---|---|---|
| | | 1 | 2 | 3 | 4 | 5 | | |
| J 2K | 0 / 2047 | PN-0 2K | | | | | 0 / 2047 | J 2K |
| K 2K | 0 / 2047 | PN-3 14K | PN-4 6K | PN-9 2 | PN-16 1K | | 0 / 1024 / 2047 | K 2K |
| | | | | | PN-17 1K | | | |
| L 4K | 0 / 4095 | | | PN-6 4K | PN-10 2K | PN-18 1K | 0 / 1024 / 2048 / 3072 / 4095 | L 4K |
| | | | | | | PN-19 1K | | |
| | | | | | PN-11 2K | PN-20 1K | | |
| | | | | | | PN-21 1K | | |
| M 4K | 0 / 4095 | | PN-5 8K | PN-7 4K | PN-12 2K | PN-22 1K | 0 / 1024 / 2048 / 3072 / 4095 | M 4K |
| | | | | | | PN-23 1K | | |
| | | | | | PN-13 2K | PN-24 1K | | |
| | | | | | | PN-25 1K | | |
| N 4K | 0 / 4095 | | | PN-8 4K | PN-14 2K | PN-26 1K | 0 / 1024 / 2048 / 3072 / 4095 | N 4K |
| | | | | | | PN-27 1K | | |
| | | | | | PN-15 2K | PN-28 1K | | |
| | | | | | | PN-29 1K | | |

FIG. 90

CIS SEQUENCE - TRANSLATE MODE
COMMON PHASE

| STATE | INITIATE SIGNAL | OUTPUT SIGNALS | OPERATIONS |
|---|---|---|---|
| $\tau_0$ (000) | | | Continues in state-$\tau_0$ until a Request signal is received. |
| $\tau_1$ (001) | DHiC (Translate Mode Request) | | Request signals enabled to set respective Request flip-flops. A Processor corresponding to one of the set Request flip-flops is selected in accordance with a predetermined priority scheme. |
| $\tau_2$ (011) | DADS (Translate Mode Selected) | DHiE | Notification signal transmitted to CCS to identify selected Processor. In response, Symbolic Word Address of selected Processor transmitted to CIS. |
| $\tau_3$ (010) | DHSM (Symbolic Word Address Present) | | Symbolic Word Address decoded. Decoding controls generation of one of 8 Translate Mode control signals. Control signal initiates Decode Complete DCDC signal. |

FIG. 94

CIS SEQUENCE - TRANSLATE MODE
SELF-INTERRUPT (PL 4-7, 14, 15)

| STATE | INITIATE SIGNAL | OUTPUT SIGNALS | OPERATIONS |
|---|---|---|---|
| $\tau_4$ (110) | DCDC (Decode Complete) | DADi | Can only be requested by DAP.<br>DCAN control signal issues during and continues from $\tau_3$. DHS5=1.<br>SI Control Register is loaded with identification of selected DAP-i.*<br>SI-PL Register is loaded with PL from Symbolic Word Address.<br>DADi signal issues to notify DAP-i of interrupt requirement. |
| $\tau_5$ (111) | Automatic change from $\tau_4$ | DHAM<br>DHA0-9 | Actual Word Address transmitted.<br>Notification signal denotes presence of Actual Word Address.<br>CCS receives Actual Word Address and responds with signal denoting Address Received.<br>The Actual Word Address represents dummy cell $0456_8$. |
| $\tau_6$ (101) | DHAR (Word Address Received) | $\overline{\text{DHiE}}$<br>$\overline{\text{DHAM}}$<br>$\overline{\text{DHA0-9}}$ | All Request flip-flops cleared. |
| $\tau_7$ (100) | $\overline{\text{DADS}}$ (Translate Mode Terminated) | | |
| $\tau_0$ (000) | $\overline{\text{DHSM}}$ | | |

Misc. - (a) No change in PL Table
  (b) No change in Queued PL Register

* If an RI Control Register flip-flop identifies same DAP-i as an SI Control Register flip-flop, the former flip-flop is cleared.

FIG. 95

CIS SEQUENCE - TRANSLATE MODE
SELF-INTERRUPT (ABORT-1)

| STATE | INITIATE SIGNAL | OUTPUT SIGNALS | OPERATIONS |
|---|---|---|---|
| $\tau_3$ (cont'd) (010) | DSAQ | | Generate DAB1 signal if:<br>(1) Self-Interrupt queued and<br>(2) only one DAP Request flip-flop on. |
| $\tau_0$ (000) | DAB1 | | $\tau_0$-$\tau_3$ Sequence repeats until another Request flip-flop sets. |

---

SELF-INTERRUPT (ABORT-2)

| STATE | INITIATE SIGNAL | OUTPUT SIGNALS | OPERATIONS |
|---|---|---|---|
| $\tau_3$ (cont'd) (010) | DSAQ<br>DMPR | | Generate DAB2 signal if:<br>(1) Self-Interrupt queued and<br>(2) two or more DAP Request flip-flops on.<br><br>DAB2 signal resets the recognized DAP Request flip-flop, which in turn, causes the corresponding DH1E signal to drop. The next higher priority DAP having a set Request flip-flop is selected and its Symbolic Word Address is decoded. |
| $\tau_4$ (110) (complete sequence) | | | A. If new request is not for Self-Interrupt. |
| $\tau_3$ (cont'd) (010) | | | B. If new request is for Self-Interrupt and two DAP Request flip-flops on repeat Abort-2. |
| $\tau_0$ (000) | | | C. If new request is for Self-Interrupt and one DAP Request flip-flop on → Abort-1. |

*FIG. 96*

CTS ABORT SEQUENCES

START: Self-Interrupt Queued

| Abort - 1 | Abort - 2 | |
|---|---|---|
| Only one DAP Request | More than one DAP Request | |
| ⋮ | | |
| $\tau_0$ | $\alpha$ | $\beta$ |
| $\tau_1$ | Two DAP Requests | Three DAP Requests |
| $\tau_2$ | | |
| $\tau_3$ | ⋮ | ⋮ |
| (Self-Interrupt decoded) | $\tau_0$ | $\tau_0$ |
| ⋮ | $\tau_1$ | $\tau_1$ |
| $\tau_0$ | $\tau_2$ | $\tau_2$ |
| | $\tau_3$ | $\tau_3$ |

| | |
|---|---|
| a. Self-Interrupt decoded; DAB2 issues | a. Self-Interrupt decoded; DAB2 issues |
| b. Clear highest Request flip-flop | b. Clear highest Request flip-flop |
| c. Recognize remaining Request flip-flop | c. Recognize highest remaining set Request flip-flop |
| d. Decode new Symbolic Word Address | d. Decode new Symbolic Word Address |

| Self-Interrupt Request | Not a Self-Interrupt Request | Self-Interrupt Request | Not a Self-Interrupt Request |
|---|---|---|---|
| ⋮ | ⋮ | ⋮ | ⋮ |
| $\tau_0$ | Complete the Sequence | $\alpha(\tau_3)$ | Complete the Cycle |

FIG. 97

CIS SEQUENCE - TRANSLATE MODE
REQUEST INTERRUPT (PL 5, 7)

| STATE | INITIATE SIGNAL | OUTPUT SIGNALS | OPERATIONS |
|---|---|---|---|
| $\tau_4$ (110) | DCDC (Decode Complete) | | Is only requested by a DAP. DCAN control signal issues during and continues from $\tau_3$. DHS4=1. Queued PL Register is loaded with PL from Symbolic Word Address. TRCA one-shot triggered provided the RI Control Register is clear. HQL encoded and compared with LPL. |
| $\tau_5$ (111) | Automatic change from $\tau_4$ | DHAM DHA0-9 | Actual Word Address transmitted. Notification signal denotes presence of Actual Word Address. CCS receives Actual Word Address and responds with signal denoting Address Received. The Actual Word Address represents dummy cell $0456_8$. |
| $\tau_6$ (101) | DHAR (Word Address Received) | $\overline{\text{DHiE}}$ $\overline{\text{DHAM}}$ $\overline{\text{DHA0-9}}$ | All Request flip-flops cleared. |
| $\tau_7$ (100) | $\overline{\text{DADS}}$ (Translate Mode Terminated) | | |
| $\tau_0$ (000) | $\overline{\text{TRCA}}$ $\overline{\text{DHSM}}$ | DADi | 500ns after being triggered the TRCA one-shot drops to 0-state and enables inputs to the RI Control Register. If HQL>LPL, the flip-flop of the RI Control Register corresponding to the DAP operating at the LPL is set. If the corresponding SI Control Register flip-flop is on, the RI Control Register flip-flop is not set, see*, Fig. 95. DADi signal issues to notify DAP-i of interrupt request. |

Misc. - (a) No change in PL Table
(b) Queued PL Register changed

*FIG. 98*

CIS SEQUENCE - TRANSLATE MODE
REQUEST INTERRUPT (PL 8, 9 or 10)

| STATE | INITIATE SIGNAL | OUTPUT SIGNALS | OPERATIONS |
|---|---|---|---|
| $\tau_4$ (110) | DCDC (Decode Complete) | | Is only requested by PEP. |
| | | | DCAN control signal issues during and continues from $\tau_3$. DHS4=1. |
| | | | Queued PL Register is loaded with PL from Symbolic Word Address. |
| | | | TRCA one-shot triggered, provided the RI Control Register is clear. |
| | | | ** HQL encoded and compared with LPL. |
| $\tau_5$ (111) | Automatic change from $\tau_4$ | DHAM DHA0-9 | Actual Word Address transmitted. |
| | | | Notification signal denotes presence of Actual Word Address. |
| | | | CCS receives Actual Word Address and responds with signal denoting Address Received. |
| | | | The Actual Word Address is 00PL DEFNR 0 where PL is 01, 10, 11 for respective PL-8, 9, 10 and DEFNR is corresponding Definer count. |
| $\tau_6$ (101) | DHAR (Word Address Received) | $\overline{\text{DH1E}}$ $\overline{\text{DHAM}}$ $\overline{\text{DHA0-9}}$ | All Request flip-flops cleared. Increment Definer Counter. |

FIG. 99a

CIS SEQUENCE - TRANSLATE MODE
REQUEST INTERRUPT (PL 8, 9 or 10)
CONTINUED

| STATE | INITIATE SIGNAL | OUTPUT SIGNALS | OPERATIONS |
|---|---|---|---|
| $\bar{7}$ (100) | $\overline{DADS}$ (Translate Mode Terminated) | | |
| $\bar{0}$ (000) | $\overline{TRCA}$ $\overline{DHSM}$ | DADi | 500ns after being triggered the TRCA one-shot drops to 0-state and enables inputs to the RI Control Register. If HQL>LPL, the flip-flop of the RI Control Register corresponding to the DAP operating at the LPL is set. If the corresponding SI Control Register flip-flop is on, the R1 Control Register is not set, see * Fig. 95. <br><br>DADi signal issues to notify DAP-i of interrupt request. |

Misc. - (a) No change in PL Table
       (b) Queued PL Register changed

** A DAP operating at either PL 8, 9, or 10 will service complete active Definer portion of Memory corresponding to that PL before dropping to lower PL. No other DAP must operate at such time at same PL. Thus, with a DAP operating at PL 8, 9, or 10, the corresponding Queued PL Register flip-flop is inhibited from affecting HQL; however, the Actual Word Address delivers the next Definer count.

FIG.99b

CIS SEQUENCE - TRANSLATE MODE
READ/WRITE X-REGISTER

| STATE | INITIATE SIGNAL | OUTPUT SIGNALS | OPERATIONS |
|---|---|---|---|
| $\tau_4$ (110) | DCDC (Decode Complete) | | Can only be initiated by DAP. DCXR control signal issues during and continues from $\tau_3$. |
| $\tau_5$ (111) | Automatic change from $\tau_4$ | DHAM DHA0-9 | Actual Word Address transmitted. Notification signal denotes presence of Actual Word Address. CCS receives Actual Word Address and responds with signal denoting Address Received. The Actual Word Address is: 010(PL-4)(X-1) where PL is that of initiating DAP and X is provided by Symbolic Word Address. |
| $\tau_6$ (101) | DHAR (Word Address Received) | $\overline{\text{DHiE}}$ $\overline{\text{DHAM}}$ $\overline{\text{DHA0-9}}$ | All Request flip-flops cleared. |
| $\tau_7$ (100) | $\overline{\text{DADS}}$ (Translate Mode Terminated) | | |
| $\tau_0$ (000) | | $\overline{\text{DHSM}}$ | |

Misc. - (a) No change in PL Table
        (b) No change in Queued PL Register

FIG.100

CIS SEQUENCE - TRANSLATE MODE
READ/WRITE STATUS TABLE

| STATE | INITIATE SIGNAL | OUTPUT SIGNALS | OPERATIONS |
|---|---|---|---|
| $\tau_4$ (110) | DCDC (Decode Complete) | | Can only be initiated by DAP.<br>DCST control signal issues during and continues from $\tau_3$. |
| $\tau_5$ (111) | Automatic change from $\tau_4$ | DHAM<br>DHA0-9 | Actual Word Address transmitted.<br>Notification signal denotes presence of Actual Word Address.<br>CCS receives Actual Word Address and responds with signal denoting Address Received.<br>The Actual Word Address is:<br>    0111(PL-4)00 for DAP-A<br>    1000(PL-4)00 for DAP-B<br>    100(PL+8)00 for DAP-C<br>where PL is that of initiating DAP. |
| $\tau_6$ (101) | DHAR (Word Address Received) | $\overline{\text{DHiE}}$<br>$\overline{\text{DHAM}}$<br>$\overline{\text{DHA0-9}}$ | All Request flip-flops cleared. |
| $\tau_7$ (100) | $\overline{\text{DADS}}$ (Translate Mode Terminated) | | |
| $\tau_0$ (000) | $\overline{\text{DHSM}}$ | | |

Misc. - (a) No change in PL Table
       (b) No change in Queued PL Register

*FIG. 101*

CIS SEQUENCE - TRANSLATE MODE
READ PROCESSOR MAILBOX

| STATE | INITIATE SIGNAL | OUTPUT SIGNALS | OPERATIONS |
|---|---|---|---|
| $\tau_4$ (110) | DCDC (Decode Complete) | | Can be initiated by any Processor. DCAM control signal issues during and continues from $\tau_3$. |
| $\tau_5$ (111) | Automatic change from $\tau_4$ | DHAM DHA0-9 | Actual Word Address transmitted. Notification signal denotes presence of Actual Word Address. CCS receives Actual Word Address and responds with signal denoting Address Received. The Actual Word Address is: 000011(PR)00 where PR is 01 for PEP, 10 for DAP-A, 11 for DAP-B and 00 for DAP-C, PR corresponding to the initiating Processor. |
| $\tau_6$ (101) | DHAR (Word Address Received) | $\overline{\text{DHiE}}$ $\overline{\text{DHAM}}$ DHA0-9 | All Request flip-flops cleared. |
| $\tau_7$ (100) | $\overline{\text{DADS}}$ (Translate Mode Terminated) | | |
| $\tau_0$ (000) | | $\overline{\text{DHSM}}$ | |

Misc. - (a) No change in PL Table
      (b) No change in Queued PL Register

*FIG.102*

CIS SEQUENCE - TRANSLATE MODE
ALERT PROCESSOR

| STATE | INITIATE SIGNAL | OUTPUT SIGNALS | OPERATIONS |
|---|---|---|---|
| $\tau_4$ (110) | DCDC (Decode Complete) | DFiC | Can be initiated by any Processor. DCAA control signal issues during and continues from $\tau_3$. Alert signal (DFiC) transmitted to respective Processor-i designated by Symbolic Word Address. |
| $\tau_5$ (111) | Automatic change from $\tau_4$ | DHAM DHA0-9 | Actual Word Address transmitted. Notification signal denotes presence of Actual Word Address. CCS receives Actual Word Address and responds with signal denoting Address Received. The Actual Word Address represents dummy cell $0456_8$. |
| $\tau_6$ (101) | DHAR (Word Address Received) | $\overline{\text{DFiC}}$ $\overline{\text{DHiE}}$ $\overline{\text{DHAM}}$ $\overline{\text{DHA0-9}}$ | All Request flip-flops cleared. |
| $\tau_7$ (100) | $\overline{\text{DADS}}$ (Translate Mode Terminated) | | |
| $\tau_0$ (000) | $\overline{\text{DHSM}}$ | | |

Misc. - (a) No change in PL Table
(b) No change in Queued PL Register

*FIG.103*

CIS SEQUENCE - TRANSLATE MODE
READ TRANSFER VECTOR

| STATE | INITIATE SIGNAL | OUTPUT SIGNALS | OPERATIONS |
|---|---|---|---|
| $\tau_4$ (110) | DCDC (Decode Complete) | | Can only be initiated by DAP. DCTV control signal issues during and continues from $\tau_3$. |
| $\tau_5$ (111) | Automatic change from $\tau_4$ | DHAM DHA0-9 | Actual Word Address transmitted. Notification signal denotes presence of Actual Word Address. CCS receives Actual Word Address and responds with signal denoting Address Received. The Actual Word Address is: 0000(PL-4)DP where PL is that of initiating DAP, and DP is 10 for DAP-A, 11 for DAP-B, and 00 for DAP-C, DP corresponding to the initiating DAP. |
| $\tau_6$ (101) | DHAR (Word Address Received) | $\overline{\text{DHiE}}$ $\overline{\text{DHAM}}$ $\overline{\text{DHA0-9}}$ | All Request flip-flops cleared. |
| $\tau_7$ (100) | $\overline{\text{DADS}}$ (Translate Mode Terminated) | | |
| $\tau_0$ (000) | $\overline{\text{DHSM}}$ | | |

Misc. - (a) No change in PL Table
       (b) No change in Queued PL Register

FIG.104

CIS SEQUENCE - TRANSLATE MODE
SET TRANSFER ADDRESS OPERATION

| STATE | INITIATE SIGNAL | OUTPUT SIGNALS | OPERATIONS |
|---|---|---|---|
| $\tau_4$ (110) | DCDC (Decode Complete) | | Can only be initiated by DAP. DCTM control signal issues during and continues from $\tau_3$. |
| $\tau_5$ (111) | Automatic change from $\tau_4$ | DHAM DHA0-9 | Actual Word Address transmitted. Notification signal denotes presence of Actual Word Address. CCS receives Actual Word Address and responds with signal denoting Address Received. The Actual Word Address represents dummy cell $0456_8$. |
| $\tau_6$ (101) | DHAR (Word Address Received) | $\overline{\text{DH1E}}$ $\overline{\text{DHAM}}$ $\overline{\text{DHA0-9}}$ | All Request flip-flops cleared. |
| $\tau_7$ (100) | $\overline{\text{DADS}}$ (Translate Mode Terminated) | | FTAi flip-flop of Transfer Control Register corresponding to selected DAP-i is set. |
| $\tau_0$ (000) | $\overline{\text{DHSM}}$ | | |

Misc. - (a) No change in PL Table
       (b) No change in Queued PL Register

FIG.105

CIS SEQUENCE - TRANSLATE MODE
TRANSFER ADDRESS OPERATION

| STATE | INITIATE SIGNAL | OUTPUT SIGNALS | OPERATIONS |
|---|---|---|---|
| $\tau_4$ (110) | DCDC (Decode Complete) | DHAM DHA0-9 | Can only be executed for a DAP. DCTA control signal issues during and continues from $\tau_2$. An FTAi flip-flop corresponding to the selected DAP is in the 1-state at $\tau_0$. Actual Word Address transmitted. Notification signal denotes presence of Actual Word Address. CCS receives Actual Word Address and responds with signal denoting Address Received. The Actual Word Address is the same as the Symbolic Word Address. |
| $\tau_5$ (111) | Automatic change from $\tau_4$ | | |
| $\tau_6$ (101) | DHAR (Word Address Received) | $\overline{\text{DH1E}}$ $\overline{\text{DHAM}}$ $\overline{\text{DHA0-9}}$ | All Request flip-flops cleared. |
| $\tau_7$ (100) | $\overline{\text{DADS}}$ (Translate Mode Terminated) | | FTAi flip-flop corresponding to selected DAP-i is reset. |
| $\tau_0$ (000) | $\overline{\text{DHSM}}$ | | |

Misc. - (a) No change in PL Table
(b) No change in Queued PL Register

*FIG.106*

CIS SEQUENCE - TRANSLATE MODE
NON-TRANSLATE OPERATION

| STATE | INITIATE SIGNAL | OUTPUT SIGNALS | OPERATIONS |
|---|---|---|---|
| $\tau_4$ (110) | DCDC (Decode Complete) | DHAM DHA0-9 | Can be initiated by any Processor. DCTA control signal issues during and continues from $\tau_2$. Actual Word Address transmitted. Notification signal denotes presence of Actual Word Address. CCS receives Actual Word Address and responds with signal denoting Address Received. The Actual Word Address is the same as the Symbolic Word Address. |
| $\tau_5$ (111) | Automatic change from $\tau_4$ | | |
| $\tau_6$ (101) | DHAR (Word Address Received) | $\overline{\text{DH1E}}$ $\overline{\text{DHAM}}$ $\overline{\text{DHA0-9}}$ | All Request flip-flops cleared. |
| $\tau_7$ (100) | $\overline{\text{DADS}}$ (Translate Mode Terminated) | | |
| $\tau_0$ (000) | $\overline{\text{DHSM}}$ | | |

Misc. - (a) No change in PL Table
       (b) No change in Queued PL Register

*FIG.107*

CIS SEQUENCE - TRANSLATE MODE
READ DEFINER LIST

| STATE | INITIATE SIGNAL | OUTPUT SIGNALS | OPERATIONS |
|---|---|---|---|
| $\tau_4$ (110) | DCDC (Decode Complete) | DHAM DHA0-9 | Is only initiated by DAP operating at PL 8, 9, or 10. |
| | | | DCTA control signal issues during and continues from $\tau_2$. |
| | | | The Queued PL Register FQ08, 09 or 10 flip-flop, designated by the Symbolic Word Address is cleared. |
| | | | Actual Word Address transmitted. |
| | | | Notification signal denotes presence of Actual Word Address. |
| | | | CCS receives Actual Word Address and responds with signal denoting address received. |
| | | | The Actual Word Address is the same as the Symbolic Word Address. |
| $\tau_5$ (111) | Automatic change from $\tau_4$ | | |
| $\tau_6$ (101) | DHAR (Word Address Received) | $\overline{\text{DH1E}}$ $\overline{\text{DHAM}}$ $\overline{\text{DHA0-9}}$ | All Request flip-flops cleared. |
| $\tau_7$ (100) | $\overline{\text{DADS}}$ (Translate Mode Terminated) | | |
| $\tau_0$ (000) | $\overline{\text{DHSM}}$ | | |

Misc. - (a) No change in PL Table
      (b) Queued PL Register changed. HQL is unaffected because flip-flop reset has been inhibited from affecting HQL by the initiating DAP, which has been operating at corresponding PL.

*FIG. 108*

CIS SEQUENCE-PASSIVE MODE
WRITE PL TABLE

CIS SEQUENCE-PASSIVE MODE
READ PL TABLE-RESPONSE TO INTERRUPT

United States Patent Office 3,444,525
Patented May 13, 1969

3,444,525
CENTRALLY CONTROLLED MULTICOMPUTER SYSTEM
Jesse P. Barlow, Reseda, Calif., Richard Barton and John E. Belt, Phoenix, Carlton R. Frasier, Glendale, Lorenz A. Hittel and Laszlo L. Rakoczi, Phoenix, Ariz., Mark A. Torfeh, Tarzana, Calif., and Jerome B. Wiener, Armonk, N.Y., assignors to General Electric Company, a corporation of New York
Filed Apr. 15, 1966, Ser. No. 542,768
Int. Cl. G06f 9/06
U.S. Cl. 340—172.5
8 Claims

TABLE OF CONTENTS

| | Column |
|---|---|
| General Description | 3 |
| Description of Drawings | 7 |
| Multicomputer System—General | 9 |
| Information Representation | 10 |
| System Circuit Elements | 11 |
| AND-Gate | 11 |
| OR-Gate | 12 |
| Inverter | 12 |
| Flip-flop | 13 |
| Flip-flop, Type-A | 13 |
| Flip-flop, Type-C | 13 |
| Flip-flop, Type-B | 17 |
| Register | 19 |
| One-Shot | 20 |
| One-shot, Type-F | 20 |
| One-shot, Type-H | 20 |
| Logical Schematic Diagram | 23 |
| Glossary and Index of Signals | 25 |
| Program Structure | 39 |
| Definition of Terms | 39 |
| Priority Level | 40 |
| Program Number | 40 |
| Subject Mode | 40 |
| Control Mode | 40 |
| Priority Interrupt | 40 |
| Return From Interrupt | 40 |
| Self-Interrupt | 40 |
| Request-Interrupt | 40 |
| Operating System Memory | 40 |
| Real-Time Event | 40 |
| Requested Program | 40 |
| Scheduled Program | 40 |
| Active Program | 40 |
| Priority Levels and Operation System | 41 |
| Instruction Translator | 41 |
| General Control | 41 |
| Executive Routine | 41 |
| Scheduler Routine | 42 |
| Allocator Routine | 42 |
| Subject Software Error | 42 |
| Input/Output Initiation | 42 |
| Input/Output Error | 42 |
| Input/Output Termination | 42 |
| Input/Ouptut Control Interrupt | 42 |
| Real-Time Input/Output Operation | 42 |
| Real-Time Clock | 43 |
| DAP Hardware Error | 43 |
| Multicomputer System—Details | 43 |
| Central Control Subsystem (CCS) | 43 |
| CIS-System Interconnections | 49 |
| Processors | 49 |
| Memory Group | 51 |
| Processor-Memory Communication | 52 |
| Double-Word, Read-Restore | 54 |
| Single-Word, Read-Restore | 55 |
| Double-Word, Clear-Write | 55 |
| Single-Word, Clear-Write | 56 |
| Other Communications | 57 |
| Central Address Exchange | 57 |
| Central Data Exchange | 62 |
| Central Control Exchange | 65 |
| Central Address Translator | 66 |
| Overall operation | 67 |
| Input Scanner | 68 |
| Address Translator | 74 |
| Translated Address Storage | 76 |
| Memory Request Signal Generator | 78 |
| Memory Start Signal Generator | 78 |
| Timer-Controller | 78 |
| Address Translation Topologies | 80 |
| Central Interlace Controller, Request Scanner | 88 |
| Overall Operation | 89 |
| Input Scanner | 89 |
| Time-Protection, Time-Balancing, Scope Controller | 90 |
| Processor Access Request Register | 94 |
| Memory Request Register | 94 |
| Processor Priority Allocation Logic Unit | 95 |
| Processor Access Granting Register | 96 |
| Memory Assignment Register | 97 |
| Gate Enabling Signal Generator | 97 |
| Timer | 98 |
| Central Interlace Controller, Bus Scheduler | 98 |
| Overall Operation | 99 |
| Input Request Logic Unit | 101 |
| Data Bus Request Register | 102 |
| Memory Priority Allocation Logic Unit | 103 |

| | Column |
|---|---|
| Data Bus Granting Register | 103 |
| Double-Word Input Clearing Logic Unit | 104 |
| Double-Word Data Bus Clearing Register | 105 |
| Gate Enabling Signal Generators | 106 |
| Control Signal Transmitter | 107 |
| Acknowledgment Signal Transmitters | 108 |
| Timer-Controller | 109 |
| Central Interrrupt Scheduler | 109 |
| Translate Mode Operations | 110 |
| Passive Mode Operations | 112 |
| General Structure | 112 |
| Overall Operation | 114 |
| Translate Mode Execution | 115 |
| Passive Mode Execution | 116 |
| Request Register | 117 |
| Priority Allocation Logic Unit | 118 |
| Sequencer | 119 |
| Symbolic Word Address Decoder | 122 |
| Actual Word Address Encoder | 123 |
| Transfer Control Register | 126 |
| Self-Interrupt Control Register | 127 |
| Request-Interrupt Selector | 128 |
| Request-Interrupt Control Register | 129 |
| Priority Interrupt Gates | 129 |
| Passive Mode Request Register | 130 |
| Passive Mode Priority Allocation Logic Unit | 130 |
| Interrupt Response Control Register | 130 |
| Initiate R/W PL Table Logic Unit | 131 |
| Passive Mode Control Unit | 132 |
| Write PL Table Logic Unit | 133 |
| Self-Request Select Logic Unit | 133 |
| Modify PL Table Logic Unit | 134 |
| R/W Completion Logic Unit | 134 |
| Priority Level Table | 135 |
| Selected PL Signal Gates | 136 |
| PL Signal Transmitter | 136 |
| PL Table Input Gates | 137 |
| Self-Interrupt PL Register | 137 |
| PL 8, 9, 10 Decoder and HQL 5, 7 Decoder | 138 |
| Queue 5, 7 Inupt Logic Unit and Queue 8-10 Input Logic Unit | 138 |
| Queued PL Register | 139 |
| Highest Queued PL (HQL) Encoder | 140 |
| Lowest Processor PL (LPL) Encoder | 141 |
| HQL V LPL Comparator | 142 |
| Definer Counters | 143 |
| Definer Count Output Gates | 143 |
| Priority Level Decoder | 144 |
| CIs Participation in System Operation | 144 |
| Priority Interrupt Initiation Sequence | 144 |
| Priority Interrupt Acceptance Sequence | 150 |
| Return-From-Interrupt Sequence | 155 |
| Alert Sequence | 156 |
| CIS Internal Sequences | 159 |
| Translate Mode Sequences | 159 |
| Self-Interrupt Sequence | 160 |
| Request-Interrupt Sequence (PL 5 or 7) | 162 |
| Request-Interrupt Sequence (PL 8, 9, or 10) | 163 |
| Read/Write X-Register Sequence | 164 |
| Read/Write Status Table Sequence | 164 |
| Read Processor Mailbox Sequence | 165 |
| Alert Processor Sequence | 165 |
| Read Transfer Vector Sequence | 166 |
| Set Transfer Address Sequence | 166 |
| Transfer Address Sequence | 167 |
| Non-Translate Sequence | 168 |
| Read Definer List Sequence | 168 |
| Passive Mode Sequences | 169 |
| Passive Mode Write Sequence | 169 |
| Passive Mode Read Sequence | 171 |

TABLES AND CHARTS

| | |
|---|---|
| Table 1 | 14 |
| Table 2 | 15 |
| Table 3 | 41 |
| Table 4 | 70 |
| Table 5 | 87 |
| Table 6 | 123 |
| Table 7 | 125 |
| Chart I—Priority Interrupt Initiation Sequence | 145 |
| Chart II—Priority Interrupt Acceptance Sequence | 151 |
| Chart III—Return-From-Interrupt Sequence | 155 |
| Chart IV—Alert Sequence | 157 |

ABSTRACT OF THE DISCLOSURE

A multicomputer system is disclosed in which each data processor of the system is capable of executing independently of the other processors a computer program from beginning to end. All the processors have access to and use the single memory system of the multicomputer system, which memory is addressable, i.e., each cell of the memory has a unique address. All communications between the data processors and the memory is through and under the control of a central control subsystem. This subsystem, in response to requests from the data processors for communication with the memory, permits each processor to communicate with the memory in executing its program's instructions without interference or appreciable delay due to the execution of programs by the other data processors of the multicomputer system.

GENERAL DESCRIPTION

This invention relates to multicomputer systems and more particularly to apparatus for exercising management control of a multicomputer system.

A multicomputer system comprises a plurality of data processors, a plurality of data storage units, and a plurality of input devices and output devices. The data processors process data by executing separate programs or program parts simultaneously. The data storage units store data to be processed, data which is the result of processing, and programs for controlling the processing operations of the data processors. The input devices supply programs and data to be processed and the output devices receive and utilize processed data. Communication must be provided for the data processors to receive programs and data to be processed from the data storage units and to transmit processed data to the data storage units. In the multicomputer system described one or more input/output processors provide common control and data transmission centrals for a plurality of input devices and a plurality of output devices. Accordingly, communication must also be provided for the input/output processors to transfer programs and data to be processed to the data storage units from the input devices and to transfer processed data from the data storage units to the output devices.

The apparatus of the instant invention provides management control for such a multicomputer system. Generally, management control of the multicomputer system described comprises expeditiously supplying data to be processed and the programs providing the required data processing functions to the data processors, and efficiently controlling the output devices to receive and utilize the processed data. Such management control is effected by providing and controlling all required communications between the processors and data storage units; by providing for the assignment of programs to data processors for execution in accordance with the required urgencies for execution of the different programs, the availability of the required input and output devices, the availability of the required data storage space in the data storage units, and the relative capabilities of the data processors for executing the different programs; by providing termination of the programs nearing completion and their replacement with other waiting programs; by providing assignment of specific data storage units for programs to be executed; by providing assignment of specific input and output devices for programs to be executed, and initiation and termination of data transfer operations by these devices; by providing the corrective functions required when program or data errors are detected by the processors, or when the processors become partially or totally inoperative; etc.

Each data processor of a multicomputer system executes a program separately from the programs being executed by the other data processors. The program comprises a set of instructions, each instruction specifying a discrete type of processing operation. A data processor executes a program by sequentially responding to each of the instructions of the program to perform the corresponding operations. The data processor obtains the instructions of a program in sequence from a set of storage locations, or "cells," in the data storage system, which comprises the plurality of data storage units. Each such cell is identified by a unique identification, termed an "address." Thus, in obtaining the instructions of a program in proper sequence the data processor supplies the corresponding addresses in sequence. Additionally, many of the intructions during execution require the data processor to further communicate with the data storage system, either to obtain a data item on which the data processor is to perform an operation or to store a data item which is the result of an operation. Accordingly, each instruction requiring a transfer of a data item between the data processor and the data storage system must also identify the cell which is to supply or receive the data item. Therefore, each program requires a set of cells for storing and supplying data items to be processed by the program, for receiving and storing data items which are the result of processing operations performed by the program, and for storing the instructions of the program, many of the stored instructions comprising an identification of a cell in the set.

A program is only executed by the multicomputer system after it has been presented for execution by an input device. An advanced form of management control provides most effective and efficient execution of the waiting programs if, instead of waiting for the availability of specific storage space, each waiting program is accepted from an input device and transferred to the data storage system as soon as the data storage system has free any storage space which is of sufficient capacity and which is provided by the required combination of data storage unit types. After transfer to the data storage system these programs are executed according to their relative urgencies and the availability of the input and output devices required by each program.

However, in utilizing this advanced form of management control the particular portion of the data storage system in which a program is to be stored and executed is not determinable when the program is prepared or when it is being presented by an input device; instead, the storage portion to be employed varies according to the other programs already present when a program is accepted into the data storage system. Accordingly, the instructions in each program which identify data storage system cells can identify neither specific data storage units nor specific cells in a data storage unit; instead, the instructions can identify only symbolically the relative disposition of the cells in which the program is to be executed. In obtaining the instructions of the program in proper sequence, the data processor must supply in sequence symbolic identifications, or symbolic addresses, of cells appropriately disposed relative to the cells identified by the symbolic addresses provided by the instructions. Additionally, the symbolic addresses supplied by a data processor during execution of a program will identify symbolically a set of contiguous data storage system cells within which the instructions, the data items to be processed, and the processed data items are stored or to be stored.

Each input/output processor of a multicomputer system performs control and data transmission operations for its respective set of input and output devices separately from the operations being performed by the other input/output processors and separately from the programs being executed by the data processors. An input/output processor stores the data items provided by each of its associated input devices in a respective set of cells of the data storage system. Thus, in transmitting the data items supplied in succession by a particular input device an input/output processor supplies in sequence addresses of the cells of a cell set for receiving and storing the data items. Similarly, data items for transmission to each of its associated output devices are obtained by the input/output processor from a respective set of cells of the data storage system. Thus, in transmitting data items in succession to a particular output device an input/output processor also supplies in sequence addresses of the cells of the cell set storing the data items.

An input device is required to supply data to be processed when a program being executed by a data processor requires such data. An input device is required to supply programs for execution when the management control requires such program following termination of execution of one or more of the programs presently in the data storage system. However, an input device may also voluntarily supply data and programs, However, as described previously, in utilizing this advanced form of management control, the particular portion of the data storage system in which a program is to be stored and executed is not determinable until the program is accepted into the data storage system. Accordingly, the input/ output processor can identify neither specific data storage units nor specific cells in a data storage unit when transmitting data items supplied by an input device; instead the input/output processor can identify only symbolically the relative disposition of the cells for receiving and storing the data items. In transmitting in succession the data items supplied by a particular input device, the input/output processor must supply in sequence symbolic addresses of the cell set to receive these data items. Normally, the symbolic addresses supplied by an input/output processor for data items provided by a particular input device will identify symbolically a set of contiguous data storage system cells within which the data items are to be stored. For similar reasons, in obtaining data items in succession for transmission to a particular output device, the input/output processor normally will supply symbolic addresses identifying symbolically a set of contiguous cells within which the data items are stored.

To realize the benefits from the above-described advanced form of management control for a multicomputer system, an address translating device provides for simply, reliably and rapidly converting the symbolic identifications of the storage cells supplied by the programs, the data processors, and the input/output processors into corresponding actual addresses of the storage cells in which the instructions of the program, the data items to be processed, and the processed data items are stored or to be stored.

Heretofore it has been common practice for one data processor of a multicomputer system to act as master coordinator for all communication with data storage system, thereby implementing a major portion of the management control. Such master data processor is repeatedly interrupted in the execution of its programs to provide the requisite coordination functions; these functions including: interpreting symbolic addresses supplied by the various processors, resolving conflicts when two or more processors simultaneously request communication with the same data storage unit, implementing termination of programs and their replacement with waiting programs, assigning specific input and output devices for programs to be executed, etc. However, this practice of employing a master data processor to implement a major portion of the management control is an uneconomical and inefficient use of a complex and costly apparatus, which has been primarily designed for efficient execution of programs. Furthermore, most efficient and expeditious management control is not effected by employing apparatus intended primarily for another purpose.

Therefore, to obtain even further benefits from the above-described management control for a multicomputer system it is desirable to provide control apparatus to enable the data processors to execute their respective programs simultaneously and independently of each other, and to enable the input/output processors to execute their respective control and data transmission operations simultaneously and independently of each other and of the data processors. Such control apparatus should provide freedom of communication between each data processor and the data storage system, without requiring the intervention of another data processor. Additionally, such control apparatus should provide freedom of communication between each input/output processor and the data storage system, without requiring substantial intervention of a data processor. Accordingly, it is desirable to provide control apparatus particularly directed to providing the management control functions required in a multicomputer system for freeing each data processor to execute its respective programs independently of the programs being executed by the other data processors and substantially independently of the data transmission operations of the input/output processors.

Therefore, it is an object of this invention to provide improved management control apparatus for implementing the effective and efficient operation of a multicomputer system.

Another object of this invention is to provide improved management control apparatus for effecting communication between the processors and the data storage system of a multicomputer system.

Another object of this invention is to provide management control apparatus for effecting communication between each of the processors and the data storage system of a multicomputer system without requiring the intervention of aonther of the processors.

Another object of this invention is to provide apparatus for effecting independent communication between the processors of a multicomputer system and a data storage system.

The foregoing objects are achieved, according to one embodiment of the instant invention, by providing a multicomputer system wherein a central controller provides independent and controllable transmission of data between each of the processors and the data storage units of the system. The central controller comprises a central data transmission member and a central address generation device and is coupled directly to all data processors, all input/output processors, and all data storage units. The data transmission member provides selective and controllable communication between the plurality of processors and the plurality of data storage units of the multicomputer system.

When a processors is to communicate with the data storage system to receive or to transmit a data item, the processor supplies a signal group symbolically representing the address of a cell in the data storage system. The address generation device is coupled to receive these symbolic addresses. Upon accepting a symbolic address the address generation device responds to generate a corresponding signal set which represents a specific cell in a specific data storage unit. The signal set so generated comprises an identification signal, which identifies a particular one of the data storage units, and a signal group representing the actual address of one of the cells in the identified data storage unit. Following generation of a signal set by the address generation device, the identification signal controls additional apparatus of the central controller to provide transfer of the actual address to the data storage unit designated by the identification signals and to enable the data transmission member to effect a data item transfer between the initiating processor and the designated data storage unit. Upon receiving the actual data address, the designated data storage unit initiates an operation to provide the required communication between the specifically addressed cell thereof and the initiating processor through the data transmission member. In this manner, each data processor and each input/output processor is provided communication with the symbolically addressed cells of the data storage units without requiring the cooperation of any other processor and without handicapping any one of the complex and costly data processors, thereby providing a speedy and efficient multicomputer system.

Certain portions of the apparatus herein disclosed are not of our invention, but are the inventions of:

J. P. Barlow, A. McLagan, L. L. Rakoczi, and M. A.

Torfeh, as defined by the claims of their application, Ser. No. 543,237, filed Apr. 18, 1966, entitled Apparatus Providing Alterable Symbolic Memory Addressing in a Multiprogrammed Data Processing System.

W. J. Broderick, C. R. Frasier, L. A. Hittel, G. R. Hope, Jr., E. J. Porcelli, and L. L. Rakoczi, as defined by the claims of their application, Ser. No. 544,023, filed Apr. 20, 1966, entitled Apparatus Providing Inter-Processor Communication in a Multicomputer System.

R. Barton, L. A. Hittel, L. L. Rakoczi, and J. B. Wiener, as defined by the claims of their application, Ser. No. 546,716, filed May 2, 1966, entitled Data Processing Apparatus Providing Contiguous Addressing for Non-Contiguous Storage.

C. R. Frasier, L. A. Hittel, J. R. Hudson, L. L. Rakoczi, D. L. Sansbury and J. B. Wiener, as defined by the claims of their application, Ser. No. 550,037, filed May 13, 1966, entitled Program Request Storage and Control Apparatus in a Multiprogrammed Data Processing System.

S. F. Aranyi, J. P. Barlow, L. L. Rakoczi, and M. A. Torfeh, as defined by the claims of their application, Ser. No. 550,562, filed May 16, 1966, entitled Data Storage Access Control Apparatus for a Multicomputer System.

J. E. Belt, L. A. Hittel, G. R. Hope, Jr., E. J. Porcelli, and L. L. Rakoczi, as defined by the claims of their application, Ser. No. 551,355, filed May 19, 1966, entitled Apparatus Providing Inter-Processor Communication and Program Control in a Multicomputer System.

S. F. Aranyi, J. P. Barlow, R. Barton, L. L. Rakoczi, and M. A. Torfeh, as defined by the claims of their application, Ser. No. 551,657, filed May 20, 1966, entitled Multi-Word Storage Access Control Apparatus for a Data Processing System.

J. P. Barlow, C. R. Jones, and J. L. Kerr, as defined by the claims of their application, Ser. No. 559,305, filed June 21, 1966, entitled Apparatus Providing a Unique Decision Signal for Concurrent Interrogation Signals.

W. W. Chu and N. R. Crain, as defined by the claims of their application, Ser. No. 559,497, filed June 22, 1966, entitled Apparatus for Providing Controllable Delays.

S. F. Aranyi, J. P. Barlow, E. J. Porcelli, L. L. Rakoczi, and M. A. Torfeh, as defined by the claims of their application, Ser. No. 568,343, filed July 27, 1966, entitled Interprocessing Multicomputer Systems.

J. E. Belt, L. A. Hittel, and L. L. Rakoczi, as defined by the claims of their application, Ser. No. 612,560, filed Jan. 30, 1967, entitled Apparatus Providing Identification of Programs in a Multiprogrammed Data Processing System.

J. B. Barlow, R. Barton, L. L. Rakoczi, and M. A. Torfeh, as defined by the claims of their application, Ser. No. 618,076, filed Feb. 23, 1967, entitled Data Storage Access Control Apparatus for a Multicomputer System.

J. P. Barlow, R. Barton, E. J. Porcelli, L. L. Rakoczi, and M. A. Torfeh, as defined by the claims of their application, Ser. No. 619,377, filed Feb. 28, 1967, entitled Data Storage Access Control Apparatus for a Multicomputer System.

S. F. Aranyi, J. P. Barlow, L. L. Rakoczi, L. A. Hittel, and M. A. Torfeh, as defined by the claims of their application, Ser. No. 623,284, filed Mar. 15, 1967, entitled Data Storage Access Control Apparatus for a Multicomputer System; and J. R. Hudson, L. L. Rakoczi, and D. L. Sansbury, as defined by the claims of their application, Ser. No. 646,504, filed on or about June 16, 1967, entitled Program Interruption and Assignment Apparatus in a Multiprogrammed Data Processing System; all such applications being assigned to the assignee of the present application.

DESCRIPTION OF DRAWINGS

The invention will be described with reference to the accompanying drawings, wherein;

FIGURE 1 is a block diagram of a Multicomputer Data Processing System to which the instant invention is applicable;

FIGURE 3 is a circuit diagram of one form of flip-flop useful in the System of FIG. 1;

FIGURES 7a and 7b are block diagrams of the major components of the Central Control Subsystem of the System;

FIGURE 14 is a block diagram of the Central Control Exchange of the System;

FIGURES 26–37 are logical schematic diagrams of the circuits providing input signals to the flip-flops and one-shots of the CAT;

FIGURES 38–41 are logical schematic diagrams of the circuits providing logical combination signals in the CAT;

FIGURES 42–48 are logical schematic diagrams of the circuits providing input signals to the flip-flops and one-shots of the CIC-R/S;

FIGURES 49–51 are logical schematic diagrams of the circuits providing logical combination signals in the CIC-R/S;

FIGURES 52–57 are logical schematic diagrams of the circuits providing input signals to the flip-flops of the CIC-B/S;

FIGURES 58–62 are logical schematic diagrams of the circuits providing logical combination signals in the CIC-B/S;

FIGURES 63–79 are logical schematic diagrams of the circuits providing input signals to the flip-flops and one-shots of the CIS;

FIGURES 80–86 are logical schematic diagrams of the circuias providing logical combination signals in the CIS;

FIGURES 89–93 are schematic diagrams illustrating various forms of Address Translators;

FIGURES 94–98, 99a, 99b and 100–108 are timing diagrams illustrating various operations executed by the CIS.

MULTICOMPUTER SYSTEM—GENERAL

Figure 2A:
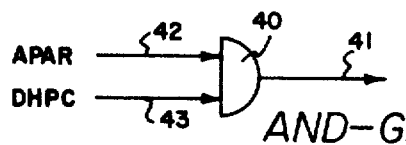
FIGURES 2a, 2b, 2c, 2d, 2e, and 2f illustrate symbols employed to represent circuit elements in the System of FIG. 1.

The Multicomputer System of FIG. 1 is adapted to process large amounts of information very rapidly by performing many different processing operations simultaneously. Each of a plurality of Data Processors 10, 11, and 12, designated respectively as Data Processor-A, Data Processor-B, and Data Processor-C, responds to a respective plurality of distinct instructions to perform a particular data processing operation on the information received by each Data Processor. Each such plurality of instructions is known as a program. The instructions of a program are supplied to a Data Processor in the sequential order necessary to control the Data Processor to execute a particular data processing operation. For brevity herein, a Data Processor is identified as a DAP, and the respective Data Processors are identified as DAP-A, DAP-B, and DAP-C.

A plurality of Memories 20, 21, 22, 23, 24, 25, and 26 store Data Words representing information which is to be processed, Data Words representing information which is the result of processing, and Data Words representing instructions of the programs to be executed by the Data Processors. Each Data Word is stored in a discrete memory location. Memories 20–26 are designated respectively as Memory-J, Memory-K, Memory-L, Memory-M, Memory-N, Memory-T, and Memory-V.

Each DAP communicates with one or more of the Memories to receive Data Words therefrom. Following execution of certain steps of the data processing operations, each DAP transmits the resulting Data Words to one or more of the Memories for storage.

A Peripheral Processor 30 executes special instructions to function as an automatic information transfer apparatus, providing communication between the System of FIG. 1 and external devices (not shown). These external devices supply information for processing, supply programs to process the information, and receive the processed result information. Some external devices function as sources of information and programs; such as magnetic tape handlers, punched card readers, and electric typewriters. Each of these source devices stores information and programs as mechanical representations and converts these representations to corresponding electrical signals for receipt by the PEP, which, in turn, controls the transfer of the signals to one or more of the Memories. Other external devices function to receive the processed information and convert it to a form useful to the System user. For example, magnetic tape handlers and card punches receive processed information and store it as mechanical representations for subsequent use, whereas high speed printers, cathode ray devices, and electric typewriters display the information for immediate use. The PEP receives electrical signals representing processed information from one or more of the Memories and controls the transfer of the signals to the external devices for corresponding storage or display. For brevity herein, the Peripheral Processor is identified as the PEP.

A Central Control Subsystem 32 directs and schedules all communication between Processors 10–12 and 30 and Memories 20–26. The Central Control Subsystem is adapted to operate with a variable number of Processors and Memories and, accordingly, this invention is not limited to a system comprising either a predetermined number of Processors or a predetermined number of Memories. The Central Control Subsystem schedules and coordinates each Processor request for communication with a Memory, such request either being for retrieval of one or more Data Words from a Memory or for storage of one or more Data Words in a Memory. In performing such scheduling and coordination, the Central Control Subsystem assigns a Memory to the requesting Processor for communication. Additionally, the Central Control Subsystem schedules and transmits Data Words between the requesting Processor and a Memory. The lines shown in FIG. 1 as interconnecting the Processors, the Central Control Subsystem and the Memories denote, generally, the direction of control for communication between a Processor and a Memory. For brevity herein, the Central Control Subsystem is identified as the CCS.

A Central Interrupt Scheduler 34 controls schedules, and maintains the status of the set of programs being executed by Data Processors 10–12. The Central Interrupt Scheduler maintains a record of the importance priority levels respectively allocated to the programs being executed. The Central Interrupt Scheduler interrupts Data Processors executing low priority programs to control such Data Processors to execute, instead, required programs of higher priority. For brevity herein, the Central Interrupt Scheduler is identified as the CIS.

Information representation

The Multicomputer System of FIG. 1 processes information represented by the binary code. With the binary code, each element of information is represented by a binary digit, sometimes termed a "bit," each binary digit being either a 1 or a 0. In the instant System, the binary 1 is represented by a relatively positive electrical signal, and the binary 0 by a relatively negative electrical signal.

The unit of information primarily employed in processing is termed the Data Word. The Data Word in the System of FIG. 1 comprises 24 bits. Two types of Data Words are employed, the operand word and the instruction word.

The operand word is a Data Word on which an arithmetic or logical operation is performed by a DAP 10–12, or which is the result of a data processing operation performed by a DAP. Thus, the operand word represents information which is to be processed and which is received from a Memory by a DAP, or information which is the result of processing and which is transmitted to a Memory by a DAP. The PEP functions to transfer operand words from source external devices to the Memories or from the Memories to receiving external devices.

The instruction word is employed by a DAP to direct a discrete step in the data processing operation being executed. The instruction word is received from a Memory by a DAP. Although the PEP functions to transfer instruction words from source external devices to the Memories, it ordinarily does not transfer instruction words from the Memories to receiving external devices.

Most of the instruction words comprise command and address portions. The command represents the type of step to be executed by a DAP, so that when an instruction is received by a DAP the command controls the DAP to execute the represented step.

The instruction address is a representation of a location in a Memory from which an operand word is to be retrieved for processing or in which a processed operand word is to be stored. Generally, the instruction addresses of a program represent a series of locations in a Memory from which information to be processed is obtained, a series of locations in a Memory in which processed information is to be stored, and a series of locations in the Memory in which the incomplete results of intermediate processing steps are stored. However, in this invention, the instruction address neither identifies an actual memory location nor a particular one of Memories 20–26, but instead only symbolically identifies a Memory location. Accordingly, the address supplied by an instruction word is termed a Symbolic Address.

The Symbolic Address is rendered useful to identify a particular location in a particular Memory by the CCS. The CCS receives a Symbolic Address from a DAP and translates it to provide an output address designating a specific location in a particular Memory. The output address delivered by the CCS is termed an Actual Address. The CCS transmits this Actual Address to the corresponding Memory to control such Memory to employ the designated location in communicating with the initiating DAP.

The Symbolic Address comprises two parts, a Symbolic Word Address having 10 bits and a Symbolic Block Address having five bits. The Actual Address transmitted to a Memory by the CCS also comprises 15 bits, a 10-bit Actual Word Address and a 5-bit Actual Block Address.

The Actual Block Address identifies a particular block of 1024 contiguous locations in a Memory and the Actual Word Address identifies a particular location within the identified block.

In addition to the Symbolic Address provided by a DAP from instruction words, each DAP supplies the Symbolic Address of a memory location whenever the DAP requests the next instruction word in the program it is executing. This Symbolic Address is also translated by the CCS to provide an Actual Address identifying the specific memory location storing this next instruction word.

Finally, the PEP in executing special instructions to transfer Data Words to or from the Memories, supplies a Symbolic Address of the same type as that provided by a DAP. This Symbolic Address is also translated to an Actual Address by the CCS.

An additional unit of information employed in the System is the Program Number. The System assigns Program Numbers to each of the programs to be executed therein. When a DAP is executing a program, a corresponding Program Number, represented by five bits, is supplied by that DAP whenever a Memory communication request is made. A Program Number is also supplied by the PEP. The CCS employs the Program Number in generating an Actual Address from a Symbolic Address.

SYSTEM CIRCUIT ELEMENTS

The functions of circuits useful as elements of the System of FIG. 1 will now be described. Circuits for performing these functions are well known in the art. For some functions specific circuits are shown herein and are particularly well suited. However, this invention is not to be considered as limited to the employment of the specific circuits described.

The following circuits find general employment in the System: AND-gates, OR-gates, inverters, flip-flops, and one-shots. The symbols illustrated in FIG. 2 are employed throughout the drawings to represent these circuits.

*AND-gate*

The AND-gate provides the logical operation of Conjunction for binary 1 signals applied thereto. In the System, since the binary 1 is represented by a positive signal, the AND-gate provides a positive output signal representing a binary 1 when, and only when, all of the input signals applied thereto are positive and represent binary 1's. The symbol identified by the numeral 40 in FIG. 2a represents a two-input AND-gate. Such an AND-gate delivers a binary 1 output signal on output lead 41 only when each of the two input signals applied thereto on respect input leads 42 and 43 represents a binary 1.

The two input signals applied to the AND-gate of FIG. 2a are designated respectively APAR and DHPC. The output signal is designed by APAR DHPC, a conjunctive logic expression. This form of expression is used in logical equations, which are also known as Boolean equations, to be employed hereinafter. The conjunctive operation on any two signals, such as the APAR and DHPC signals, is indicated by writing the two signal designation terms adjacent each other with no operator notation therebetween, as written above, or with the operator notation ($\cdot$) between the two terms; as follows: APAR·DHPC. This conjunctive expression is read as "APAR and DHPC."

The logical operation of Conjunction is not limited to AND-gates having only two input signals, but instead is applicable to AND-gates having any number of input signals. In each such instance, the output signal of the corresponding AND-gate represents a binary 1 when, and only when, all of the input signals applied to the gate are positive and represent binary 1's.

*OR-gate*

Figure 2B:
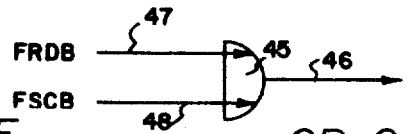

The OR-gate provides the logical operation of inclusive-Or for binary 1 input signals applied thereto. In the System, since the binary 1 is represented by a positive signal, the OR-gate provides a positive output signal representing a binary 1 when any one or more of the input signals applied thereto are positive and represent binary 1's. The symbol identified by the numeral 45 in FIG. 2b represents a two-input OR-gate. Such an OR-gate delivers a binary 1 output signal on output lead 46 when any one or both of the input signals applied thereto on respective input leads 47 and 48 represent binary 1's.

The two input signals applied to the OR-gate of FIG. 2b are designated respectively FRDB and FSCB. The output signal is designated by $FRDB+FSCB$, an inclusive-or logic expression. This form of expression is also used in logical equations to be employed hereinafter. The inclusive-or operation on any two signals, such as the FRDB and FSCB signals, is indicated by writing the two signal designation terms with the operator notation ($+$) between the two terms, as written above. This inclusive-or expression is read as "FDRB or FSCB."

The logical operation of Inclusive-Or is not limited to OR-gates having only two input signals, but instead is applicable to OR-gates having any number of input signals. In each such instance the output signal of the corresponding OR-gate represents a binary 1 when any one or more of the input signals applied to the gate are positive and represent binary 1's.

*Inverter*

The inverter provides the logical operation of Inversion, or NOT, for an input signal supplied thereto. The inverter provides a relatively positive output signal, representing a binary 1, when the input signal supplied thereto is relatively negative, representing a binary 0. Conversely, the inverter provides an output signal representing a binary 0 when the input signal represents a binary 1.

Figure 2C:

The symbol identified by the numeral 50 in FIG. 2c represents an inverter. The inverter delivers a binary 1 output signal on output lead 51 when the input signal applied thereto on input lead 52 represents a binary 0.

The output signal delivered by the inverter is designated as having the inverse binary logical significance of the input signal. The input signal applied to the inverter of FIG. 2c is designated as the DHCE signal. The output signal of this inverter is designated by $\overline{DHCE}$, which signifies that such signal has inverse logical significance compared to the input DHCE signal.

This designation for a signal having inverse logical significance with respect to another signal is employed generally herein. Thus, any signal, such as FDTA, designates that when the FDTA signal is relatively positive, representing a binary 1, the $\overline{FDTA}$ signal is relatively negative, representing a binary 0, and vice versa. It is to be understood herein that whenever a particular signal is generated, its logical inverse may be generated by applying the original signal to an inverter.

Flip-flop

The flip-flop provides temporary storage of a binary digit of information or temporary storage of a binary digit of control. A pair of output signals is delivered by the flip-flop to denote the type of binary digit that is currently being stored.

The flip-flop, or bistable multivibrator, is a circuit adapted to operate in either one of two stable states and to transfer from the state in which it is operating to the other stable state upon application of a respective trigger signal thereto. In one state of operation the flip-flop represents the binary 1 (1-state) and in the other state the binary 0 (0-state).

A flip-flop, generally, is identified mnemonically in accordance with the function it performs. For example, the flip-flop designated as the FRPR flip-flop is a request indicator for the PEP. The FRPR flip-flop stores a binary 1 when the PEP is requesting communication with a Memory.

Three types of flip-flops are employed in the System of FIG. 1, the three types being identified by the respective letters A, B, and C.

Flip-flop, type-A

Figure 2D:
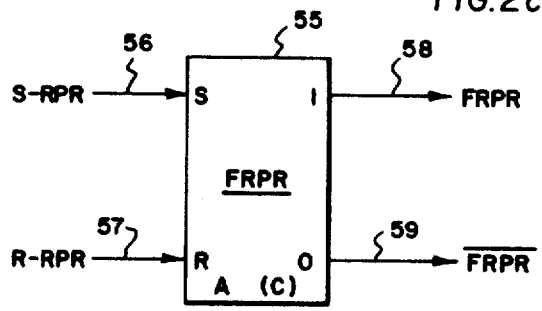

The symbol identified by the numeral 55 in FIG. 2d and provided with the letter A in the lower portion thereof represents a type-A flip-flop. The two leads 56 and 57 entering the left-hand side of the flip-flop symbol are input leads and provide the two required trigger signals. Lead 56, the 1-input lead, provides the 1-input (or "set") signal and lead 57, the 0-input lead, provides the 0-input (or "reset") signal. When the 1-input signal increases positively, the flip-flop is transferred to its 1-state (or "set" state), if it is not already in the 1-state. When the 0-input signal increases positively, the flip-flop is transferred to its 0-state (or "reset" state), if it is not already in the 0-state. The two leads 58 and 59 leaving the right-hand side of the flip-flop symbol are output leads and deliver the two output signals. Lead 58, the 1-output lead, delivers the 1-output signal of the flop-flop and lead 59, the 0-output lead, delivers the 0-output signal.

The input and output signals of a flip-flop are identified in accordance with the designation of the flip-flop. For example, the 1-input signal received by the FRPR flip-flop is identified as the S-RPR signal, whereas the 0-input signal is identified as the R-RPR signal. The 1-output signal delivered by the FRPR flip-flop is identified as the FRPR signal, whereas the 0-output signal is identified as the $\overline{\text{FRPR}}$ signal. When the FRPR flip-flop is in the 1-state, a relatively positive signal is delivered on the 1-output lead and a relatively negative signal is delivered on the 0-output lead. Conversely, when the flip-flop is in the 0-state, a relatively negative signal is delivered on the 1-output lead and a relatively positive output signal is delivered on the 0-output lead.

The type-A flip-flop is well known in the art and the circuit thereof will not be shown herein.

Flip-flop, type-C

The symbol identified by the numeral 55 in FIG. 2d and provided with the letter C in the lower portion thereof represents a type-C flip-flop. This flip-flop is employed in the CAT, FIG. 26. The type-C flip-flop is provided with two input leads and two output leads in the same manner as the type-A flip-flop, and these leads have the same logical significance with respect to the state of the type-C flip-flop as do the corresponding input and output leads of the type-A flip-flop. However, the type-C flip-flop has the additional capability, not found in many of the flip-flops of the prior art, of providing logically significant output signals when both input signals simultaneously represent a binary 1 or when both input signals simultaneously represent a binary 0. Therefore, the circuit of the type-C flip-flop is shown in FIG. 3 and its operation will be described briefly.

The type-C flip-flop of FIG. 3 is the invention of N. R. Crain and is the subject of U.S. Patent 3,167,662, issued Jan. 26, 1965 and assigned to the assignee of the instant invention. The output amplifiers shown in FIG. 3 and employed with the flip-flop thereof are also the invention of N. R. Crain and are described in U.S. patent application Ser. No. 265,757, filed Mar. 18, 1963, and also assigned to the assignee of the instant invention.

The flip-flop circuit of FIG. 3 includes a pair of cross-coupled transistor amplifiers comprising the PNP transistors 101 and 102. To effect cross-coupling the collector electrode of transistor 101 is coupled through a resistor-capacitor network 103 to the base electrode of transistor 102 and the collector electrode of transistor 102 is coupled through a resistor-capacitor network 104 to the base electrode of transistor 101. A pair of NPN transistors 105 and 106 are coupled to the respective emitter electrodes of transistors 101 and 102 to function as output amplifiers for driving load circuits, which are connected to the respective output leads 59' and 58'. A pair of input amplifiers comprising the PNP transistors 107 and 108 couple the input signals supplied on respective input leads 56' and 57' to the base electrodes of respective transistors 101 and 102. A pair of regenerative amplifiers comprising the respective NPN transistors 109 and 110 and the respective transformers 111 and 112 are coupled to the output amplifiers to provide rapid changes of output signal voltages when the state of the flip-flop changes.

Input lead 56' receives the 1-input signal and input lead 57' receives the 0-input signal. Output lead 58' delivers the 1-output signal and output lead 59' delivers the 0-output signal. When any one of the input and output signals represents a binary 1, its level is approximately +3 v. When any one of these signals represents a binary 0, its level is approximately 0 v.

The type-C flip-flop is operative in three states. In the first state transistor 101 is conductive, transistor 102 is nonconductive, the output signal on lead 58' represents a binary 0, and the output signal on lead 59' represents a binary 1. In the second state, transistor 101 is nonconductive, transistor 102 is conductive, the output signal on lead 58' represents a binary 1, and the output signal on lead 59' represents a binary 0. In the third state, both of transistors 101 and 102 are nonconductive, and the output signal on each of leads 58' and 59' represents a binary 0.

Four combinations of logical input signals provide the three states of the type-C flip-flop, as shown in the following Table 1:

TABLE 1

| Binary Input Signals | | Binary Output Signals | | |
|---|---|---|---|---|
| S | R | "1" | "0" | State |
| 0 | 1 | 0 | 1 | A |
| 1 | 0 | 1 | 0 | B |
| 1 | 1 | 0 | 0 | C |
| 0 | 0 | | | |

As shown in Table 1, if leads 56' and 57' receive respective binary 0 and binary 1 input signals, the flip-flop operates in state A, wherein output lead 58' delivers a binary 0 signal and output lead 59' delivers a binary 1 signal. If leads 56' and 57' receive respective binary 1 and binary 0 input signals, the flip-flop operates in state B, wherein output leads 58' delivers a binary 1 signal and output lead 59' delivers a binary 0 signal. If both of input leads 56' and 57' receive binary 1 input signals, the flip-flop operates in state C, wherein each of output leads 58' and 59' deliver a signal representing a binary 0. However, if both of input leads 56' and 57' receive binary 0 input signals, the state of the flip-flop is determined by its immediately preceding history, as shown in the following Table 2:

TABLE 2

| State Before 0-0 Inputs | | | State After 0-0 Inputs | | |
|---|---|---|---|---|---|
| "1" | "0" | State | "1" | "0" | State |
| 0 | 1 | A | | 0 | 1 | A |
| 1 | 0 | B | | 1 | 0 | B |
| 0 | 0 | C | or | 0 | 1 | A or B |
| | | | | 1 | 0 | |

As shown in Table 2, when the type-C flip-flop is operating in state A and the input signal on lead 57' changes to represent a binary 0, the flip-flop continues to operate in state A. When the flip-flop is operating in state B and the input signal on lead 56' changes to represent a binary 0, the flip-flop continues to operate in state B. However, when the flip-flop is operating in state C and both of the input signals substantially simultaneously change to represent a binary 0, the flip-flop changes to operate in state A or state B. In this transition, whether the flip-flop assumes state A or state B, depends on the relative values of the corresponding parameters of the circuit, which, in turn, determine whether transistor 101 or 102 will first regain conduction when both input signals simultaneously change to binary 0's.

In state A a 0 v., binary 0 signal is received by input lead 56' and a +3 v., binary 1 signal is received by input lead 57'. The +3 v. signal on lead 57' forces transistor 108, diode 114, and the emitter-base junction of transistor 106 to be conductive in series and a voltage of approximately +1.0 v. is accordingly provided at the base of transistor 102. Inasmuch as the voltage on the emitter of transistor 102 is approximately +0.5 v. due to conduction of transistor 106, the emitter-base junction of transistor 102 is reverse-biased, and transistor 102 is maintained nonconductive by the binary 1 signal on input lead 57'.

Additionally, the 0 v. signal on lead 56' forces transistor 107 to be nonconductive, thereby permitting the voltage on the base of transistor 101 to decrease until transistor 101 conducts heavily. With transistor 101 conductive, the voltage on the base thereof is determined by the sum of the voltage across diode 115, through which the emitter current of transistor 101 flows, and the emitter-base voltage of transistor 101. Accordingly, the base voltage of transistor 101 is approximately −1.0 v. When transistor 101 is conductive, the voltage on its emitter is approximately −0.5 v., thereby reverse-biasing the emitter-base junction of transistor 105, and transistor 105 is maintained nonconductive.

Thus, in state A the 0-output lead 59' delivers a binary 1 signal and the 1-output lead 58' delivers a binary 0 signal. With transistor 105 nonconductive, the voltage on the collector thereof increases until the collector is clamped at approximately +3 v. by the diode 117. Accordingly, the potential of output lead 59', which is connected to the collector of transistor 105, represents a binary 1. With transistor 106 conductive, the voltage on the collector thereof is approximately +0.2 v. Accordingly, the potential of output lead 58', which is connected to the collector of transistor 106, represents a binary 0.

The opposite modes of conduction of transistors 101 and 102 in state A provide a "memory" voltage across the capacitor of resistor-capacitor network 103. This capacitor has its upper terminal connected to the base of transistor 102, which is being maintained at a potential level of +1.0 v., and its lower terminal connected to the collector of transistor 101, which is being maintained at a potential level of −0.7 v. Accordingly, the capacitor stores a voltage of approximately 1.7 v. It is this latter voltage which maintains the circuit in state A (Table 2) when the input signal applied to lead 57' in state A drops from +3 v. to 0 v.

In state B, a +3 v., binary 1 signal is received by input lead 56' and a 0 v., binary 0 signal is received by input lead 57'. In this state the conductive condition of each transistor is reversed from its condition in state A. For example, transistor 101 is maintained nonconductive and transistor 102 conducts heavily. Accordingly, in state B, the 1-output lead 58' delivers a binary 1 signal and the 0-output lead 59' delivers a binary 0 signal. Additionally, resistor-capacitor network 104 now stores a 1.7 v. "memory" voltage so that the circuit remains in state B when the input signal applied to lead 56' drops from +3 v. to 0 v.

In state C, a +3 v., binary 1 signal is received by both input leads 56' and 57'. The +3 v. input signals force transistors 107, diode 113, and the emitter-base junction of transistor 105 to conduct in series and transistor 108, diode 114, and the emitter-base junction of transistor 106 to conduct in series. Therefore, transistors 101 and 102 are each maintained nonconductive. With transistors 105 and 106 conductive, the +0.2 v. potentials on their respective collectors provide binary 0 signals on both output leads 58' and 59'.

The maintenance of both transistors 101 and 102 in the non-conductive state provides the storage of a large "memory" voltage on the capacitors of resistor-capacitor networks 103 and 104. The upper terminals of each of these capacitors is maintained at a potential level of +1.0 v., by connection to the anodes of the conducting diodes 113 and 114. The lower terminals of each of these capacitors is maintained at approximately −9.0 v. by the voltage divider action of the series resistors between the anodes of diodes 113 and 114 and the −12 v. source. Therefore, the capacitors of resistor-capacitor networks 103 and 104 store voltages of approximately 10.0 v. in state C. These large "memory" voltages maintain both transistors 101 and 102 momentarily nonconductive if both input signals drop from +3 v. to 0 v. at substantially the same time, and both output signals momentarily continue to represent binary 0's until one of these capacitors discharges to a voltage that permits the corresponding one of transistors 101 or 102 to begin conduction.

As described above, with relation to Table 2, when a 0 v., binary 0 signal is received by both input leads 56' and 57', the state of operation of the type C flip-flop is dependent on the state of operation immediately prior to the time when both input signals become a binary 0. When each input signal represents a binary 0 neither transistor 107 nor transistor 108 is conductive, the flip-flop circuit is isolated from and uncontrolled by the present input signals, and its state is controlled by internal potential levels existing in the immediately preceding state.

If the flip-flop previously has been operating in state A, transistor 102 has been nonconductive, transistor 101 has been conductive, the +3 v. input signal on lead 57' has been forcing conduction of transistor 108, and a "memory" voltage has been stored on the capacitor of resistor-capacitor network 103 with the upper terminal of this capacitor at +1.0 v. Now, if the input signal on lead 57' changes to represent a binary 0, transistor 108 becomes nonconductive, but the capacitor "memory" voltage momentarily continues to maintain the base of transistor 102 at +1.0 v. and keeps transistor 102 nonconductive. However, since transistor 106 and diode 114 continue to conduct, this base voltage of transistor 102 remains at +1.0 v. and the circuit continues to operate in state A.

In a similar manner, the flip-flop continues to operate in state B if the binary 1 input signal applied to lead 56' changes to represent a binary 0.

If, however, the circuit has been operating in state C, both transistors 101 and 102 have been nonconductive, both +3 v. input signals have been forcing conduction of transistors 107 and 108, and large "memory" voltages have been stored on the capacitors of both resistor-capacitor networks 103 and 104 with the upper terminals of each of these capacitors at +1.0 v. Now, if the input signals on both leads 56' and 57' change to represent a binary 0, the isolation of the circuit by the resulting nonconductive transistors 107 and 108 leaves the flip-flop in a temporarily unstable state. The capacitor "memory" voltages momentarily continue to maintain the base of each of transistors 101 and 102 at +1.0 v. and these transistors temporarily remain nonconductive. Each output signal correspondingly continues to represent a binary 0. Both capacitors immediately commence to discharge and the voltage on the base of each of transistors 101 and 102 becomes more negative. Since absolute identity cannot exist between corresponding components of the flip-flop, one of these capacitors will discharge first to a voltage that permits the corresponding one of transistors 101 or 102 to begin conduction. The collector of the transistor which first becomes conductive will immediately rise to a potential level of −0.7 v., forcing a voltage rise of the entire resistor-capacitor network to which such collector is connected and increasing the reverse bias on the remaining nonconducting one of transistors 101 and 102. The circuit will then remain operating in a stable manner in state A or state B, whichever state corresponds to the one of transistors 101 or 102 that first becomes conductive.

Of particular significance in the employment of this circuit in the instant invention is the fact that at no time will more than one of output leads 58' and 59' deliver a binary 1 signal, and in the unstable period described the output lead which first starts to deliver a binary 1 signal continues to do so as the circuit settles into its stable condition.

Flip-flop, type-B

Figure 2E:
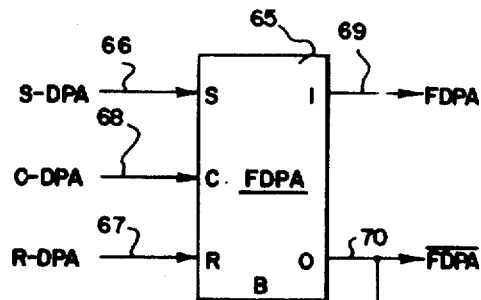

The symbol identified by numeral 65 in FIG. 2e and provided with the letter B in the lower portion thereof, represents a type-B flip-flop. The two leads 66 and 67 entering the left-hand side of the flip-flop symbol are input leads and provide the two required trigger signals. Lead 66, the 1-input lead, provides the 1-input signal and lead 67, the 0-input lead, provides the 0-input signal. A third lead 68 entering the left-hand side of the flip-flop symbol is an additional input lead and provides a "clock," or transfer signal.

For the state of the type-B flip-flop to be changed, not only must the corresponding trigger signal be a binary 1, but the clock signal must be a binary 1 at the same time. Accordingly, when the 1-input signal increases positively, the flip-flop is enabled for transferral to its 1-state, if it is not already in the 1-state. However, a transfer is not effected until, with the 1-input signal representing a binary 1, the clock signal is suddenly increased positively. Upon the simultaneous representation of a binary 1 by both the 1-input signal and the clock signal, the flip-flop transfers to its 1-state. Similarly, when the 0-input signal represents a binary 1, the flip-flop is enabled for transfer to its 0-state, if it is not already in the 0-state. When the clock signal also changes to represent a binary 1, the flip-flop transfers to its 0-state.

The two leads 69 and 70 leaving the right-hand side of the flip-flop symbol are output leads and deliver the two output signals. Lead 69, the 1-output lead, delivers the 1-output signal of the flip-flop and lead 70, the 0-output lead, delivers the 0-output signal.

As described previously, in relation to the type-A flip-flop, the input and output signals of the flip-flop are identified in accordance with the designation of the flip-flop, which in FIG. 2e is the FDPA flip-flop. The additional input signal of the type-B flip-flop illustrated is identified as the C-DPA signal.

Certain of the type-B flip-flops are provided with an additional reset capability, wherein the flip-flop may be transferred to the 0-state without requiring a clock signal. A special input lead 71 is illustrated symbolically in FIG. 2e as being connected to 0-output lead 70. When the designated signal shown to the left of lead 71 becomes a binary 1, the flip-flop is transferred to its 0-state, if it is not already in the 0-state.

Figure 4:
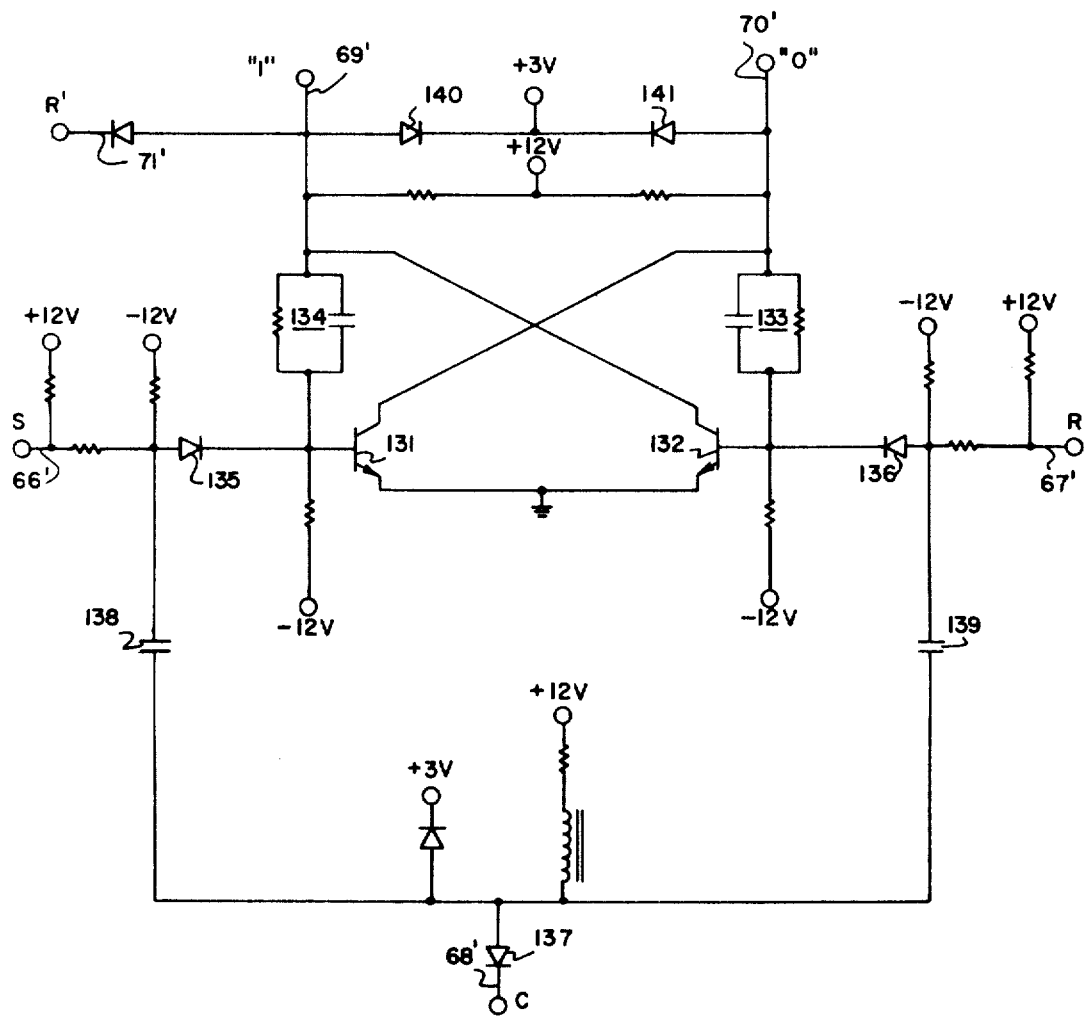
FIGURE 4 is a circuit diagram of another form of flip-flop useful in the System of FIG. 1.

A particular circuit for a type-B flip-flop is shown in FIG. 4 and its operation will be described briefly.

The flip-flop circuit of FIG. 4 includes a pair of cross-coupled transistor amplifiers comprising the NPN transistors 131 and 132. To effect cross-coupling the collector electrode of transistor 131 is coupled through a resistor-capacitor network 133 to the base electrode of transistor 132 and the collector electrode of transistor 132 is coupled through a resistor-capacitor network 134 to the base electrode of transistor 131. A pair of diodes 135 and 136 couple the input trigger signals supplied on respective input leads 66' and 67' to the base electrodes of respective transistors 131 and 132. Output leads 69' and 70' are connected to the respective collectors of transistors 132 and 131. A diode 137 and a capacitor 138 couple the clock signal supplied on input lead 68' to the anode of diode 135. Diode 137 and a capacitor 139 also couple the clock signal to the anode of diode 136.

Input leads 66' receives the 1-input signal and input lead 67' receives the 0-input signal. Input lead 68' receives the clock signal. Output lead 69' delivers the 1-output signal and output lead 70' delivers the 0-output signal. When any one of the input trigger, clock, and output signals represents a binary 1, its level is approximately +3 v. When any one of these signals represents a binary 0, its level is approximately 0 v.

The type-B flip-flop is operative in two stable states. In one state the flip-flop represents a binary 0 and in the other state the flip-flop represents a binary 1. In the 0-state, transistor 131 is nonconductive, transistor 132 is conductive, the output signal on lead 69' represents a binary 0, and the output signal on lead 70' represents a binary 1. In the 1-state, transistor 131 is conductive, transistor 132 is nonconductive, the output signal on lead 69' represents a binary 1, and the output signal on lead 70' represents a binary 0.

In the 0-state, transistor 132 conducts heavily and the potential on its collector is approximately +0.2 v. Accordingly, the voltage on output lead 69' represents a binary 0. Transistor 131 is nonconductive and the potential on its collector increases until the collector is clamped at approximately +3 v. by a diode 141. Accordingly, the voltage on output lead 70' represents a binary 1.

The opposite modes of conduction of transistors 131 and 132 in the 0-state provide a "memory" voltage across the capacitor of the resistor-capacitor network 133. This capacitor has its upper terminal connected to the collector of transistor 131, which is being maintained at a potential level of +3 v., and its lower terminal connected to the base of transistor 132, which is being maintained at a potential level of approximately +0.5 v. Accordingly, the capacitor stores a voltage of approximately 2.5 v. It is this latter voltage which enables the circuit to transfer to the 1-state when the appropriate input signals are applied to the circuit.

In the 1-state, the conductive condition of each transistor is reversed from its condition in the 0-state. Accordingly, in the 1-state, the 1-output leads 69' delivers a binary 1 signal and the 0-output lead 70' delivers a binary 0 signal. Additionally, resistor-capacitor network 134 now stores a 2.5 v. "memory" voltage so that the circuit is enabled to transfer to the 0-state when the appropriate input signals are applied to the circuit.

The flip-flop is transferred from the 0-state to the 1-state when the 1-input signal and the clock signal each become a binary 1. With each input trigger signal representing a binary 0 and with the circuit operating in the 0-state, transistor 132 is conductive and transistor 131 is nonconductive. The emitter-base junction of transistor 131 is reverse-biased by the ground potential coupled to the emitter and by the −0.3 v. potential applied to the base due to the voltage-divider action of the series resistors between the collector of transistor 132 and the −12 v. source.

Diode 135 is also reverse-biased at this time, the cathode thereof being maintained at the —0.3 v. potential on the base of transistor 131 and the anode being maintained at a potential of approximately —2.8 v. by the voltage divider connected thereto and operating between the +12 v. and —12 v. sources. At this time the capacitor of the resistor-capacitor network 133 stores a voltage of 2.5 v.

If, now, a trigger signal of +3 v. is applied to input lead 66', although the voltage on the anode of diode 135 increases to —0.5 v., this latter voltage is insufficient to initiate conduction of the diode, the diode remaining reverse biased. However, with the input signal on lead 66' at the +3 v. level, if the voltage of the clock signal also increases to +3 v., the voltage on the anode of diode 135 immediately rises toward +2.5 v., and the diode becomes forward-biased and conductive. Diode 135 conducts through the emitter-base junction of transistor 131, which also becomes conductive. The collector of transistor 131 now drops to +0.2 v. and forces the base of transistor 132 to a potential substantially below ground, because of the +2.5 v. stored in resistor-capacitor network 133. Accordingly, when the type-B flip-flop is operating in the 0-state and binary 1 signals are received on both input leads 66' and 68', the state of operation of the flip-flop is reversed. The flip-flop continues operating in the 1-state when the clock signal is removed.

The clock signal, alone, is insufficient to change the state of the flip-flop. Thus, in the above example of operation in the 0-state, if a +3 v. clock signal is applied to the circuit when input lead 66' continues to receive a binary 0 signal, the voltage on the anode of diode 135 only rises to a potential of approximately +0.1 v. This potential is insufficient to induce the diode to conduct, and the flip-flop continues in the 0-state.

The flip-flop is similarly transferred from the 1-state to the 0-state upon the simultaneous application of binary 1 signals to 0-input lead 67' and to clock input lead 68'.

Special input lead 71' provides a special reset signal for transferring the type-B flip-flop from the 1-state to the 0-state without requiring a simultaneous binary 1 clock signal. Normally the signal applied to lead 71' is maintained at a potential level of +3 v., which permits the flip-flop to operate in either the 0-state or the 1-state, depending on the type of trigger signals applied to input leads 66' and 67'. However, with the flip-flop operating in the 1-state, if the potential level of lead 71' is decreased to 0 v. the potential level of the upper terminal of the capacitor of resistor-capacitor network 134 is correspondingly decreased. Since this capacitor at this time stores a 2.5 v. "memory" voltage, the lower terminal of the capacitor and the connected base of conductive transistor 131 are forced to a —2.5 v. potential. Transistor 131 thereupon becomes non-conductive and transistor 132 conductive, and the flip-flop commences operation in the 0-state.

For simplicity in the detailed drawings of the invention, the designation of the original signal which initiates the special reset signal on lead 71' is illustrated. However, this original signal is actually coupled to an inverter and the inverter output signal is applied on lead 71' to comprise the special reset signal. For example, consider the FP11 flip-flop of FIG. 70. The DANA signal is shown symbolically as initiating the special reset action for this flip-flop. However, it is to be understood herein that the signal illustrated is inverted before being coupled to lead 71'. Accordingly, when the DANA signal represents a binary 0, lead 71' receives a +3 v. signal; but when the DANA signal increases to +3 v., lead 71' receives a 0 v. signal to reset the flip-flop.

Register

A register is a set of flip-flops providing temporary storage for a group of related binary digits of information or control. For example, the Memory Request Register of the CIC-R/S, FIG. 17, comprises FRJQ, FRKQ, FRLQ, FRMQ, FRNQ, FRTQ, and FRVQ flip-flops. Each of these flip-flops stores a binary digit which denotes whether the corresponding one of the seven Memories has been requested for communication by a Processor.

One-shot

The one-shot provides temporary storage of a binary digit of control for a predetermined duration following the occurrence of a particular event. An output signal is delivered by the one-shot to denote the type of binary digit that is currently being stored.

The one-shot, or monostable multivibrator, is a circuit normally operative in a stable state, but adapted to operate in an unstable state for a predetermined duration following application of a trigger signal thereto. In the stable state of operation, the one-shot represents a binary 0 (0-state) and in the unstable state a binary 1 (1-state).

A one-shot, generally, is identified mnemonically in accordance with the function it performs. For example, the one-shot designated as the TTAR one-shot is a request initiator for DAP-A. The TTAR one-shot transfers to the 0-state when DAP-A initiates a request for a communication with a Memory.

Two types of one-shots are employed in the System of FIG. 1, the two types being identified by the respective letters F and H.

One-shot, type-F

Figure 2F:
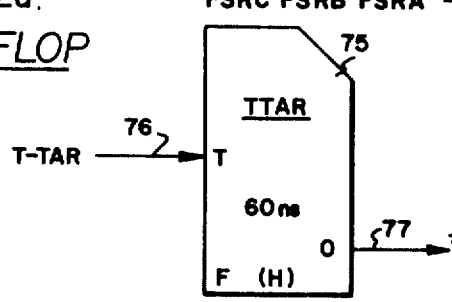

The symbol identified by the numeral 75 in FIG. 2f and provided with the letter F in the lower portion thereof, represents a type-F one-shot. The lead 76 entering the left-hand side of the one-shot symbol is an input lead and provides the required trigger signal. When the trigger signal goes relatively positive, the one-shot is transferred to its 1-state (or unstable state), and remains in the 1-state for a predetermined duration before returning to the 0-state. The lead 77 leaving the right-hand side of the symbol is an output lead and delivers the output signal, which is the 0-output signal.

The input and output signals of a one-shot are identified in accordance with the designation of the one-shot. For example, the trigger signal received by the TTAR one-shot is identified as the T-TAR signal. The 0-output signal delivered by the TTAR one-shot is identified as the $\overline{\text{TTAR}}$ signal. When the TTAR one-shot is in the stable 0-state, a relatively positive signal is delivered on output lead 77. Conversely, when the one-shot is in the unstable 1-state, a relatively negative signal is delivered on the output lead.

The type-F one-shot is well known in the art and the circuit thereof will not be shown herein.

One-shot, type-H

The symbol identified by the numeral 75 in FIG. 2f and provided with the letter H in the lower portion thereof, represents a type-H one-shot. This one-shot is employed, for example, in the CAT, FIG. 28. The type-H one-shot is provided with a single input lead and usually with one output lead in the same manner as the type-F one-shot, and these leads have the same logical significance with respect to the state of the type-H one-shot as do the corresponding input and output leads of the type-F one-shot. However, the type-H one-shot has the additional capability, not found in many one-shots of the prior art, of remaining in the unstable 1-state so long as the trigger signal continues to represent a binary 1, and then continuing to remain in the 1-state for a predetermined duration after the trigger signal changes to a binary 0. Therefore, the circuit of the type-H one-shot is shown in FIG. 5a and its operation will be described briefly.

Figures 5A, 5B:
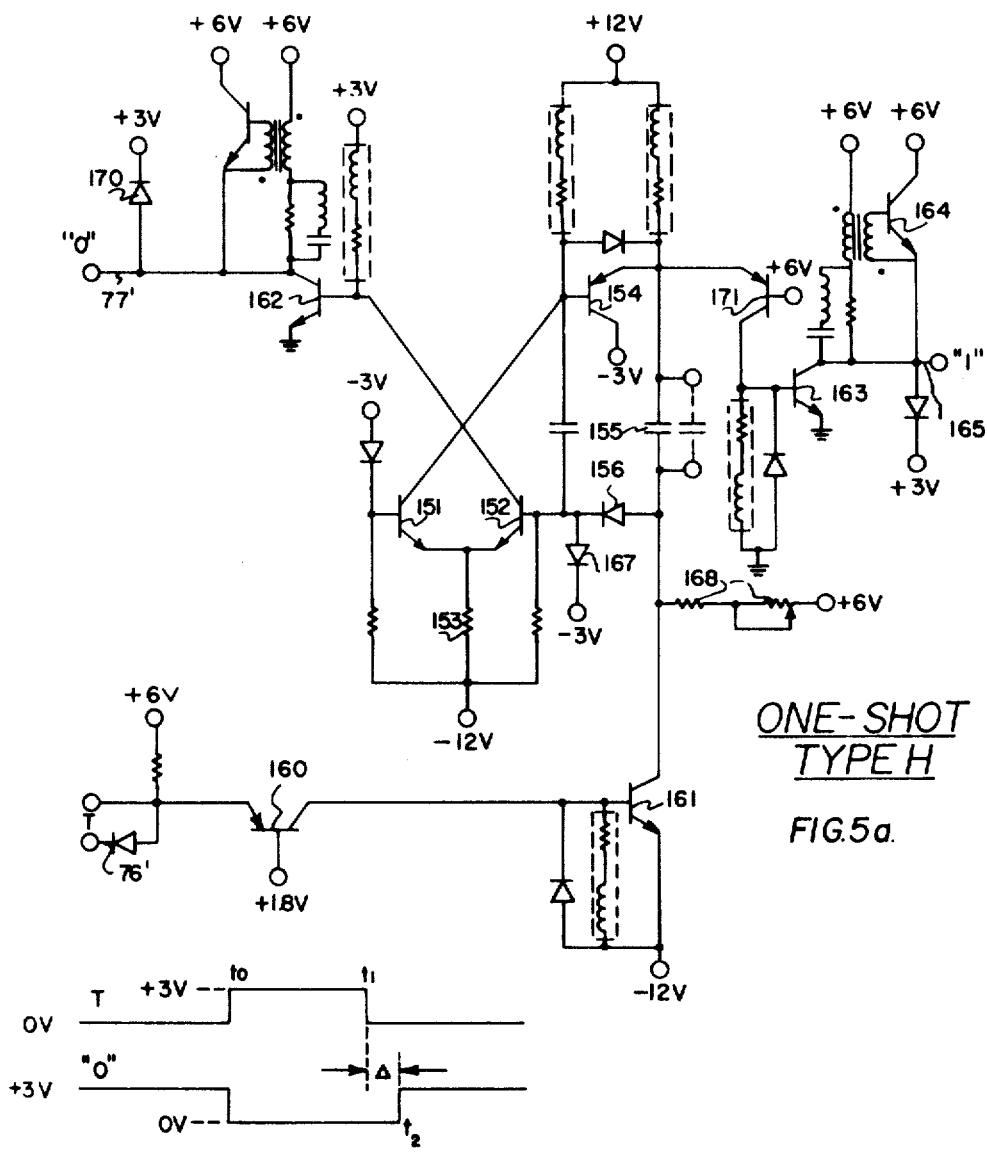
FIGURES 5a and 5b are circuit diagrams of a one-shot useful in the System of FIG. 1.

The one-shot of FIG. 5a includes a pair of cross-coupled transistor amplifiers comprising the NPN transistors 151 and 152. To effect cross-coupling both emitter electrodes of transistors 151 and 152 are connected to a common emitter load resistor 153. Additionally, the collector electrode of transistor 151 is coupled through a transistor 154, a capacitor 155 and a diode 156 to the base electrode of transistor 152. A pair of series-connected transistors 160 and 161 coupled the trigger signal supplied on input lead 76' to the anode of diode 156. A transistor 162 is coupled to the collector electrode of transistor 152 to function as an output amplifier for driving load circuits which are connected to output lead 77'. A pair of transistors 163 and 164 function as an output amplifier for driving optional load circuits which are connected to an optional output lead 165.

Input lead 76' receives the input trigger signal. Output lead 77' delivers the 0-output signal and optional output lead 165 delivers the optional 1-output signal. When any one of the input and output signals represents a binary 1, its level is approximately +3 v. When any one of these signals represents a binary 0, its level is approximately 0 v.

The operation of the circuit of FIG. 5a will now be described with reference to the waveforms of FIG. 5b.

The type-H one-shot is operative in two states. In one state, the one-shot represents a binary 0 and in the other state the one-shot represents a binary 1. In the 0-state, which is the stable state, transistor 151 is nonconductive, transistor 152 is conductive, and the output signal on lead 77' represents a binary 1. In the 1-state, which is the unstable state, transistor 151 is conductive, transistor 152 is nonconductive, and the output signal on lead 77' represents a binary 0.

In the 0-state of operation of the one-shot, the trigger signal applied to input lead 76' has a potential of 0 v. The symbol "T" in FIG. 5b identifies the illustrated trigger signal waveform. The 0 v. trigger signal provides a reverse bias on the emitter-base junction of transistor 160, and maintains the transistor nonconductive. With transistor 160 non-conductive, a potential of $-12$ v. is applied to both base and emitter of transistor 161, which therefore is also nonconductive. Accordingly, diodes 156 and 167 conduct in series from the +6 v. source and variable resistor 168 to the $-3$ v. source. Conduction of diode 167 maintains a potential of approximately $-2.5$ v. on the base of transistor 152. Accordingly, transistor 152 is maintained conductive and its emitter operates at a potential of approximately $-3.0$ v., reverse-biasing the emitter-base junction of transistor 151 which is thereby maintained nonconductive. The collector of transistor 152 operates at a potential of approximately $-2.8$ v., reverse-biasing the emitter-base junction of transistor 162 and maintaining transistor 162 nonconductive. The potential on the collector of transistor 162 increases until the collector is clamped at approximately +3 v. by a diode 170. Accordingly, the voltage on output lead 77' represents a binary 1 when the one-shot is operating in the 0-state. The symbol "0" in FIG. 5b identifies the illustrated 0-output signal waveform.

In the 1-state of operation of the one-shot, the conductive condition of each transistor is reversed from its condition in the 0-state. A first phase of the 1-state continues as long as the input trigger signal remains a binary 1. This first phase is shown in FIG. 5b as continuing between times $t_0$ and $t_1$. The +3 v. trigger signal forces conduction of transistor 160 which, in turn, forces transistor 161 also to be conductive. The potential on the collector electrode of transistor 161 is approximately $-11.8$ v. and this potential is coupled to the anode of diode 156. The voltage drop across diode 156 is insufficient to sustain conduction. Accordingly, the base of transistor 152 is maintain at $-12$ v. and the transistor is nonconductive. Since transistor 152 does not conduct in the 1-state, the emitter base junction of transistor 151 is not reverse-biased and the latter transistor is conductive. With transistor 152 nonconductive, the potential on the base electrode of transistor 162 increases until transistor 162 becomes conductive. The collector electrode of transistor 162 and the connected output lead 77' are maintained at a potential of approximately +0.2 v. and represent a binary 0.

In this first phase of the 1-state, the collector of transistor 151 is maintained at approximately $-3.8$ v. This $-3.8$ v. potential is coupled to and forces transistor 154 to be conductive. Accordingly, the emitter of transistor 154 is now maintained at approximately $-3.3$ v. Capacitor 155 stores a "memory" voltage in this phase. This capacitor has its upper terminal connected to the emitter of transistor 154, which is being maintained at a potential level of $-3.3$ v., and its lower terminal connected to the collector of transistor 161, which is being maintained at a potential level of $-11.8$ v. Accordingly, capacitor 155 stores a voltage of approximately 8.5 v. It is this latter voltage which maintains the one-shot in the 1-state for a predetermined duration after the trigger signal reverts to a binary 0 representation.

The type-H one-shot is transferred from the 0-state to the 1-state when the trigger signal becomes a binary 1. In the 0-state transistor 152 is conductive, transistor 151 is nonconductive, and transistor 154 is nonconductive. The 0-output signal on lead 77' represents a binary 1 at this time. The potential on the emitter of transistor 154 increases until transistor 171 becomes conductive. The upper terminal of capacitor 155 is maintained at approximately +6.5 v. by the emitter of the conductive transistor 171 and the lower terminal is maintained at approximately $-2.0$ v. by the anode of conductive diode 156. Accordingly, in the 0-state capacitor 155 stores approximately 8.5 v., as it does in the first phase of the 1-state. If now (time $t_0$ in FIG. 5b), the trigger signal increases to +3 v., the resulting conduction of transistor 161 clamps the anode of diode 156 to a potential level of $-11.8$ v., thereby terminating conduction of diodes 156 and 167 and of transistor 152. Transistor 151 is thereupon permitted to conduct. The circuit therefore transfers to operation in the first phase of the 1-state. The emitter-base junction of transistor 154 conducts through transistor 151 and transistor 171 becomes nonconductive. Since there is no appreciable change of voltage required on capacitor 155, the transition from the 0-state to the 1-state is very rapid and the 0-output signal immediately drops to represent a binary 0 as shown in FIG. 5b.

The first phase of operation in the 1-state is terminated only when the trigger signal on lead 76' reverts to the binary 0 representation. At such time the circuit enters the second phase of the 1-state of operation, denoted by the interval between $t_1$ and $t_2$ in FIG. 5b. The duration of the second phase is determined by the rate of discharge of capacitor 155. This discharge rate is controlled by the resistor-capacitor series network comprising variable resistor 168, capacitor 155, and any externally connected capacitance, illustrated by the dashed representation in parallel with capacitor 155 in FIG. 5a. Thus, the duration of the second phase is made controllable by varying the value of resistor 168 and by connecting different values of capacitance in parallel with capacitor 155. When the trigger signal drops to a potential of 0 v. at time $t_1$, although transistor 161 immediately becomes nonconductive, transistors 151 and 154 remain conductive and transistor 152 remains nonconductive for the duration of the second phase of the 1-state. The upper terminal of capacitor 155 remains clamped at a potential level of $-3.3$ v. by the continued conduction of transistors 154 and 151. Capacitor 155 now commences to discharge through the circuit path comprising resistor 168 and transistors 154 and 151. As capacitor 155 discharges, the potential of its lower terminal begins to increase from the initial value of $-11.8$ v. The second phase of the 1-state continues until the lower terminal of capacitor 155 increases to a potential level of approximately $-3$ v., whereupon the series-connected diode 156 and transistor 152 commence conduction. The circuit now reverts immediately to the 0-state. Thus, the binary 0 output signal on lead 77' continues to represent a binary 0 throughout the first and second phases of the 1-state.

If output lead 165 is provided to represent the 1-state of the circuit, lead 165 delivers a signal representing a binary 0 during the 0-state of operation of the circuit and a signal representing a binary 1 during the 1-state.

LOGICAL SCHEMATIC DIAGRAM

Generally, two or more output signals from flip-flops, one-shots, inverters, and the signals provided by certain switches are combined logically by AND-gates and OR-gates to provide input signals to other flip-flops, one-shots and inverters. Thus, the different input signals to a flip-flop are usually the output signals of respective logical chains of AND-gates and OR-gates, which, in turn, receive output signals provided by other flip-flops and by one-shots, inverters and certain switches. These logical chains may be described and illustrated by logical expressions. A logical expression is actually a logical schematic diagram representing the logical and structural interconnection of a logical chain. Thus, the circuits providing the input signals to a flip-flop may be illustrated by a set of logical schematic diagrams for each flip-flop, as shown in FIG. 69. The flip-flop representations of FIGS. 26, 31, and 69 for example, and the associated logical schematic diagrams to the left of each flip-flop symbol are termed herein "flip-flop input" diagrams.

The one-shot also usually receives its single input signal from a logical chain. Therefore, the logical chain delivering the input signal to a one-shot may also be illustrated by a logical schematic diagram, as shown in FIG. 27. The one-shot representations of FIG. 27, for example, and the associated logical schematic diagrams to the left of each one-shot symbol are termed herein "one-shot input" diagrams.

In a similar manner, the logical circuits providing input signals to inverters may be illustrated by logical schematic diagrams.

The two types of logical schematic diagrams; namely "flip-flop input" diagrams and "one-shot input" diagrams are employed in FIGS. 26–86 to illustrate the internal circuit structure of the components and interconnecting circuit configurations between the components.

Figure 15:
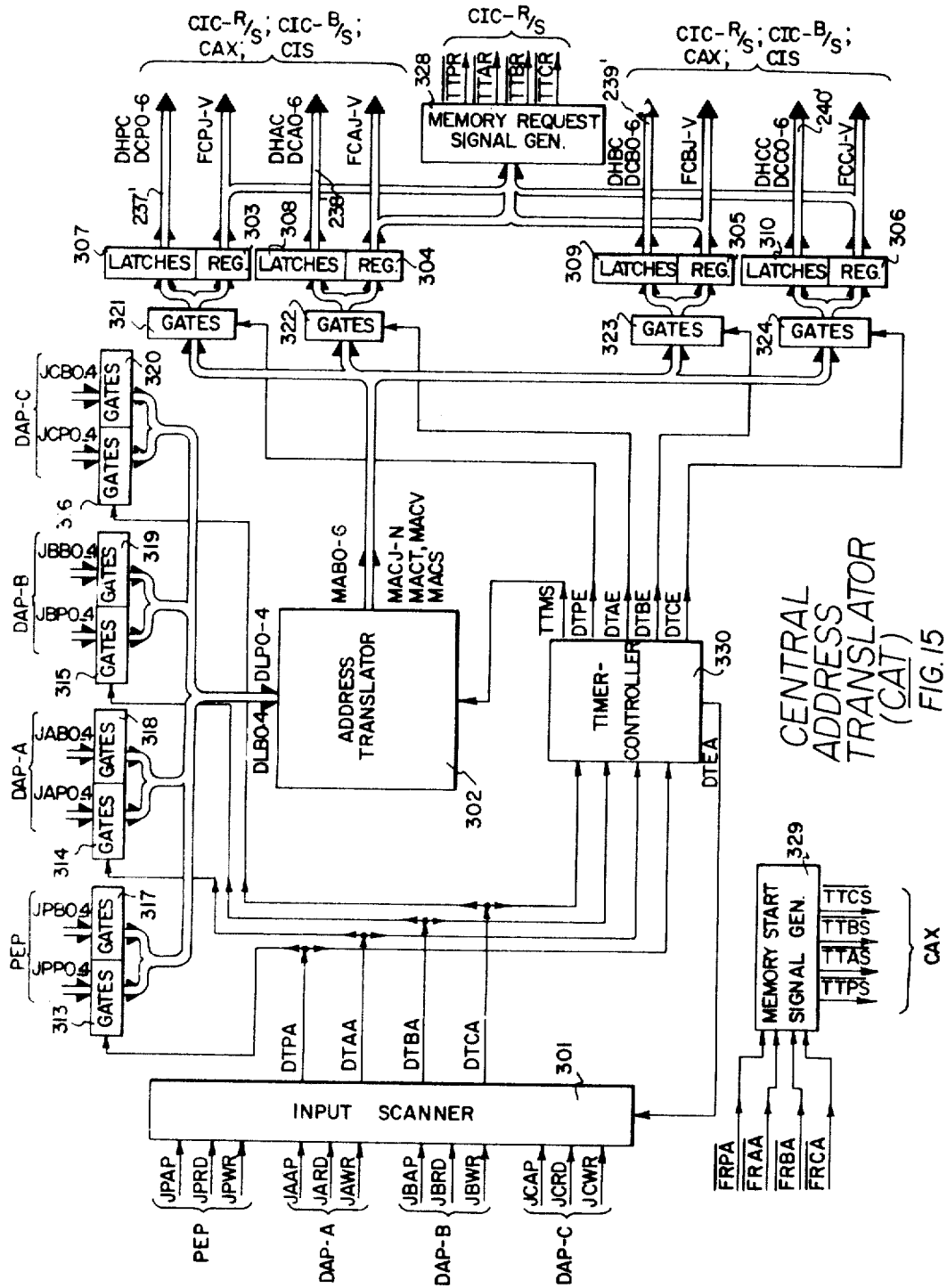
FIGURE 15 is a block diagram of the Central Address Translator (CAT) of the System.

In addition to the two types of logical schematic diagrams described above, a third type of logical schematic diagram termed the "source logical schematic diagram" is employed, for example, in FIG. 38. Certain signals generated within logical chains are provided with designations. Such signals are, therefore, the output signals of a first logical chain and are employed as input signals to one or more additional logical chains. A source logical schematic diagram is a representation of such a first type logical chain. The output signal provided by a logical chain represented by a source logical schematic diagram is not usually applied directly to flip-flops, one-shots, or inverters. For example, the DTPG signal (FIG. 38) represents a request by the PEP for communication with a Memory. The DTPG signal is the output signal of a logical chain which receives an output signal from the FRPA flip-flop, output signals from the DCPC and DTPZ logical chains, and the JPAD, JPRD, and JPWR request signals originating in the PEP. The DTPG signal is applied as an input signal to a plurality of logical chains whose output signals, in turn, are received by other circuit elements of the CAT input scanner (FIGS. 15 and 26).

In the logical circuits illustrated by the following types of logical schematic diagrams, the logical functions of Conjunction are implemented by AND-gates and the logical functions of Inclusive-Or are implemented by OR-gates: (a) flip-flop input diagrams, (b) one-shot input diagrams, (c) inverter input diagrams, (d) source logical schematic diagrams.

The following example demonstrates the significance of the logical schematic diagram and its employment to illustrate the interconnection of flip-flops, one-shots, inverters, and switches by AND-gates and OR-gates. It particularly illustrates that this notation, couched in terms of signal designations in associative and combinatorial arrangements, completely defines the block and schematic circuit element arrangements, once the basic building blocks have been determined, as has been done in the preceding description and in FIGS. 2–5.

Figure 6:
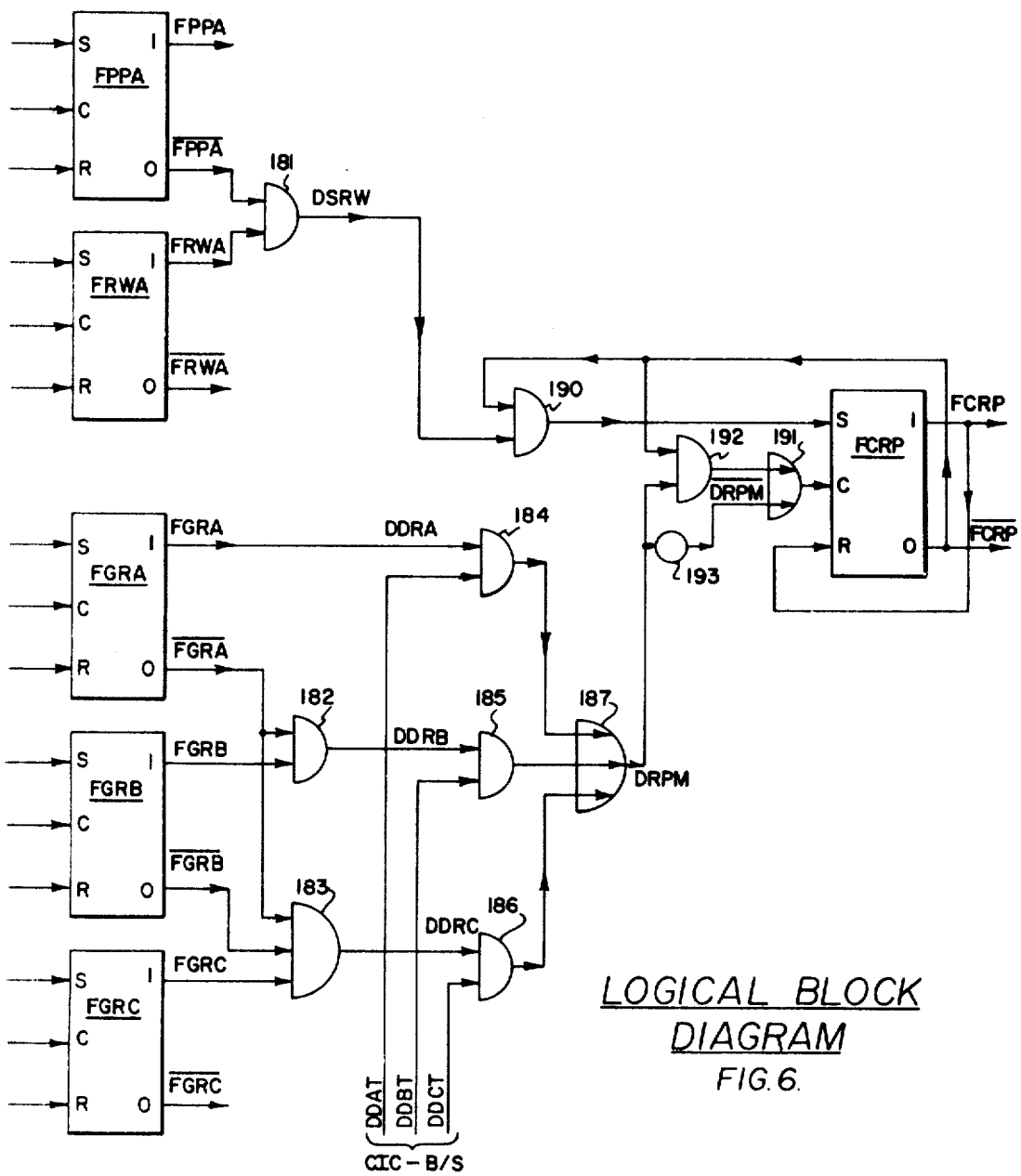
FIGURE 6 is an exemplary logical block diagram employed in the System of FIG. 1;.

FIGURE 6 is a block diagram of the circuits providing the three input signals for the FCRP flip-flop of the CIS. This figure is the block diagram equivalent of the logical schematic diagrams of circuits which provide the FCRP input signals shown in FIG. 69: namely, the DSRW signal, FIG. 80; the DDRA, DDRB, and DDRC signals, FIG. 83; and the DRPM signal, FIG. 83.

The DSRW signal is the output signal of AND-gate 181. AND-gate 181 receives the $\overline{FPPA}$ output signal of the FPPA flip-flop and the FRWA output signal of the FRWA flip-flop. The output signal of the FRWA flip-flop. The output signal of AND-gate 181 is represented by:

$$DSRW = \overline{FPPA} \; FRWA$$

where $\overline{FPPA}$ FRWA represents the logical operation of Conjunction on the two input signals supplied to AND-gate 181, and is also a direct representation of the circuit which generates the DSRW signal. Therefore, the logical schematic diagram $\overline{FPPA}$ FRWA may also be employed to illustrate the logical circuit which generates the DSRW signal.

The DDRA signal is merely a redesignation of the 1-output signal of the FGRA flip-flop, employed for consistency with the DDRB and DDRC signals.

The DDRB signal is the output signal of AND-gate 182. AND-gate 182 receives the $\overline{FGRA}$ output signal of the FGRA flip-flop and the FGRB output signal of the FGRB flip-flop. The output signal of AND-gate 182 is represented by:

$$DDRB = \overline{FGRA} \; FGRB$$

The DDRC signal is the output signal of AND-gate 183. AND-gate 183 receives the $\overline{FGRA}$ signal, the $\overline{FGRB}$ output signal of the FGRB flip-flop, and the FGRC output signal of the FGRC flip-flop. The output signal of AND-gate 183 is represented by:

$$DDRC = \overline{FGRA} \; \overline{FGRB} \; FGRC$$

The DRPM signal is generated by the logical circuit comprising AND-gates 184, 185, 186, and OR-gates 187. AND-gate 184 receives the DDRA signal and the DDAT signal, which is provided by another logical chain, FIG. 59. The output signal of AND-gate 184 is represented by:

$$DDRA \; DDAT$$

AND-gate 185 receives the DDRB signal and the DDBT signal, which is provided by another logical chain, FIG. 59. The output signal of AND-gate 185 is represented by:

$$DDRB \; DDBT$$

AND-gate 186 receives the DDRC signal and the DDCT signal, which is provided by another logical chain, FIG. 59. The output signal of AND-gate 186 is represented by:

$$DDRC-DDCT$$

The output signals of AND-gates 184, 185 and 186 are applied to OR-gate 187. The output signal of OR-gate 187 is represented by:

$$DRPM = DDRA \; DDAT + DDRB \; DDBT + DDRC \; DDCT$$

Therefore, the above logical schematic diagram illustrates the logical circuit which generates the DRPM signal.

The 1-input signal for setting the FCRP flip-flop is designated as the S-CRP signal. This signal is the output signal of AND-gate 190. AND-gate 190 receives the $\overline{FCRP}$ output signal of the FCRP flip-flop and the DSRW signal. The output signal of AND-gate 190 is represented by:

$$S\text{-}CRP = \overline{FCRP} \; DSRW$$

The 0-input signal for resetting the FCRP flip-flop is designated as the R-CRP signal. This signal is provided directly from the 1-output lead of the FCRP flip-flop. Therefore, the 0-input signal for the FCRP flip-flop is represented by:

$$R\text{-}CRP = FCRP$$

The clock signal supplied to the FCRP to the flip-flop is designated as the C-CRP signal. This signal is the output signal of an OR-gate 191. OR-gate 191 receives the output signals of an AND-gate 192 and an inverter 193. AND-gate 192 receives the $\overline{FCRP}$ signal and the DRPM signal. The output signal of AND-gate 192 is represented by:

$$\overline{FCRP} \; DRPM$$

Inverter 193 receives the DRPM signal; therefore, its output is designated as $\overline{DPRM}$. Accordingly, the output signal of OR-gate 191 is represented by:

$$C\text{-}CRP = \overline{FCRP} \; DRPM + \overline{DRPM}$$

The preceding example demonstrates how the logical schematic diagrams of FIGS. 26–86 provide simple, compact and readily analyzed and related illustrations of the circuit structures of the components and of the circuit interconnection configurations between components. This has been done by using signal designations in associations and combinations serving not only to identify the signal relationships, but also to define the circuit elements and their circuit relationships.

GLOSSARY AND INDEX OF SIGNALS

The signals provided by the system circuit elements are listed below. The portion of the description which describes and illustrates the respective source circuit element for each of these signals is also identified.

For example, the notation:

A*i*AR: Log, CCX; FIG. 14 indicates that the A*i*AR signal where *i* represents J, K, L, M, N, T, or V) is a logical combination signal of the Central Control Exchange, and that its source logical schematic diagram is illustrated in FIG. 14.

The notation:

FKCL: FF, CIC-B/S; FIG. 57 indicates that FKCL signal is the 1-output signal of the FKCL flip-flop of the Central Interlace Controller, Bus Scheduler. The source flip-flop is illustrated in FIG. 57.

The notation:

DHR*n* (0–3): Log, CIS; FIG. 84 identifies four signals originating in the Central Interrupt Scheduler, the symbol *n* having the respective values 0, 1, 2, 3; i.e., DHR*n* represents the four specific signals DHR0, DHR1, DHR2, and DHR3.

The notation:

FPmm (1–3) (1–4): FF, CIS; FIGS. 70, 71, 72 identifies twelve signals, the symbol *m* having the respective values 1, 2, 3; and for each of these values of *m*, the symbol *n* having the values 1, 2, 3, 4. Thus, *mn* assumes the values 11, 12, 13, 14, 21, 22 23, 24, 31, 32, 33, and 34.

Figure 13A:
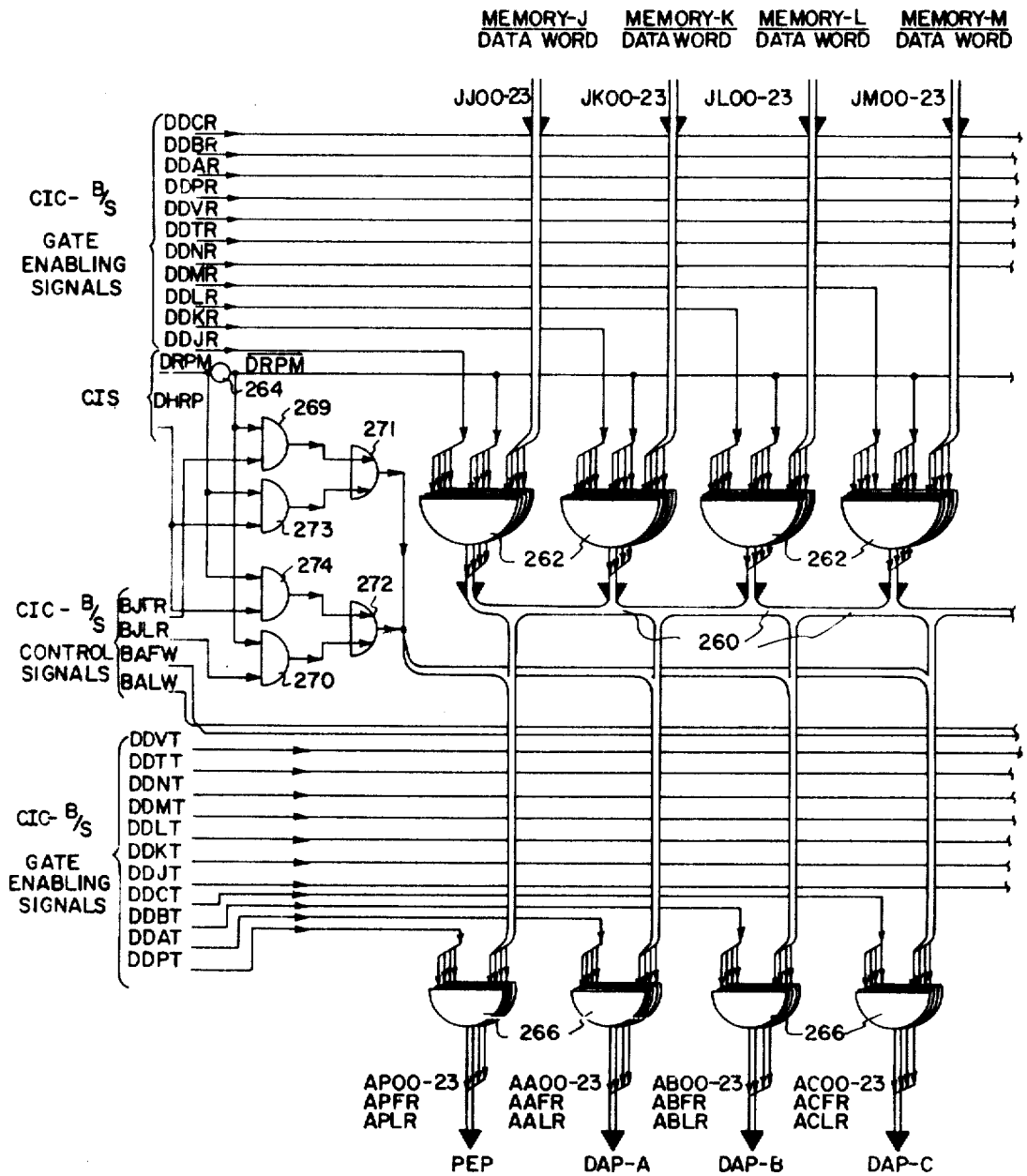
FIGURES 13a and 13b are block diagrams of the Central Data Exchange of the System.
Figure 13B:
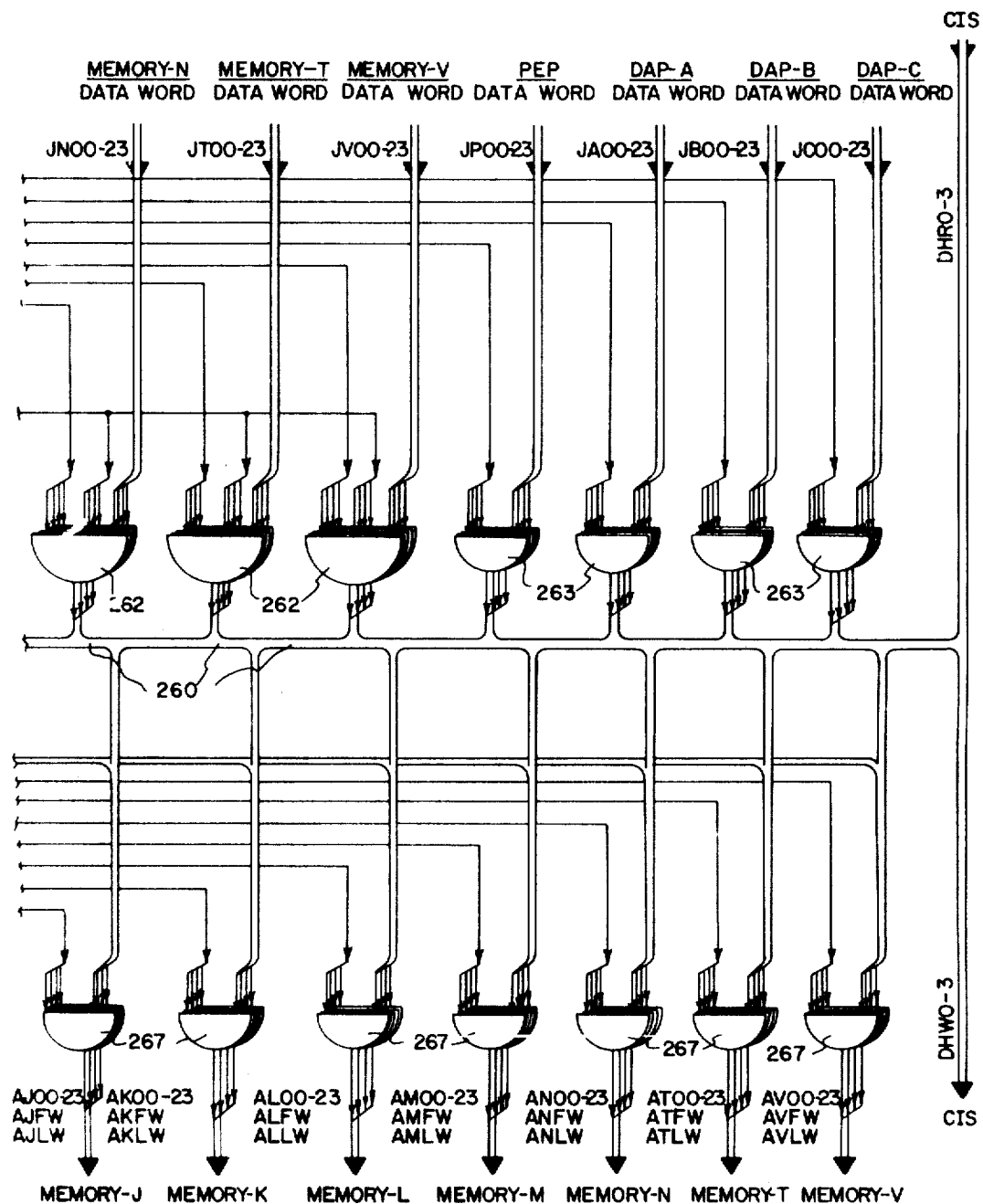

The glossary following employs the abbreviations and notations:

FF: Flip-flop
OS: One-shot
Log: Logical element
Sw: Switch
Proc: Processor
Processor-*i*: (*i* = P, A, B, C)
PEP: Peripheral Processor (Processor-P)
DAP: Data Processor (Processor-A, B, or C)
DAP-*i*: (*i* = A, B, C)
Mem: Memory
Memory-*j*: (*j* = J, K, L, M, N, T, V)
CAT: Central Address Translator
CIC-R/S: Central Interlace Controller, Request Scanner
CIC-B/S: Central Interlace Controller, Bus Scheduler
CAX: Central Address Exchange
CCX: Central Control Exchange
CDX: Central Data Exchange
CIS: Central Interrupt Scheduler
Sw Pan: Switch Panel A*i*00–A*i*23: Log, CDX; FIG. 13. The 24 signals representing a Data Word supplied by the assigned Memory or the CIS, the signals being transmitted to Processor-*i*.

A*i*AR: Log, CCX; FIG. 14. A pulse denoting the receipt by the assigned Memory of the address supplied by Processor-*i*, the pulse being transmitted to Processor-*i*.

A*i*FP: Log, CCX; FIG. 14. A pulse denoting the receipt and storage by the assigned Memory of a First Data Word supplied by Processor-*i*, the pulse being transmitted to Processor-*i*.

A*i*FR: Log, CDX; FIG. 13. A signal denoting the presence on the assigned Memory output data lines of a First Data Word during a Read-Restore cycle, the signal being transmitted to Processor-*i*.

A*i*LP: Log, CCX; FIG. 14. A pulse denoting the receipt and storage by the assigned Memory of a Last Data Word supplied by Processor-*i*, the pulse being transmitted to Processor-*i*.

A*i*LR: Log, CDX; FIG. 13. A signal denoting the presence on the asrigned Memory output data lines of a Last Data Word during a Read-Restore cycle, the signal being transmitted to Processor-*i*.

A*j*00–A*j*23: Log, CDX; FIG. 13. The 24 signals representing a Data Word supplied by the directing Processor, the signals being transmitted to Memory-*j*.

Figure 11A:
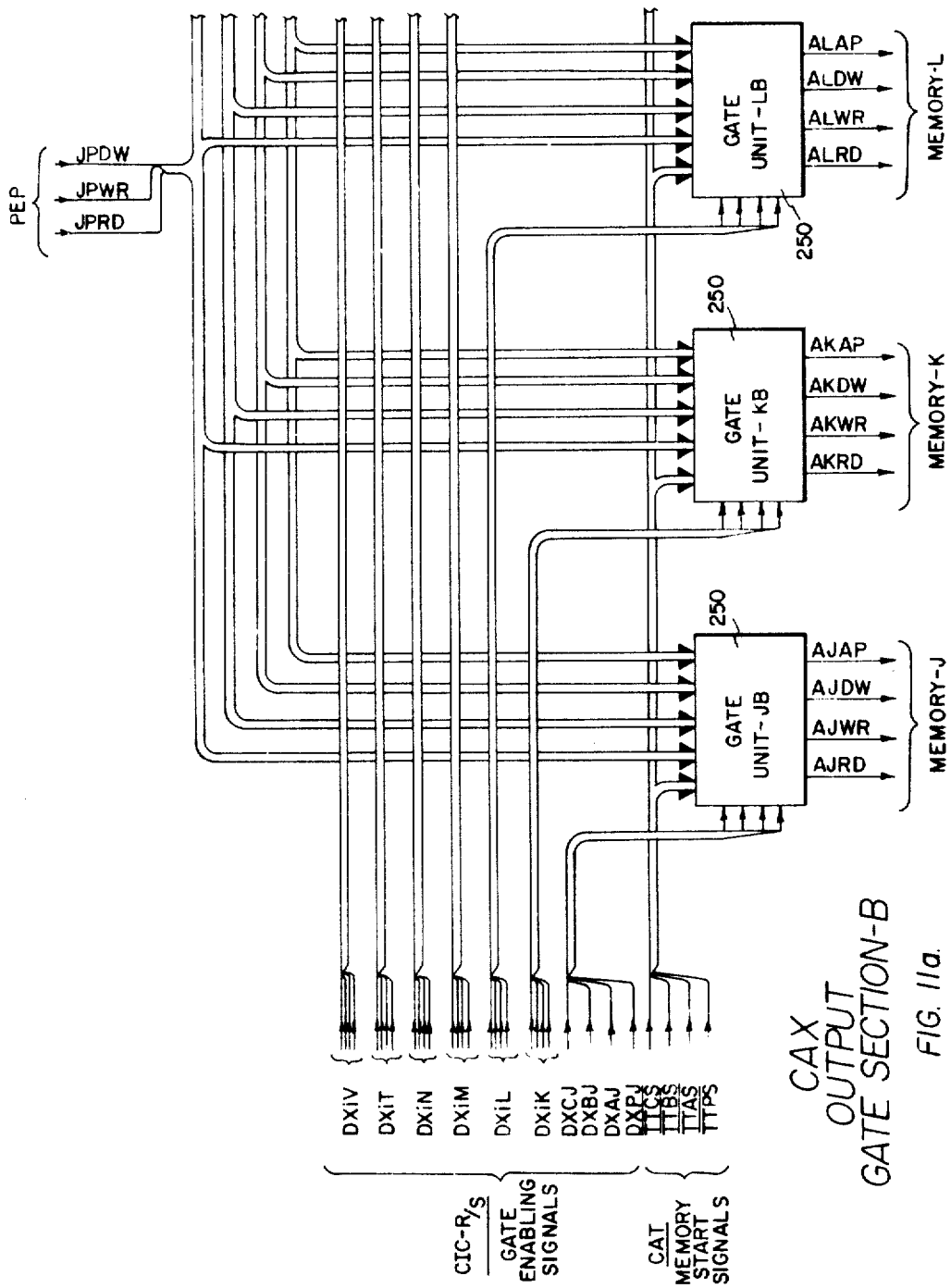
FIGURES 11a and 11b are block diagrams of the Output Gate Section B of the CAX.
Figure 11B:
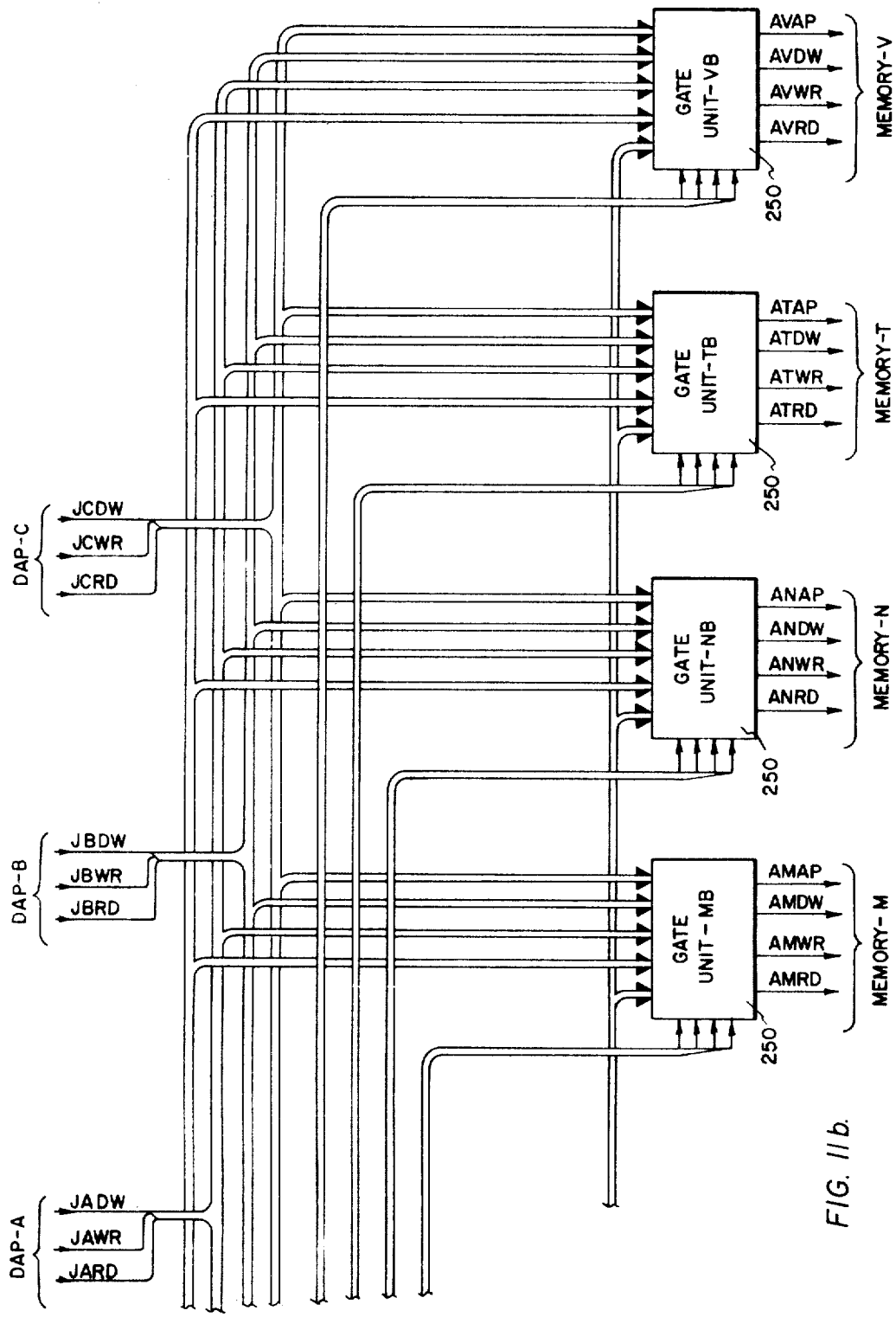
Figure 12:
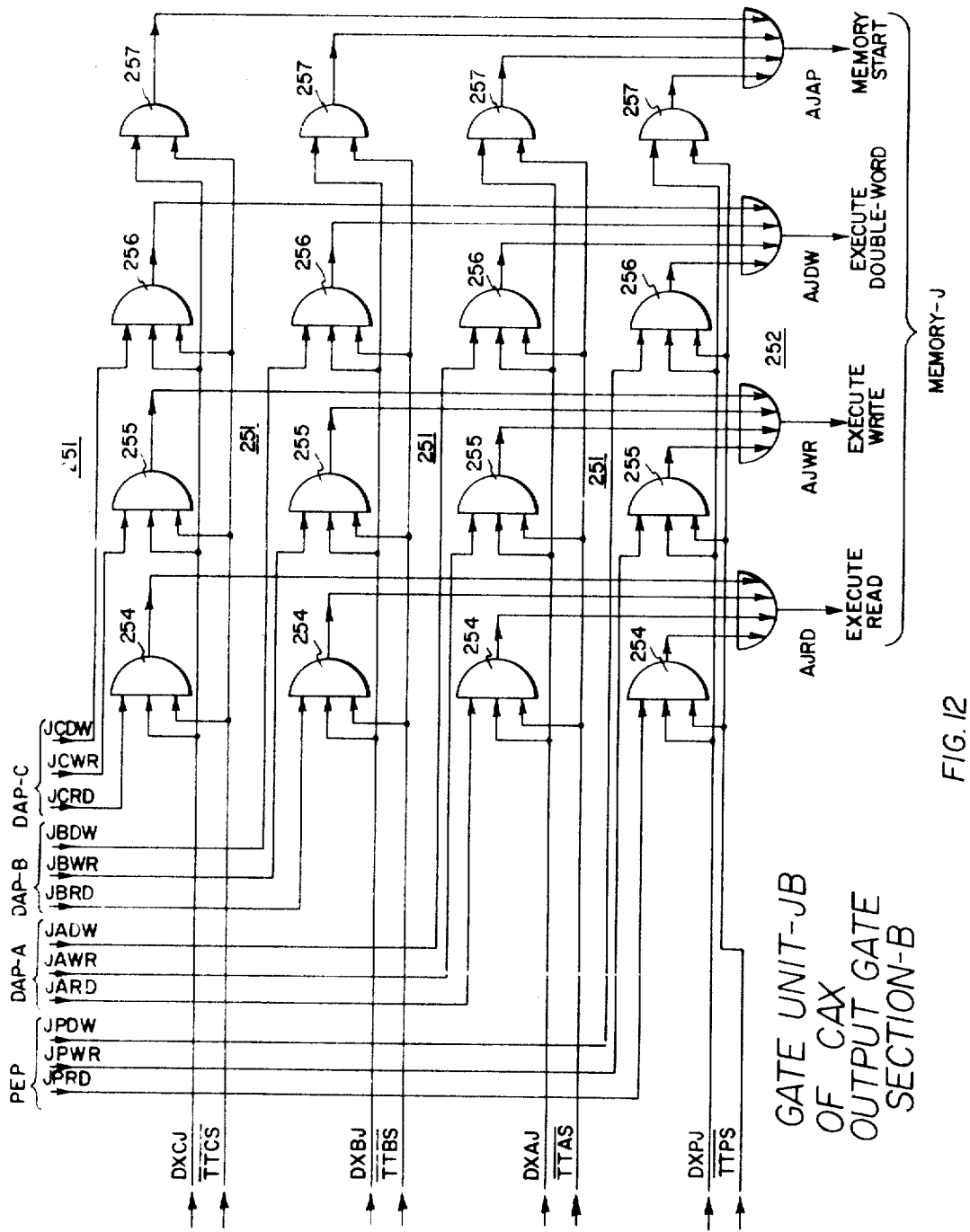
FIGURE 12 is a logical block diagram of one of the gate units of Output Gate Section B of FIG. 11.

A*j*AP: Log, CAX; FIGS 11, 12. A signal transmitted to Memory-*j* for initiating the start of a memory cycle.

Figure 10A:
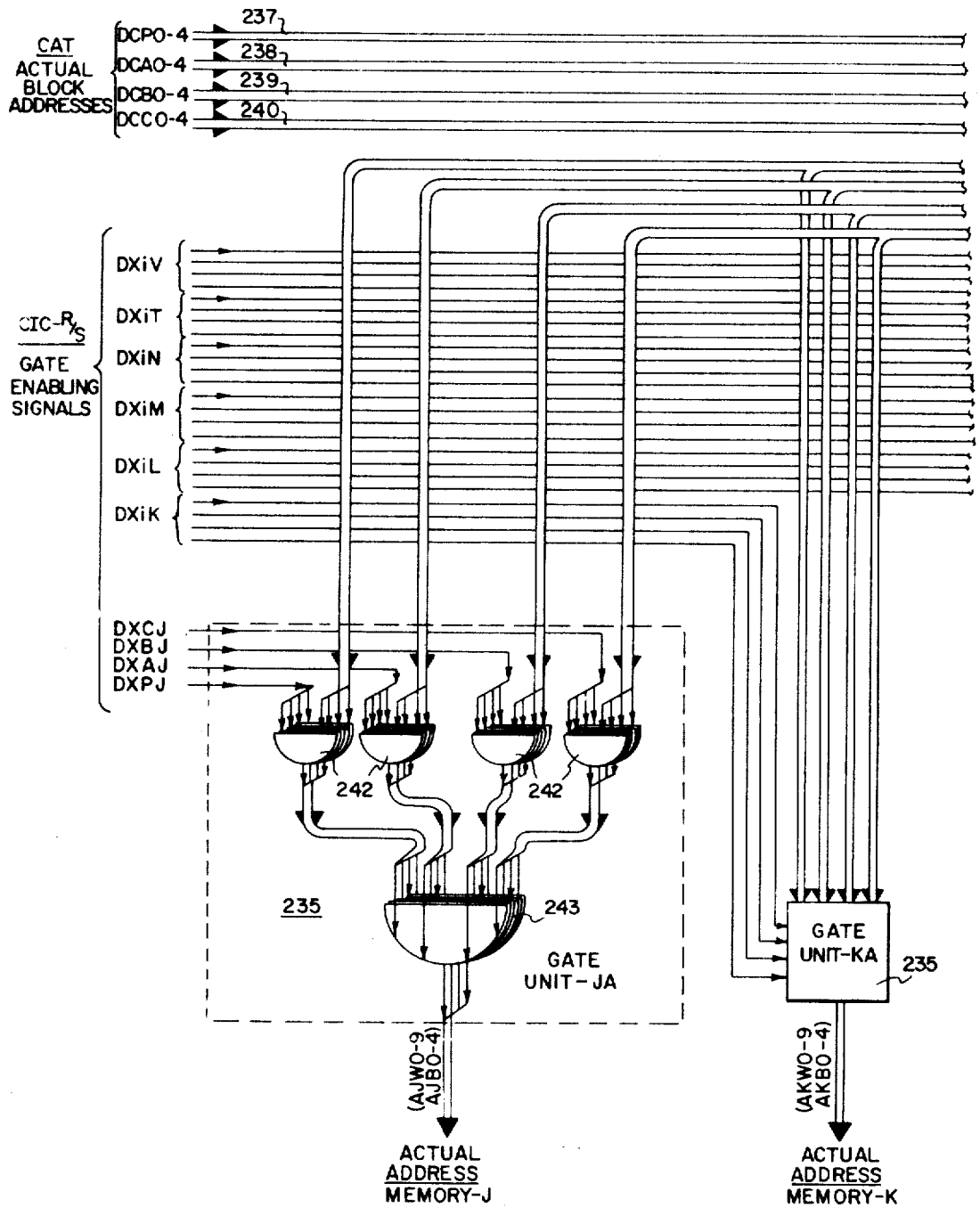
FIGURES 10a and 10b are block diagrams of the Output Gate Section A of the CAX.
Figure 10:
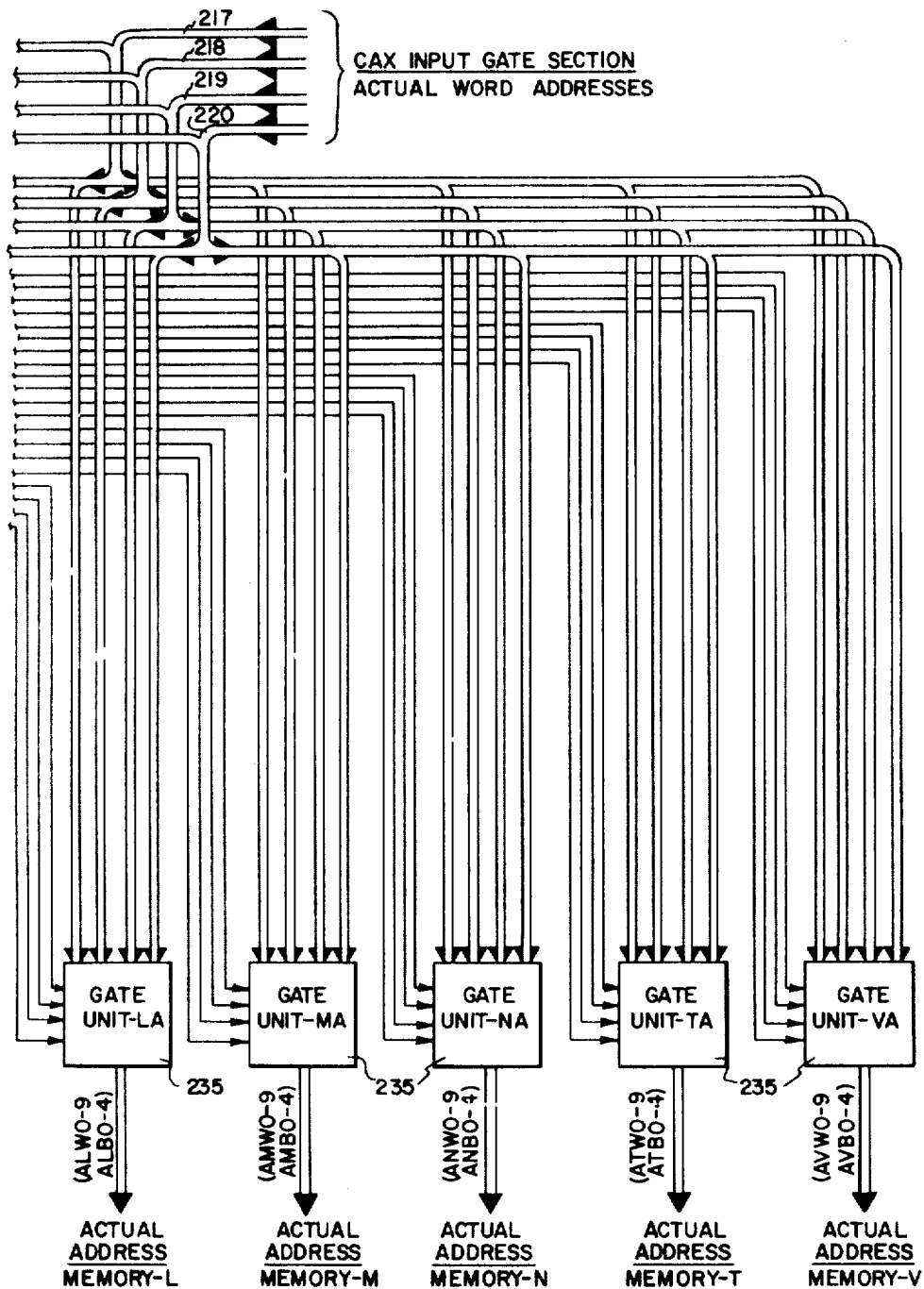

A*j*B0–A*j*B4: Log, CAX; FIG. 10. The five signals representing an Actual Block Address supplied by the CAT, the signals being transmitted to Memory-*j*.

A*j*DW: Log, CAX; FIGS. 11, 12. A signal transmitted to Memory-*j* for controlling the cycle being executed to be a double-word memory cycle.

A*j*FA: Log, CIC-B/S; FIG. 61. A pulse denoting the receipt by the requesting Processor of a First Data Word supplied by Memory-*j* during a Read-Restore cycle, the pulse being transmitted to Memory-*j*.

A*j*FW: Log, CDX; FIG.13. A signal accompanying and identifying a First Data Word transmitted to Memory-*j*.

A*j*LA: Log, CIC-B/S; Fig. 61. A pulse denoting the receipt by the requesting Processor of a Last Data Word supplied by Memory-*j* during a Read-Restore cycle, the pulse being transmitted to Memory-*j*.

A*j*LW: Log, CDX; FIG. 13. A signal accompanying and identifying a Last Data Word transmitted to Memory-*j*.

A*j*RD: Log, CAX; FIGS. 11, 12. A signal transmitted to Memory-*j* for controlling the cycle being executed to be a Read-Restore cycle.

A*j*W0–A*j*W9: Log, CAX; FIG. 10. The 10 signals representing an Actual Word Address supplied by the directing Processor or the CIS, the signals being transmitted to Memory-*j*.

A*j*WR: Log, CAX; FIGS. 11, 12. A signal transmitted to Memory-*j* for controlling the cycle being executed to be a Clear-Write cycle.

BAFW: Log, CIC-B/S; FIG. 58. A signal denoting a request by a Processor for the assigned Memory to store a First Data Word, the signal being transmitted to the CDX for retransmission to the Memory when the initiating Processor is granted access to the Data Bus.

BALW: Log, CIC-B/S; FIG. 58. A signal denoting a request by a Processor for the assigned Memory to store a Last Data Word, the signal being transmitted to the CDX for retransmission to the Memory when the initiating Processor is granted access to the Data Bus.

B/FP: Log, CIC-B/S; FIG. 62. A pulse denoting the receipt and storage by Memory-*j* of a First Data Word supplied by the initiating Processor, the pulse being transmitted to the CCX for retransmission to the requesting Processor.

BJFR: Log, CIC-B/S; FIG. 58. A signal denoting the presence on the assigned Memory output data lines of a First Data Word during a Read-Restore cycle, the signal being transmitted to the CDX for retransmission to the requesting Processor.

B/LP: Log, CIC-B/S; FIG. 62. A pulse denoting the receipt and storage by Memory-*j* of a Last Data Word supplied by the initiating Processor, the pulse being transmitted to the CCX for retransmission to the requesting Processor.

BJLR: Log, CIC-B/S; FIG. 58. A signal denoting the presence on the assigned Memory output data lines of a Last Data Word during a Read-Restore cycle, the signal being transmitted to the CDX for retransmission to the Processor.

DAB1: Log, CIS; FIG. 80. A signal denoting that a DAP has initiated a Self-Interrupt request when a previous Self-Interrupt request remains queued in the CIS, not yet having been answered. However, this signal issues only if no lower priority DAP is making, at the same time, a CIS request, the signal functioning to reset the CIS Sequencer.

DAB2: Log, CIS; FIG. 80. A signal denoting that a DAP has initiated a Self-Interrupt request when a previous Self-Interrupt request remains queued in the CIS, not yet having been answered. However, this signal issues only if a lower priority DAP is making, at the same time, a CIS request, the signal functioning to reset the CIS Request Register flip-flop corresponding to the DAP making the Self-Interrupt request.

DAD*i* (A–C): Log, CIS; FIG. 81. A signal denoting that DAP-*i* has been selected by the CIS for a Self-Interrupt or a Request-Interrupt operation, the signal being transmitted to DAP-*i*.

DADS: Log, CIS; FIG. 80. A signal denoting that the CIS has accepted the request of a Processor for executing a Translate Mode operation.

Figure 8:
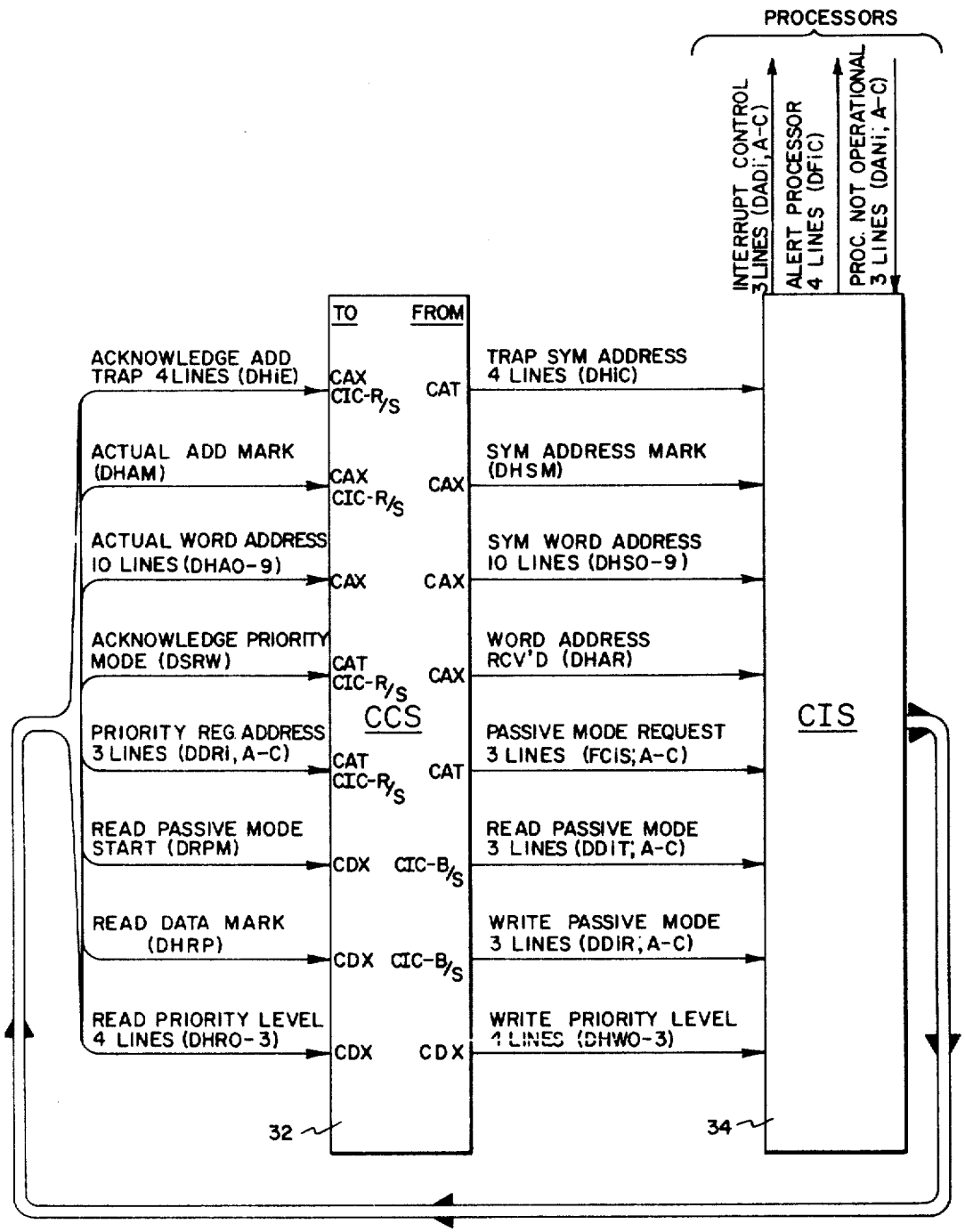
FIGURE 8 is a block diagram illustrating the control signal and data transfer interconnections between the Central Interrupt Scheduler (CIS) and the remainder of the System.

DAN*i* (A–C): Log, DAP; FIG. 8. A signal denoting that DAP-*i* is not fully operational, the signal being transmitted to the CIS. This signal prevents the CIS from selecting DAP-*i* for an interrupt operation.

DBPR: Log, CIS; FIG. 80. A signal denoting the receipt by the CIS of a Processor request for a Translate Mode or Passive Mode operation. This signal initiates a timing cycle of the CIS Sequencer.

DC21: Log, CIS; FIG. 85. A signal denoting that PL Register-B is currently storing a higher program priority number than PL Register-A; i.e., that DAP-B is executing a program of higher priority than DAP-A.

DC31: Log, CIS; FIG. 85. A signal denoting that PL Register-C is currently storing a higher program priority number than PL Register-A; i.e., that DAP-C is executing a program of higher priority than DAP-A.

DC32: Log, CIS; FIG. 85. A signal denoting that PL Register-C is currently storing a higher program priority number than PL Register-B; i.e., that DAP-C is executing a program of higher priority than DAP-B.

DC*i*0–DC*i*4, DC*i*6: Log, CAT; FIGS. 40, 41. The five signals representing an Actual Block Address is the assigned Memory for the initiating Processor-*i* to communicate with such Memory and a signal representing additional microcontrol information, as required by Processor-*i*. These signals are delivered by the CAT Output Latches to the CAX.

DCAA: Log, CIS; FIG. 81. A signal for controlling the CIS in its Translate Mode to generate a signal altering for communication the Processor designated by the Symbolic Word Address. This signal is delivered by the CIS Symbolic Word Address Decoder.

DC*i*C: Log, CAT; FIG. 41. A signal denoting that the CAT Output Register for Processor-*i* has a flip-flop set. This flip-flop represents the Memory assigned to Processor-*i* by the CAT.

DCAM: Log, CIS; FIG. 81. A signal for controlling the CIS in its Translate Mode to generate the Actual Word Address of the Mailbox of the Processor initiating the Translate Mode operation. This signal is delivered by the CIS Symbolic Word Address Decoder.

DCAN: Log, CIS; FIG. 81. A signal for controlling the CIS in its Translate Mode to initiate a Request-Interrupt operation for the DAP executing the lowest priority program or a Self-Interrupt operation for the DAP initiating the Translate Mode operation. This signal is delivered by the CIS Symbolic Word Address Decoder.

DCDC: Log, CIS; FIG. 81. A signal denoting the completion of the decoding of the Symbolic Word Address received by the CIS and the generation of a corresponding control signal by the Symbolic Word Address Decoder.

DCST: Log, CIS; FIG. 81. A signal for controlling the CIS in its Translate Mode to generate an Actual Word Address for the Status Table memory region reserved for the DAP initiating the operation. This Actual Word Address corresponds to the priority level of the program which the DAP is executing. This signal is delivered by the CIS Symbolic Word Address Decoder.

DCT0: Log, CIS; FIG. 81. A signal for enabling the CIS to generate a further signal which, in turn, controls the retransmission of the Symbolic Word Address supplied as the output Actual Word Address, translation being inhibited. The DCT0 signal is generated in the CIS Symbolic Word Address Decoder.

DCTA: Log, CIS; FIG. 81. A signal for inhibiting translation by the CIS in its Translate Mode, whereby the CIS delivers an Actual Word Address which is the same as the Symbolic Word Address received. This signal is delivered by the CIS Symbolic Word Address Decoder.

DCTM: Log, CIS; FIG. 81. A signal for setting a flip-flop in the CIS Transfer Control Register corresponding to the DAP initiating the operation. During the next-following CIS Translate Mode operation initiated by this DAP, the Actual Word Address delivered by the CIS will be the same as the Symbolic Word Address supplied by the DAP. This signal is delivered by the CIS Symbolic Word Address Decoder.

DCTV: Log, CIS; FIG. 81. A signal for controlling the CIS in its Translate Mode to generate an Actual Word Address for the Transfer Vector memory region reserved for the DAP initiating the operation. This Actual Word Address corresponds to the priority level of the program which the DAP is executing. This signal is delivered by the CIS Symbolic Word Address Decoder.

DSXR: Log, CIS; FIG. 81. A signal for controlling the CIS in its Translate Mode to generate the Actual Word Address of the Index Register designated by the Symbolic Word Address for the priority level of the program which the initiating DAP is executing. This signal is delivered by the CIS Symbolic Word Address Decoder.

DD*i*R: Log, CIC-B/S; FIG. 60. A signal for enabling a set of CDX input gates for transferring to the Data Bus a Data Word supplied by Processor-*i*.

DD*i*T: Log, CIC-B/S; FIG. 59. A signal for enabling a set of CDX output gates for transferring a Data Word from the Data Bus to Processor-*i*.

DDDC: Log, CIS; FIG. 86. A signal for controlling insertion of a Definer count into the Actual Word Address generated by the CIS in its Translate Mode. The Definer count inserted corresponds to the priority level designated during a Request-Interrupt request, provided priority level 8, 9, or 10 is designated.

DD$j$R: Log, CIC-B/S; FIG. 59. A signal for enabling a set of CDX input gates for transferring to the Data Bus a Data Word supplied by Memory-$j$.

DD$j$T: Log, CIC-B/S; FIG. 60. A signal for enabling a set of CDX output for transferring a Data Word from the Data Bus to Memory-$j$.

DDL$n$ (1–5): Log, CIS; FIG. 86. The five signals representing the count of the Definer Counter corresponding to the priority level operation controlled by the CIS in a Request-Interrupt Translate Mode when one of the priority levels 8, 9, or 10 is specified by the Symbolic Word Address. These signals provide a portion of the Actual Word Address supplied by the CIS during the operation.

DDR$i$ (A–C): Log, CIS; FIG. 83. A signal denoting that DAP-$i$ has been granted priority for communication with the PL Table of the CIS during the next-occurring CIS Passive Mode operation.

DF$i$C: Log, CIS; FIG. 82. A signal transmitted to and alerting Processor-$i$ for a subsequent communication with the Processor initiating this signal. The signal is generated by the CIS during a Translate Mode operation in which the Symbolic Word Address identifies the Processor to be alerted.

DGDC: Log, CIS; FIG. 82. A signal for controlling the Actual Word Address Encoder of the CIS in the Translate Mode to generate the address of a dummy Memory cell when the Translate Mode operation is one of the following:
  (a) An operation to initiate a Self-Interrupt operation to priority level 4–7, 14 or 15 or a Request-Interrupt operation to priority level 5, 7, or 11–13;
  (b) An operation to provide a signal for alerting a Processor for a subsequent communication with the initiating Processor; or
  (c) An operation for setting one of the flip-flops of the Transfer Control Register.

DHA$n$ (0–9): Log, CIS; FIG. 82. The 10 signals representing an Actual Word Address generated by the Actual Word Address Encoder of the CIS, the signals being transmitted to the CAX for retransmission to the Memory assigned to the initiating Processor.

DH$i$C: Log, CAT; FIGS. 40, 41.—A signal denoting a request by Processor-$i$ for the CIS to execute a Translate Mode operation. The signal is delivered by the CAT Output Latches to the CIS.

DH$i$E: Log, CIS; FIG. 80. A signal denoting that the CIS is ready to initiate a Translate Mode operation for the initiating Processor-$i$. This signal is transmitted to the CAX and the CIC-R/S.

DHAM: Log, CIS; FIG. 81. A signal denoting the presence on CIS output lines of an Actual Word Address during a Translate Mode of the CIS. This signal is transmitted to the CAX and the CIC-R/S.

Figure 9A:
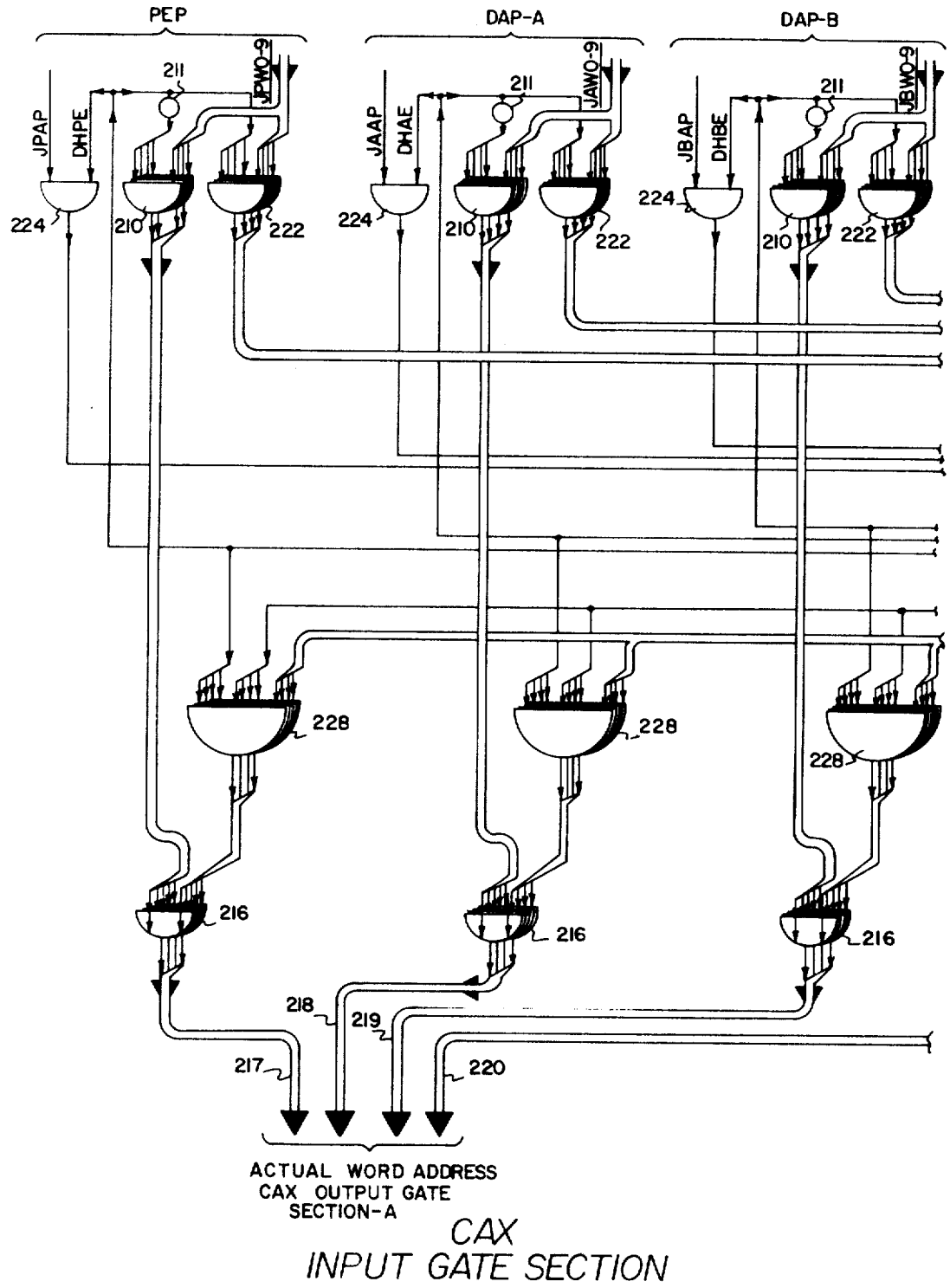
FIGURES 9a and 9b are block diagrams of the Input Gate Section of the Central Address Exchange (CAX) of the System.
Figure 9B:
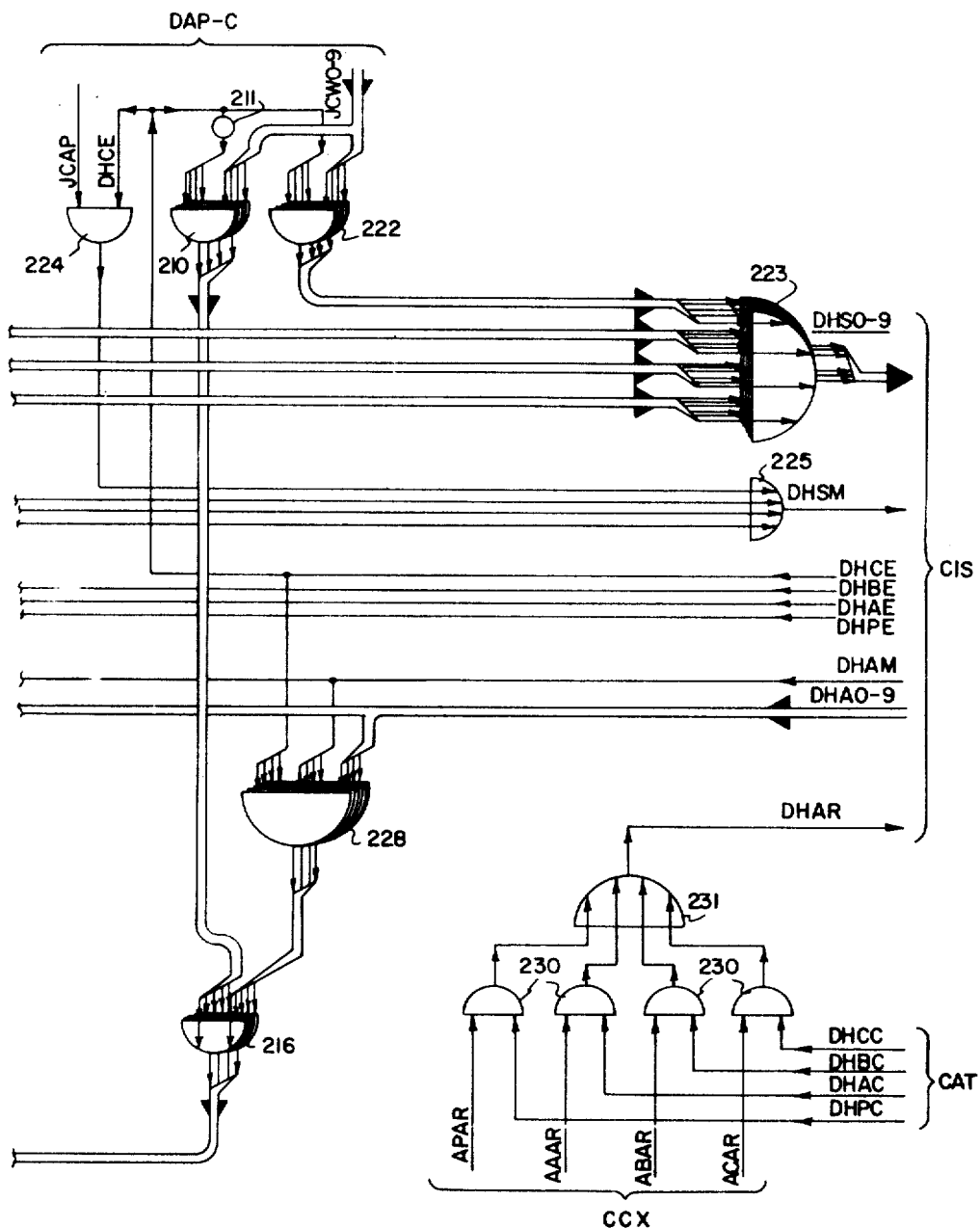

DHAR: Log, CAX; FIG. 9. A pulse denoting the receipt by a Memory of an Actual Word Address supplied by the CIS, the pulse being transmitted to the CIS.

DHQ$k$ (A–D): Log, CIS; FIG. 85. The four signals representing the value of the highest priority level stored in the Queued PL Register.

DHR$n$ (0–3): Log, CIS; FIG. 84. The four signals representing the value of the priority level stored in a register of the PL Table selected during a Passive Mode read operation of the CIS, the signals being transmitted to the CDX.

DHRP: Log, CIS; FIG. 81. A signal denoting the presence on CIS output lines of the DHR$n$ signals representing the value of a priority level in the PL Table during a Passive Mode read operation. The DHRP signal is transmitted to the CDX.

DHS$n$ (0–9): Log, CAX; FIG. 9. The 10 signals representing a Symbolic Word Address supplied by a Processor when the Processor is requesting the CIS to execute a Translate Mode operation, the signals being transmitted to the CIS.

DHSM: Log, CAX; FIG. 9. A signal denoting the presence on CIS input lines of a Symbolic Word Address. The DHSM signal is transmitted to the CIS.

DHW$n$ (0–3): Log, CDX; FIG. 13. The four signals representing the value of a priority level supplied by a Processor when the Processor is requesting the CIS to execute a Passive Mode write operation, the signals being transmitted to the CIS.

DKEN: Log, CIC-B/S; FIG. 58. A signal denoting the enabling of a set of CDX input and output gates to provide for the transfer of a Data Word between a Processor and a Memory.

DK$j$R: Log, CIC-B/S; FIG. 58. A signal representing a request by a Processor for the assignment of the Data Bus to the Processor for communication with assigned Memory-$j$; the signal issuing when:
  (a) The Processor has a Data Word ready to transmit to assigned Memory-$j$ or Memory-$j$ has a Data Word ready to transmit to the Processor, and
  (b) When the Processor has actually been granted communication with Memory-$j$ by the Processor Access Granting Register of the CIC-R/S.

The DK$j$R signal controls the setting of the flip-flop corresponding to Memory-$j$ in the Data Bus Request Register of the CIC-B/S.

DLB$n$ (0–4): Log, CAT; FIG. 39. The five signals representing the Symbolic Block Address supplied by the Processor currently having an Address Translation operation performed by the CAT, the signals being transmitted to the Address Translator of the CAT.

DLC$k$ (A–D): Log, CIS; FIG. 85. The four signals representing the value of the lowest priority level stored in the PL Table and, therefore, representing the lowest priority level program which a DAP is currently executing.

DLP$n$ (0–4): Log, CAT; FIG. 39. The five signals representing the Program Number of the program being executed by the Processor currently having an Address Translation operation performed by the CAT, the signals being transmitted to the Address Translator of the CAT.

DLRA: Log, CIS; FIG. 83. A signal denoting the initiation of a Passive Mode read operation of the CIS by a DAP in response to a preceding CIS output signal notifying the DAP that it had been selected for a Request-Interrupt operation. The DLRA signal participates in controlling the CIS during the Passive Mode read operation.

DLSA: Log, CIS; FIG. 83. A signal denoting the initiation of a Passive Mode read operation of the CIS by a DAP in response to a preceding CIS output signal notifying the DAP that it had been selected for a Self-Interrupt operation. The DLSA signal participates in controlling the CIS during the Passive Mode read operation.

DMPR: Log, CIS; FIG. 81. A signal denoting the request by two or more DAPs for the CIS to execute a Translate Mode operation and that these requests are queued in the CIS Request Register.

DP$mn$ (08, 09, 10): Log, CIS; FIG. 86. Signals denoting the execution by a DAP of a program assigned a respective one of the priority levels 8, 9, and 10. Each signal prevents the CIS from selecting another DAP for a Request-Interrupt operation at the corresponding priority level.

DPL$n$ (4, 8): Log, CIS; FIG. 82. A pair of signals participating in controlling the CIS Actual Word Address Encoder to generate an Actual Word Address identifying the appropriate Status Table or Transfer Vector memory location during a corresponding Translate Mode of the CIS.

DPL$k$ (A–D): Log, CIS; FIG. 84. The four signals representing the value of the priority level to be entered into a register of the PL Table of the CIS during a Passive Mode operation. The priority level represented is supplied by a Processor, the Self-Interrupt PL Register of the CIS, or the Highest Queued PL Encoder of the CIS.

DPW$i$ (A–C): Log, CIS; FIG. 83. A signal controlling entry of a priority level value into the PL Table register corresponding to DAP-$i$ during a Passive Mode write operation initiated by DAP-$i$, wherein the value of the priority level is supplied by DAP-$i$.

DQRH: Log, CIS; FIG. 85. A signal denoting that the highest queued priority level in the Queued PL Register is greater than the lowest priority level program which a DAP is executing. The signal is delivered by the HQL V LPL Comparator of the CIS. The issuance of this signal initiates the selection by the CIS of a DAP for a Request-Interrupt operation.

DR$i_1 i_2$: Log, CIC-R/S; FIG. 49. A signal denoting the assignment by the CAT of the same Memory to both Processor-$i_1$ and Processor-$i_2$ for communication. These signals control the allocation of a Memory assigned to two or more Processors to the Processor having highest positional priority.

DR$i$R (A–C): Log, CIC-R/S; FIG. 49. A signal denoting a request by DAP-$i$ for communication with a Memory The issuance of this signal depends on whether the assigned Memory is within the reserved Scope of the PEP, whether the PEP is operating in a Service Mode, and the portion of the Time Balancing Cycle during which the request is made. The signal controls the setting of the flip-flop corresponding to DAP-$i$ in the Processor Access Request Register of the CIC-R/S.

DRC0: Log, CIC-R/S; FIG. 51. A signal for controlling the timing of the CIC–R/S. This signal issues at the end of CIC-R/S operational State-1 when all Processor requests for communication with a Memory have been queued by:
(a) The setting of the corresponding Processor-identifying flip-flop in the Processor Access Request Register, and
(b) The setting of all flip-flops in the Memory Assign-flip-flop in the Memory Request Register. The signal then controls the Timer of the CIC-R/S to transfer to State-0 wherein the queued requests are granted.

DRC1: Log, CIC-R/S; FIG. 51. A signal for controlling the timing of the CIC-R/S. This signal issues at the end of CIC-R/S operational State-0 when the Processor memory requests queued in the Processor Access Request Register have been granted by:
(a) The setting of the corresponding flip-flops in the Processor Access Granting Register, and
(b) the setting of all flip-flops in the Memory Assignment Register which correspond to those memories requested in the Memory Request Register.

However, if two or more Processors having requests queued in the Processor Access Request Register have been assigned the same Memory, only the Processor with highest positional priority is granted memory communication at this time. The DRC1 signal then controls the Timer of the CIC-R/S to transfer to State-1 wherein new requests may be queued.

DRPM: Log, CIS; FIG. 83. A signal for initiating the execution of the Passive Mode read operation of the CIS. The signal issues when a DAP has been granted communication with the PL Table of the CIS, such grant being designated by the DDR$i$ signal, and when a set of CDX output gates has been enabled for transferring signals representing the priority level read from the CIS to such DAP.

DRPR: Log, CIC-R/S; FIG. 49. A signal denoting a request by the PEP for communication with a Memory. The issuance of this signal depends on whether the PEP is operating in a Service Mode and the portion of the Time Balancing Cycle during which the request is made. The signal controls the setting of the FRPR flip-flop in the Processor Access Request Register of the CIC-R/S.

DRT$i$ (A–C): Log, CIC-R/S; FIG. 49. A signal enabling a request (DR$i$R) by DAP-$i$ for communication with a Memory to issue. The DRT$i$ signal issues, provided:
(a) DAP-$i$ has not been assigned a Memory within the reserved Scope of the PEP, or
(b) DAP-$i$ has been assigned a Memory within the reserved Scope of the PEP, but either;
   (i) The PEP is not at that time operating in a Service Mode, or
   (ii) The portion of the Time Balancing Cycle is occurring wherein a DAP is permitted to communicate with such reserved Memories.

DRTP: Log, CIC-R/S; FIG. 49. A signal enabling a request (DRPR) by the PEP for communication with a Memory to issue. The DRTP signal issues, provided:
(a) The PEP is not operating in a Service Mode, or
(b) The PEP is operating in a Service Mode but the portion of the Time Balancing Cycle is occurring wherein only the PEP is permitted to communicate with the Memories within its reserved Scope.

DRWC: Log, CIS; FIG. 80. A signal denoting the execution of a CIS Passive Mode operation and that the required functions have been completed, this signal controlling the closing operations of the Passive Mode.

DSAQ: Log, CIS; FIG. 81. A signal denoting that a Self-Interrupt request is queued in the Self-Interrupt Control Register of the CIS.

DSD$i$ (A–C): Log, CIS; FIG. 80. A signal denoting the acceptance by the CIS of a request from DAP–$i$ for a Translate Mode operation and that the CIS is ready to initiate the operation.

DSL$k$ (A–D): Log, CIS; FIG. 84. The four signals representing the value of the priority level stored in a register of the PL Table selected during a Translate Mode operation or a Passive Mode read operation of the CIS. During a Translate Mode, the signals are received by the Actual Word Address Encoder and form a portion of the Actual Word Address supplied by the CIS. During a Passive Mode read operation, these signals are received by the PL Signal Transmitter and are converted to the DHR$n$ signals for transmittal to the CDX.

DSPA: Log, CIS; FIG. 80. A signal denoting the acceptance by the CIS of a request from the PEP for a Translate Mode operation and that the CIS is ready to initiate the operation.

DSQ$k$ (F, G, H, J, K): Log, CIS; FIG. 86. Signals denoting that the Symbolic Word Address received by the CIS represents the respective priority levels 5, 7, 8, 9, and 10. Each of these signals controls:
(a) Setting the corresponding flip-flop in the Queued PL Register during a Request-Interrupt Translate Mode operation for the corresponding priority level.

In addition, the DSQH, DSQJ, and DSQK signals control:
(b) Incrementation of the corresponding Definer Counter during a Request-Interrupt Translate Mode operation for the corresponding priority level,
(c) Enabling the Definer Count Output Gates to provide that the DDL$n$ signals represent the count of the corresponding Definer Counter during the above-mentioned Translate Mode operation, and
(d) The Actual Word Address Encoder to insert a code in the Actual Word Address supplied by the CIS, the code corresponding to the priority level involved.

DSR$i$ (A–C): Log, CIS; FIG. 83. A signal controlling entry of a priority level value into the PL Table register corresponding to DAP–$i$ during a Passive Mode read operation initiated by DAP–$i$ in response to a Request-Interrupt notification by the CIS, wherein the value of the priority level stored is supplied by the Highest Queued PL Encoder and represents the highest priority level stored in the Queued PL Register.

DSRW: Log, CIS; FIG. 80. A signal denoting the acceptance by the CIS of a request from a DAP for a Passive Mode operation and that the CIS is ready to initiate the operation. The signal is transmitted to the CAT and to the CIC–R/S.

DSS$i$ (A–C): Log, CIS; FIG. 83. A signal controlling entry of a priority level value into the PL Table register corresponding to DAP–$i$ during a Passive Mode read operation initiated by DAP–$i$ in response to a Self-Interrupt notification by the CIS, wherein the value of the priority level stored is supplied by the Self-Interrupt PL Register.

DT$i$A: Log, CAT; FIG. 38. A signal denoting the acceptance by the CAT of a request from Processor–$i$ for an Address Translation operation, the signal controlling initiation of the operation.

DT$i$E: Log, CAT; FIG. 39. A signal enabling the entry of the Actual Block Address and the memory designation supplied by the Address Translator of the CAT into the respective CAT Output Latches and CAT Output Register corresponding ot the Processor–$i$ that initiated the operation.

DT$i$G: Log, CAT; FIG. 38. A signal in the CAT Input Scanner denoting a request by Processor–$i$ for communication with a Memory and that such Processor has highest positional priority of all the Processors currently making such a request. This signal controls the setting of the flip-flops of the CAT Input Scanner to a state uniquely representing Processor–$i$ and the subsequent translation by the CAT of the address supplied by Processor–$i$.

DT$i$H (A–C): Log, CAT; FIG. 38. A signal in the CAT Input Scanner denoting a request by DAP–$i$ for communication with a Memory. If DAP–$i$ has highest positional priority of all the Processors currently making such a request, the corresponding DT$i$G signal will issue.

DT$i$Z: Log, CAT; FIG. 41. A signal denoting that the CAT Output Latches for Processor–$i$ are currently storing an Actual Block Address for the Memory assigned to Processor–$i$ by the CAT.

DTEA: Log, CAT; FIG. 39. A signal denoting that the CAT is not currently executing an address translation operation and that a new translation operation may be initiated. This signal enables the issuance of the DT$i$A signal corresponding to the Processor–$i$ represented by the CAT Input Scanner flip-flops.

DWPM: Log, CIS; FIG. 83. A signal for initiating the execution of the Passive Mode write operation of the CIS. The signal issues when a DAP has been granted communication with the PL Table of the CIS, such grant being designated by the DDR$i$ signal, and when a set of CDX input gates has been enabled for transferring signals representing the priority level to be written from such DAP to the CIS for storage in the PL Table.

DX$ij$: Log, CIC–R/S; FIGS. 50, 51. A signal for enabling a set of CAX output gates for transferring address information initiated by Processor–$i$ to Memory–$j$ and a set of CCX output gates for transferring control information representing events in Memory–$j$ to Processor–$i$. The CAX output gates are enabled by this signal to transfer the Symbolic Word Address supplied by Processor–$i$ to Memory–$j$ and to transfer the Actual Block Address provided by the CAT Output Latches for Processor–$i$ to Memory–$j$. The CCX output gates are enabled to transfer control pulses initiated by Memory–$j$ to Processor–$i$ and to transfer control pulses representing events in Memory–$j$ from the CIC–B/S to Processor–$i$.

F$mno$ (081–085, 091–095, 101–105): FF, CIS; FIGS. 76, 77, 78, 79. The 1-output signals of the five flip-flops comprising each of the three Definer Counters of the CIS. Each Definer Counter stores and increments a Definer count for a respective one of priority levels 8, 9, and 10.

FC$ij$ (A–C, P) (J–N, T, V): FF, CAT; FIGS. 30, 31, 32, 33, 34, 35, 36, 37. The 1-output signals of a group of seven flip-flops in each of the four CAT Output Registers. A CAT Output Register is provided for each Processor–$i$ Each CAT Output Register stores in one of these flip-flops the designation of the Memory–$j$ assigned to the corresponding processor–$i$ following an address translation operation performed by the CAT in response to a request by Processor–$i$.

FC$i$S (A–C): FF, CAT; FIGS. 33, 35, 37. The 1-output signal of a flip-flop in each of the CAT Output Registers which are provided for a DAP. This flip-flop stores a representation of the request initiated by DAP–$i$ for a Passive Mode operation of the CIS. These signals are transmitted to the CIS.

FCRP: FF, CIS; FIG. 69. The 1-output signal of a control flip-flop which, when in the 1-state, controls the CIS to execute the Passive Mode read operation.

FCWP: FF, CIS; FIG. 67. The 1-output signal of a control flip-flop which, when in the 1-state, controls the CIS to execute the Passive Mode write operation.

FDP$i$ (A–C): FF, CIS; FIGS. 63, 64. The 1-output signals of three flip-flops in the CIS Request Register. Each of these flip-flops, when in the 1-state, denotes a request by the corresponding DAP–$i$ for a Translate Mode operation.

FGR$i$ (A–C): FF, CIS; FIG. 68. The 1-output signals of the three flip-flops comprising the Passive Mode Request Register. Each of these flip-flops, when in the 1-state, denotes a request by the corresponding DAP–$i$ for a Passive Mode operation.

FKCL: FF, CIC-BS/S; FIG. 57. The 1-output signal of a CIC-B/S Timer Controller control flip-flop. When in the 1-state, this flip-flop controls acceptance by the Data Bus Request Register of Processor requests (DK$j$R) for assignment of the Data Bus for communication with assigned Memory–$j$. When in the 0-state, this flip-flop controls granting of the accepted requests in accordance with the positional priority of the Memories involved.

FK$j$M: FF, CIC-B/S; FIGS. 52, 53. The 1-output signals of the seven flip-flops comprising the Data Bus Request Register of the CIC-B/S. Each of these flip-flops, when in the 1-state, denotes a separate request for the Data Bus and corresponds to the Memory–$j$ assigned to the Processor requesting use of the Data Bus.

FK$j$N: FF, CIC-B/S; FIGS. 54, 55. The 1-output signals of the seven flip-flops comprising the Data Bus Granting Register of the CIC-B/S. Each of these flip-flops, when in the 1-state, represents a corresponding Memory–$j$ and denotes the assignment of the Data Bus to the Processor having been assigned Memory–$j$ for communication. The requests queued in the Data Bus Request Register are granted in sequential order according to the positional priority of the Memories therein.

FK$j$T: FF, CIS-B/S; FIGS. 56, 57. The 1-output signals of the seven flip-flops comprising the Double-Word Data Bus Clearing Register of the CIC-B/S. The flip-flops of this register control clearing the Data Bus of transient signals between the time of transmission of the two words of each double-word memory cycle, such clearing being accomplished by the 0-output signal of the one of these flip-flops corresponding to the Memory–$j$ currently coupled to the Data Bus.

FP$mn$ (1–3) (1–4): FF, CIS; FIGS. 70, 71, 72. The 1-output signals of the four flip-flops comprising each of the three registers of the PL Table. Each register stores a representation of the value of the priority level of the program currently being executed by a corresponding DAP.

FPC$i$ (A–C): FF, CIS; FIG. 69. The 1-output signals of the three flip-flops comprising the Interrupt Response Control Register of the CIS. Each of these flip-flops, when in the 1-state, denotes that the corresponding DAP-*i* is responding to a CIS notification, that such DAP has been selected for a Self-Interrupt or Request-Interrupt operation, by initiating a Passive Mode operation of the CIS.

FPPA: FF, CIS; FIG. 63. The 1-output signal of a flip-flop in the CIS Request Register. This flip-flop, when in the 1-state, denotes a request by the PEP for a Translate Mode operation.

FQ*mn* (05, 07–13): FF, CIS; FIGS. 74, 75. The 1-output signals of the eight flip-flops comprising the Queued PL Register of the CIS. Each of these flip-flops, when in the 1-state, denotes an existing request by a Processor for a DAP to initiate a Request-Interrupt operation to the priority level designated by the flip-flop.

FR*i*A: FF, CIC-R/S; FIG. 46. The 1-output signals of the four flip-flops comprising the Processor Access Granting Register of the CIC-R/S. Each of these flip-flops, when in the 1-state, denotes the granting of a memory communication request for the corresponding Processor-*i* this request having been queued in the Processor Access Request Register.

FR*i*R: FF, CIC-R/S; FIG. 43. The 1-output signals of the four flip-flops comprising the Processor Access Request Register of the CIC-R/S. Each of these flip-flops, when in the 1-state, denotes that a request by Processor-*i* for communication with a Memory has been accepted.

FRCE: FF, CIC-R/S; FIG. 48. The 1-output signal of the CIC-R/S Timer control flip-flop. When in the 1-state, this flip-flop controls acceptance of the Processor requests (DR*i*R) for communication with a Memory by setting corresponding flip-flops in the Processor Access Request Register, and at the same time controls the setting of those flip-flops in the Memory Request Register which correspond to the Memories assigned by the CAT to the Processors whose requests are accepted by the Process Access Request Register.

When in the 0-state, this flip-flop controls granting of the previously accepted requests by setting flip-flops in the Processor Access Granting Register corresponding to those flip-flops set in the Processor Access Request Register and by setting flip-flops in the Memory Assignment Register corresponding to those flip-flops set in the Memory Request Register.

FRD*i* (A–C): FF, CIS; FIG. 67. The 1-output signals of the three flip-flops comprising the Request-Interrupt Control Register. Each of these flip-flops, when in the 1-state, denotes that the corresponding DAP-*i* has been selected by the CIS for a Request-Interrupt operation. Each FRD*i* signal controls the issuance of the corresponding DAD*i* signal to notify DAP-*i* of such selection, and participates in controlling the subsequent Passive Mode read operation initiated by DAP-*i* in responding to the notification.

FR*i*P: FF, CIC-R/S; FIGS. 47, 48. The 1-output signals of the seven flip-flops comprising the Memory Assignment Register. Each of these flip-flops, when in the 1-state, denotes that the corresponding Memory-*j* has been assigned for communication with a Processor which has been granted communication with such Memory, as designated by one of the flip-flops of the Processor Access Granting Register.

FR*i*Q: FF, CIC-R/S; FIGS. 44, 45. The 1-output signals of the seven flip-flops comprising the Memory Request Register. Each of these flip-flops, when in the 1-state denotes that the corresponding Memory-*j* has been requested for communication by a Processor which has had accepted its request for communication with the assigned Memory-*j*, as designated by one of the flip-flops of the Processor Access Request Register.

FRWA: FF, CIS; FIG. 63. The 1-output signal of a flip-flop in the CIS Request Register. This flip-flop, when in the 1-state, denotes a request by a DAP for a Passive Mode operation.

FSC*i* (A–C): FF, CIS; FIG. 66. The 1-output signals of the three flip-flops comprising the Self-Interrupt Control Register. Each of these flip-flops, when in the 1-state, denotes that the corresponding DAP-*i* has been selected by the CIS for a Self-Interrupt operation. Each FSC*i* signal controls the issuance of the corresponding DAD*i* signal to notify DAP-*i* of such selection, and participates in controlling the subsequent Passive Mode read operation initiated by DAP-*i* in responding to the notification.

FSL*k* (A–D): FF, CIS; FIG. 73. The 1-output signals of the four flip-flops comprising the Self-Interrupt PL Register. This register stores a representation of the priority level of a program which a DAP is to execute a Self-Interrupt operation to accept. The register is loaded with the priority level representation during a CIS Translate Mode initiating a Self-Interrupt operation for a DAP, the signals representing the priority level being a portion of the Symbolic Word Address supplied by the DAP initiating the Translate Mode operation.

FSR*k* (A–C): FF, CIS; FIG. 64. The 1-output signals of the three flip-flops comprising the Sequencer of the CIS. The Sequencer is a counter which controls the sequence of steps in the various operations executed by the CIS.

FT*n*A (1–3): FF, CAT; FIG. 26. The 1-output signals of three flip-flops in the CAT Input Scanner.

The 1-output signal of the FT1A flip-flop denotes that the Input Scanner has accepted a memory communication request from either the PEP or DAP-A, the signal participating in initiation of a CAT Address Translation operation on the symbolic address supplied by the corresponding Processor.

The 0-output signal of the FT1A flip-flop denotes that the Input Scanner has accepted a memory communication request from either DAP-B or DAP-C, the signal participating in initiation of a CAT Address Translation operation on the symbolic address supplied by the corresponding Processor.

The 1-output signal of the FT2A flip-flop controls the initiation of a CAT Address Translation for the symbolic address supplied by the PEP.

The 0-output signal of the FT2A flip-flop controls the initiation of a CAT Address Translation for the symbolic address supplied by DAP-A.

The 1-output signal of the FT3A flip-flop controls the initiation of a CAT Address Translation for the symbolic address supplied by DAP-B.

The 0-output signal of the FT3A flip-flop controls the initiation of a CAT Address Translation for the symbolic address supplied by DAP-C.

FTA*i* (A–C): FF, CIS; FIG. 65. The 1-output signals of the three flip-flops comprising the Transfer Control Register. Each of these flip-flops, when in the 1-state, controls the next-following CIS Translate Mode operation initiated by DAP-*i* to deliver an Actual Word Address that will be the same as the Symbolic Word Address supplied by such DAP.

FTIL: FF, CAT; FIG. 26. The 1-output signal of a control flip-flop in the CAT Timer-Controller. This flip-flop prevents the initiation of a CAT Address Translation operation until after the preceding translation operation. An Address Translation operation is completed by the insertion of an Actual Block Address into a set of CAT Output Latches and a memory designation into the corresponding CAT Output Register.

Figure 7B:
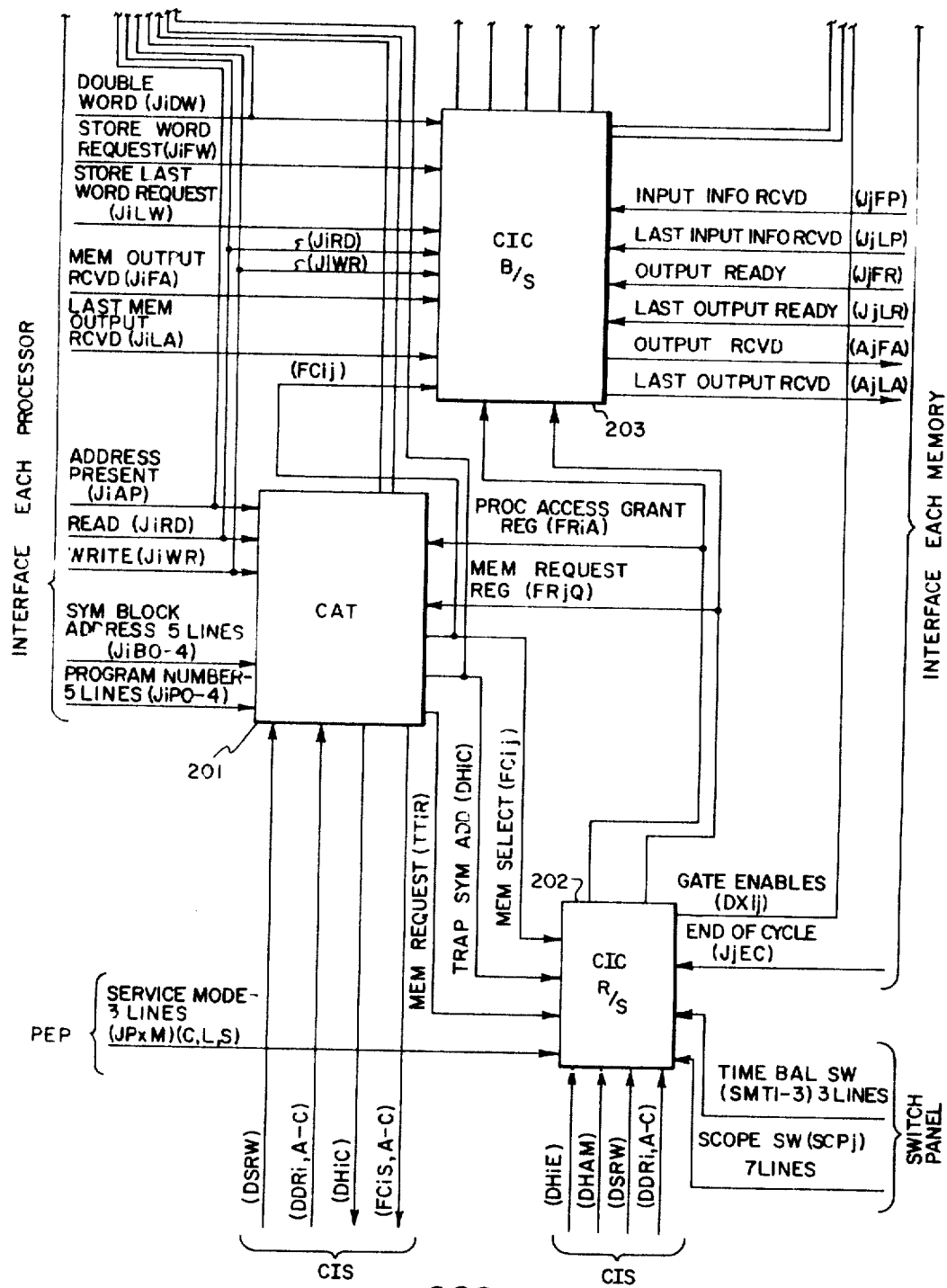

J*i*AP: FF, Proc; FIG. 7. A signal denoting the presence on the Processor-*i* output address lines of a Symbolic Block Address and a Symbolic Word Address. This is one of the signals with which Processor-*i* requests communication with a Memory, such signal participating in requesting a CAT Address Translation operation for the symbolic address supplied.

J*i*B*n* (0–4): FF, Proc; FIG. 7. The five signals representing the Symbolic Block Address supplied by Processor-*i* for communication with a Memory. These signals are transmitted to the CAT for employment in an Address Translation.

J*i*DW: FF, Proc; FIG. 7. A signal denoting that in the memory communication requested by Processor-*i*, the assigned Memory is to execute a double-word memory cycle.

J*i*FA: Log, Proc; FIG. 7. A pulse denoting the receipt by Processor-*i* of the First Data Word from a Memory during a Read-Restore cycle.

J*i*FW: FF, Proc; FIG. 7. A signal accompanying and identifying a First Data Word supplied by Processor-*i* for storage in a Memory.

J*i*LA: Log, Proc; FIG. 7. A pulse denoting the receipt by Processor-*i* of the Last Data Word from a Memory during a Read-Restore cycle.

J*i*LW: FF, Proc; FIG. 7. A signal accompanying and identifying a Last Data Word supplied by Processor-*i* for storage in a Memory.

J*i*P*n* (0–4): FF, Proc; FIG. 7. The five signals representing the Program Number of the program currently being executed by Processor-*i*. These signals are transmitted to the CAT for employment in an Address Translation.

J*i*RD: FF, Proc; FIG. 7. A signal denoting that in the memory communication requesed by Processor-*i*, the assigned Memory is to execute a Read-Restore cycle. This is one of the signals with which Processor-*i* requests communication with a Memory, such signal participating in requesting a CAT Address Translation operation for the symbolic address supplied.

J*i*WR: FF, Proc; FIG. 7. A signal denoting that in the memory communication requested by Processor-*i*, the assigned Memory is to execute a Clear-Write cycle. This is one of the signals with which Processor-*i* requests communication with a Memory, such signal participating in requesting a CAT Address Translation operation for the symbolic address supplied.

J*j*EC: Log, Mem; FIG. 7. A pulse denoting the completion of the cycle of Memory-*j*. This signal is transmitted to the CIC-R/S and initiates an operation which decouples Memory-*j* and the initiating Processor from the Data Bus, thereby terminating the immediately preceding communication operation.

J*j*FP: Log, Mem; FIG. 7. A pulse denoting the receipt and storage by Memory-*j* of the First Data Word supplied by the communicating Processor.

J*j*FR: FF, Mem; FIG. 7. A signal denoting the presence on the output data lines of Memory-*j* of the First Data Word during a Read-Restore cycle.

J*i*00–23: FF, Proc; FIG. 7. The 24 signals representing a Data Word supplied by Processor-*i* for transmission to and storage in the assigned Memory.

J*i*W0–9: FF, Proc; FIG. 7. The 10 signals representing a Symbolic Word Address supplied by Processor-*i*.

J*j*00–23: FF, Mem; FIG. 7. The 24 signals representing a Data Word provided by Memory-*j* during a Read-Restore cycle.

J*j*AR: Log, Mem; FIG. 7. A pulse denoting the receipt by Memory-*j* of an Actual Address.

J*j*LP: Log, Mem; FIG. 7. A pulse denoting the receipt and storage by Memory-*j* of the Last Data Word supplied by the communicating Processor.

J*j*LR: FF, Mem; FIG. 7. A signal denoting the presence on the output lines of Memory-*j* of the Last Data Word during a Read-Restore cycle.

JPCM: FF, PEP, FIG. 7. A signal denoting a request by the PEP for a Short Service Mode type of communication with a Memory.

JPLM: FF, PEP; FIG. 7. A signal denoting a request by the PEP for a Long Service Mode type of communication with a Memory.

JPSM: FF, PEP; FIG. 7. A signal denoting a request by the PEP for a Scanner Service Mode type of communication with a Memory.

Figure 16:
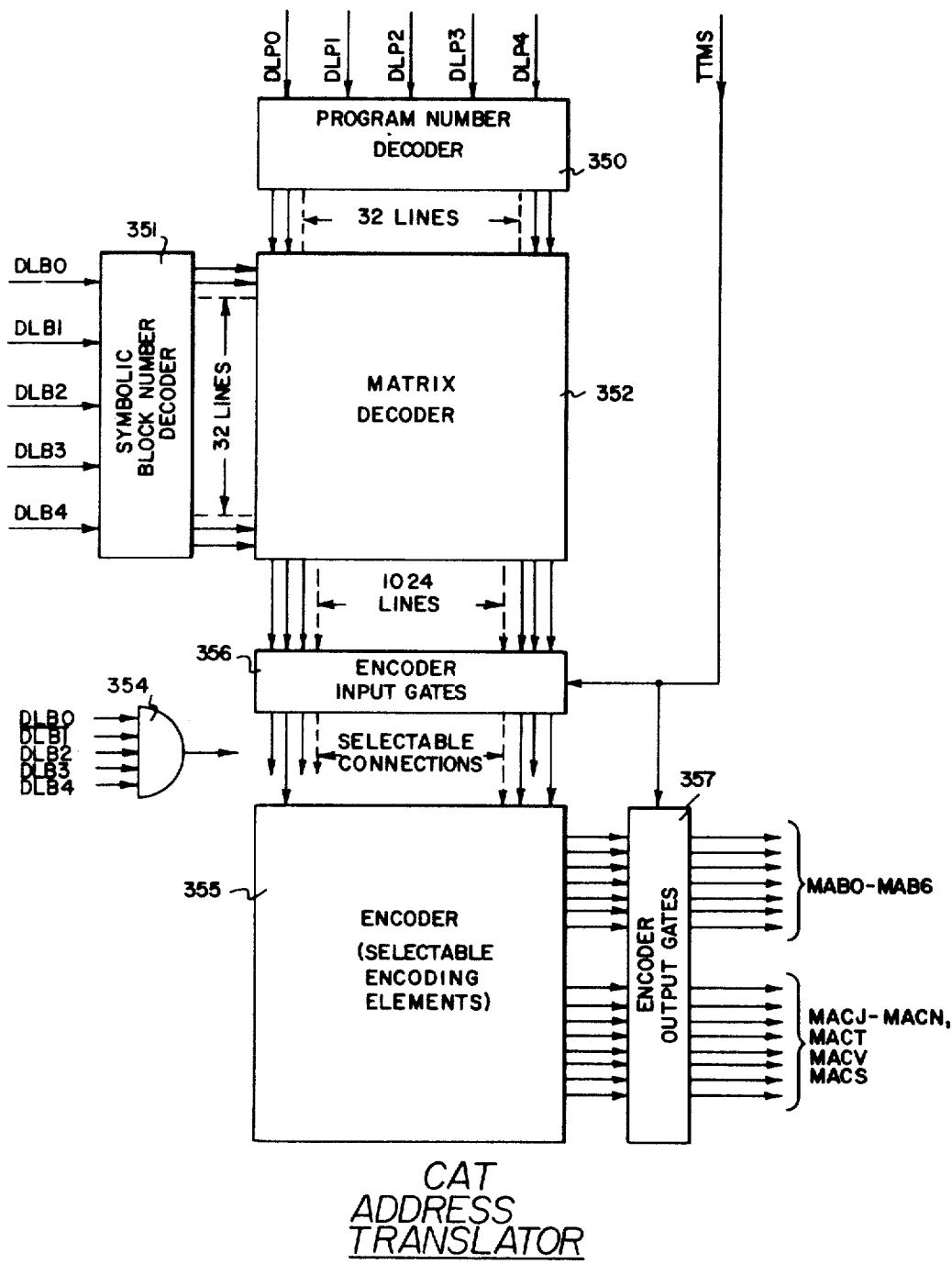
FIGURE 16 is a detailed block diagram of the Address Translator of the CAT.

MAB*n* (0–6): Log, CAT; FIGS. 15, 16. A set of seven signals supplied by the Address Translator of the CAT during an Address Translation operation and inserted into one of the groups of CAT Output Latches. The MAB0–MAB4 signals represent the Actual Block Address developed during the Address Translation. The MAB5 signal represents a request by the Processor initiating the operation for the CIS to execute a Translate Mode operation. The MAB6 signal represents additional microcontrol information, as required by the initiating Processor.

MAC*j*: Log, CAT; FIGS. 15, 16. A set of seven signals delivered by the Address Translator of the CAT during an Address Translation operation and inserted into one of the CAT Output Registers. The one of these signals which represents a binary 1 provides a designation of the Memory-*j* assigned to the initiating Processor by the Translation Operation.

MACS: Log, CAT; FIGS. 15, 16. A signal delivered by the Address Translator of the CAT during an Address Translation operation and inserted into one of the CAT Output Registers corresponding to a DAP. This signal, when in the 1-state, denotes a request by the DAP initiating the Address Translation for the CIS to execute a Passive Mode operation.

RASM: Log, CIC-R/S; FIG. 49. A signal denoting a request by the PEP for a Service Mode type of communication with a Memory, the signal participating in controlling the acceptance of requests by the CIC-R/S Input Scanner.

SCP*j*: SW, Sw-Pan; FIG. 7. A signal which issues upon the setting of a corresponding one of seven Scope switches. The signal controls placing the corresponding Memory-*j* under the reserved Scope of the PEP, when the PEP is operating in a Service Mode. The signal is transmitted to the CIC-R/S.

SMT*n* (1–3): SW, Sw-Pan; FIG. 7. A signal which issues upon the setting of a corresponding one of three Time Balancing switches. The signal enables the triggering of a corresponding one-shot TRT*n*, which controls the duration of time in each Time Balancing Cycle during which a DAP may communicate with a Memory within the reserved Scope of the PEP. The signal is transmitted to the CIC-R/S.

TRCA: OS, CIS; FIG. 66. The 1-output signal of a control one-shot in the Request-Interrupt Selector. When a change is made in the PL Table or the Queued PL Register this one-shot enters its 1-state, allowing time for the signals throughout the logic networks delivering the Highest Queued PL and Lowest Processor PL representations to settle to their steady values before the Request-Interrupt Control Register is enabled to accept a new Request-Interrupt designation for a DAP.

TRT*n* (1–3): OS, CIC-R/S; FIG. 42. The 1-output signals of the three one-shots in the Time Protection, Time Balancing, Scope Controller of the CIC-R/S. Each of these signals, when in the 1-state, controls the duration of the time in each Time Balancing Cycle during which a DAP may communicate with a Memory within the reserved Scope of the PEP.

TT*i*R: OS, CAT; FIG. 28. The 1-output signals of the four one-shots comprising the Memory Request Signal Generator of the CAT. Each of these signals, when in the 0-state, denotes that the corresponding Processor-*i* has had a CAT Address Translation performed on the symbolic address supplied, that a corresponding Actual Block Address and memory designation is stored in the respective CAT Output Latches and CAT Output Register, and that a request for communication between Processor-*i* and the designated Memory is being made to the CIC-R/S by this signal.

TT*i*S: OS, CAT; FIG. 29. The 1-output signals of the four one-shots comprising the Memory Start Signal Generator of the CAT. Each of these signals, when in the 0-state, enables a set of CAX output gates to initiate a cycle in the Memory assigned to communication with Processor-$i$.

TTMA: OS, CAT; FIG. 27. The 1-output signal of a control one-shot in the Timer-Controller of the CAT. This one-shot, when in the 0-state, enables the CAT to initiate and Address Translation operation.

TTMS: OS, CAT; FIG. 27. The 1-output signal of a control one-shot in the Timer-Controller of the CAT. The one-shot, when in the 1-state, enables operation of the CAT Encoder.

TTOA: OS, CAT; FIG. 27. The 1-output signal of a control one-shot in the Timer-Controller of the CAT. The one-shot, when in the 0-state, initiates an Address Translation operation by the CAT. This one-shot provides sufficient delay, following the time of acceptance by the CAT of a request (DT$i$A) from a Processor for a Translation operation, to enable the symbolic address signals supplied by such Processor to be applied to and decoded by the CAT Matrix Decoder, before the CAT Encoder is enabled for operation.

PROGRAM STRUCTURE

The Multicomputer System of the instant invention is a Data Processing System comprising a plurality of processors executing separate programs simultaneously and independently, but wherein the processors have the capability of intercommunication. This intercommunication capability is provided by permitting two or more processors to have common access to portions of the Memory system.

However, although the processors are accorded independence in executing programs, the assignment of programs to the various processors is controlled by a set of master control programs. In the Multicomputer System described herein, this set of master control programs is termed the Operating System. Thus, the Operating System is executive, or supervisory, in nature and does not directly process information to provide the results required by the user. The programs which perform the direct information processing to provide the results required by the user are termed Subject Programs.

Although each DAP can execute any Subject Program or any Operating System program, it is within the scope of the instant invention to provide DAP's of varying capabilities and speeds, whereby certain Subject Programs are executed more efficiently by one DAP than by another. It is one function of the Operating System to assign, when possible, a Subject Program to the DAP capable of executing the program most efficiently.

A DAP is normally executing Subject Programs. The assignment and execution of a Subject Program is scheduled and performed according to the relative importance of the program. As each Subject Program is completed, it is replaced by the most urgent scheduled Subject Program, provided that the required external devices and Memory storage space are available at that time. However, when it is necessary that an operation be performed by an Operating System program the urgency of this executive operation requires that, instead of waiting for the first completion of one of the Subject Programs, a Subject Program be interrupted at the Operating System program be executed in lieu thereof. Upon completion of execution of the interrupting Operating System program, the Subject Program is continued from the point that it was interrupted. This type of interruption is designated as "Priority Interrupt" herein.

*Definition of terms*

Several distinct terms are employed herein relative to the operation of the System while executing a Priority Interrupt and while returning from a Priority Interrupt. These terms are defined below:

Priority level

A number from 0 to 15 allocated to a program and indicating the relative urgency for execution of the program. A DAP is said to be operating in a particular mode and to have a particular priority level according to the priority level of the program which it is actually executing.

Program number

A number assigned to each of the programs or portions of programs being executed or scheduled for execution.

Subject mode

A DAP operates in the Subject Mode when the program being executed has a priority level less than 4. These programs are Subject Programs.

Control mode

A DAP operates in the Control Mode when the program being executed has a priority level greater than 3. These programs are Operating System programs.

Priority interrupt

The operation of replacing a program currently being executed by a DAP with a program allocated a higher priority level. Two types of Priority Interrupts are provided, Self-Interrupt and Request-Interrupt.

Self-interrupt

An operation initiated by a DAP when the program being executed thereby cannot continue until a higher priority program is executed. The higher prority program is assigned for execution to the DAP initiating the Self-Interrupt.

Request-interrupt

An operation initiated by a DAP or PEP when the program being executed thereby requires execution of a higher priority program. The higher priority program is assigned for execution to the DAP executing the lowest priority program at the time the requirement is effected. The DAP which initiates a Request-Interrupt is able to continue executing its current program for some time after the operation is initiated.

Return-from-interrupt

The operation of restoring to execution a program that has been interrupted by a Priority Interrupt.

Operating system memory

That portion of the Memory group which is accessible by a DAP executing an Operating System program.

Real-time event

An event occurring in an external device coupled to the PEP that requires almost immediate attention by the System.

Requested program

A Subject Program stored in an external device and awaiting execution.

Scheduled program

A Subject Program stored in the Memory group, having identified therewith specific Memory storage space for processing and specific external devices, and ready for execution when called by the Operating System.

Current program

A Subject Program being executed or partially executed by a DAP. Current programs have assigned thereto unique Memory areas and unique external devices. A current program may be in an interrupted state due to a Priority Interrupt.

Active program

A program actually in the process of execution by a DAP, and, therefore, having its Program Number stored in the Program Number Register of a DAP.

Priority levels and operating system

The CIS described hereinafter cooperates with the Operating System to assert primary control over the operation of the Multicomputer System during execution of Priority Interrupt operations. To effect this control the CIS stores the priority level of the Active Program being executed by each DAP and controls the assignment of a DAP to execute each program for which a Priority Interrupt is initiated. The priority levels stored by the DAP, the priority level of the program requested for execution during a Priority Interrupt, and the type of Priority Interrupt (whether Self-Interrupt or Request-Interrupt) determine the operation of the System during a Priority Intrerupt.

The following Table 3 identifies the program types allocated priority levels 0–15 by the System, the mode of operation of a DAP when executing the programs, the type of Priority Interrupt operation which initiates execution of the programs, and the type of processor which initiates the Priority Interrupt to the programs listed.

TABLE 3

| Priority Level | Type of Program | DAP Mode | Self-Interrupt | Request Interrupt | Initiating Processor |
|---|---|---|---|---|---|
| 0 | Subject | | Subject | | |
| 1 | Subject | | Subject | | |
| 2 | Subject | | Subject | | |
| 3 | Subject | | Subject | | |
| 4 | Instruction Translator | Control | X | | DAP |
| 5 | General Control | Control | X | or X | DAP |
| 6 | Subject Software Error | Control | X | | DAP |
| 7 | I/O Initiation | | X | or X | DAP |
| 8 | I/O Error | | | X | PEP |
| 9 | I/O Termination | | | X | PEP |
| 10 | I/O Control Interrupt | | | X | PEP |
| 11 | Real-Time I/O Operations | | X | | PEP |
| 12 | Real-Time I/O Operations | | X | | PEP |
| 13 | Real-Time I/O Operations | | X | | PEP |
| 14 | Real-Time Clock | | X | | DAP |
| 15 | DAP Hardware Error | | X | | DAP |

Table 3 illustrates that certain programs executed by a DAP may require both a Self-Interrupt and a Request-Interrupt to Operating System programs having priority levels 5 and 7.

The various Operating System programs and the functions each program performs are summarized below:

Instruction translator

This program converts certain DAP Subject Program instructions, which are unintelligible to much of the Multicomputer System of the instant invention, to instructions intelligible to the entire System. Thus, it is within the concept of the instant invention to provide a system having different DAP's, each capable of executing programs with different instruction formats. For example, a DAP which may be employed herein, is one capable of directly controlling the transfer of data between a Memory and an external device, while executing a Subject Program. However, in the instant System these transfers are controlled by only programs of the Operating System. The Subject Program instructions normally intended to initiate such transfers are indirect instructions, which request the Operating System to control the transfers. Accordingly, the Instruction Translator program converts the direct control Subject Program instructions to the type of instructions intelligible to the higher level Operating System programs.

General control

This program has several routines that constitute the primary multiprogramming control of the System and that aid in the assignment of Subject Programs for execution. These routines include:

EXECUTIVE ROUTINE

This routine maintains the System in normal operative condition by providing administration of all Subject Programs and other necessary housekeeping activities. This administration is asserted from the initial request for execution of a Subject Program, while it is still a Requested Program in an external device, through its execution and completion. Thus, this routine maintains tables of all programs; Requested, Schedules, Current, and Active. The routine also provides the necessary functions for terminating a Subject Program and initiating the next Subject Program.

SCHEDULER ROUTINE

This routine determines the Subject Program that is next to be continued, or started, whenever processing facilities become available. Maintaining and updating the urgencies for execution of all programs that have been requested is provided.

ALLOCATOR ROUTINE

This routine provides allocation of Memory group space and external devices to Subject Programs and maintains tables of allocations made.

Subject software error

This program resolves Subject Program errors which are detected in a DAP, such errors including format errors of an instruction, improper instruction command codes, improper instruction sequences, improper memory addresses, etc.

Input/output initiation

This program responds to a request from a DAP to have an external device transmit a set of Data Words to a Memory assigned to such DAP or receive a set of Data Words from the Memory. The program controls transmission of the request and other pertinent information to the PEP, which then executes the request.

Input/output error

This program resolves error conditions detected by the PEP during execution of a data transfer operation between a Memory and an external device.

Input/output termination

This program controls termination of an operation wherein an external device is communicating with a Memory under control of the PEP, after the data transfer operation completed its functions.

Input/output control interrupt

This program is executed when an external device communicating with a Memory encounters a real-time event requiring execution of a special program in order to continue.

Real-time input/output operations

A set of three programs executed for an external device normally handling real-time events. These programs will not be described in detail herein, but are provided in accordance with the type of real-time operation employed.

Real-time clock

This program services a DAP when a real-time clock in the DAP exceeds its full count. Each DAP has a counter, identified as a real-time "clock," which is reset at regular intervals during normal execution of a Subject Program. This Operating System assumes control of a DAP if its real-time clock is not reset, but due to an error condition exceeds the full count.

DAP hardware error

This program services a DAP when hardware malfunctions are detected by the DAP while operating in the Subject Mode or the Control Mode. Additionally, the program resolves certain Operating System program errors.

Accordingly, if a Processor executing a Subject Program requires the special functions available from an Operating System program, a Priority Interrupt, to a specified Operating System program is requested by the Processor. The Operating System program is then executed by either a requesting DAP, or by interruption of another DAP, to perform the required functions. When a DAP completes execution of the required Operating System program, the Subject Program that was previously executed by the DAP is resumed. It is also within the concept of the instant invention to provide a Priority Interrupt from an Operating System program of a given priority level to a higher priority level Operating System program; for example, a DAP executing the I/O initiation, priority level 7, Operating System program is interrupted to the DAP Hardware Error program, priority level 15, upon detection of an error in the I/O Initiation program. In this latter example, when the higher priority level Operating System program has been completed, the DAP resumes executing the interrupted lower priority level Operating System program.

MULTICOMPUTER SYSTEM—DETAILS

The Multicomputer System is shown in further detail in FIGS. 7 and 8, which illustrate the major components of the System and the control and data signal transfer paths between the major components. FIG. 7 illustrates the signal paths which couple together the major components of CCS 32 and which couple these components to Processors 10, 11, 12 and 30; Memories 20–26; a Switch Panel; and CIS 34. FIG. 8 illustrates the signal paths which couple the CIS to the Processors and to the CCS.

Central control subsystem (CCS)

The Central Control Subsystem comprises a Central Address Translator (CAT) 201; a Central Interlace Controller, Request Scanner (CIC-R/S) 202; a Central Interlace Controller, Bus Scheduler (CIC-B/S) 203; a Central Data Exchange (CDX) 204; a Central Address Exchange (CAX) 205; and a Central Control Exchange (CCX) 206.

The CAT, in general, receives the respective Processor requests for communication with a Memory, accepts the requests in sequence according to predetermined priorities allocated to the Processors, and for each Processor for which a request is accepted, translates the Symbolic Address supplied into an Actual Address. Following each address translation, the CAT notifies the CIC-R/S that a memory request has been accepted and identifies the requesting Processor, identifies the one of Memories 20–26 assigned to this Processor, and supplies an Actual Address for the assigned Memory.

The CIC-R/S, in general, responds to the notifications provided by the CAT and reserves the respective assigned Memories. The CIC-R/S then grants the Processor requests by controlling the CAX to transmit the Actual Addresses to the respective assigned Memories and notifying the CIC-B/S that it may initiate transfer of a Data Word between each requesting Processor and its assigned Memory.

The CIC-B/S, in general, responds to the notifications provided by the CIC-R/S and controls the CDX to grant the single Data Bus in sequence to the requesting Processors for communication with their assigned Memories. The sequence in which the CIC-B/S grants the Data Bus to the requesting Processors is determined according to predetermined priorities allocated to the respective assigned Memories.

The CDX, in general, is primarily controlled by the CIC-B/S to transmit a single Data Word between a Processor and the Memory assigned by the CAT.

The CAX, in general, is primarily controlled by the CIC-B/S to transmit Actual Addresses to the respective Memories.

The CCX, in general, is primarily controlled by the CIC-R/S to transmit acknowledgment control signals to the Processors from the respective assigned Memories.

The CAT receives a J$i$AP signal and one of the J$i$RD or J$i$WR signals from the corresponding Processor-$i$ when the Processor is requesting communication with a Memory. The J$i$AP signal denotes that Processor-$i$ is supplying a Symbolic Block Address on input lines to the CAT and a Symbolic Word Address on input lines to the CAX. The J$i$RD and J$i$WR signals request that the Memory assigned by the CAT execute a respective Read-Restore or Clear-Write cycle. For example, if both the JAAP and JARD signals represent a binary 1, the CAT interprets the combination as a request by DAP-A to receive a Data Word from a Memory.

The CAT also receives a Symbolic Block Address, represented by the J$i$B0–4 signals, and a Program Number, represented by the J$i$P0–4 signals, from the corresponding Processor-$i$ when the Processor is requesting communication with a Memory. The CAT translates the signal combination provided by the Symbolic Block Address and Program Number into signals representing an Actual Address and signals identifying a specific one of Memories 20–26.

The CAT receives the DSRW and DDR$i$ signals from the CIS. The DSRW signal indicates that the CIS has accepted a DAP request for a Passive Mode operation and is ready to initiate the operation. The DDR$i$ signal indicates that the CIS has granted priority to the corresponding DAP-$i$ for communication with the PL Table of the CIS. A DDR$i$ signal together with the DSRW signal clears the corresponding FC$i$S flip-flop, which had notified the CIS of the Passive Mode request by DAP-$i$.

The CAT receives the FR$i$A and FR$j$Q signals from the CIC-R/S. The FR$i$A signal indicates that the CIS-R/S has granted a memory communication request for the corresponding Processor-$i$. The FR$j$Q signal indicates when the corresponding Memory-$j$ has been assigned by the CAT to a requesting Processor and, therefore, is busy. The FR$i$A signal together with the FR$j$Q signal, controls the clearing of the corresponding FC$ij$ flip-flop in the CAT Output Register. The FR$i$A signal also controls the initiation of the corresponding TT$i$S memory start signal.

The CAT transmits the FC$ij$, DH$i$C, and TT$i$R signals to the CIC-R/S. The FC$ij$ signal denotes that the corresponding Memory-$j$ has been assigned to the corresponding Processor-$i$ for communication. For example, the FCPK signal represents the assignment of Memory-K by the CAT for communication with the PEP. The DH$i$C signal denotes that the corresponding Processor-$i$ has requested the CIS to execute a Translate Mode operation. The TT$i$R signal notifies the CIC-R/S that the corresponding Processor-$i$ has had a memory request accepted by the CAT and that the CAT has available an Actual Address for the assigned Memory. The FC$ij$ signals are also transmitted to the CIC-B/S. The DH$i$C signals are also transmitted to the CAX and CIS.

The CAT transmits the DC$i$0–4 and TT$i$S signals to the CAX. The DC$i$0–4 signals represent an Actual Block Address for the Memory assigned by the CAT to the corresponding Processor-$i$. The TT$i$S signal controls the start of a memory cycle in the Memory assigned to corresponding Processor-$i$.

The CAT transmits the FC$i$S signals to the CIS. The FC$i$S signal denotes that the corresponding DAP-$i$ has requested the CIS to execute a Passive Mode operation.

The CIC-R/S receives the above-mentioned FC$ij$, DH$i$C, and TT$i$R signals from the CAT. The FC$ij$ signal joins in controlling setting of a flip-flop identifying the corresponding Processor-$i$ in the Processor Access Request Register of the CIC-R/S and in resetting a flip-flop identifying the corresponding Memory-$j$ in the Memory Request Register of the CIC-R/S. The DH$i$C signal joins in controlling the time of setting a flip-flop identifying the corresponding Processor-$i$ in the Processor Access Granting Register of the CIC-R/S when such Processor-$i$ has requested a CIS Translate Mode operation. The TT$i$R signal initiates acceptance by the CIC-R/S of a memory request for the corresponding Processor-$i$ by controlling setting of the corresponding flip-flop in the Processor Access Request Register.

The CIC-R/S receives the JPCM, JPLM, and JPSM signals from the PEP when the PEP is requesting a Service Mode type of communication with a Memory. Each of these signals prevents the CIC-R/S from accepting, during certain periods, a memory request by a DAP for those Memories within the reserved Scope of the PEP.

The CIC-R/S receives the SMT1-3 and SCP$j$ signals from the Switch Panel. Each of the SMT1-3 signals determines the period during which a DAP is permitted to communicate with a Memory within the reserved Scope of the PEP in the Service Mode. The SCP$j$ signal places the corresponding Memory-$j$ under the reserved Scope of the PEP.

The CIC-R/S receives the DH$i$E, DHAM, and the above-mentioned DSRW and DDR$i$ signals from the CIS. The DH$i$E signal indicates that the CIS is ready to initiate a Translate Mode operation for the corresponding Processor-$i$. The DHAM signal denotes that the CIS is supplying an Actual Word Address on input lines to the CAX during a Translate Mode operation. The DH$i$E signal, together with the DHAM signal, controls the time of setting a flip-flop identifying the corresponding Processor-$i$ in the Processor Access Granting Register during a Translate Mode operation. The DSRW and DDR$i$ signals join in controlling the time of setting a flip-flop identifying the corresponding DAP-$i$ in the Processor Access Granting Register during a Passive Mode operation.

The CIC-R/S receives the J$j$EC signal from the corresponding Memory-$j$ when the Memory has fulfilled a request from a Processor. The J$j$EC signal clears the corresponding flip-flop of the Memory Request Register, this clearing, in turn, initiating clearing of the CAT Output Register of the Processor-$i$ to which Memory-$j$ has been assigned.

The CIC-R/C transmits the above-mentioned FR$i$A and FR$j$Q signals to the CAT and CIC-B/S.

The CIC-R/S transmits the DX$ij$ signals to the CAX and CCX. The DX$ij$ signal controls the CAX to transmit an Actual Address, provided in part by the corresponding Processor-$i$ and in part by the CAT, to the corresponding Memory-$j$. The DX$ij$ signal controls the CCX to transmit acknowledgment control signals originating from the corresponding Memory-$j$ to the corresponding Processor-$i$.

The CIC-B/S receives the J$i$FW, J$i$LW, and J$i$DW signals from the corresponding Processor-$i$ when the Processor is communicating with a Memory. The J$i$FW signal identifies the presence of a First Data Word supplied by Processor-$i$ for storage in the Memory group. The J$i$FW signal joins in controlling the CIC-B/S to grant the Data Bus of the CDX to Processor-$i$ to transmit the First Data Word of the memory cycle. The J$i$LW signal identifies the presence of a Last Data Word supplied by Processor-$i$ for storage in the Memory group. The J$i$LW signal joins in controlling the CIC-B/S to grant the Data Bus to Processor-$i$ to transmit the Last Data Word of the memory cycle. The J$i$DW signal denotes that in the memory communication requested by Processor-$i$, the assigned Memory is to execute a double-word cycle. The J$i$DW signal joins in controlling the CIC-B/S in clearing the Data Bus between the transmission of the two Data Words of the resulting double-word memory cycle.

The CIC-B/S also receives the J$i$FA and J$i$LA signals from the corresponding Processor-$i$ when the Processor is communicating with a Memory. The J$i$FA signal denotes the receipt by Processor-$i$ of the First Data Word from a Memory during a Read-Restore cycle. The J$i$LA signal denotes the receipt by Processor-$i$ of the Last Data Word from a Memory during a Read-Restore cycle. The CIC-B/S transmits signals representing the information provided by the J$i$FA and J$i$LA signals to the Memory then assigned to Processor-$i$.

The CIC-B/S also receives the above-mentioned J$i$RD and J$i$WR signals from the corresponding Processor-$i$. The J$i$RD and J$i$WR signals join in controlling the CIC-B/S to grant the Data Bus to Processor-$i$ for respectively receiving a Data Word from a Memory or transmitting a Data Word to a Memory.

The CIC-B/S receives the above-mentioned FC$ij$ signals from the CAT. The CIC-B/S receives the above-mentioned FR$i$A and FR$j$Q signals from the CIC-R/S. The FR$i$A and an FR$j$Q signal, together with the corresponding FC$ij$ signal, control the CIC-B/S to initiate transfer of a Data Word between the corresponding Processor-$i$ and its assigned Memory-$j$.

The CIC-B/S receives the J$j$FP and J$j$LP signals from the corresponding Memory-$j$. The J$j$FP signal denotes the receipt and storage by Memory-$j$ of a First Data Word supplied by a Processor during a Clear-Write cycle. The J$j$LP signal denotes the receipt and storage by Memory-$j$ of a Last Data Word supplied by a Processor during a Clear-Write cycle. The CIC-B/S transmits signals representing the information provided by the J$j$FP and J$j$LP signals to the CCX, for retransmission to the Processor that supplied the stored Data Word. Additionally, the J$j$FP signal joins in controlling the CIC-B/S to clear the Data Bus between the transmission of the two Data Words of a double-word memory cycle.

The CIC-B/S also receives the J$j$FR and J$j$LR signals from the corresponding Memory-$j$. The J$j$FR signal denotes the presence on the output data lines of Memory-$j$ of a First Data Word during a Read-Restore cycle. The J$j$LR signal denotes the presence on the output data lines of Memory-$j$ of a Last Data Word during a Read-Restore cycle. The CIC-B/S transmits signals representing the information provided by the J$j$FR and J$j$LR signals to the CDX, for retransmission to the Processor to which the corresponding Memory-$j$ is assigned. Additionally, the J$j$FR signal joins in controlling the CIC-B/S in granting the Data Bus to the Processor-$i$ to which the CAT has assigned Memory-$j$. The CIC-B/S transmits the A$j$FA and A$j$LA signals to the corresponding Memory-$j$. The A$j$FA signal denotes the receipt by the requesting Processor of the First Data Word supplied by Memory-$j$ during a Read-Restore cycle. The A$j$LA signal denotes the receipt by the requesting Processor of the Last Data Word supplied by Memory-$j$ during a Read-Restore cycle.

The CIC-B/S transmits the B$j$FP and B$j$LP signals to the CCX. The B$j$FP signal denotes the receipt and storage by the corresponding Memory-$j$ of a First Data Word provided by a Processor during a Clear-Write cycle. The B$j$LP signal denotes the receipt and storage by Memory-$j$ of a Last Data Word provided by a Processor during a Clear-Write cycle.

The CIC-B/S transmits the BAFW, BALW, BJFR and BJLR signals to the CDX. The BAFW and BALW signals identify the presence of a respective First or Last Data Word supplied by a Processor during a Clear-Write cycle. The BJFR and BJLR signals identify the presence of a respective First or Last Data Word supplied by a Memory during a Read-Restore cycle.

The CIC-B/S also transmits the DD$i$R, DD$j$R, DD$i$T and DD*j*T signals to the CDX. A DD*i*R and DD*j*T signal are provided when the CIC-B/S grants the Data Bus of the CDX to the corresponding Processor-*i* for communication with the corresponding Memory-*j* during a Clear-Write cycle. A DD*j*R and DD*i*T signal are provided when the CIC-B/S grants the Data Bus to the corresponding Processor-*i* for communication with the corresponding Memory-*j* during a Read-Restore cycle. The DD*i*R and DD*i*T signals corresponding to each DAP are also transmitted to the CIS.

The CDX receives the J*i*00–23 signals from the corresponding Processor-*i* and the J*j*00–23 signals from the corresponding Memory-*j*. The J*i*00–23 signals represent a Data Word supplied by Processor-*i*. This Data Word is transmitted by the Data Bus of the CDX to the assigned Memory for storage during a Clear-Write cycle. The J*j*00–23 signals represent a Data Word supplied by Memory-*j* during a Read-Restore cycle. This latter Data Word is transmitted by the Data Bus to the Processor which Memory-*j* is then assigned to.

The CDX receives the above-mentioned BAFW, BALW, BJFR and the BJLR signals from the CIC-B/S. The CDX transmits signals representing the information provided by the BAFW and BALW signals to the Memory currently coupled to the Data Bus. The CDX transmits signals representing the information provided by the BJFR and BJLR signals to the Processor currently coupled to the Data Bus.

The CDX also receives the DD*i*R, DD*j*R, DD*i*T and DD*j*T signals from the CIC-B/S. A DD*i*R and DD*j*T signal enable the set of CDX input gates coupled to the corresponding Processor-*i* and the set of CDX output gates coupled to the corresponding Memory-*j* for transmission of a Data Word on the Data Bus during a Clear-Write cycle. A DD*j*R and DD*i*T signal enable the set of CDX input gates coupled to the corresponding Memory-*j* and the set of CDX output gates coupled to the corresponding Processor-*i* for transmission of a Data Word on the Data Bus during a Read-Restore cycle.

The CDX receives the DHRP and DRPM signals from the CIS. The DHRP signal denotes that the CIS is supplying signals representing the value of a priority level in the PL Table. The DHRP signal enables a set of CDX gates for signaling the requesting Processor to accept the priority level-representing signals. The DRPM signal denotes that a DAP has been granted communication with the PL Table for a Passive Mode read operation. The DRPM signal disables the CDX memory input gates to provide for transfer of the priority level signals from the CIS to the requesting DAP.

The CDX also receives the DHR0–3 signals from the CIS. The DHR0–3 signals represent the value of a priority level stored in the PL Table and are provided during a Passive Mode read operation. The CDX transmits signals representing the priority level provided by the DHR0–3 signals to the requesting Processor.

The CDX transmits the A*i*00–23 signals to the corresponding Processor-*i* and the A*j*00–23 signals to the corresponding Memory-*j*. The A*i*00–23 signals represent a Data Word supplied by a Memory during a Read-Restore cycle. The A*j*00–23 signals represent a Data Word supplied by a Processor for storage during a Clear-Write cycle.

The CDX also transmits the A*i*FR and A*i*LR signals to the corresponding Processor-*i*. The A*i*FR and A*i*LR signals indicate to Processor-*i* the presence on the output data lines of the assigned Memory of a respective First or Last Data Word during a Read-Restore cycle.

The CDX also transmits the A*j*FW and A*j*LW signals to the corresponding Memory-*j*. The A*j*FW and A*j*LW signals indicate to Memory-*j* the presence of a respective First or Last Data Word supplied by the requesting Processor during a Clear-Write cycle.

The CDX transmits the DHW0–3 signals to the CIS. The DHW0–3 signals represent the value of a priority level supplied by a DAP when the DAP is requesting the CIS to execute a Passive Mode write operation.

The CAX receives the above-mentioned J*i*AP, J*i*RD, J*i*WR, and J*i*DW signals from the corresponding Processor-*i*. The J*i*AP signal joins in controlling the CAX to notify the CIS of the presence of a Symbolic Word Address on the CIS input lines. The CAX transmits signals representing the information provided by the J*i*RD, J*i*WR and J*i*DW signals to the Memory assigned to Processor-*i*.

The CAX also receives the J*i*W0–9 signals from the corresponding Processor-*i*. The J*i*W0–9 signals represent a Symbolic Word Address supplied by Processor-*i*. The CAX transmits signals representing this Symbolic Word Address as an Actual Word Address to the Memory assigned to Processor-*i* or as a Symbolic Word Address to the CIS.

The CAX receives the above-mentioned DH*i*C, DC*i*0–4, and TT*i*S signals from the CAT. The DH*i*C signal joins in controlling the CAX to notify the CIS that a Memory has received the Actual Word Address supplied by the CIS. The Actual Block Address represented by the DC*i*0–4 signals are transmitted by the CAX to the Memory assigned to the corresponding Processor-*i*. Signals representing the control information provided by the TT*i*S signals are transmitted by the CAX to the Memory assigned to the corresponding Processor-*i*.

The CAX receives the above-mentioned DX*ij* signals from the CIC-R/S. The DX*ij* signal enables a set of CAX output gates for transferring signals representing an Actual Address in part from the corresponding Processor-*i* and in part from the CAT to the corresponding Memory-*j*.

The CAX receives the A*i*AR signals from the CCX. The A*i*AR signal indicates that the Memory assigned to the corresponding Processor-*i* has received an Actual Address. The A*i*AR signal, together with the corresponding DH*i*C signal, provides a notification to the CIS that a Memory has received the Actual Word Address supplied by the CIS.

The CAX receives the DHA0–9 signals and the above-mentioned DHAM and DH*i*E signals from the CIS. The DHA0–9 signals represent an Actual Word Address generated by the CIS. The CAX transmits signals representing this Actual Word Address to the Memory assigned to the initiating Processor. The DH*i*E signal controls the CAX input gates to enable transfer of the Symbolic Word Address supplied by the corresponding Processor-*i* to the CIS and to inhibit transfer of this Address to the assigned Memory. The DHAM signal, together with the DH*i*E signal, controls the CAX to transfer the Actual Word Address supplied by the CIS to the Memory assigned to the corresponding Processor-*i*.

The CAX transmits the A*j*W0–9 and A*j*B0–4 signals to the corresponding Memory-*j*. The A*j*W0–9 signals represent an Actual Word Address. The A*j*B0–4 signals represent an Actual Block Address.

The CAX also transmits the A*j*AP, A*j*RD, A*j*WR, and A*j*DW signals to the corresponding Memory-*j*. The A*j*AP signal controls the starting of a cycle in Memory-*j*. The A*j*RD and A*j*WR signals control Memory-*j* to execute a respective Read-Restore or Clear-Write cycle. The A*j*DW signal controls the memory cycle in Memory-*j* to be a double-word cycle.

The CAX transmits the DHSM, DHS0–9, and DHAR signals to the CIS. The DHSM signal denotes the presence of a Symbolic Word Address on the CIS input lines. The DHS0–9 signals represent a Symbolic Word Address supplied by a Processor. The DHAR signal notifies the CIS that a Memory has received the Actual Word Address supplied by the CIS.

The CCX receives the J*j*AR signals from the corresponding Memory-*j*. The J*j*AR signal denotes the receipt by Memory-*j* of an Actual Address. The CCX transmits signals representing the information provided by the J*j*AR signals to the Processor to which Memory-*j* is assigned.

The CCX receives the above-mentioned DX*ij* signals from the CIC-R/S. The DX*ij* signal enables a set of CCX output gates for transferring acknowledgment control signals representing conditions in the corresponding Memory-*j* to the corresponding Processor-*i*.

The CCX receives the above-mentioned B*j*FP and B*j*LP signals from the CIC-B/S. The CCX transmits signals representing the information provided by the B*j*FP and B*j*LP signals to the Processor to which the corresponding Memory-*j* is assigned.

The CCX transmits the A*i*FP, A*i*LP and the above-mentioned A*i*AR signals to the corresponding Processor-*i*. The A*i*FP and A*i*LP signals denote the receipt and storage by the assigned Memory of a respective First Data Word or Last Data Word supplied by the corresponding Processor-*i*. The A*i*AR signal is also transmitted to the CAX.

CIS-system interconnections

As shown in FIG. 8, the CIS communicates mainly with and is primarily controlled by the CCS. However, three sets of control signals are transmitted directly between the Processors and the CIS.

The significance of all signals transmitted between the CIS and the CCS has been set forth in the immediately preceding subsection. Therefore, only the manner in which these signals affect the operation of the CIS will be described herein. The CIS receives the DH*i*C, DHSM, DHS0–9 and DHAR signals during a Translate Mode operation. The DH*i*C signals controls the setting of a corresponding flip-flop in the CIS Request Register when the request represented by this signal is received by the CIS. The DHSM signal controls the Sequencer, which in turn controls the CIS to translate the Symbolic Word Address received. The Symbolic Word Address, represented by the DSH0–9 signals, is translated by the CIS to an Actual Word Address. The DHAR signal, which issues following receipt by a Memory of the Actual Word Address generated by the CIS, controls the termination of the Translate Mode operation of the CIS.

The CIS receives the FC*i*S signals during each Passive Mode operation, the DD*i*T signals during a Passive Mode read operation and the DD*i*R and DHW0–3 signals during a Passive Mode write operation. The FC*i*S signal controls the setting of a corresponding flip-flop in the Passive Mode Request Register and a flip-flop in the CIS Request Register. The DD*i*T signal, which indicates that the CDX output gates coupled to the corresponding DAP-*i* have been enabled, initiates execution of the Passive Mode read operation to transfer signals representing a priority level in the PL Table from the CIS to DAP-*i*. The DD*i*R signal, which indicates that the CDX input gates coupled to the corresponding DAP-*i* have been enabled to transmit a priority level representation to the CIS, initiates execution of the Passive Mode write operation to store the priority level, represented by the DHW0–3 signals, in the PL Table.

The CIS transmits the DH*i*E, DHAM and the DHA0–9 signals during a Translate Mode operation. The DSRW and DDR*i* signals are transmitted during each Passive Mode operation. The DRPM, DHRP and DHR0–3 signals are transmitted only during the Passive Mode read operation.

The CIS receives the DAN*i* signal from the corresponding DAP-*i*. The DAN*i* signal indicates that DAP-*i* is not fully operational. This signal prevents the CIS from selecting DAP-*i* for an interrupt operation.

The CIS transmits the DAD*i* signal to the corresponding DAP-*i*. The DAD*i* signal notifies DAP-*i* that it has been selected by the CIS for a Self-Interrupt or Request-Interrupt operation.

The CIS transmits the DF*i*C signal to the corresponding Processor-*i*. The DF*i*C signal, generated by the CIS during a Translate Mode operation, alerts Processor-*i* for a subsequent communication with the Processor initiating the operation.

Processors

Each DAP executes a program independently of the programs currently being executed by the other Processors. The DAP obtains the instruction words of the program it is executing from the Memory group in the sequential order in which the program is to be executed. As each instruction is obtained by a DAP, it is executed. Most instructions require the DAP to communicate with the Memory group, either to retrieve an operand word which the instruction controls the DAP to process or to store an operand word representing information which is the result of processing, before the DAP obtains the next instruction. The DAP executes both Subject and Operating System programs in this manner.

Each time the DAP must communicate with the Memory group to retrieve an instruction or to retrieve or store an operand, the DAP requests such communication from the CAT. Each such request must be accompanied by a representation of the address of a discrete storage location in the Memory group.

Inasmuch as the Operating System schedules Subject Programs according to their urgency and also according to the availability of the Memory group storage space and the external devices required by each Subject Program, the memory address representations of a Subject Program are symbolic. Each address representation supplied by a DAP identifies neither a specific one of Memories 20–26 nor a specific memory location in any one of these Memories, but instead merely identifies symbolically a memory location. All of the addresses of each Subject Program, however, identify a contiguous set of symbolic memory locations within which all of the Subject Program instructions are stored, within which all of the information to be processed is stored, within which all of the processed information is stored, and within which all of the intermediate results of processing are stored. When the Operating System schedules a Subject Program for execution it is assigned a Program Number. The Program Number, together with the Symbolic Address, comprises a complete symbolic representation of an address for submission to the CCS. It is this symbolic representation which is translated, in whole or in part, by the CCS to represent a particular one of Memories 20–26 and a specific location within such Memory. Further details concerning the Symbolic Address and the translation thereof are provided subsequently under the section describing the CAT.

The CAT accepts the DAP requests according to predetermined priorities allocated to all of the Processors, for each accepted request translates the symbolic representation of an address into an identification of a particular one of Memories 20–26 and a specific location in such Memory, and provides signals to control the remainder of the CCS to provide the requested communication between the initiating DAP and the assigned Memory.

In the instant embodiment, the PEP is allocated highest priority among the Processors for recognition by the CAT, and DAP-A, DAP-B, and DAP-C are allocated successively lower priorities.

The PEP, as represented in the instant embodiment, does not execute Subject Programs or Operating System programs. Instead, the PEP executes a special sequence of instructions, most of which are not supplied by the Memory group, but are generated within the PEP. However, it is within the scope of the instant invention to employ a DAP, in place of the PEP. In executing the special sequence of instructions, the PEP must address the Memory group in order to transfer Data Words between the Memory group storage locations and external devices. The PEP transfers instructions and operands into the Memory group for use by a Subject Program and receives operands processed by a Subject Program from the Memory group. Therefore, the PEP also supplies a symbolic representation of an address to the CCS when it requests communication with the Memory group, and these representations are also translated in the CCS.

Operating System programs which are executed by a DAP also must have the addresses thereof translated by the CCS. However, since the Operating System programs are always stored in the Memory group and remain substantially unchanged, each such program is always assigned the same memory storage locations each time it is executed. Accordingly, the Operating System programs are provided with a fixed Program Number, Program Number zero. A Subject Program can never be assigned Program Number zero when it is scheduled for execution by the Operating System, so that the Symbolic Addresses of a Subject Program cannot be translated to identify a location in the Operating System Memory. Thus, the Operating System Memory is automatically protected by the instant invention from being interfered with or erroneously written into by a Subject Program.

When a Subject Program requires execution of an Operating System program, a request for a priority interrupt operation must be made to the CIS. The Processor making the request, instead of supplying its currently assigned Program Number as part of the address representation, supplies the Program Number zero. The resulting address representation is translated partially by the CAT and partially by the CIS and functions to control the CIS to initiate the required priority interrupt operation. In this instance, the CIS supplies the Actual Address.

Processors which may be employed herein are well known in the art and will not be described in detail. Generally, the Processor of any general purpose Data Processing System which can accept and execute instructions in sequence and which can communicate with an addressable Memory to obtain instructions and to obtain or store operands can be employed in the instant invention. A particularly useful Processor which may be employed herein is that described in the copending United States patent application by T. J. Beatson et al., filed Apr. 6, 1965, Ser. No. 446,067, for an Address Development Apparatus for Multi-Address Instructions, which is assigned to the same assignee as the instant invention. In particular, the Program Processor described in the T. J. Beatson et al. application may be utilized for any one or all of the Processors identified herein.

The signals which are supplied by a Processor and the general operation of the Processor are described in a succeeding Processor-Memory Communication subsection.

*Memory group*

The Memory group comprises a plurality of Memories 20–26. Each Memory stores a plurality of Data Words in a corresponding plurality of storage locations. Each such location is identified and accessible by a unique numerical address for that Memory. For example, if a Memory has the capacity for storing 64,000 Data Words, each address from 0 to 63,999 uniquely identifies a respective one of the storage locations in this Memory.

Memories of two types may be employed herein. The first type, which may be identified as a read-write Memory, (a) receives and stores Data Words and (b) retrieves and transmits stored Data Words. The second type, which may be identified as a read-only Memory, only retrieves and transmits stored Data Words.

A Data Word is stored in or retrieved from a storage location identified symbolically by a Processor requesting communication with such location. The requesting Processor supplies a symbolic representation of the storage location address, and this symbolic representation is translated by the CCS to an identification of a particular one of Memories 20–26 and to an actual numerical address of a storage location in the identified Memory. The actual address is then transferred to the identified Memory for initiating communication between the addressed storage location and the requesting Processor.

In the read-write Memory described above, a Data Word is obtained therefrom by a Processor controlling the Memory to execute a memory cycle termed a Read-Restore cycle. In the Read-Restore cycle a Data Word is first retrieved from the address storage location and transferred into a Memory Register, and at the same time this storage location is cleared. The contents of the Memory Register are then transferred to the requesting Processor and also returned to the original Memory location for storage. A data Word is stored in the read-write Memory by a Processor controlling the Memory to execute a memory cycle termed a Clear-Write cycle. In the Clear-Write cycle the addressed storage location is first cleared, the Data Word to be stored is transmitted next from the requesting Processor to the Memory Register, and the contents of the Memory Register are then transferred into the addressed storage location.

When a Processor requests a Data Word from a read-only Memory, it will provide the same signals as provided in controlling a read-write Memory to execute a Read-Restore cycle. However, usually a read-only Memory will not clear the addressed storage location when the Data Word therein is retrieved and, consequently, the Restore function is unnecessary.

If a Processor is to exercise its facility of retrieving or storing two Data Words with a single request, at least one of the Memories employed in the instant invention should have the capability for executing a double-word cycle. During a double-word cycle two Data Words are transferred successively between the requesting Processor and a Memory. Two Data Words may be retrieved by controlling one form of Memory to execute two successive Read-Restore cycles, the two cycle obtaining Data Words from adjacently addressed storage locations. In another form of Memory, two Data Words may be retrieved simultaneously in a single Read-Restore cycle, stored temporarily in a double-length Memory Register, and then transmitted successively to a Processor. In a similar manner these Memories store two words in a double-word cycle either by executing two successive Clear-Write cycles to store individual Data Words in adjacent storage locations or by executing a single Clear-Write cycle to store simultaneously two Data Words held in the double-length Memory Register.

All of the various types and forms of Memories described above are well known in the art. Any combination of these types may be employed in the Memory group. The instant invention does not require the employment of a particular type or a particular combination of these Memories.

The control signals to which a Memory responds, the signals which the Memory supplies, and the general operation of the Memory are described in the following Processor-Memory Communication subsection.

*Processor-memory communication*

The interrelated operations of the Processors and Memories will be described herein. The responses of a Memory to the various control and information signals initiated by a Processor and the responses of a Processor to acknowledgment and information signals initiated by a Memory will be described. A description of certain responses of the CCS and CIS to the signals initiated by the Processors and Memories will complete this explanation of the Processor-Memory communication. This description will be set forth with reference to FIGS. 7, 8 and 25.

Figure 25A:
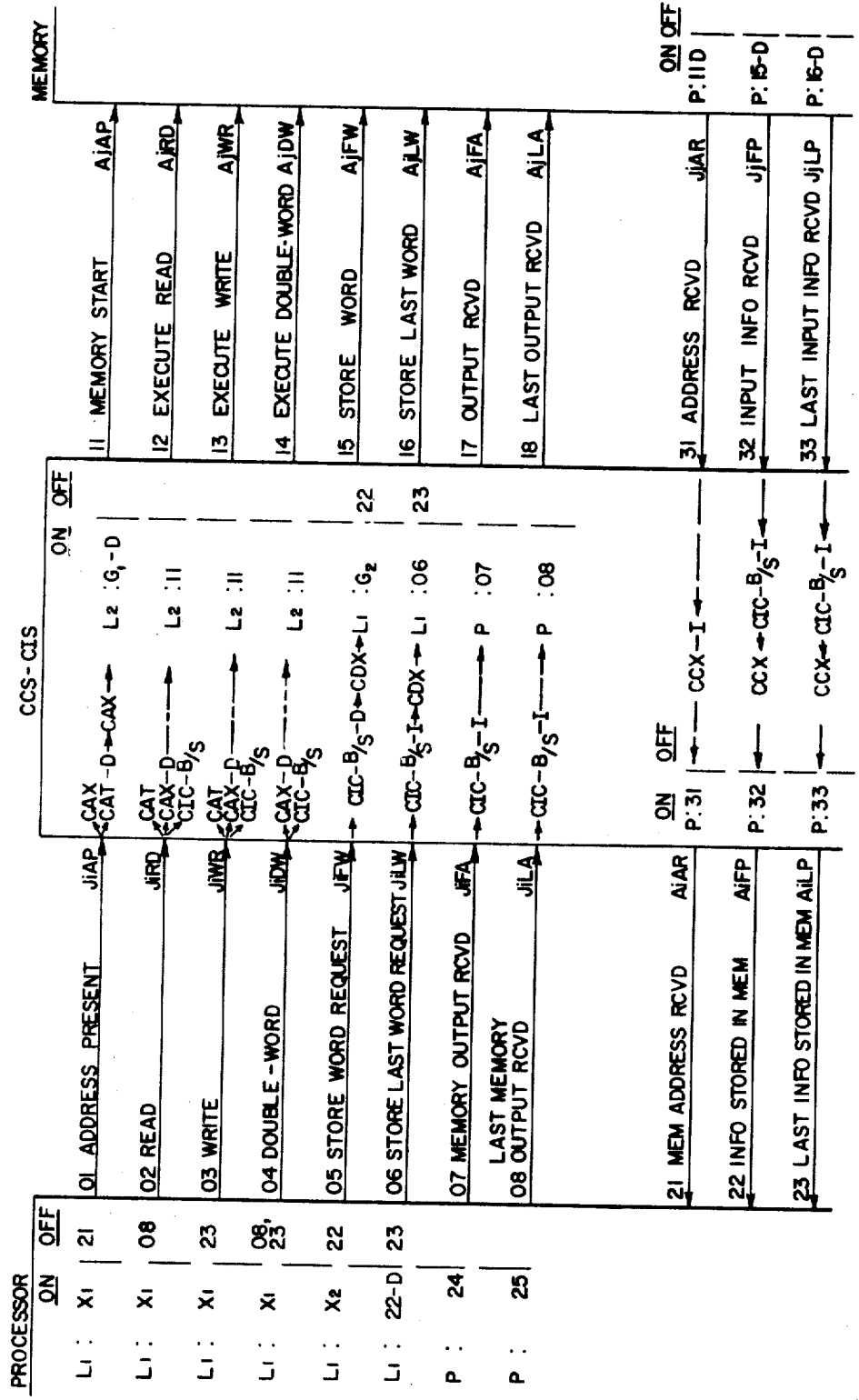
FIGURES 25a and 25b are diagrams illustrating the timing interrelationship of signals transmitted between the major components of the System of FIG. 1.
Figure 25B:
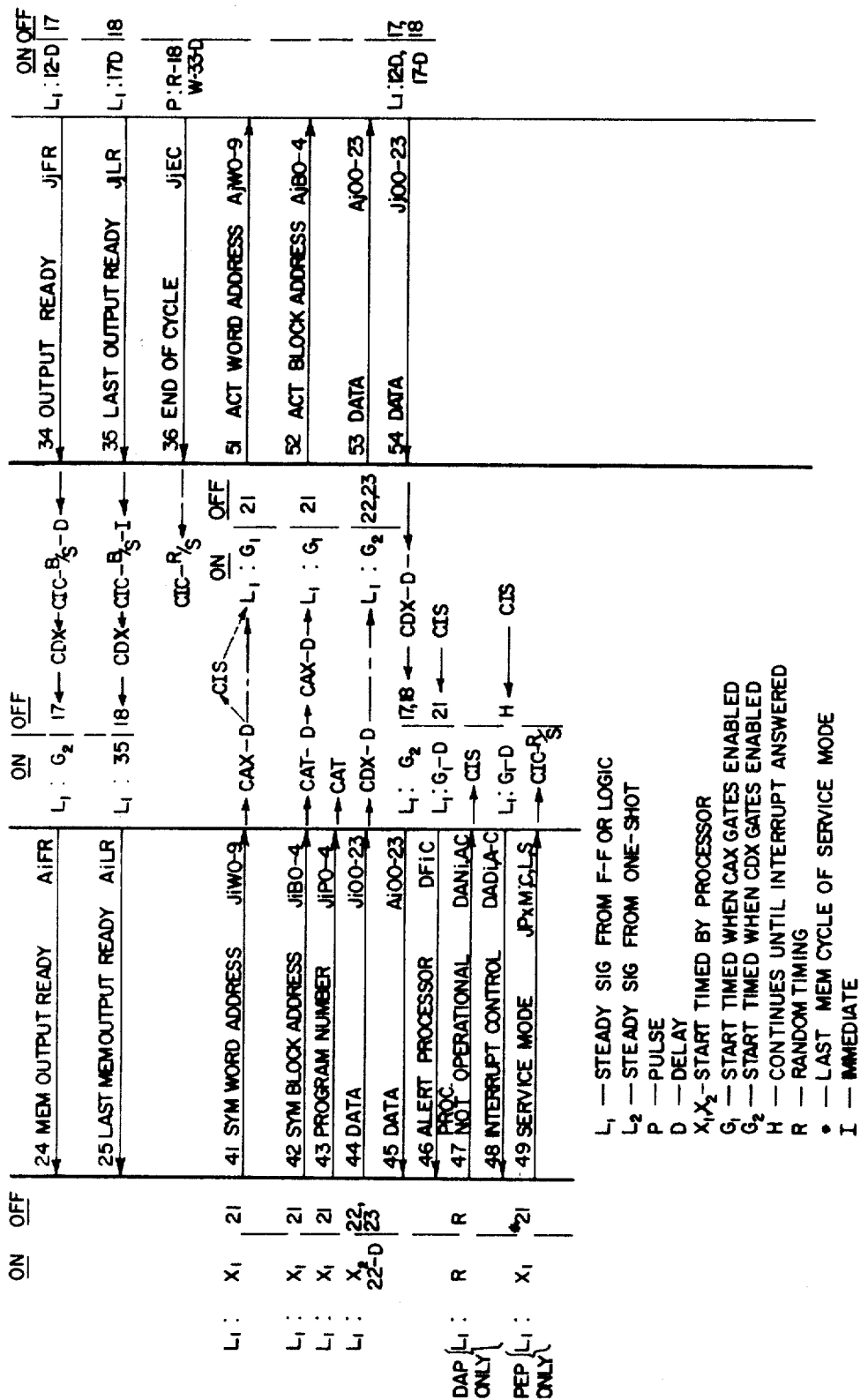

FIGURE 25 illustrates the relative times of occurrence of the signals received and transmitted by the Processors and the Memories. Each illustrated signal or signal set transmitted or received by the Processors and Memories is designated by a unique number in the figure. For example, the J$i$RD signal transmitted from the Processor to the CCS is designated by the number 02. The signals illustrated are of two types, "steady signals" and pulses.

A steady signal provided by a flip-flop or logical gate becomes a binary 1 at a first controllable time and becomes a binary 0 at a later controllable time. These signals are designated as $L_1$ signals in the figure. A steady signal provided by a one-shot is designated as an $L_2$ signal. The $L_2$ signal becomes a binary 1 at a first controllable time, but reverts to a binary 0 at a time determined by the one-shot itself. A pulse generator provides a pulse signal designated as a P signal. The time when the pulse becomes a binary 1 is controllable, but the pulse duration is relatively short compared to the duration of any of the steady signals.

To the left of each signal shown as transmitted from left to right and to the right of each signal shown as transmitted from right to left (FIG. 25), is a designation of the signal type, a designation of the relative time when the signal becomes a binary 1 (is "turned on") and, where applicable, a designation of the relative time when the signal returns to a binary 0 (is "turned off"). For example, the aforementioned J$i$RD signal is a steady signal $L_1$, provided by a flip-flop; becomes a binary 1 at a time $X_1$, which is controlled by the initiating Processor; and reverts to a binary 0 when the designated 08 signal becomes a binary 1. Only the relative time of initiation of $L_2$ signals and pulses is provided. If the letter D is associated with an event, the time of occurrence of the event is delayed from the time of occurrence of the initiating signal. For example, the start of the J$i$LW signal is controlled by, but delayed from, the time when the A$i$FP signal becomes a binary 1.

Communication between a Processor and a Memory is initiated when the Processor requests such communication from the CAT. This request is initiated at a time $X_1$, determinable by the program the Processor is currently executing. The J$i$AP signal and one of the J$i$RD or J$i$WR signals are transmitted by Processor-$i$ to the CAT and constitute the request. The J$i$AP signal indicates that a Symbolic Address is being supplied by Processor-$i$. The J$i$RD and J$i$WR signals indicate that Processor-$i$ is requesting a corresponding Read-Restore or Clear-Write memory operation. If the Processor requires that two Data Words be transferred during the requested communication, the J$i$DW signal is also provided at this time. The Symbolic Address provided comprises a Symbolic Word Address, represented by the J$i$W0–9 signals, a Symbolic Block Address, represented by the J$i$B0–4 signals, and a Program Number, represented by the J$i$P0–4 signals.

Upon accepting the request, the CAT translates the combined Symbolic Block Address and Program Number into (1) an identification of the Memory which the CAT assigns to the requesting Processory for communication and (2) an Actual Block Address for such Memory. The CAT then notifies the CIC-R/S that Processor-$i$ has made a memory request and identifies the particular Memory assigned to the Processor. The CIC-R/S interprets this notification as a request and stores the request, provided the assigned Memory is not busy. The request normally is granted immediately if the Memory required by Processor-$i$ is not also being requested by a Processor allocated higher priority, the CIC-R/S granting the request by initiating a memory start signal and by enabling CAX gates to transfer the Actuall Address to the assigned Memory.

The time when the CIC-R/S grants communication of the Processor to its assigned Memory is designated as time $G_1$ in FIG. 25. At this time the Actual Address, which comprises the original Symbolic Word Address, and the Actual Block Address generated by the CAT, is transmitted to the assigned Memory-$j$. The Actual Address is represented by the A$j$W0–9 and A$j$B0–4 signals. Following a predetermined delay after time $G_1$, the A$j$AP memory start signal is transmitted to Memory-$j$. The memory start signal enables a Memory to initiate a Read-Restore cycle immediately or a Clear-Write cycle upon receipt of the appropriate store signal from the requesting Processor.

The description of the subsequent interrelated operations of the Memory and the Processor will be described according to the category of Memory cycle involved.

Double-word, read-restore

The double-word, Read-Restore memory operation is executed in response to a Processor-$i$ providing the J$i$RD and J$i$DW signals at time $X_1$, the time of the request. When the CAX delivers the memory start signal A$j$AP, it also delivers the A$j$RD signal, which controls Memory-$j$ to execute a Read-Restore memory cycle, and the A$j$DW signal, which controls the memory cycle to be a double-word cycle. Delivery of the A$j$AP, A$j$RD, and A$j$DW signals is delayed a predetermined duration following time $G_1$. Inasmuch as the Actual Address signals are received by Memory-$j$ at time $G_1$, the Memory transmits the J$j$AR pulse in response to the A$j$AP signal. The J$j$AR pulse, denoting that Memory-$j$ has received the Actual Address, is transferred through the CCX, and redesignated as the A$i$AR pulse, is transmitted to the requesting Processor-$i$. The A$i$AR pulse indicates to Processor-$i$ that its request has been granted and that a memory cycle has been initiated in the assigned Memory. In response to the A$i$AR pulse, the J$i$AP signal and all signals provided by Processor-$i$ for representing a Symbolic Address are terminated. Termination of the J$i$AP signal, in turn terminates the Actual Block Address signals provided by the CAT.

Responding to the A$j$RD signal, Memory-$j$ executes a Read-Restore cycle to transfer a First Data Word into the Memory Register. The J$j$FR signal is thereupon transmitted to notify the requesting Processor that the First Data Word, represented by the J$j$00–23 signals, is available from Memory-$j$. When the CIC-B/S enables the CDX gates to grant the Data Bus for communication between the requesting Processor and Memory-$j$, denoted by time $G_2$, the CDX transmits the J$j$FR signal and the Data Bus transmits the First Data Word from Memory-$j$ to the Processor. The First Data Word transmitted by the Data Bus to Processor-$i$ is represented by the A$i$00–23 signals. The J$j$FR signals is received by Processor-$i$, redesignated as the A$i$FR signal and notifies Processor-$i$ that it may now accept the First Data Word.

Processor-$i$ thereupon accepts the First Data Word and transmits an acknowledgment signal, the J$i$FA pulse, to the CIC-B/S. The J$i$FA pulse is transferred through the CIC-B/S and, redesignated as the A$j$FA pulse, is transmitted to Memory-$j$. The A$j$FA pulse notifies Memory-$j$ that the First Data Word supplied thereby has been received by the requesting Processor and that the Memory may terminate transmission of this Data Word. The J$j$FR signal and the First Data Word J$j$00–23 signals are thereupon terminated.

The Last Data Word is immediately prepared by the Memory and supplied as a second set of J$j$00–23 signals. The J$j$LR signal, notifying of the availability of this Last Data Word, is thereupon transmitted by Memory-$j$ to the CCS. The Last Data Word is immediately transmitted by the Data Bus to the requesting Processor-$i$. At the same time the J$j$LR signal, redesignated as the A$i$LR signal, is transmitted to Processor-$i$. The A$i$LR signal notifies Processor-$i$ that it may now accept the Last Data Word.

Processor-$i$ thereupon accepts the Last Data Word and transmits the J$i$LA acknowledgment pulse to the CIC-B/S. Upon transmission of the J$i$LA pulse, Processor-$i$ terminates the J$i$RD and J$i$DW signals since the Processor no longer has need for Memory-$j$ in the instant operation. The J$i$LA pulse is transferred through the CIC-B/S and, redesignated as the A$j$LA pulse, is transmitted to Memory-$j$. The A$j$LA pulse notifies Memory-$j$ that the required double-word Read-Restore cycle functions have been completed and that the memory cycle may be terminated. The memory cycle is terminated by terminating the J$j$LR signal and the J$j$00–23 signals. Memory-$j$ thereupon transmits the J$j$EC signal to the CCS to clear all flip-flops therein which are controlling the instant Memory-Processor communication and thereby enables the CIC-B/S to assign the Data Bus to another Processor requesting communication with a Memory.

Single-word, read-restore

The single-word, Read-Restore memory operation is executed in response to a Processor-$i$ providing the J$i$RD signal at time $X_1$, the J$i$DW signal continuing as a binary 0. This operation is substantially the same as the first portion of the double-word, Read-Restore operation in which the First Data Word is obtained. The primary difference is that for each control or acknowledgment signal provided for the First Data Word, the corresponding control or acknowledgment signal for the Last Data Word is provided simultaneously. Hence, when the single Data Word has been retrieved from the Memory and transferred to the Processor, the presence of the Last Data Word control and acknowledgment signals enable immediate termination of the communication.

Thus, the J$j$LR signal is generated by Memory-$j$ concurrently with the J$j$FR signal. The corresponding A$i$LR and A$i$FR signals are transmitted simultaneously to Processor-$i$. The J$i$LA pulse, responding to the A$i$LR signal, issues simultaneously with the J$i$FA pulse, denoting that although Processor-$i$ has just received the First Data Word, it is not expecting another Data Word. Finally, the corresponding A$j$LA and A$j$FA pulses are transmitted simultaneously to Memory-$j$. The A$j$LA pulse notifies Memory-$j$ that the required functions of the Read-Restore cycle have been completed and that Memory-$j$ must terminate its communication with Processor-$i$ by issuing the J$j$EC signal.

Double-word, clear-write

The double-word, Clear-Write memory operation is executed in response to a Processor-$i$ providing the J$i$WR and J$i$DW signals at time $X_1$, the time of the request. When the CAX delivers the memory start signal A$j$AP, it also delivers the A$j$WR signal, which controls Memory-$j$ to execute a Clear-Write memory cycle, and the A$j$DW signal, which controls the memory cycle to be a double-word cycle. Delivery of the A$j$AP, A$j$WR, and A$j$DW signals is delayed a predetermined duration following time $G_1$. Inasmuch as the Actual Address signals are received by Memory-$j$ at time $G_1$, the memory transmits the J$j$AR pulse in response to the A$j$AP signal. The J$j$AR pulse, denoting that Memory-$j$ has received the Actual Address, is transferred throug the CCX and, redesignated as the A$i$AR pulse, is transmitted to the requesting Processor-$i$. The A$i$AR pulse indicates to Processor-$i$ that its request has been granted and that a memory cycle is ready to be initiated in the assigned Memory when the First Data Word is received. In response to the A$i$AR pulse, the J$i$AP signal and all signals provided by Processor-$i$ for representing a Symbolic Address are terminated. Termination of the J$i$AP signal, in turn, terminates the Actual Block Address signals provided by the CAT.

At the time of making the memory request, or immediately thereafter, at time $X_2$, a Processor-$i$ supplies a First Data Word, represented by the J$i$00–23 signals, on the Processor output lines coupled to the CDX. At the same time Processor-$i$ supplies the J$i$FW signal, denoting the availability of this First Data Word. When the CIC-B/S enables the CDX gates to grant the Data Bus for communication between the requesting Processor and Memory-$j$, denoted by time $G_2$, the CDX transmits the J$i$FW signal and the Data Bus transmits the First Data Word to Memory-$j$. The First Data Word transmitted by the Data Bus to Memory-$j$ is represented by the A$j$00–23 signals. The J$i$FW signal is received by Memory-$j$, redesignated as the A$j$FW signal, and notifies Memory-$j$ that it may now accept the First Data Word. Memory-$j$ thereupon executes a Clear-Write cycle to store the First Data Word in the memory location designated by the Actual Address.

Immediately following storage of the First Data Word, Memory-$j$ transmits an acknowledgment signal, the J$j$FP pulse, to the CCS. The J$j$FP pulse is transferred through the CCS and, redesignated as the A$i$FP pulse, is transmitted to Processor-$i$. The A$i$FP pulse notifies Processor-$i$ that the First Data Word supplied thereby has been received and stored by the assigned Memory, and that the Processor may terminate transmission of this Data Word. The J$i$FW signal and the First Data Word J$i$00–23 signals are thereupon terminated.

The Last Data Word is immediately prepared by the Processor and supplied as a second set of J$i$00–23 signals. The J$i$LW signal, notifying of the availability of this Last Data Word, is thereupon transmitted by Processor-$i$ to the CCS. The Last Data Word is immediately transmitted by the Data Bus to the assigned Memory-$j$. At the same time, the J$i$LW signal, redesignated as the A$j$LW signal, is transmitted to Memory-$j$. The A$j$LW signal notifies Memory-$j$ that it may now accept the Last Data Word. Memory-$j$ thereupon executes a Clear-Write cycle to store the Last Data Word.

Immediately following storage of the Last Data Word, Memory-$j$ transmits the J$j$LP acknowledgment pulse to the CCS. The J$j$LP pulse is transferred through the CCS and, redesignated as the A$i$LP pulse, is transmitted to Processor-$i$. Following this transmission of the J$j$LP pulse the Memory, having completed the required double-word, Clear-Write cycle functions, transmits the J$j$EC signal to the CCS to clear all flip-flops therein which are controlling the instant Memory-Processor communication. The A$i$LP pulse notifies Processor-$i$ that the required double-word, Clear-Write cycle functions have been completed and that the Processor may terminate the control signals. The Processor thereupon terminates the J$i$WR, J$i$DW, J$i$LW, and J$i$00–23 signals.

If the Memory involved is of the form wherein two Data Words may be stored simultaneously in a single Clear-Write cycle, the First Data Word is entered into the Memory Register upon receipt by the Memory, but a Clear-Write cycle is not then executed. Instead, the J$j$FP acknowledgment signal is immediately transmitted to initiate transfer of the Last Data Word from the Processor. Upon receipt, the Memory enters the Last Data Word into the Memory Register, a Clear-Write cycle is immediately executed to store both Data Words, and the Last Data Word acknowledgment signal, the J$i$LP signal, is then transmitted to the initiating Processor.

Single-word, clear-write

The single-word, Clear-Write memory operation is executed in response to a Processor-$i$ providing the J$i$WR signal at time $X_1$, The J$i$DW signal continuing as a binary 0. This operation is substantially the same as the first portion of the double-word, Clear-Write operation in which the First Data Word is stored in a Memory. The primary difference is that for each control or acknowledgment signal provided for the First Data Word, the corresponding control or acknowledgment signal for the Last Data Word is provided simultaneously. Hence, when the single Data Word has been transferred from the Processor and stored in the Memory, the presence of the Last Data Word control and acknowledgment signals enable immediate termination of the communication.

Thus, the J$i$LW signal is generated by Processor-$i$ concurrently with the J$i$FW signal. The corresponding A$j$LW and A$j$FW signals are transmitted simultaneously to Memory-$j$. Upon storage by the Memory of the single Data Word supplied by Processor-$i$, the J$i$LP pulse issues simultaneously with the J$j$FP pulse, denoting that although Memory-$j$ has just received the First Data Word, it is not expecting another Data Word. Finally, the corresponding A$i$LP and A$i$FP pulses are transmitted simultaneously to Processor-$i$. The A$i$LP pulse notifies Processor-$i$ that the required functions of the Clear-Write cycle have been completed and that Processor-*i* may terminate the signals provided for controlling Memory-*j* to execute a Clear-Write cycle. Following issuance of the J*j*LP pulse, Memory-*i* terminates its communication with Processor-*i* by issuing the J*j*EC signal.

Other communications

Certain other signals not described above are transmitted between a Processor and the CCS or CIS.

A Processor is alerted to receive a communication from another Processor by the CIS transmitting the DF*i*C signal to the particular Processor-*i* being alerted. This signal is generated during a CIS Translate Mode operation after the CAX input gates have been enabled for the initiating Processor. The CIS thereupon transmits the FD*i*C signal to the particular Processor-*i* denoted by the Symbolic Word Address supplied by the initiating Processor. The FD*i*C signal terminates upon generation of the J*j*AR pulse by the assigned Memory, the J*j*AR pulse denoting receipt by this Memory of a dummy Actual Word Address supplied by the CIS during this Translate Mode.

A DAP-*i* is notified that it has been selected for a Self-Interrupt or a Request-Interrupt operation by the CIS transmitting the DAD*i* signal. This signal is generated during a Translate Mode operation after the CAX input gates have been enabled for the initiating Processor. The DAD*i* signal continues until the notified DAP-*i* responds by initiating a Passive Mode read operation in the CIS.

A DAP-*i* notifies the CIS that it is not operational by transmitting the corresponding DAN*i* signal to the CIS. This signal continues until DAP-*i* is restored to normal operation and the DAN*i* signal cleared.

The PEP requests a Service Mode type of communication with a Memory by transmitting the JP*x*M signal corresponding to the type of Service Mode requested. The JP*x*M signal continues until the final memory cycle required by the particular Service Mode has been entered and the Memory indicates that it has received an address for this last cycle by initiating transmission of the APAR pulse.

CENTRAL ADDRESS EXCHANGE

The primary function of the CAX is to accept address-representing signals from the CAT, the Processors and the CIS and to transmit these signals as Actual Addresses to the Memories. In the instant embodiment, the CAX can effect four address transmissions simultaneously whereby memory cycles can be initiated simultaneously in four different Memories. Each such Memory cycle can effect the retrieval or storage of one or more Data Words for a corresponding Processor.

The Actual Address transmitted to a Memory by the CAX is represented by 15 signals, five signals representing an Actual Block Address supplied by the CAT and 10 signals representing an Actual Word Address. The Actual Word Address is either the Symbolic Word Address supplied by a requesting Processor or the Actual Word Address generated by the CIS.

In addition to its primary function, the CAX also transmits to the Memories control signals generated both by the requesting Processor and by the CAT.

For clarity, the CAX is described herein as comprising three sections: the Input Gate Section, FIG. 9; the Output Gate Section A, FIG. 10; and the Output Gate Section B, FIGS. 11 and 12. The Input Gate Section transfers a Symbolic Word Address supplied by a Processor as an Actual Word Address to Output Gate Section A or transfers the Symbolic Word Address to the CIS and an Actual Word Address generated by the CIS to Output Gate Section A. Four different Actual Word Addresses may be transferred simultaneously by the Input Gate Section to Output Gate Section A. Output Gate Section A receives the Actual Word Addresses supplied by the Input Gate Section and the Actual Block Addresses supplied by the CAT and transmits Actual Addresses to the Memories. Again, four different Actual Addresses may be transmitted simultaneously by Output Gate Section A to respective Memories. Output Gate Section B receives control signals supplied the Processors and the CAT and transmits these signals to the Memories.

Consider, first, the operation of the Input Gate Section of FIG. 9 when a Processor makes a normal request of the CAT for communication with a Memory. During such an operation, the CIS does not participate. The request is initiated when a Processor supplies a Symbolic Address and a J*i*AP signal, the latter signal denoting that a Symbolic Address is being supplied by Processor-*i*. The Symbolic Address includes a Symbolic Word Address, represented by the J*i*W0–9 signals. The J*i*W0–9 signals are applied by the requesting Processor-*i* to input leads of a corresponding AND-gate set 210. Each set 210 comprises ten AND-gates for receiving the respective signals representing a Symbolic Word Address. Each of these AND-gates receives a respective one of the ten signals of the corresponding Symbolic Word Address on one of the two input leads thereof. The other input lead of all AND-gates of each gate set 210 receives the output signal provided by a respective inverter 211.

With the CIS not participating in the operation, the input signal applied to each inverter 211 represents a binary 0 and, therefore, the inverter delivers an output signal representing a binary 1. Accordingly, all AND-gates of each gate set 210 receive a binary 1 signal on one input lead thereof to enable transmission through the gate set of the corresponding Symbolic Word Address signals received on the other input leads. The output signals delivered by each AND-gate set 210 are coupled to input leads of a corresponding OR-gate set 216. Each set 216 comprises ten OR-gates for receiving the respective signals delivered by the corresponding AND-gate set 210. Each of these OR-gates receives a respective one of the ten signals representing a Symbolic Word Address on one of the two input leads thereof. Accordingly, each gate set 216 transmits immediately the Symbolic Word Address signals received from the corresponding AND-gate set 210.

The OR-gate sets 216 are coupled to Output Gate Section A by respective leads sets 217, 218, 219 and 220. The ten signals delivered on each of these leads sets represent an Actual Word Address for a corresponding one of the Processors.

For example, assume that DAP-A is requesting communication with a Memory. DAP-A supplies the JAAP and JAW0–9 signals. The JAW0–9 signals represent a Symbolic Word Address for the Memory that is assigned to DAP-A by the CAT. The JAW0–9 signals are applied to a gate set 210. Since the AND-gates of this set are enabled by the binary 1 output, signals of the corresponding one of inverters 211, signals representing the Symbolic Word Address are transmitted through this gate set to the corresponding OR-gate set 216. This gate set 216 then transmits the Symbolic Word Address signals on lead set 218 to Output Gate Section A, these signals being redesignated as Actual Word Address signals.

Consider, next, the operation of the Input Gate Section when a Processor requests that CAT to initiate a Translate Mode operation in the CIS. The request is again initiated when a Processor supplies a Symbolic Address and a J*i*AP signal. A particular Symbolic Address for the instant embodiment is selected to notify the CAT of this specific request. The notification is provided when the Symbolic Block Address represents the block number 0 and when the Program Number represents the number 0. The Symbolic Word Address of the Symbolic Address, represented by the J*i*W0–9 signals, is applied by the requesting Processor-*i* to input leads of a corresponding AND-gate set 222. Each set 222 comprises ten AND-gates for receiving the respective signals representing a Symbolic Word Address. Each of these AND-gates receives a respective one of the ten signals of the corresponding Symbolic Word Address on one of the two input leads thereof. The other input lead of all AND-gates of each gate set 222, receives the input signals applied to the respective inverter 211.

The CAT interprets the request of Processor-*i* and generates a corresponding DH*i*C signal. The DH*i*C signal is transmitted to the Input Gate Section and is also transmitted to the CIS to notify the CIS of the request of Processor-*i* for a Translate Mode operation. When the CIS accepts the request and is ready to initiate a Translate Mode operation for Processor-*i*, it transmits the corresponding DH*i*E signal to the Input Gate Section and to the CIS-R/S. This DH*i*E signal now representing a binary 1, is coupled to all of the AND-gates of the gate set 222 that receives the Symbolic Word Address supplied by the requesting Processor-*i*. The DH*i*E signal thereupon enables transmission through this gate set of the Symbolic Word Address signals.

The output signals delivered by each AND-gate set 222 are coupled to respective input leads of an OR-gate set 223. OR-gate set 223 comprises ten OR-gates, each having four input leads for receiving the corresponding ones of the ten signals delivered by each of the four AND-gate sets 222. Accordingly, OR-gate set 223 transmits immediately the Symbolic Word Address signals received from an AND-gate set 222, the output signals of OR-gate set 223 being designated as the DHS0–9 signals.

The DH*i*E signal is also applied to a corresponding one of AND-gates 224. Each of AND-gates 224 has two input leads, receiving a respective one of the DH*i*E signals on one input lead and a respective one of the J*i*EP signals on the other input lead. Accordingly, the one of AND-gates 224 corresponding to the Processor requesting the Translate Mode operation is enabled at the time of the request by the J*i*AP signal. When the corresponding DH*i*E signal becomes a binary 1, this AND-gate 224 delivers an output signal representing a binary 1 to an input lead of an OR-gate 225. OR-gate 225 has four input leads, each lead being coupled to receive the output signal of a respective one of AND-gates 224. Therefore, OR-gate 225 transmits immediately the signal delivered by an AND-gate 224. The output signal delivered by OR-gate 225 is designated as the DHSM signal. The DHSM signal is transmitted to the CIS at the same time as the Symbolic Word Address to provide a notification that a Symbolic Word Address is now available to the CIS.

In response to the DHSM signal, the CIS accepts the DHS0–9 signals, executes an Address Translation operation on the Symbolic Word Address represented by these signals, and delivers an Actual Word Address represented by the DHA0–9 signals. At the same time that the DHA0–9 signals are transmitted by the CIS to the Input Gate Section, the CIS also transmits the DHAM signal to notify of the presence on CIS output lines of an Actual Word Address during a Translate Mode operation.

The DHA0–9 signals are applied to input leads of all of the AND-gate sets 228. Each set 228 comprises ten AND-gates for receiving the respective signals representing the Actual Word Address delivered by the CIS. Each of these AND-gates receives a respective one of the ten signals of the Actual Word Address on one of the three input leads thereof. A second input lead of all AND-gates of all gate sets 228 receives the DHAM signal. The third input lead of all AND-gates of each gate set 228 receives the respective DH*i*E signal. Accordingly, all gates of the gate set 228 corresponding to the initiating Processor-*i* are enabled by the corresponding DH*i*E signal and activated upon the occurrence of the DHAM signal to transmit therethrough the Actual Word Address received from the CIS.

The output signals delivered by each AND-gate sets 228 are coupled to the second set of input leads of the corresponding OR-gate set 216. Accordingly, the one of gate sets 216 receiving an Actual Word Address from the corresponding one of gate sets 228 transmits immediately the received signals on the respective one of lead sets 217 to 220. Therefore, again, the ten signals delivered on each of these lead sets represent an Actual Word Address for a corresponding one of the Processors.

When the Memory-*j* assigned by the CAT to the requesting Processor-*i* has received the Actual Word Address signals supplied by the CIS, the corresponding J*j*AR signal is transmitted by the Memory. This signal is transferred through the CCX and, deresignated as the A*i*AR signal, is applied to one of the two input leads of a corresponding one of AND-gates 230 of the Input Gate Section. The other input lead of each AND-gate 230 receives and is enabled by the corresponding DH*i*C signal. Accordingly, the one of AND-gates 230 which corresponds to the requesting Processor-*i*, upon receipt of the corresponding A*i*AR signal, transmits an output signal representing a binary 1 to an input lead of an OR-gate 231. OR-gate 231 has four input leads, each lead being coupled to receive the output signal of a respective one of AND-gates 230. Accordingly, OR-gate 231 transmits immediately the signal delivered by an AND-gate 230. The output signal of OR-gate 231 is designated as the DHAR signal. The DHAR signal notifies the CIS that the Actual Word Address being supplied thereby has been accepted by a Memory and that the CIS may terminate the Translate Mode operation.

For example, assume that the DAP-A is requesting the CAT to initiate a Translate Mode operation in the CIS. DAP-A supplies the JAAP and the JAW0–9 signals. Additionally, the Symbolic Block Address and the Program Number supplied by DAP-A as part of the Symbolic Address both represent the numeral zero. The CAT responds to this Symbolic Block Address and Program Number and generates the DHAC signal. When the CIS accepts this request by DAP-A, as designated by the DHAC signal, it generates the DHAE signal. The DHAE signal is applied to the ones of AND-gate sets 222, AND-gates 224, and AND-gate sets 228 that correspond to DAP-A. The enabled AND-gate set 222 thereupon transmits the received Symbolic Word Address signals to OR-gate set 223 and the enabled AND-gate 224 transmits a binary 1 output signal to OR-gate 225. OR-gate set 223 transmits immediately to the CIS the DHS0–9 signals, which now represent the Symbolic Word Address supplied by DAP-A. At the same time OR-gate 225 transmits the DHSM signal to the CIS to provide notification that a Symbolic Word Address is being supplied.

Upon translation of the Symbolic Word Address the CIS transmits an Actual Word Address, represented by the DHA0–9 signals, to the AND-gate sets 228. The DHAM signal is also generated and applied to AND-gate set 228. The DHAE signal and the DHAM signal enable the AND-gate set 228 which corresponds to DAP-A for transmitting therethrough the Actual Word Address supplied by the CIS. The Actual Word Address is then transmitted through the corresponding OR-gate set 216 to Output Gate Section-A on lead set 218.

Output Gate Section A receives the signals representing Actual Word Addresses provided by the Input Gate Section and the Actual Block Addresses provided by the CAT and applies these signals to each of a plurality of Gate Units 235. Each Gate Unit 235 is coupled for transmitting an Actual Address to a corresponding Memory. For example, Gate Unit-JA transmits an Actual Address to Memory-J, Gate Unit-KA transmits an Actual Address to Memory-K, etc. DX*ij* gate enabling signals received from the CIC-R/S enable corresponding ones of AND-gate sets 242 in Gate Units 235 to transmit Actual Addresses between selected Processors and Memories.

Gate Units 235 are alike, each Gate Unit comprising four AND-gate sets 242 and an OR-gate set 243. Therefore, the detailed structure of only one Gate Unit 235 is illustrated in FIG. 10. Each AND-gate set 242 comprises fifteen AND-gates for receiving the respective signals representing an Actual Word Address and an Actual Block Address. Each of these AND-gates receives a respective one of the fifteen signals of the corresponding Actual Address on one of the two input leads thereof. The other input lead of all AND-gates of each gate set 242 receives a respective one of the twenty-eight different DX$ij$ gate enabling signals. The output signals delivered by each of the four AND-gate sets 242 of Gate Unit 235 are coupled to respective input leads of an OR-gate set 243. Each set 243 comprises fifteen OR-gates, each having four input leads for receiving the corresponding ones of the fifteen signals delivered by each of the four related AND-gate sets 242.

When one or more Actual Word Addresses are received by Output Gate Section A on lead sets 217–220, corresponding Actual Block Addresses are also received on lead sets 237, 238, 239 and 240. Lead set 217 and lead set 237 are coupled to the input leads of corresponding ones of AND-gate sets 242 in each Gate Unit 235. Similarly, corresponding lead sets 218 and 238, 219 and 239, and 220 and 240 are coupled to the input leads of respective corresponding AND-gate sets 242 in each Gate Unit. Therefore, when a Processor provides a Symbolic Address, an Actual Word Address and an Actual Block Address are applied to a corresponding AND-gate set 242 in each Gate Unit 235.

A separate DX$ij$ gate enabling signal is coupled to each gate set 242. When the CAT assigns a Memory-$j$ for communication with a Processor-$i$, the corresponding DX$ij$ signal becomes a binary 1 to enable the corresponding AND-gate set 242 to transfer the Actual Address to Memory-$j$.

For example, assume that DAP-A is requesting communication with a Memory. Assume further that the CAT has assigned Memory-J to DAP-A for communication. The Actual Word Address received from the Input Gate Section on lead set 218 and the corresponding Actual Block Address received from the CAT on lead set 238 are applied to the second AND-gate set 242 of all Gate Units 235. When the CIC-R/S grants the request of DAP-A, it generates the DXAJ gate enabling signal. The DXAJ signal thereupon enables the second gate set 242 in Gate Unit-JA to enable transmission of the Actual Address through this gate set. The Actual Address is then immediately transmitted through OR-gate set 243 to Memory-J.

Output Gate Section B, FIGS. 11 and 12, receives control signals provided by the Processors and the CAT and applies these signals to each of a plurality of Gate Units 250. The J$i$RD, J$i$WR, and J$i$DW control signals are received from the Processors and the $\overline{\text{TTiS}}$ control signals from the CAT. Each Gate Unit 250 is coupled for transmitting these control signals to a corresponding Memory. For example, Gate Unit-JB transmits control signals to Memory-J, Gate Unit-KB transmits control signals to Memory-K, etc. DX$ij$ gate enabling signals received from the CIC-R/S enable corresponding ones of AND-gate sets 251 in Gate Units 250 to transmit control signals between selected Processors and Memories.

Gate Units 250 are alike, each Gate Unit comprising four AND-gate sets 251 and an OR-gate set 252. Therefore, the detailed structure of only one Gate Unit 250 is illustrated in FIG. 12. Each AND-gate set 251 comprises four AND-gates 254, 255, 256, and 257 for transmitting four different control signals. AND-gates 254, 255, and 256 are provided with three input leads and AND-gate 257 is provided with two input leads. Each of these AND-gates receives a respective one of the four different control signals relating to a corresponding Processor on a first input lead. The second input leads of all AND-gates of each of the gate sets 251 receive a respective one of the twenty-eight different DX$ij$ gate enabling signals. The third input leads of AND-gates 254, 255 and 256 also receive the corresponding $\overline{\text{TTiS}}$ control signals. The output signals delivered by each of the four AND-gate sets 251 of a Gate Unit 250 are coupled to respective input leads of the corresponding OR-gate set 252. Each set comprises four OR-gates, each having four input leads for receiving the corresponding ones of the four signals delivered by the four related AND-gate sets 251.

When one or more Processors make request of the CAT for communication with a Memory, the corresponding J$i$RD or J$i$WR control signals are provided. If a double-word cycle is requested, the corresponding J$i$DW control signal is also provided. When the CIC-R/S grants each request, it generates the corresponding DX$ij$ gate enabling signal and controls the CAT to generate the corresponding $\overline{\text{TTiS}}$ memory start control signal. A separate DX$ij$ gate enabling signal is coupled to each gate set 251. When the CAT assigns a Memory-$j$ for communication with a Procesor-$i$, the corresponding DX$ij$ signal becomes a binary 1 to enable the respective AND-gate set 251 to transfer these control signals to Memory-$j$.

For example, assume, again, that DAP-A is requesting communication with a Memory for a double-word, Read-Restore cycle. Assume further that the CAT has assigned Memory-J to DAP-A for communication. At the time of making the request, DAP-A provides the JARD and JADW signals. The JARD and JADW signals are applied to the second AND-gate set 251 of all Gate Units 250, the JARD signal being applied to AND-gates 254 and the JADW signal being applied to AND-gates 256 of these Gate Units. When the CIC-R/S grants the request of DAP-A, it generates the DXAJ gate enabling signal. The DXAJ signal thereupon enables the second gate set 251 of Gate Unit-JB. The CAT, responding to the action of the CIC–R/S in granting the request, generates the $\overline{\text{TTAS}}$ signal. The $\overline{\text{TTAS}}$ signal is transmitted immediately through the enabled AND-gate 257 to OR-gate set 252. The $\overline{\text{TTAS}}$ signal also activates the enabled AND-gates 254 and 256. The JARD and JADW signals are then transmitted through gates 254 and 256 to the corresponding gates of OR-gate set 252 of Gate Unit-JB. OR-gate set 252 immediately transmits the control signals received thereby to Memory-J.

CENTRAL DATA EXCHANGE

The primary function of the CDX, FIG. 13, is to transfer Data Words between the Processors and Memories. In the instant embodiment, the CDX comprises a single Data Bus, shown generally by the reference numeral 260. Therefore, the CDX can effect but a single Data Word transfer from a Processor to a Memory or from a Memory to a Processor at any given time, so that the Data Bus is assignel by the CIC-B/S in sequence to the requesting Processors for communication with the Memories assigned thereto by the CAT. The sequence in which the CIC-B/S assigns the Data Bus to the requesting Processors is determined according to predetermined priorities allocated to the respective assigned Memories. Normally, the faster Memories are allocated higher priorities, since these Memories complete their cycles and free the Data Bus more rapidly for subsequent communication.

In addition to its primary function, the CDX also transmits control signals initiated by the Processors and the Memories.

Consider, first, the operation of the CDX when a Processor makes a normal request of the CAT for communication with a Memory. During such an operation, the CIS does not participate. After the CIC-B/S grants the request of the Processor and controls the start of a Memory cycle in the assigned Memory, the CIC–B/S enables the CDX to grant the Data Bus for communication between the requesting Processor and this Memory. At this time, if a Read-Restore cycle has been requested, the assigned Memory-*j* has a Data Word, represented by the J*j*00–23 signals, ready for transmission to the requesting Processor. The J*j*00–23 signals are applied to input leads of a respective one of AND-gate sets 262. However, if a Clear-Write cycle has been requested, the requesting Processor-*i* has a Data Word, represented by the J*i*00–23 signals, ready for transmission to the assigned Memory. The J*i*00-23 signals are applied to input leads of a respective one of AND-gate sets 263. All of AND-gate sets 262 and 263 are coupled to deliver the Data Word signals received thereby to Data Bus 260.

Each gate set 262 comprises twenty-four AND-gates for receiving the signals representing a Data Word supplied by a respective Memory-*j*. Each of these AND-gates receives a respective one of the twenty-four signals of the Data Word on a first of the three input leads thereof. The second input lead of all AND-gates of each gate set 262 receives a respective one of the seven DD*j*R gate enabling signals provided by the CIC-B/S. The third input lead of all AND-gates of all gate sets 262 receives the output signal provided by an inverter 264.

With the CIS not participating in the operation, the DRPM signal applied to inverter 264 represents a binary 0 and, therefore, the inverter delivers an output signal representing a binary 1. Accordingly, all AND-gates of all gate sets 262 receive an enabling binary 1 signal on the third input lead thereof. The CIC-B/S enables the CDX to transfer a Data Word from a Memory-*j* to the Data Bus during a Read-Restore operation by generating the DD*j*R signal. This signal thereupon activates a respective one of AND-gate sets 262 to transmit the Data Word supplied by the corresponding Memory-*j* onto Data Bus 260.

Each gate set 263 comprises twenty-four AND-gates for receiving the signals representing a Data Word supplied by a respective Processor-*i*. Each of these AND-gates receives a respective one of the twenty-four signals of the Data Word on a first of the two input leads thereof. The second input lead of all AND-gates of each gate set 263 receives a respective one of the four DD*i*R gate enabling signals provided by the CIC-B/S. The CIC-B/S enables the CDX to transfer a Data Word from a Processor-*i* to the Data Bus during a Clear-Write operation by generating the DD*i*R signal. This signal thereupon enables a respective one of AND-gate sets 263 to transmit the Data Word supplied by the corresponding Processor-*i* onto Data Bus 260.

Data Bus 260 receives the twenty-four signals representing a Data Word from one of AND-gate sets 262 or 263 and applies these signals to input leads of all of a plurality of AND-gate sets 266 and a plurality of AND-gate sets 267.

If a Read-Restore cycle is being executed by the Memory participating in the current Data Word transmission by the Data Bus, the CIC-B/S provides the BJFR and BJLR signals when the respective First and Last Data Words are made available to the CDX by the Memory. The BJFR and BJLR signals are applied to input leads of respective AND-gates 269 and 270.

Each of AND-gates 269 and 270 is provided with two input leads, the other input lead of these two gates receiving the above-mentioned output signal of inverter 264. An OR-gate 271 receives the output signal of AND-gate 269 on one of the two input leads thereof. An OR-gate 272 receives the output signal of AND-gate 270 on one of the two input leads thereof. Since, in the operation presently being considered, inverter 264 delivers a binary 1 output signal, gates 269 and 270 are enabled. Therefore, the BJFR signal, upon receipt by the CDX, is immediately transferred through AND-gate 269 and OR-gate 271. Similarly, the BJLR signal, upon receipt, is immediately transferred through AND-gate 270 and OR-gate 272. The output signals of OR-gates 271 and 272 are applied to input leads of all AND-gate sets 266.

If a Clear-Write cycle is being executed by the Memory participating in the current Data Word transmission, the CIC-B/S provides the BAFW and BALW signals when the respective First and Last Data Words are made available to the CDX by the participating Processor. The BAFW and BALW signals are applied directly to input leads of all of AND-gate sets 267.

Each gate set 266 comprises twenty-six AND-gates for receiving the twenty-four Data Word signals transmitted on Data Bus 260 and for receiving the output signals of OR-gates 271 and 272. Each of these And-gates receives a respective one of these twenty-six signals on a first of the two input leads thereof. The second input lead of all AND-gates of each gate set 266 receives a respective one of the four DD*i*T gate enabling signals provided by the CIC-B/S. The CIC-B/S enables the CDX to transfer a Data Word from the Data Bus to a Processor-*i* during a Read-Restore operation by generating the DD*i*T signal. This signal thereupon enables a respective one of AND-gate sets 266 to transmit the Data Word signals supplied by the Data Bus, redesignated as the A*i*00–23 signals, and the BJFR and BJLR control signals, redesignated as the A*i*FR and A*i*LR signals, to the corresponding Processor-*i*.

Each gate set 267 comprises twenty-six AND-gates for receiving the twenty-four Data Word signals transmitted on Data Bus 260 and for receiving the BAFW and BALW control signals. Each of these AND-gates receives a respective one of these twenty-six signals on a first of the two input leads thereof. The second input lead of all AND-gates of each gate set 267 receives a respective one of the seven different DD*j*T gate enabling signals provided by the CIC-B/S. The CIC-B/S enables the CDX to transfer a Data Word from the Data Bus to a Memory-*j* during a Clear-Write operation by generating the DD*j*T signal. This signal thereupon enables a respective one of AND-gate sets 267 to transmit the Data Word signals supplied by the Data Bus, redesignated as the A*j*00–23 signals, and the BAFW and BALW control signals, redesignated as the A*j*FW and A*j*LW signals, to the corresponding Memory-*j*.

For example, assume again, that DAP-A has requested and been granted communication with an assigned Memory-J for a Read-Restore operation. When the CIC-B/S assigns the Data Bus to DAP-A for communication with Memory-J the DDJR and DDAT gate enabling signals are generated by the CIC-B/S. The DDJR signal activates the first of AND-gate sets 262 to transfer the Data Word supplied by Memory-J onto Data Bus 260. The DDAT signal enables the second of AND-gate sets 266 to transfer the Data Word transmitted on Data Bus 260 to DAP-A. As the CIC-B/S generates the BJFR and BJLR signals, they are immediately transmitted to DAP-A through the second of AND-gate sets 266.

Consider, next, the operation of the CDX when a DAP requests the CAT to initiate a Passive Mode operation in the CIS. The CAT interprets the request of the DAP and provides a signal to so notify the CIS. The mode of operation of the CDX is then determined by whether a Passive Mode read or write operation has been requested.

If a DAP requires receipt of a priority level value from the PL Table, a Passive Mode read operation is requested. Accordingly, the CIC-B/S generates a DD*i*T signal, corresponding to the requesting DAP-*i*, to enable the respective AND-gate set 266 for providing a data transmission from the CIS to DAP-*i*.

Upon responding to the DAP request, the CIS generates the DRPM signal. This signal, representing a binary 1, is applied to inverter 264. The output signal of inverter 264, now representing a binary 0, disables all of AND-gate sets 262 to prevent a Memory from transferring signals to the Data Bus.

The CIS then delivers the four DHR0–3 signals representing the value of the priority level stored in the selected register of the PL Table. These signals are transferred onto Data Bus 260 and applied to all of AND-gate sets 266. The enabled AND-gate set 266 thereupon transmits the DHR0–3 signals to the requesting DAP-$i$ on four of the lines which at other times transfer four of the Data Word signals A$i$00–23. At the same time, the CIS supplies the DHRP signal to denote the presence on the CIS output lines of signals representing the value of a priority level. The DHRP signal is applied to respective input leads of AND-gates 273 and 274. Each of AND-gates 273 and 274 is provided with two input leads, the other input lead of these two gates receiving the DRPM signal. OR-gate 271 receives the output signal of AND-gate 273 on one of the input leads thereof. OR-gate 272 receives the output signal of AND-gate 274 on one of the input leads thereof. Since the DRPM signal represents a binary 1, enabling AND-gates 273 and 274, the DHRP signal is transmitted through both AND-gates 273 and 274, through OR-gates 271 and 272, and to all of the AND-gate sets 266. The enabled one of AND-gate sets 266 thereupon transmits the output signals of gates 271 and 272, redesignated as the A$i$FR and A$i$LR signals, to notify the requesting DAP-$i$ that the priority level signals are now available on the output leads of this gate set 266.

If a DAP requires storage of a priority level value in the PL Table, a Passive Mode write operation is requested. Accordingly, the CIC-B/S generates a DD$i$R signal, corresponding to the requesting DAP-$i$, to enable the respective AND-gate set 263 for providing a data transmission from DAP-$i$ to the CIS. In requesting this operation, DAP-$i$ supplies a Data Word, the four least significant digits thereof representing a priority level value to be stored in the PL Table. The Data Word signals are transferred through the enabled AND-gate set 263 onto Data Bus 260. From the Data Bus, the four least significant digits, redesignated as the DHW0–3 signals, are transmitted to the CIS. The CIS accepts and stores these signals in the PL Table.

During the Passive Mode write operation, the CIC-B/S also generates a DD$j$T signal to enable a corresponding one of AND-gate sets 267. The enabled gate set 267 transfers the Data Word on the Data Bus to a storage location in the corresponding Memory-j. The contents of this location may or may not be subsequently employed.

CENTRAL CONTROL EXCHANGE

The primary function of the CCX, FIG. 14, is to receive acknowledgment control signals initiated by the Memories and to transmit these signals to the Processors. In the instant embodiment, the CCX transmits simultaneously all acknowledgment control signals for all Memories simultaneously executing memory cycles. Thus, the CCX receives the J$j$AR signal whenever Memory-$j$ receives an Actual Address. The CCX receives the B$j$FP and B$j$LP signals whenever Memory-$j$ receives a respective First or Last Data Word. In response to these acknowledgment control signals, the CCX transmits the corresponding A$i$AR, A$i$FP, and A$i$LP signals to the Processor-$i$ that initiated the address and the Data Words being acknowledged by these signals.

Each control signal received by the CCX is applied to a plurality of Gate Units 280. Each Gate Unit 280 is coupled for transmitting these control signals to a corresponding Processor. For example, Gate Unit-PA transmits control signals to the PEP, Gate Unit-AA transmits control signals to DAP-A, etc. DX$ij$ gate enabling signals received from the CIC-R/S enable corresponding ones of AND-gate sets 281 in Gate Units 280 to transmit the control signals between selected Memories and Processors.

Gate Units 280 are alike, each Gate Unit comprising seven AND-gate sets 281 and an OR-gate set 282. Therefore, the detailed structure of only one Gate Unit 280 is illustrated. Each AND-gate set 281 comprises three AND-gates for receiving respective control signals initiated by a corresponding one of the Memories. Each of these AND-gates receives a respective one of the control signals on one of the two input leads thereof. The other input lead of all AND-gates of each AND-gate set 281 receives a respective one of the twenty-eight different DX$ij$ gate enabling signals. The output signals delivered by the AND-gate sets 281 of each Gate Unit 280 are coupled to input leads of a corresponding OR-gate set 282. Each set 282 comprises three OR-gates, each OR-gate having seven input leads for receiving the corresponding ones of the three signals delivered by the seven related AND-gate sets 281. Accordingly, each gate set 282 transmits immediately the control signals received from a coupled AND-gate set 281.

For example, assume that the PEP has requested and been granted communication with an assigned Memory-J. Upon granting the request of the PEP, the CIC-R/S generates the DXPJ gate enabling signal. The DXPJ signal thereupon enables the first gate set 281 of Gate Unit-PA. When Memory-J receives an Actual Address from the CAX, the JJAR acknowledgment control signal is transmitted directly to the CCX and is applied to an input lead of one of the three AND-gates of the first gate set 281 of all Gate Units 280. Since this gate set, the first AND-gate set 281 of Gate Unit-PA, is being enabled by the DXPJ signal, the JJAR signal is immediately transferred therethrough and through the corresponding OR-gate set 282, and is transmitted to the PEP. The signal transmitted to the PEP is redesignated as the APAR signal. If the PEP had requested a Clear-Write cycle, Memory-J transmits the JJFP signal to the CIC-B/S upon receiving the First Data Word for storage. The information represented by the JJFP signal is transmitted as the BJFP signal to the CCX. The BJFP signal is applied to an input lead of a second one of the AND-gates of the first gate set 281 of Gate Unit 280. The BJFP signal is immediately transferred through the first AND-gate set 281 of Gate Unit-PA and through the corresponding OR-gate set 282. The signal, redesignated as the APFP signal, is transmitted to the PEP. In a similar manner, Memory-J supplies the JJLP signal upon receiving the Last Data Word for storage. The CIC-B/S transmits the corresponding BJLP signal to the CCX. This signal is transferred through the first AND-gate set 281 and through OR-gate set 282 of Gate Unit-PA. The signal, redesignated as the APLP signal, is transmitted to the PEP.

CENTRAL ADDRESS TRANSLATOR

The primary function of the CAT, FIG. 15, is to respond to Processor requests for communication with the Memory group, or to respond to Processor requests for the CAT to initiate a CIS operation. In response to each such request, the CAT assigns a Memory for communication with the requesting Processor, provides an Actual Address identifying a storage location within this Memory, and generates control signals to notify the CIC-R/S that a Memory request has been accepted and to identify the requesting Processor. Additionally, if a CIS operation has been requested, the CAT generates control signals to initiate the requested operation in the CIS.

The CAT comprises an Input Scanner 301 for sensing Processor requests and for accepting the requests in sequence according to predetermined priorities allocated to the Processors; an Address Translator 302 for translating a Symbolic Address supplied with each request into an identification of the Memory assigned by the Translator and an Actual Address for the Memory; Output Registers 303–306 for storing identifications of the Memories assigned to respective Processors; and Output Latch sets 307–310 for storing Actual Addresses for the corresponding assigned Memories. Additionally, the CAT comprises input gate sets 313–316 and input gate sets 317–320 for receiving respective Program Number and Symbolic Block Address signals supplied by Processors and for selectively transmitting these signals to the Address Translator; and output gate sets 321–324 for receiving the signals delivered by the Address Translator and for selectively transmitting these signals to the Output Registers and Output Latch sets. The CAT also comprises a Memory Request Signal Generator 328 for notifying the CIC-R/S of the acceptance of Memory requests and of the translation of the corresponding addresses provided; and a Memory Start Signal Generator 329 for providing control signals to initiate cycles in the assigned Memories. Finally, the CAT includes a Timer-Controller 330 for controlling the sequence of the individual operations which take place within the CAT.

*Overall operation*

The overall operation of the CAT will be first described. A Processor-$i$ requests communication with the Memory group, or requests the CAT to initiate a CIS operation, by supplying the corresponding J$i$AP signal and one of the J$i$RD or J$i$WR signals, according to whether a Read-Restore or Clear-Write cycle is required of the Memory group. At the same time the Processor also supplies a Symbolic Address, which comprises a Program Number, represented by the J$i$P0–4 signals; a Symbolic Block Address, represented by the J$i$B0–4 signals; and a Symbolic Word Address. The J$i$AP, J$i$RD, and J$i$WR signals are received by Input Scanner 301. The J$i$P0–4 signals are received by a respective one of gate sets 313–316 and the J$i$B0–4 signals are received by a respective one of gate sets 317–320.

The requests are normally accepted according to predetermined priorities allocated by Input Scanner 301 to the Processors. In the instant embodiment, the PEP is allocated highest priority, following in descending order by DAP-A, DAP-B, and DAP-C. If two or more requests arrive substantially simultaneously, and the CAT is not at that time busy translating a Symbolic Address, the request of but one Processor is accepted. If one or more requests arrive while the CAT is busy translating a Symbolic Address, the requests are not accepted until completion of the Translation operation. However, if two or more requests arrive while the CAT is busy translating, the highest priority requests inhibits the requests of lower priority.

Upon accepting the requests of a Processor-$i$, Input Scanner 301 generates a corresponding DT$i$A signal to initiate a Translation operation on the Symbolic Address supplied by Processor-$i$ to the CAT. The DT$i$A signal enables the corresponding ones of gate sets 313–316 and 317–320 to transfer the Program Number and Symbolic Block Address supplied by the recognized Processor-$i$ to Translator 302.

Address Translator 302 translates the Symbolic Address supplied thereto and delivers output signals representing one of the Memories of the Memory group and an Actual Block Address in this Memory.

Following delivery of the output signals by Translator 302, Timer-Controller 330 generates a signal to enable a corresponding one of the gate sets 321–324 to transfer the Translator output signals to the ones of Output Registers 303–306 and Output Latch sets 307–310 that correspond to the recognized Processor.

Following storage of the Memory identification in one of Output Registers 303–306, Memory Request Signal Generator 328 generates the corresponding $\overline{TTiR}$ signal to notify the CIC-R/S that the corresponding Processor-$i$ has had an Address Translation operation performed on the Symbolic Address supplied. The $\overline{TTiR}$ signal constitutes a request by the CAT for the CIC-R/S to initiate a cycle in the assigned Memory for Processor-$i$.

Additionally, following storage of a Memory identification in one of Output Registers 303–306, the corresponding DT$i$A signal reverts to a binary 0, terminating the Translation operation for the Symbolic Address supplied by Processor-$i$ and enabling Input Scanner 301 to accept a request of another Processor.

After the CIC-R/S has responded to the $\overline{TTiR}$ signal and granted the identified Memory to the corresponding Processor-$i$, the CIC-R/S supplies the respective FR$i$A signal to the CAT. In response to the FR$i$A signal, Memory Start Signal Generator 329 generates the corresponding $\overline{TTiS}$ signal for initiating a cycle in the Memory assigned to communication with Processor-$i$.

*Input scanner*

Figure 87:
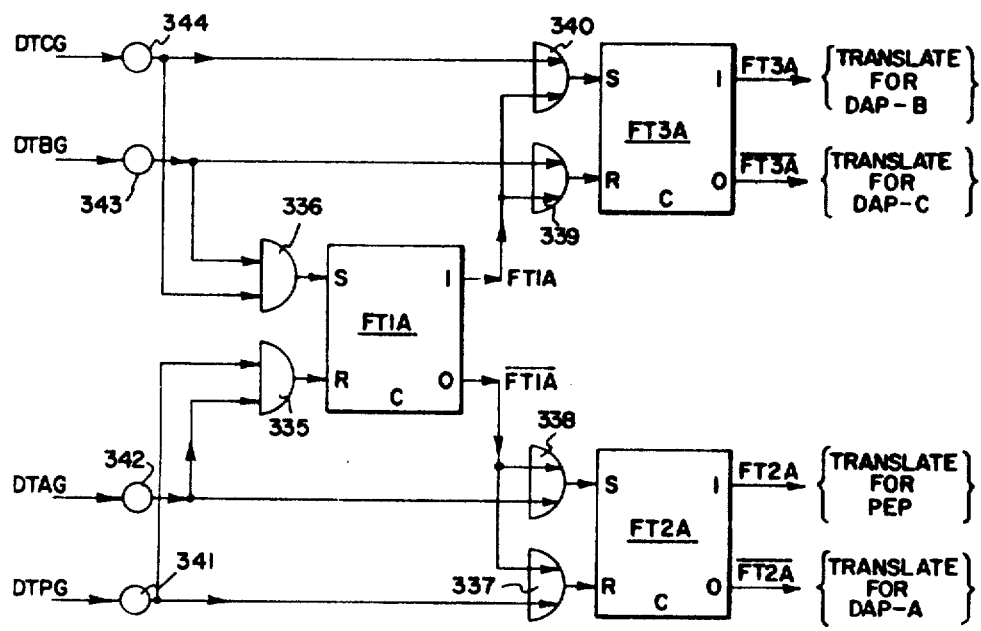
FIGURE 87 is a logical block diagram of a portion of the Input Scanner of the CAT.

The detailed structure of Input Scanner 301 is shown in FIGS. 26 and 38. A logical block diagram of a portion of the Input Scanner for providing a single output signal to initiate a Translation operation when more than one priority request signal is generated is shown in FIG. 87.

The Input Scanner receives the Processor request signals; converts the received signals into CAT-request signals if certain conditions are fulfilled; recognizes the CAT-request signals according to predetermined priorities allocated to the Processors; and generates output signals identifying the next Processor for which a Symbolic Address will be translated.

FIGURE 38 shows the logical schematic diagrams of the circuits which accept the Processor request signals and convert these signals into the corresponding DTPG, DTAH, DTBH, and DTCH CAT-request signals. Additionally, FIG. 38 illustrates logical schematic diagrams of circuits which respond to the DTAH, DTBH, and DTCH signals to generate corresponding DTAG, DTBG, and DTCG CAT-priority request signals. Since the PEP is accorded highest priority by the CAT, the DTPG CAT-request signal is also utilized as the corresponding CAT-priority request signal.

The logical schematic diagram for the circuit which generates the DTPG CAT-request signal for the PEP is:

$$JPAP(JPRD+JPWR)\overline{DCPC}\ \overline{DTPZ}\ \overline{FRPA}=DTPG$$

Thus, the CAT-request signal for the PEP issues when the PEP requests communication with the Memory group by supplying the JPAP signal and one of the JPRD or JPWR signals; provided, however, the Output Register 303 is not at that time storing the designation of a Memory for assignment to the PEP, as evidenced by the DCPC signal being a binary 0; that Output Latch set 307 is not storing an Actual Block Address for this Memory, as evidenced by the DTPZ signal being a binary 0; and that the FRPA flip-flop of the Processor Access Granting Register in the CIC-R/S is in the 0-state, indicating that no memory communication is currently being provided for the PEP. FIGURE 41 illustrates the logical schematic diagrams of the circuits that generate the DCPC and DTPZ signals.

The DTAH, DTBH, and DTCH CAT-request signals issue in response to Memory requests from the corresponding DAP-A, DAP-B, and DAP-C, provided that conditions corresponding to those required for the issuance of the DTPG signal to issue are met.

Only one of the CAT-priority request signals can continue to be generated by Input Scanner 301 at any one time, the signal which is generated representing the requesting Processor allocated highest priority. For example, if the PEP is requesting communication with the Memory group and the Symbolic Address supplied by the PEP has not yet been translated, the DTPG signal represents a binary 1 and the DTAG, DTBG, and DTCG signals each represents a binary 0. If both DAP-B and DAP-C are requesting communication with the Memory group and the Symbolic Address supplied by neither DAP has yet been translated, the DTBG signal represents a binary 1 and the DTCG signal represents a binary 0. The logical schematic diagram for the circuit which generates the DTCG signal, shown in FIG. 38, is:

$$DTCH(\overline{DTPG}\ \overline{DTAG}\ \overline{DTBG}+\overline{FT3A})=DTCG$$

Thus, the DTCG CAT-priority request signal issues in response to the corresponding DTCH CAT-request signal, provided that the PEP, DAP-A and DAP-B are not currently making an unanswered request for communication with the Memory group, as designated by the respective $\overline{DTPG}$, $\overline{DTAG}$, and $\overline{DTBG}$ signals. The $\overline{FT3A}$ signal represents a binary 1 when the requesting DAP-C has been recognized by the CAT for the next Address Translation operation. This signal then "locks" the DTCG signal in the 1-state so that even if a higher priority Processor subsequently requests the Memory group it will not inhibit the DTCG signal until the Translation operation has been completed for DAP-C. In a similar manner, the CAT-priority request signals DTAG and DTBG are inhibited by higher order Processor requests, but "lock" on when the corresponding DAP has been recognized for the next Address Translation.

The portion of Input Scanner 301 illustrated in FIG. 87 responds to the DT$i$G CAT-priority request signals to generate but a single output signal designating the next Processor to be provided an Address Translation operation by the CAT. Although each CAT request signal inhibits all CAT-priority request signal DTAG, DTBG, and DTCG of lower priority, nevertheless, it will frequently happen that two or more Processors initiate request signals according to the temporal relationship whereby two or more CAT-priority request signals momentarily issue substantially simultaneously. Assume, for example, that DAP-B makes a Memory request and shortly thereafter DAP-A follows with a request. The DTBH CAT-request signal first issues and controls generation of the corresponding DTBG CAT-priority request signal. The DTAH signal next issues and controls generation of the corresponding DTAG signal. The DTAH signal now inhibits generation of the DTBG signal, if the FT3A signal has not yet become a binary 1. However, for a brief moment before the DTBG signal can change from the binary 1 representation to the binary 0 representation, both the DTBG and the DTAG signals represent a binary 1. If, at this moment, Address Translator 302 is ready to commence an Address Translation operation, the presence of two recognized requests would result in an ambiguous condition if the circuit of FIG. 87 did not provide resolution. Thus, if the CAT had to respond directly to the DT$i$G signals, it would attempt to translate simultaneously the Symbolic Addresses provided by both DAP-A and DAP-B. Therefore, to resolve this ambiguity, which is sometimes termed a "race" condition, the circuit of FIG. 87 is provided.

The race-resolving circuit of FIG. 87 delivers at any time but a single one of four possible output signals in response to the receipt of one or more input signals, the single output signal corresponding to one of the input signals received. Thus, the circuit receives the DTPG, DTAG, DTBG, and DTCG signals on respective input leads, but provides an output signal representing a binary 1 on only one of the FT2A, $\overline{FT2A}$, FT3A, and $\overline{FT3A}$ output leads, the single output signal delivered controlling a Translation operation for a corresponding one of the Processors.

The race-resolving circuit comprises the FT1A, FT2A, and FT3A flip-flops, which are the previously described type-C flip-flops. The FT1A flip-flop receives the output signal of the two-input AND-gate 335 on the 0-input lead and the output signal of the two-input AND-gate 336 on the 1-input lead. The FT2A flip-flop receives the output signal of the two-input OR-gate 337 on the 0-input lead and the output signal of the two-input OR-gate 338 on the 1-input lead. The FT3A flip-flop receives the output signal of the two-input OR-gate 339 on the 0-input lead and the output signal of the two-input OR-gate 340 on the 1-input lead. The DTPG priority request signal is applied to an inverter 341, the output signal of inverter 341 being applied to respective first input leads of AND-gate 335 and OR-gate 337. The DTAG priority request signal is applied to an inverter 342, the output signal of inverter 342 being applied to the second input lead of AND-gate 335 and a first input lead of OR-gate 338. The DTBG signal is applied to an inverter 343, the output signal of inverter 343 being applied to respective first input leads of AND-gate 336 and OR-gate 339. The DTCG signal is applied to an inverter 344, the output signal of inverter 344 being applied to the second input lead of AND-gate 336 and a first input lead of OR-gate 340. Accordingly, the signal applied to the 0-input lead of the FT1A flip-flop by AND-gate 335 is represented by:

$$\overline{DTPG}\ \overline{DTAG}$$

and the signal applied to the 1-input lead of the FT1A flip-flop by AND-gate 336 is represented by:

$$\overline{DTBG}\ \overline{DTCG}$$

The above two logical expressions demonstrate that if no Processor is making a Memory request, each input signal received by the FT1A flip-flop represents a binary 1 and, therefore, each of the output signals FT1A and $\overline{FT1A}$ represents a binary 0, the defined state-C of the flip-flop.

If, now, a single one of the Processors makes a Memory request, the respective DT$i$G signal becomes a binary 1 and controls the corresponding one of AND-gates 335 and 336 to deliver an output signal representing the binary 0. The corresponding one of the output signals FT1A and $\overline{FT1A}$ continues to represent a binary 0 but the other one of these output signals changes to a binary 1, so that the flip-flop now operates in either the defined state-A or state-B. If, however, one of the DTPG or DTAG signals and one of the DTBG or DTCG signals simultaneously change to a binary 1, denoting two simultaneous requests, both input signals of the FT1A flip-flop simultaneously change to a binary 0 and operation of the flip-flop momentarily becomes unstable. The flip-flop thereupon transfers to state-A or to state-B, wherein one of the output signals FT1A or $\overline{FT1A}$ represents a binary 1.

Thus, consider the following Table 4, which describes in one form, the overall operation of the circuit of FIG. 87. Table 4 represents the operation of the circuit in response to the simultaneous arrival of the Processor requests shown. Once the signals shown have issued, the subsequent arrival of further requests will not affect the operation of the circuit of FIG. 87 until the corresponding Address Translation has been completed and the respective CAT request signal becomes a binary 0. If, for example, the priority request signal combination designation as input-6 in Table 4 occurs, DAP-A and DAP-C are making substantially simultaneous requests. The output signal of each AND-gate of the circuit is shown to be a binary 0 and the output signals of the FT1A flip-flop, designated in the Table as $\overline{F_1}$ and $F_1$, are shown to have two possible conditions, the aforementioned state-B and state-A. This doubly-possible output signal combination from the FT1A flip-flop also occurs for inputs-7, 8, 10, 11, 12, 14, 15 and 16.

TABLE 4

| Input | Processor-$i$ Requests | | | | AND-Gate Outputs | | | Flip-Flop Outputs | | | OR-Gate Outputs | | | | Flip-Flop Outputs | | | |
|---|---|---|---|---|---|---|---|---|---|---|---|---|---|---|---|---|---|---|
| | P | A | B | C | $\overline{P}\ \overline{A}$ | $\overline{B}\ \overline{C}$ | | $\overline{F_1}$ | $F_1$ | | $P+\overline{F_1}$ | $A+\overline{F_1}$ | $B+F_1$ | $C+F_1$ | "P" $F_2$ | "A" $\overline{F_2}$ | "B" $F_3$ | "C" $\overline{F_3}$ |
| 1 | 0 | 0 | 0 | 0 | 1 | 1 | | 0 | 0 | | 1 | 1 | 1 | 1 | 0 | 0 | 0 | 0 |
| 2 | 0 | 0 | 0 | 1 | 1 | 0 | | 1 | 0 | | 1 | 1 | 1 | 0 | 0 | 0 | 0 | 1 |
| 3 | 0 | 0 | 1 | 0 | 1 | 0 | | 1 | 0 | | 1 | 1 | 0 | 1 | 0 | 0 | 1 | 0 |
| 4 | 0 | 0 | 1 | 1 | 1 | 0 | | 1 | 0 | | 1 | 1 | 0 | 0 | 0 | 0 | INDET | |
| 5 | 0 | 1 | 0 | 0 | 0 | 1 | | 0 | 1 | | 1 | 0 | 1 | 1 | 0 | 1 | 0 | 0 |
| | | | | | | | | 0 | 1 | | | 0 | | 1 | 0 | 1 | 0 | 0 |

TABLE 4—Continued

| | Processor-i Requests | | | | AND-Gate Outputs | | Flip-Flop Outputs | | | OR-Gate Outputs | | | | Flip-Flop Outputs | | | |
|---|---|---|---|---|---|---|---|---|---|---|---|---|---|---|---|---|---|
| Input | P | A | B | C | P̄Ā | B̄C̄ | F̄₁ | F₁ | P̄+F̄₁ | Ā+F̄₁ | B̄+F₁ | C̄+F₁ | "P" F₂ | "A" F̄₂ | "B" F₂ | "C" F̄₃ |
| 6 | 0 | 1 | 0 | 1 | 0 | 0 | 1 0 | 0 1 | 1 | 1 0 | 1 | 0 1 | 0 0 | 0 1 | 0 0 | 1 0 |
| 7 | 0 | 1 | 1 | 0 | 0 | 0 | 1 0 | 0 1 | 1 | 1 0 | 0 1 | 1 | 0 0 | 0 1 | 1 0 | 0 0 |
| 8 | 0 | 1 | 1 | 1 | 0 | 0 | 1 | 0 | 1 | 1 | 0 | 0 | 0 | 0 | INDET | |
| 9 | 1 | 0 | 0 | 0 | 0 | 1 | 0 1 | 1 0 | 0 | 1 | 1 | 1 | 1 0 | 0 0 | 0 0 | 0 0 |
| 10 | 1 | 0 | 0 | 1 | 0 | 0 | 1 0 | 0 1 | 1 | 1 | 1 | 0 1 | 0 1 | 0 0 | 0 0 | 1 0 |
| 11 | 1 | 0 | 1 | 0 | 0 | 0 | 1 0 | 0 1 | 1 | 1 | 0 1 | 1 | 0 1 | 0 0 | 1 0 | 0 0 |
| 12 | 1 | 0 | 1 | 1 | 0 | 0 | 1 | 0 | 1 | 1 | 0 | 0 | 0 | 0 | INDET | |
| 13 | 1 | 1 | 0 | 0 | 0 | 1 | 0 1 | 1 0 | 0 0 | 1 | 0 1 | 1 | 0 | 0 INDET INDET | 0 0 | 0 0 |
| 14 | 1 | 1 | 0 | 1 | 0 | 0 | 1 0 | 0 1 | 1 0 | 0 1 | 1 | 0 | 0 0 INDET | 0 | 0 1 | 0 0 |
| 15 | 1 | 1 | 1 | 0 | 0 | 0 | 1 0 | 0 1 | 1 0 | 0 1 | 0 1 | 1 | 0 0 INDET | 0 | 1 0 | 0 0 |
| 16 | 1 | 1 | 1 | 1 | 0 | 0 | 1 | 0 | 1 | 0 | 0 | 0 | 0 | 0 | INDET | |

Once a Processor request is recognized by the circuit of FIG. 87, it is "locked" by the corresponding output signal of the FT2A and FT3A flip-flops. If, now, a higher priority input request is made, the states of the flip-flops in the circuit do not change and the original request continues to be recognized until the Translation operation is complete. For example, assume that DAP-B makes a sole request (input-3, Table 4) whereupon the $\overline{FT1A}$ signal becomes a binary 1 and the FT1A signal continues as a binary 0, this condition being state-A of the FT1A flip-flop. After recognition of this request is completed and the FT3A signal becomes a binary 1 to "lock" the DTBG signal in the 1-state, assume that a PEP request occurs, as represented by the DTPG signal. Although both input signals to the FT1A flip-flop now become binary 1's, the FT1A flip-flop continues in state-A and DAP-B continues to be recognized. This action is shown in the earlier Table 2.

The $\overline{FT1A}$ output signal is applied to the respective second input leads of OR-gates 337 and 338. The FT1A output signal is applied to the respective second input leads of OR-gates 339 and 340. Therefore, the signal applied to the 0-input lead of the FT2A flip-flop by OR-gate 337 is respresented by:

$$\overline{DTPG}+\overline{FT1A}$$

The signal applied to the 1-input lead of the FT2A flip-flop by OR-gate 338 is represented by:

$$\overline{DTAG}+\overline{FT1A}$$

The signal applied to the 0-input lead of the FT3A flip-flop by OR-gate 339 is represented by:

$$\overline{DTBG}+FT1A$$

The signal applied to the 1-input lead of the FT3A flip-flop by OR-gate 340 is represented by:

$$\overline{DTCG}+FT1A$$

In the absence of a request by any Processor (input-1, Table 4) both output signals of the FT1A flip-flop represent a binary 0, but each of the output signals delivered by inverters 341–344 represents a binary 1. Therefore, each of OR-gates 337–340 receives a binary 1 input signal and consequently delivers a binary 1 output signal, so that flip-flops FT2A and FT3A operate in state-C wherein both output signals of each of these two flip-flops represent binary 0's. No translation request is provided. If, now, a single Processor memory request is received, the corresponding one of the FT1A output signals continues to represent a binary 0 and the other one of these signals becomes a binary 1. The one of inverters 341–344 receiving the single priority request signal delivers a signal representing a binary 0 to a respective one of the OR-gates 337–340, this OR-gate also receiving the binary 0 output signal of the FT1A flip-flop. The one of flip-flops FT2A and FT3A receiving the binary 0 output signal of this one OR-gate transfers to state-A or state-B depending on the input lead thereof receiving the binary 0 signal. This flip-flop thereupon delivers a binary 1 signal on the output lead which corresponds to the received request signal to control the next Translation operation to be provided for the requesting Processor. In this instance, the one of the output signals of the FT1A flip-flop which represents a binary 1 is applied to both OR-gates coupled to the other one of the FT2A and FT3A flip-flops and thereby forces such flip-flop to continue operating in state-C, delivering two binary 0 output signals.

For example, assume again input-3 in Table 4, wherein the DTBG signal represents a binary 1 to denote a memory request from DAP-B. The output signal delivered by inverter 343 now represents a binary 0, disabling AND-gate 336 and thereby controlling the FT1A flip-flop to transfer to state-A, wherein the FT1A signal represents a binary 0 and the $\overline{FT1A}$ signal represents a binary 1. The $\overline{FT1A}$ signal is coupled through OR-gates 337 and 338 to both input leads of the FT2A flip-flop and forces this flip-flop to continue in state-C. OR-gate 339 receives the binary 0 output signal of inverter 343 on its first input lead and the binary 0 FT1A signal on its second input lead. Therefore, OR-gate 339 applies a binary 0 signal to the 0-input lead of the FT3A flip-flop. OR-gate 340 receives a binary 1 input signal on its first input lead from inverter 344 and therefore applies a binary 1 signal to the 1-input lead of the FT3A flip-flop. Therefore, the FT3A flip-flop transfers to state-B wherein the FT3A output signal represents a binary 1 to denote a request that the next Translation operation be provided for DAP-B. Inputs-2, 3, 5 and 9 illustrate operation of the circuit of FIG. 87 with a single request.

If two or more priority request signals are supplied substantially simultaneously to the circuit of FIG. 87, only one output signal will be provided thereby. For example, consider input-4 of Table 4, wherein both DAP-B and DAP-C make simultaneous requests. The consequent 0-output signal delivered by AND-gate 336 controls the FT1A flip-flop to transfer to state-A and, in turn, to retain the FT2A flip-flop in state-C. Since the output signal of each of inverters 343 and 344 represents a binary 0 at this time, OR-gates 339 and 340 simultaneously deliver binary 0's to the FT3A flip-flop. Accordingly, the FT3A flip-flop will be momentarily in an unstable state and will thereupon transfer to either state-A or state-B. The next Translation operation will be provided for either DAP-B or DAP-C, depending on whether the FT3A flip-flop transfers to the respective state-B or state-A. The abbreviation "INDET" in Table 4 indicates an indeterminate condition of the FT3A flip-flop, i.e., that is the FT3A flip-flop will assume either state-A or state-B.

Consider, finally, the most complex condition requiring resolution, wherein the race-resolving circuit receives substantially simultaneously priority request signals for all four Processors (input-16). Each of inverters 341–344 now delivers a binary 0 output signal and these output signals upon application to AND-gates 335 and 336 provide binary 0 input signals to both input leads of the FT1A flip-flop. Consequently, the FT1A flip-flop will transfer to either state-A or state-B. The operation of the FT1A flip-flop is shown in FIG. 4 respectively above and below the horizontal dividing line opposite input-16, according to whether the FT1A flip-flop assumes state-B or state-A. In state-B the FT1A output signal represents a binary 1, and upon being applied to OR-gates 339 and 340 controls the FT3A flip-flop to deliver two binary 0 output signals. In this state-B the $\overline{FT1A}$ output signal continues to represent a binary 0 and applied to OR-gates 337 and 338 permits the FT2A flip-flop to transfer to either state-A or state-B when the output signals of inverters 341 and 342 change to binary 0's. In the instance, therefore, wherein the FT1A flip-flop assumes state-B, the output signals will control the next Translation operation for either the PEP or DAP-A.

However, if the FT1A flip-flop transfers to state-A with input-16, the $\overline{FT1A}$ output signal represents a binary 1 and controls the FT2A flip-flop to deliver two binary 0 output signals. The FT1A output signal represents a binary 0 and with the two binary 0 signals from inverters 343 and 344, permits the FT3A flip-flop to transfer to either state-A or state-B. Therefore, in the instance wherein the FT1A flip-flop assumes state-A, the race-resolving circuit controls the next Translation operation for either DAP-B or DAP-C.

Following delivery of an output signal representing a binary 1 by the race resolving circuit of FIG. 87 a corresponding DT$i$A translation initiation signal issues, FIG. 38, provided that Address Translator 302 has completed the immediately preceding Address Translation operation, as denoted by the DTEA signal. For example, assume that DAP-A has requested communication with the Memory group and that Input Scanner 301 has recognized this request by controlling the corresponding $\overline{FT2A}$ signal to represent a binary 1. If Address Translator 302 is now ready to provide a Translation operation, the DTEA signal represents a binary 1, enabling issuance of the DTAA signal. The logical schematic diagram for the circuit generating the DTAA translation initation signal is:

$$\overline{FT2A}(DTEA+DTAA)=DTAA$$

Once the Address Translation commences, Address Translator 302 is denoted as being busy by the DTEA signal becoming a binary 0. To maintain the DTAA signal in the 1-state, this signal is supplied as a "locking" or self-maintaining input signal, as shown in the above logical schematic diagram.

Each DT$i$A signal of Input Scanner 301 performs the two major functions of: (a) enabling the respective ones of gate sets 313–316 and 317–320 to transfer the Priority Number and Symbolic Block Address signals supplied by the corresponding Processor-$i$ to Address Translator 302, and (b) triggering Timer-Controller 330 to initiate the sequence of steps of a Translation operation for translating the received Symbolic Address Signals to Actual Address signals. The enabling of input gate sets 313–320 by the DT$i$A signals is illustrated in the logical schematic diagrams of FIG. 39. The triggering of Timer-Controller 330 to initiate the Translation operation sequence is illustrated by the logical schematic diagram of the circuit which delivers an input signal to the TTOA one-shot, FIG. 27.

*Address translator*

The detailed structure of Address Translator 302 is shown in the block diagram of FIG. 16.

The Address Translator receives a first signal group representing a Program Number and a second signal group representing a Symbolic Block Address from a Processor and translates these received signals into output signals identifying one of the Memories of the Memory group and an output signal group representing an Actual Block Address in the identified Memory.

Address Translator 302 comprises a Program Number Decoder 350 for receiving the group of signals representing a Program Number and for delivering a single binary 1 output signal corresponding to the Program Number; a Symbolic Block Number Decoder 351 for receiving the group of signals representing a Symbolic Block Address and for delivering a single binary 1 output signal corresponding to the Symbolic Block Address; and a Matrix Decoder 352 for receiving the output signals of the Program Number Decoder and the Symbolic Block Number Decoder and for delivering a single binary 1 output signal corresponding to the Program Number-Symbolic Block Number combination provided.

Additionally, Address Translator 302 comprises an Encoder 355 for responding to a plurality of input signals and for delivering output signals identifying a Memory and an output signal group representing an Actual Block Address in the identified Memory; Encoder Input Gates 356 for transferring the output signals of Matrix Decoder 352 to Encoder 355 when enabled by a signal from the Timer-Controller; and Encoder Output Gates 357 for transmitting the output signals of Encoder 355 when enabled by the signal supplied by the Timer-Controller.

As described above, the DT$i$A signal delivered by Input Scanner 301, FIG. 15, enables a respective one of gate sets 313–316 and 317–320, FIG. 39, to transfer the signal groups representing a Program Number and a Symbolic Block Address from the corresponding Processor-$i$ to the Address Translator. The output signal group supplied by the enabled one of gate sets 313–316 and representing a Program Number are redesignated as the DLP0–4 signals. The output signal group supplied by the enabled one of gate sets 317–320 and representing a Symbolic Block Address are redesignated as the DLB0–4 signals.

The DLP0–4 signal group is applied to Program Number Decoder 350 and the DLB0–4 signal group is applied to Symbolic Block Number Decoder 351. Decoders 350 and 351 may comprise any decoding circuit adapted to receive a binary digital signal group and to deliver a unique output signal for each different number represented by the received signal group. In the instant embodiment, each of the Program Number and Symbolic Block Number signal groups comprises five binary digital signals. Thus, the signal group received by each of Decoders 351 and 352 may represent any one of 32 different numbers. Accordingly, each of Decoders 350 and 351 is provided with 32 output lines and delivers a binary 1 signal on the one of these lines which corresponds to the number represented by the respective received signal group. For example, if the signal group applied to Decoder 350 represents Program Number 2, an output signal will be delivered on a corresponding one of the output lines of Decoder 350, this output line delivering an output signal only when the input signal group represents the number 2.

Decoding circuits of the type described are well known in the art and may comprise, for example, diode matrix decoders, magnetic core matrix decoders, or logical gate decoders. For example, AND-gate 354 in FIG. 16 may be employed in a logical gate decoder, this gate delivering a binary 1 output signal only when a unique combination of five input signals is received. Thus, AND-gate 354 is connected to receive a unique combination of the Symbolic Block Address signal group so that only when this signal group represents the decimal number 23 is an output signal delivered. Therefore, 32 of these five-input AND-gates, each coupled to receive a different combination of a five-signal group may comprise each of Decoders 350 and 351.

Matrix Decoder 352 is coupled to the 32 output lines of each of Decoders 350 and 351 and delivers a unique output signal for each different pair of binary 1 signals received. One signal of this pair is received from Decoder 350 and the other from Decoder 351. Accordingly, 1024 output lines transmit respective ones of 1024 different binary 1 output signals for uniquely identifying the input signal pair received. Matrix Decoder 352 may comprise any one of the prior art decoding circuits named above.

Matrix Decoder 352, therefore, delivers a binary 1 signal on the one of 1024 output lines which corresponds to the particular Program Number and Symbolic Block Address provided by the requesting Processor. For each different combination of Program Number and Symbolic Block Address, a respective output line of Matrix Decoder 352 delivers a binary 1 signal.

Encoder 355 is coupled to the 1024 output lines of Decoder 352 and responds to the signals on these lines to deliver signals identifying one of the Memories and representing an Actual Block Address in the identified Memory. Each of the signals of the MACJ-MACN, MACT, and MACV signal group delivered by Encoder 355 identifies a corresponding one of the seven Memories of the Memory group. The Actual Block Address is represented by the MAB0–4 signal group delivered by Encoder 355.

Encoder 355 may comprise any encoding circuit coupled for receiving an input signal on any one of a plurality of input lines and for delivering a corresponding plurality of output signal sets. Such encoding circuits are well known in the art and may comprise, for example, diode matrix encoders or logical gate encoders. Another circuit useful for providing the functions of Encoder 355 is the Capacitive Fixed Memory System invention of J. F. Cubbage, which is the subject of U.S. Patent 3,183,490, issued May 11, 1965, and assigned to the assignee of the instant invention.

The TTMS signal generated by Timer-Controller 330 determines the period when Encoder 355 is employed to provide the encoding function. The TTMS signal is applied to and enables Encoder Input Gates 356 and Encoder Output Gates 357. When the TTMS signal represents a binary 1, the output signal delivered by Matrix Decoder 352 is transferred through Encoder Input Gates 356 to Encoder 355 and the output signal set of Encoder 355 is transferred through Encoder Output Gates 357 to output gate sets 321–324.

The MAB0–MAB4 signals delivered by Encoder 355 and transmitted through Gates 357 represent the Actual Block Address developed during the Address Translation. The MAB5 signal denotes a request by a Processor for the CIS to execute a Translate Mode operation. The MAB6 signal represents additional microcontrol information, as required by the initiating Processor. For example, the MAB6 signal may be employed to control the retrieval of Data Words from two or more Memories utilizing the Actual Block Address generated. The single one of the MACJ-MACN, MACT and MACV signals which represents a binary 1 provides an identification of the Memory assigned to the requesting Processor by the Translation operation of the CAT. The MACS signal denotes a request by a DAP for the CIS to execute a Passive Mode operation.

Although Address Translator 302 is illustrated in FIG. 16 as comprising a separate Matrix Decoder 352 and an Encoder 355, it is within the scope of the instant invention to employ, instead, a device integrating the separate Address Translation functions of decoding and encoding. For example, Address Translator 302 may comprise an associative, or content-addressed, memory wherein an output signal set is delivered directly in response to the receipt of a particular input signal group.

The Address Translator may also comprise a read-write memory or a read-only memory of the type described heretofore in connection with the Memory group. The input signal group is utilized as the address of a memory location from which the output signal group is retrieved. By employing the read-write form of Memory, the translation topologies of the Address Translator may be readily altered by storing new information in the addressed locations. The translation topologies may be altered in the other forms of Address Translators described above by physically changing the interconnections of the constituent electronic components.

The various types of Address Translation topologies provided by Address Translator 302 will be described in a following section.

Translated address storage

The output signals of Address Translator 302 are transferred through one of gate sets 321–324 to a respective one of Output Registers 303–306 and to a respective one of Output Latch sets 307–310. The one of gate sets 321–324 which is enabled for this signal transfer corresponds to the Processor providing the original Symbolic Address. The logical schematic diagrams of the portions of gate sets 321–324 which transmit signals to Output Registers 303–306 are shown in FIGS. 30–37. The logical schematic diagrams of the portions of gate sets 321–324 which transmit signals to Output Latch sets 307–310 and which comprise a portion of these Latch sets are shown in FIGS. 40 and 41.

Each one of gate sets 321–324 is enabled to transfer signals by a respective one of the DT$i$E signals provided by Timer-Controller 330. Each DT$i$E enabling signal represents a binary 1 only during a Translation operation for the corresponding Processor-$i$. For example, the logical schematic diagram of the portion of gate set 322 that transfers the MACJ signal to Output Register 304 for storage is:

$$MACJ \; DTAE = S\text{-}CAJ$$

As another example, the logical schematic diagram of the portion of gate set 322 that transfers the least significant digit signal of the Actual Block Address to Output Latch set 308, and which comprises a portion of Latch set 308, is:

$$MAB4 \; DTAE$$

Figure 31:
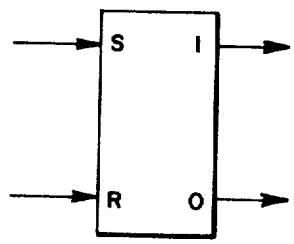
Figure 79:
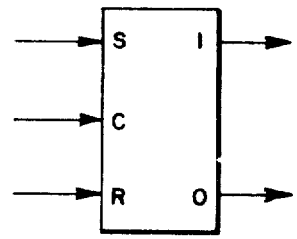

Output Register 303, FIGS. 30 and 31, comprises seven FCP$j$ flip-flops, each flip-flop being adapted to store the identification of the respective Memory-$j$ assigned by the CAT to the PEP. For example, if all of the signals received by Register 303 represent binary 0's except for the MACL signal, all of the FCP$j$ flip-flops continue in the 0-state except the FCPL flip-flop when the DTPE signal occurs. This FCPL flip-flop, when in the 1-state, enables communication between the PEP and Memory-L. Therefore, to designate a particular Memory of the Memory group, only one of the seven flip-flops of Register 303 is maintained in the 1-state.

Each of Output Registers 304, 305, and 306 also comprises seven Memory-designating FC$ij$ flip-flops, operative in the same manner as the flip-flops of Output Register 303 to designate a Memory for communication with the corresponding DAP-*i*. Each of these three registers additionally comprises the FC*i*S flip-flop. An FC*i*S flip-flop, when in the 1-state, denotes a request by the corresponding DAP-*i* for a Passive Mode operation of the CIS. Therefore, when a Translation operation is performed by the CAT for a DAP-*i* requesting a Passive Mode operation, both a Memory-designating flip-flop and the FC*i*S flip-flop in the corresponding Output Register are transferred to the 1-state.

Output Registers 303–306 store a particular Memory designation until the designated Memory has completed its cycle and, therefore, its communication with the requesting Processor. At this time the Memory generates the corresponding J*j*EC signal, this signal clearing the corresponding FR*j*Q flip-flop of the Memory Request Register of the CIC-R/S by transferring the flip-flop to the 1-state. The setting of the FR*j*Q flip-flop thereupon clears a corresponding Memory-designating flip-flop in the CAT output Register. The logical schematic diagram of the circuit that clears a CAT Output Register flip-flop is, for example:

*FRTQ FRAA=R-CAT*

In the above example, the FRTQ signal issues after the FRTQ flip-flop is cleared following receipt of the JTEC signal from Memory-T, the FRAA signal at this moment representing a binary 1 to indicate that DAP-A has been communicating with a Memory. The consequent R-CAT signal thereupon clears the FCAT flip-flop of Output Register 304, FIG. 33.

Each of Output Latch sets 307–310 comprises five latches for storing the DC*i*0–4 signals representing an Actual Block Address; a sixth latch for storing the DH*i*C signal representing a request by Processor-*i* for a Translate Mode operation of the CIS; and a seventh latch for storing the DC*i*6 signal representing additional microcontrol information.

Each latch of Latch sets 307–310 comprises as one portion thereof one of the AND-gates of the respective one of gate sets 321–324 and a second portion a "locking" circuit. For example, the logical schematic diagram, FIG. 40, of the latch that stores the least significant digit of the Actual Block Address of the Memory assigned to DAP-A is:

*MAB4 DTAE+DCA4 JAAP=DCA4*

The MAB4 signal represents the least significant digit of the Actual Block Address provided by Address Translator 302, this digit being inserted into the corresponding latch of Latch set 308 during a Translation operation by the DTAE gate enabling signal. The DCA4 output signal then issues from this latch. The DCA4 signal also functions as a "locking" signal to maintain itself after the particular Translation operation has been completed and the DTAE signal becomes a binary 0. Thus, the DCA4 signal continues to issue until the JAAP signal, provided by DAP-A, becomes a binary 0. As described previously herein, the JAAP signal is transferred to a binary 0 after the Memory assigned to DAP-A receives an Actual Address.

Any number of DC*i*0–DC*i*4 signals may represent binary 1's. On the other hand, if the Actual Block Address represents Block Number 0, all of the DC*i*0–4 signals will be binary 0's. The DC*i*6 signal represents additional control information as required by the initiating Processor. The DH*i*C signal is provided by the Output Latches when the corresponding Processor-*i* requests a Translate Mode operation of the CIS. When a Translate Mode operation is requested, not only does the DH*i*C signal represent a binary 1, but the DC*i*0–4 signals represent an Actual Block Address in a Memory in which the initiating Processor may communicate.

The DT*i*Z signal, FIG. 41, denotes that a CAT Output Latch set current stores an Actual Block Address for the Memory assigned to Processor-*i*, this signal cooperating in preventing the CAT from recognizing another request by Processor-*i*. The DC*i*C signal, FIG. 41, denotes that a CAT Output Register currently stores an identification of a Memory for communication with Processor-*i*, this signal also cooperating in preventing recognition of another request by Processor-*i*.

*Memory request signal generator*

Memory Request Signal Generator 328, shown in detail in FIG. 28, provides signals to notify the CIC-R/S of the acceptance by the CAT of a Memory request from a Processor and of the completion of an Address Translation operation in response to this request. The Memory Request Signal Generator comprises four, type-H, TT*i*R one-shots, each one-shot delivering a respective $\overline{TT_iR}$ output signal. When a $\overline{TT_iR}$ signal becomes a binary 1, it is effective as a notification to the CIC-R/S.

Each TT*i*R one-shot is maintained in the unstable 1-state by the respective $\overline{DC_iC}$ signal so long as the corresponding CAT Output Register stores no Memory identification. At such time the $\overline{TT_iR}$ signal is a binary 0. Following an Address Translation operation for Processor-*i* and the storage of a Memory identification in the corresponding Output Register, the DC*i*C signal becomes a binary 1, FIG. 41, and therefore the $\overline{DC_iC}$ signal becomes a binary 0. After the $\overline{DC_iC}$ signal becomes a binary 0, the TT*i*R one-shot continues in its unstable state for an additional 60 nanoseconds (ns.) and then reverts to its 0-state, whereupon the $\overline{TT_iR}$ signal becomes a binary 1. This binary 1 $\overline{TT_iR}$ signal is then recognized by the CIC-R/S to control the start of a Memory cycle in the Memory designated by the corresponding CAT Output Register.

The TT*i*R one-shot does not return to the 1-state until the Memory-*j* assigned to the corresponding Processor-*i* has completed is cycle and generated the corresponding J*j*EC signal.

*Memory start signal generator*

Memory Start Signal Generator 329, shown in detail in FIG. 29, provides signals for controlling CAX output gates to initiate cycles in the Memories. The Memory Start Signal Generator comprises four, type-H, TT*i*S one-shots, each one shot delivering a respective $\overline{TT_iS}$ output signal. When a $\overline{TT_iS}$ signal becomes a binary 1, it is effective to control CAX output gates.

Each TT*i*S one-shot is maintained in the unstable 1-state by the respective $\overline{FR_iA}$ signal so long as the FR*i*A flip-flop of the Processor Access Granting Register remains in the 0-state. At such time the $\overline{TT_iS}$ signal is a binary 0. Following the issuance of a $\overline{TT_iR}$ request signal by Memory Request Signal Generator 328, the CIC-R/S grants the Memory communication request for the corresponding Processor-*i* by transferring the FR*i*A flip-flop to the 1-state. Therefore, the $\overline{FR_iA}$ signal drops to a binary 0. After the $\overline{FR_iA}$ signal becomes a binary 0, the TT*i*S one-shot continues in its unstable state for an additional 100 ns. and then reverts to its 0-state, whereupon the $\overline{TT_iS}$ output signal becomes a binary 1. This binary 1 $\overline{TT_iS}$ signal is then effective to control CAX output gates to initiate a Memory cycle for the corresponding Processor-*i*.

The TT*i*S one-shot does not return to the 1-state until Memory-*j* assigned to the corresponding Processor-*i* has completed its cycle and generated the corresponding J*j*EC signal.

*Time-controller*

The detailed structure of the Timer-Controller is shown in FIGS. 26, 27 and 39.

Timer-Controller 330 provides signals to control the sequence of the individual operations which take place within the CAT from the time of recognition of a Processor request until the Symbolic Address provided by the Processor has been translated, the resulting Actual Address stored, and transient signals cleared from the Address Translator.

Figure 88:
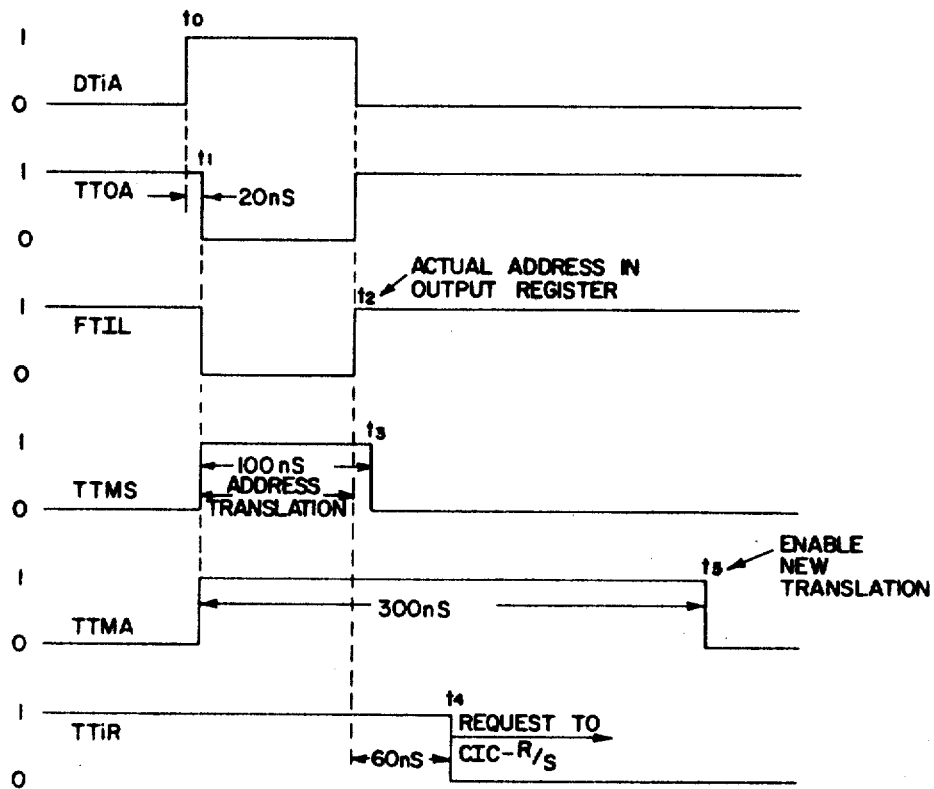
FIGURE 88 illustrates waveforms of significant signals in the CAT Translation cycle.

Timer-Controller 330 receives and responds to the DT*i*A translation initiation signals from Input Scanner 301; delivers the DTEA signal, which denotes that Translator 302 is ready to provide an Address Translation; and delivers the DT*i*E signals, which enable gate sets 321–324 for transferring the output signals of Translator 302 to Output Registers 303–306 and Output Latch sets 307–310. FIGURE 88 illustrates waveforms demonstrating the temporal relationship of various CAT signals during a Translation cycle.

The timing cycle of Timer-Controller 330, and consequently of the Address Translation operation of Translator 302, cannot be initiated until the DTEA signal represents a binary 1. After the DTEA signal becomes a binary 1, a DT*i*A translation initiation signal issues when the first one of the output signals of the FT2A or FT3A flip-flops becomes a binary 1, which follows recognition of a corresponding Processor request by Input Scanner 301. The DT*i*A signal thereupon initiates the start of the timing cycle by transferring the input signal of the TTOA, type-H, one-shot to a binary 0, FIG. 27. The TTOA one-shot, which is maintained in the unstable 1-state in the absence of a DT*i*A translation initiation signal, continues in the 1-state for an additional 20 ns. after a $\overline{DTiA}$ signal becomes a binary 0, and then reverts to its 0-state. The $\overline{TTOA}$ signal thereupon become a binary 1.

The transfer of the TTOA one-shot to the 0-state triggers the TTMS, type-F, one-shot to its unstable 1-state, the TTMS one-shot remaining in the 1-state for 100 ns. The TTMS one-shot in its 1-state controls translation of a Symbolic Address by enabling Encoder Input Gates 356 and Encoder Output Gates 357 of Translator 302, FIG. 16. Since each DT*i*A signal also enables corresponding ones of gate sets 313–320 to transfer Symbolic Address signals to Translator 302, the delay in the transfer of the TTOA one-shot to the 0-state permits the stabilization of the Symbolic Address signals on the input leads of Translator 302 before the Address Translation commences.

Transfer of the TTMS one-shot to the 1-state also transfers the FTIL flip-flop to the 0-state and triggers the TTMA, type-F, one-shot to the unstable 1-state, the TTMA one-shot remaining in the 1-state for 300 ns.

When the FTIL flip-flop is in the 0-state, the one of gate sets 321–324 corresponding to the Processor-*i* for which the Translation operation is being provided is enabled by a respective DT*i*E signal to transfer the output signals of Translator 302 to a respective one of Output Registers 303–306 and Output Latch sets 307–310. For example, the logical schematic diagram for the circuit which generates the DTAE signal is:

$$DTAA \ \overline{FTIL} = DTAE$$

This circuit is shown in FIG. 39.

After the Actual Address is stored in one of the Output Registers, the corresponding DT*i*A signal is inactivated and becomes a binary 0. The TTOA one-short then is transferred to its 1-state and, in turn, transfers the FTIL flip-flop to the 1-state. When the FTIL flip-flop enters the 1-state, the active DT*i*E signal becomes a binary 0 and the effective period of the Translation operation is terminated by disablement of gate sets 321–324.

The TTMA one-shot, however, continues in the unstable 1-state for approximately 200 ns. after the end of the Translation period to permit clearing of transient signals in Address Translator 302. The TTMA one-shot thereupon reverts to the 0-state, enabling triggering of the TTMS one-shot and thereby enabling the Address Translator to commence another Translation operation, as follows:

$$\overline{TTOA} \ FTIL \ \overline{TTMA} = T\text{-}TMS$$

The CAT notifies the CIC-R/S after completion of a Translation operation by generating the $\overline{TTiR}$ signal approximately 60 ns. after storage of the Actual Address in an Output Register.

*Address translation topologies*

Various configurations of Address Translator 302 are employed to provide different types of Address Translation topologies. FIGURES 89–93 illustrate schematically a few of the representative types of Translation topologies employed in the instant invention.

Address Translator 302 assigns the storage locations, also termed "cells" herein, of the Memories of the Memory group in blocks of 1024 contiguously addressable locations. However, for simplicity herein, the number of cells in a block frequently will be referred to as 1,000 (1K). Similarly, the number of cells in a set of blocks frequently will be referred to by the closest integral multiple of 1,000. For example, although a set of six blocks comprises 6144 cells, the set will be referred to as comprising 6,000 (6K) cells.

Each Subject Program and Operating System program comprises a set of instructions operationally related to a plurality of contiguous symbolically addressed Memory cells. Accordingly, whenever a Processor requires communication with the Memory group, it provides a Symbolic Address. For example, if a particular program requires an 8K group of Memory cells, the Symbolic Addresses provided by the program represent numbers within the range of 0000–8191.

The Symbolic Address provided by the instructions of the instant embodiment comprises 15 bits and, therefore, can symbolically represent 32K different Memory cells. The five most significant bits of the Symbolic Address comprise the Symbolic Block Address, which represents symbolically the first location of a 1K block of storage locations. The ten least significant bits of the Symbolic Address comprise the Symbolic Word Address, which represents symbolically one of the 1024 cells in the block represented by the Symbolic Block Address. For example, if the Symbolic Block Address represents symbolic block 23, the first cell of this symbolic block is represented by the complete Symbolic Address 23,552. The Symbolic Word Address representing one of the numbers 0000–1023 identifies a particular one of the 1024 different cells in symbolic block 23; i.e., the symbolic cells 23,552–24,575. Hence, continuing the example, if the Symbolic Word Address represents the number 575 with the Symbolic Block Address representing symbolic block 23, the symbolic cell 24127 is addressed by the complete Symbolic Address.

Each program executed by a Processor has an assigned Program Number of five bits. Whenever a Processor requires communication with the Memory group, it provides signals representing both the current Program Number and a Symbolic Address. The signals representing the Symbolic Word Address are transmitted to the CAX. The signals representing the Program Number and the Symbolic Block Address are transmitted to the CAT, and are then applied to Address Translator 302 when a Translation operation is to be performed by the CAT for the originating Processor.

The Program Number and the Symbolic Block Address are translated as an entity by the Address Translator into a representation of an actual block in the Memory group. Accordingly, the output signals of Translator 302 identify a specific one of the Memories employed and represent an Actual Block Address in the identified Memory. Thus, continuing the above example, assume that the Subject Program providing the Symbolic Block Address representing symbolic block 23 and providing the Symbolic Word Address representing the number 575 has been assigned Program Number 5. Assume further that this combination of Program Number and Symbolic Block Address is translated by the CAT to identify actual block 3 in Memory-T. If the Symbolic Word Address is not translated, but is employed directly as the Actual Word Address, the complete Actual Address represents cell 3647 in Memory-T.

Usually the Symbolic Word Addresses of Subject Programs are not translated, but are transferred directly through the CAX to represent Actual Word Addresses. On the other hand, the Symbolic Word Addresses of Operating System programs are frequently translated by the CIS to provide Actual Word Addresses.

Figure 89:
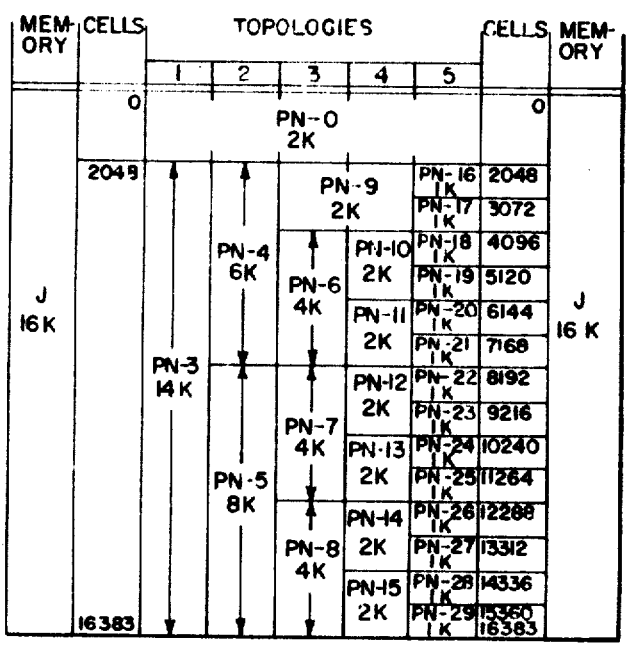

FIGURE 89 illustrates five different Translation topologies made available by an Address Translator for a single 16K Memory wherein 27 different Program Numbers are employed. (The 16K Memory actually has 16,384 cells.) The word "topology," as used herein, refers to a particular "map" or chart of the Memory group when it is occupied by a particular set of programs. This chart changes as the occupying program set changes. In each of the five topologies the first 2K cells are reserved for the Operating System programs, assigned Program Number 0, "PN–0" being specified for brevity. (Although Program Numbers 0, 1, and 2 are reserved for use by the complete Operating System of the instant embodiment, the topologies illustrated in FIGS. 89–93 employ only PN–0 programs.)

In topology #1, the entire portion of the Memory available for Subject Programs is assigned to a single Subject Program. In scheduling for execution Subject Programs requiring more than 8K cells, but not more than 14K cells, the Operating System for the Address Translator illustrated in FIG. 89 assigns PN–3 to such programs. Each PN–3 program is permitted the capability of providing any Symbolic Address from 00000 to 14335. During execution of this program, communication with the Memory group is initiated when the executing Processor transmits to the CAT five signals representing PN–3 and five signals representing one of the symbolic blocks 0–13. The CAT thereupon translates the combined set of ten signals to an identification of Memory-J and a representation of one of actual blocks 2–15. It is not required that the fourteen symbolic block representations 0–13 be translated into a corresponding series of actual blocks 2–15. Thus, symbolic blocks 2 and 3 do not have to be translated to the respective actual blocks 4 and 5, but, for example, may be translated to the respective actual blocks 14 and 6. However, in the Translator represented by FIG. 89, each Symbolic Block Address is translated to a unique Actual Block Address. Since the Symbolic Word Address of the Subject Program is not translated, it represents the relative position of the addressed cell with respect to the first cell of the actual block.

When the System is operating in topology #1 of FIG. 89, a Subject Program assigned PN–3 is being executed by a single Processor. No other Processor is permitted to execute a Subject Program, since all of the Memory allocated to Subject Programs has been assigned to the PN–3 program. Therefore, the remaining Processors can execute only Operating System programs.

In topology #2, FIG. 89, the portion of the Memory available for Subject Programs is assignable to two Subject Programs. In scheduling for simultaneous execution two Subject Programs, one requiring more than 4K cells, but not more than 6K cells, and the other requiring more than 6K cells but not more than 8K cells, the Operating System assigns the respective PN–4 and PN–5 to the two programs. Each PN–4 the program is permitted the capability of providing any Symbolic Address from 0000 to 6143, and each PN–5 program is permitted the capability of providing any Symbolic Address from 0000 to 8191. The CAT translates the combined set of ten signals representing PN–4 and one of symbolic blocks 0–5 to an identification of Memory-J and a representation of one of actual blocks 2–7. The CAT translates the combined set of ten signals representing PN–5 and one of symbolic blocks 0–7 to an identification of Memory-J and a representation of one of actual blocks 8–15. As described above with reference to topology #1, the different symbolic block numbers of each of the two Subject Programs need not be translated into a corresponding series of actual block numbers, but it is merely required that a unique Actual Block Address be provided for each different Symbolic Block Address-Program Number combination within a given topology.

For best efficiency in executing programs it has been specified above that PN–4 is assigned to Subject Programs requiring more than 4K but not more than 6K cells and that PN–5 is assigned to Subject Programs requiring more than 6K but not more than 8K cells. However, at certain times the set of Subject Programs scheduled for execution may not comprise two programs fitting the most efficient criterion for topology #2. For example, although one scheduled Subject Program may require more than 4K but not more than 6K cells and be assigned PN–4, the largest additional scheduled program may require but 5K cells. Accordingly, the scheduler will assign PN–5 to this program. Therefore, topology #2 is also employed in the execution of two Subject Programs each requiring more than 4K, but not more than 6K cells.

In topology #3, FIG. 89, the portion of the Memory available for Subject Programs is assignable to four Subject Programs. In scheduling a set of Subject Programs for simultaneous execution in accordance with topology #3, one program requiring no more than 2K cells is assigned PN–9 and three programs, each requiring more than 2K cells, but not more than 4K cells, are assigned respectively PN–6, 7, and 8. The PN–9 program is permitted the capability of providing Symbolic Addresses in the range 0000–2047. Each PN–6, 7, and 8 program is permitted the capability of providing Symbolic Addresses in the range 0000–4095. The CAT translates the combined set of ten signals representing PN–9 and one of symbolic blocks 0 to 1 to an identification of Memory-J and a representation of one of actual blocks 2 or 3. The CAT translates the combined set of ten signals representing PN–6, 7, or 8 and one of symbolic blocks 0–3 to an identification of Memory-J and a representation of one of the blocks in the respective actual block sets 4–7, 8–11, or 12–15. As in the employment of topology #2, a program requiring less than 2K cells may be assigned a PN–6, 7, or 8 designation to complete a set of Subject Programs for operation in topology #3.

The translator providing the topologies of FIG. 89 also permits PN–9 and PN–6 programs to be executed at the same time as a PN–5 program without conflict, or, correspondingly, permits PN–7 and PN–8 programs to be executed simultaneously with a PN–4 program.

In the instant embodiment, wherein three DAP's are provided, any three of the four different Subject Programs of topology #3 may be in execution simultaneously, and immediately following the earliest termination of one of these three programs, the fourth program may be executed without conflict. However, if a new topology is scheduled for execution immediately following completion of the programs of a topology currently being executed, the Scheduler routine of the Operating Systems must protect against the possibility of simultaneously executing two programs requiring communication with the same actual Memory cell. For example, with the permitted topologies of FIG. 89, two Subject Programs assigned respectively PN–4 and PN–6 cannot be in simultaneous execution by two different Processors since both of these two programs communicate with actual blocks 4–7 of Memory-J. However, certain overlapping of topologies is possible as the programs of a current topology are completed and the programs of a new topology come into execution. For example, tooplogy #3 may be started before topology #2 is completed if, for example, PN–4 is first completed and then PN–9 or PN–6, or both, are executed in place of the completed PN–4. Similarly, PN–7 or PN–8, or both, may be executed immediately after PN–5 has been completed.

In topology #4, FIG. 89, the portion of the Memory available for Subject Programs is assignable to seven Subject Programs, each requiring not more than 2K cells. PN–9 through PN–15 are assigned to respective ones of these Subject Programs. Each such program is permitted the capability of providing Symbolic Addresses in the range 0000–2047. The CAT translates the combined set of ten signals representing one of these Program Numbers and one of symbolic blocks 0 or 1 to an identification of Memory-J and a representation of one of the blocks in the respective actual block pairs 2 and 3, 4 and 5, 6 and 7, 8 and 9, 10 and 11, 12 and 13, and 14 and 15. As described previously in relation to topologies #2 and #3, any one or more of the Subject Programs of topology #4 may be executed in lieu of a complete program occupying the same horizontal rows of one of the lower-numbered topologies of FIG. 89. Thus, PN–10, PN–11 or both PN–10 and PN–11 may be executed instead of the PN–6 program while topology #3 continues, instead of the PN–4 program while topology #2 continues.

Topology #5 permits the simultaneous execution of fourteen different Subject Programs, each requiring not more than 1K cells. Each of these fourteen programs is permitted the capability of providing any Symbolic Address in the range 0000–1023. In the instant embodiment any three of the fourteen Subject Programs may be executed simultaneously by the DAP's, and immediately following termination of any one of these three programs any one of the remaining programs comprising topology #5 may be executed without conflict.

FIGURE 89 and the above explanation thereof, describe an invention wherein a plurality of programs may be executed simultaneously, and wherein each of these programs may be operationally related to a common plurality of Memory cells without conflict with the other programs. These capabilities are provided by Address Translator 302, which assigns to each program of a particular topology a unique portion of the Memory group and prevents any other program of the same topology from obtaining access to this portion, thereby preventing interference with or failure of each such program. Additionally, the Address Translator permits each Subject Program to comprise a set of instructions operationally related to a plurality of contiguous symbolically addressed Memory cells commencing with symbolic cell 0000. Therefore, each Subject Program is executed by a DAP independently of any information as to the actual or symbolic Memory cells required by the other programs currently being executed.

Translator 302 thereby frees the System of requiring fixed sets of interdependent Subject Programs wherein each Subject Program can be executed only as part of such a set. Instead, the Translator provides that various combinations of Subject Programs may, upon scheduling, be executed simultaneously, the Translator automatically assigning these programs different portions of the Memory group and protecting each such program from the others being executed.

FIGURE 90 illustrates five topologies organized from the same sets of Subject Programs that comprise the five topologies of FIG. 89. However, in the System of FIG. 90 the Memory group occupied by each of the five different program sets comprises five Memories. An Address Translator of the same capacity as that represented by FIG. 89 may be employed. As in FIG. 89, the Memory group comprises 16K cells, but the cells shown in FIG. 90 are distributed through five Memories.

Memory-J and Memory-K each comprise 2K cells. Memory-L, Memory-M and Memory-N each comprise 4K cells. Memory-J is reserved for use by the PN–0 Operating System programs. The remaining four Memories are reserved for Subject Programs.

In topology #1, Memory-K, L, M and N are assigned to one Subject Program, identified as the PN–3 program, which requires more than 8K cells but not more than 14K cells. This program is permitted the capability of providing any Symbolic Address from 00000 to 14335. The CAT translates the combined set of ten signals representing PN–3 and one of symbolic blocks 0–13 to an identification of Memory-K, L, M, or N and a representation of one of the blocks in the respective actual block sets 0 or 1 for Memory-K and 0–3 for Memory-L, M, and N. Any one of the symbolic blocks 0–13 may be translated into any one of the actual blocks of Memory-K, L, M and N. For example, symbolic block 0 of PN–3 may be translated to represent actual block 2 of Memory-M and symbolic block 1 of the same program may be translated to represent actual block 0 of Memory-L.

Similarly to the System employing the Translator of FIG. 89, when topology #1 of FIG. 90 is being executed, all of the Memories assigned for use by Subject Programs are reserved to the single Processor executing PN–3 and, therefore, no other Processor is permitted to execute a Subject Program. The other Processors can execute only Operating System programs.

The remaining topologies of FIG. 90 represent relations between the respective Subject Program sets and the Memory group similar to the relations represented by the corresponding topologies of FIG. 89. Accordingly, the previous explanation of the System of FIG. 89 is applicable to an understanding of the topologies of FIG. 90.

Figure 91:
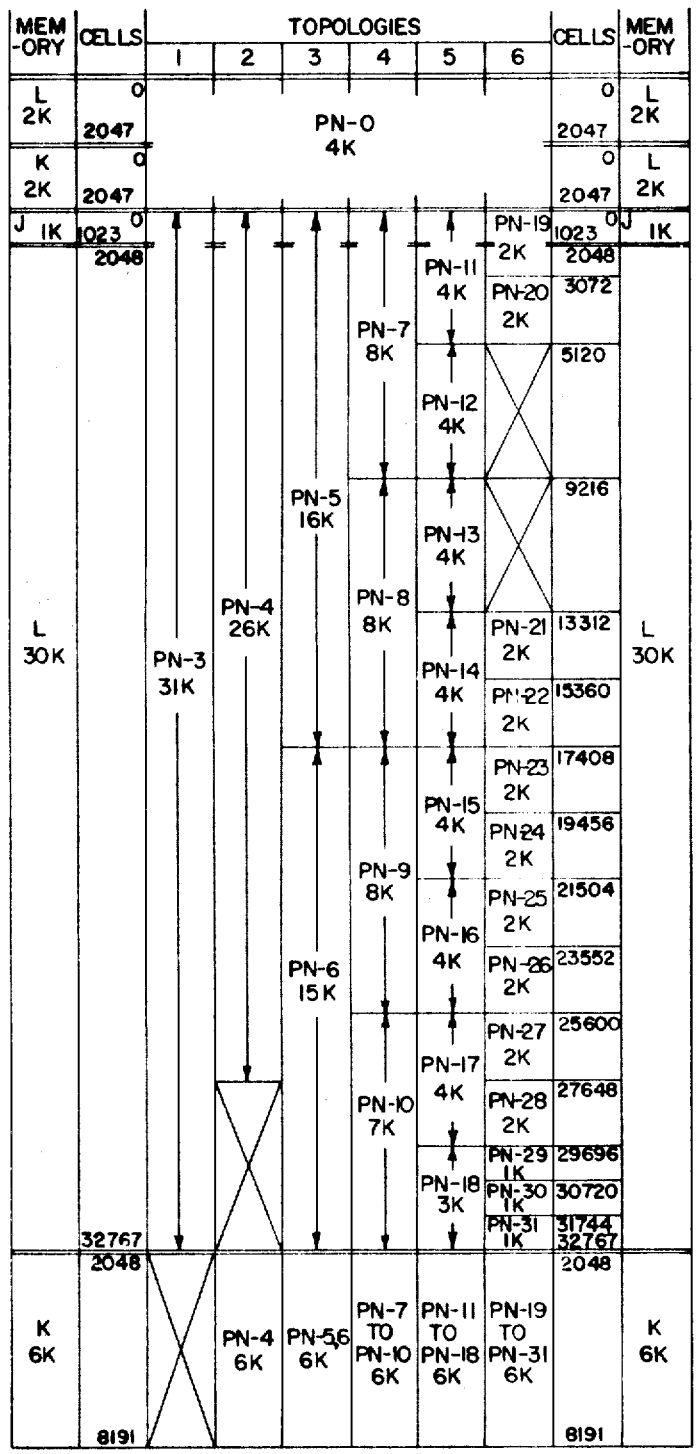

FIGURE 91 illustrates six translation topologies made available by an Address Translator for three different Memories providing 41K cells, wherein 29 different Program Numbers are employed. Memory-J is a very fast read-write 1K Memory. One type of device useful for the function of Memory-J is the magnetic thin-film random-access memory. Memory-K is a very fast read-only 8K Memory. One type of device useful for the function of Memory-K is the capacitive fixed memory system described heretofore. The 32K Memory-L may be a conventional magnetic core random-access read-write memory.

The Operating System programs, designated by PN–0, have reserved therefor 2K cells of Memory-K and 2K cells of Memory-L. Therefore, the Operating System programs are accessible to both conventional read-write cells and rapid read-only cells.

Memory-J, 6K cells of Memory-K, and 30K cells of Memory-L are for use of the Subject Programs. In topology #1, Memory-J and the 30K cells of Memory-L are assigned to one Subject Program, designated as PN–3. Subject Programs requiring more than 26K read-write cells are assigned PN–3 during scheduling. Each PN–3 program is permitted the capability of providing any Symbolic Address from 00000 to 31743. The CAT translates the combined set of ten signals representing PN–3 and one of symbolic blocks 0–30 either to an identification of Memory-J and a representation of actual block 0 or an identification of Memory-L and a representation of one of actual blocks 2–31. As described previously, any symbolic block number may be translated into the block of Memory-J or into any one of the allowable actual blocks of Memory-L. For example, symbolic block 5 of PN–3 may be translated to an identification of Memory-J and a representation of actual block 0. However, a Subject Program intended to be executed as PN–3 is usually written so that a particular one of the symbolic blocks is translated to the block of the fast Memory-J. Therefore, in order that the desired symbolic block is executed in Memory-J, either the Translator must be organized to provide for this requirement of the program or the program must, in this instance, be written with knowledge of the particular translator. Since other topologies of the System of FIG. 91 utilize Memory-J, one technique for providing Memory-J for a specific symbolic block of several different programs is to reserve a specific symbolic block, such as symbolic block 0, for translation to Memory-J in all topologies. Thus, the Scheduler would assign a Program Number providing translation to Memory-J to each program with symbolic block 0. For example, in FIG. 91, such programs would be assigned PN–3, 4, 5, 7, 11 or 19, according to the size of the program.

In topology #2 the full 32K symbolic addressing capability of the Subject Program may be utilized by providing 32K cells comprising the 1K cells of Memory-J, 25K cells of Memory-L, and 6K cells of Memory-K. Hence, each PN–4 program is permitted the capability of providing any Symbolic Address from 00000 to 32767. The CAT translates the signals representing PN–4 and one of symbolic blocks 0–31 to an identification of Memory-J, K, or L and a representation of one of the actual addressable blocks in each Memory; for example, one of actual blocks 2–26 of Memory-L or 2–7 of Memory-K.

For topologies #3–#6 the System of FIG. 91 provides a capability not found in the Systems of FIGS. 89 and 90. In these latter Systems the nature of the topology employed requires that a unique Actual Block Address be provided for each different Symbolic Block Address-Program Number combination within each topology. This is a protective feature provided by the instant invention for use with read-write Memories to prevent interference between programs of a given topology; for example, to prevent one program writing in and thereby destroying the contents of cells subsequently to be read by another program of the same topology.

However, many different programs frequently use the same routines or subroutines or employ identical tables of standard data. It would be wasteful to allot Memory space to each such Subject Program to provide for these common routines and tables. Therefore, in accordance with the instant invention, common portions of different Subject Programs of the same topology are stored in a read-only section of the Memory group and are accessible to all Subject Programs of that topology. By storing these common portions in read-only Memory, no Subject Program can destroy or modify the information therein, and these portions will always be in the form required by a utilizing Subject Program. Thus, topologies 3–6 in FIG. 91 are provided with this capability.

In topology #3, FIG. 91, the portion of the Memory available for Subject Programs is assignable to two Subject Programs. In scheduling for simultaneous execution two Subject Programs, one requiring more than 8K, but not more than 16K read-write cells, and the other requiring more than 8K, but not more than 15K read-write cells, the Operating System assigns the respective PN–5 and PN–6 to the two programs. Each PN–5 program is permitted the capability of addressing twenty-two symbolic blocks and each PN–6 program is permitted the capability of addressing twenty-one symbolic blocks. The CAT translates signals representing PN–5 and one of the symbolic blocks provided to an identification of Memory-J and a representation of block 0 therein, an identification of Memory-K and a representation of one of actual blocks 2–7 therein, or an identification of Memory-L and a representation of one of actual blocks 2–16 therein. The CAT translates signals representing PN–6 and one of the symbolic blocks provided to an identification of Memory-K and a representation of one of actual blocks 2–7 therein, or an identification of Memory-L and a representation of one of actual blocks 17–31 therein. Thus, it is seen that six symbolic block addresses provided by both PN–5 and PN–6 programs are translated to represent the same set of six actual blocks of Memory-K. Accordingly, the Address Translator providing topology #3 in FIG. 9 permits the storage of common portions of Subject Programs PN–5 and PN–6 in a read-only section of Memory-K.

In a manner similar to that described above for providing a particular symbolic block of a Subject Program assured access to the rapid Memory-K, those portions of the Subject Programs of the System of FIG. 91 requiring access to the common blocks of Memory-K must be assured that such access occurs. One technique is to reserve specific symbolic blocks in each Subject Program for translation to the common Memory portion. For example, in the topologies of FIG. 91 symbolic blocks 0–5 may be used for those portions of each program intended to be operationally related to the six actual blocks 2–7 of Memory-K. Alternatively, symbolic blocks 26–31 may be employed for this purpose.

In topology #4, FIG. 91, the portion of the Memory available for Subject Programs is assigned to four Subject Programs. In scheduling a set of Subject Programs for execution in accordance with topology #4, three programs each requiring more than 4K, but not more than 8K read-write cells, are assigned respectively PN–7, 8 and 9, and one program requiring more than 4K, but not more than 7K read-write cells, is assigned PN–10. Additionally, the PN–7 program may be one which requires the capability of the 1K fast Memory-J. Furthermore, in topology #4, each of the four programs is provided communication with the common six blocks of Memory-K. The function of the Address Translator in receiving Symbolic Block Addresses presented by these four Subject Programs and providing Actual Block Addresses in Memory-J, Memory-K and Memory-L has been described heretofore.

The remaining topologies of FIG. 91 represent relationships between the respective Subject Program sets and the Memory group similar to the relationships described heretofore. Accordingly, the previous explanations of the Systems of FIGS. 89, 90 and 91 are applicable to an understanding of topologies 5 and 6 of FIG. 91. It is to be noted herein that topology #6 does not translate any of the Symbolic Addresses of the PN–19 to PN–31 programs to actual blocks 5–12 of Memory-L.

Figure 92:
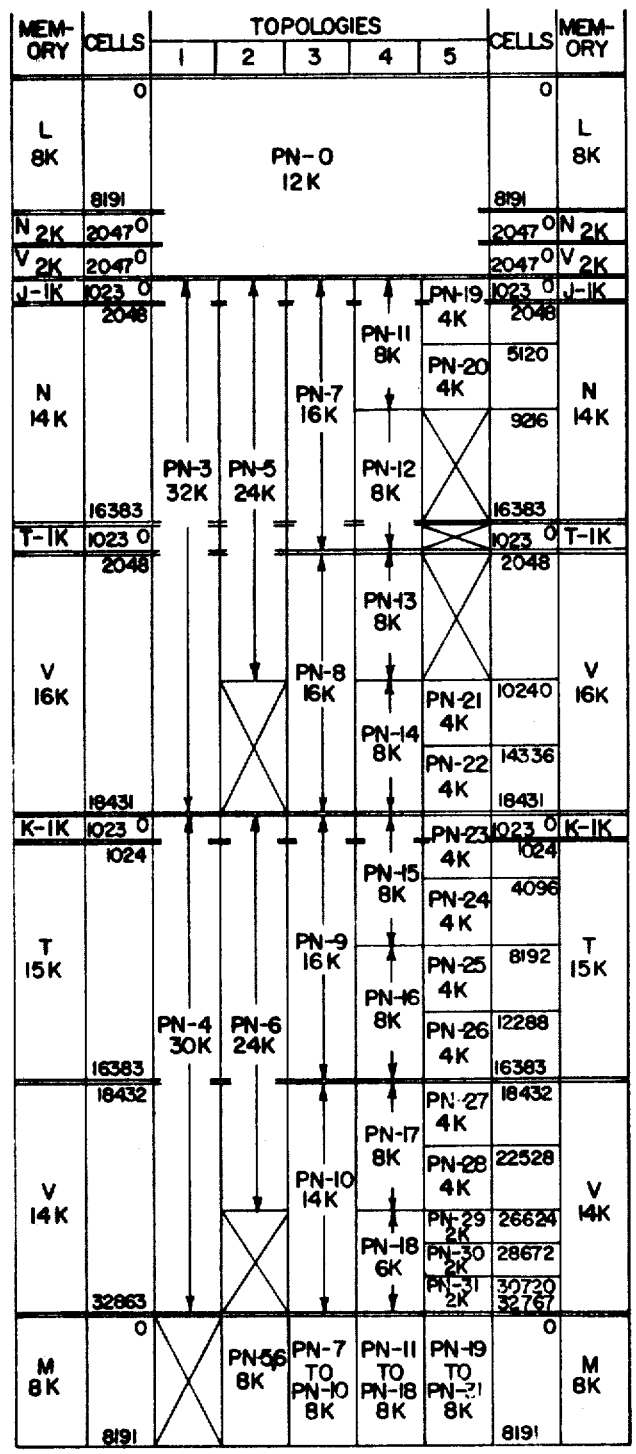

FIGURE 92 illustrates five topologies made available by the Address Translator for a System employing seven different Memories, as illustrated in the present embodiment. The seven different Memories provide 82K cells. Memory-J and Memory-K are very fast read-write 1K Memories. Memory-L and Memory-M are very fast read-only 8K Memories. Memory-N and Memory-T are relatively fast magnetic core random-access read-write 16K memories whereas Memory-V is a slower magnetic core random-access read-write 32K memory. Similarly to Memory-K of the FIG. 91 System, Memory-M of the FIG. 92 System provides storage for common portions of a plurality of Subject Programs; accordingly, the entire Memory-M is accessible by PN–5 and PN–6 of topology #2, PN–7 to PN–10 of topology #3, PN–11 to PN–18 of topology #4 and PN–19 to PN–31 of topology #5.

The Operating System programs, designed by PN–0, have reserved therefor the entire 8K of read-only Memory-L, 2K of the fast core Memory-N, and 2K of the slower core Memory-V.

Memory-J, Memory-K, Memory-M, 14K cells of Memory-N, Memory-T, and 30K cells of Memory-V are for use by the Subject Programs. In topology #1, Memory-J, the 14K cells of Memory-N, 1K of Memory-T, and 16K cells of Memory-V are assigned to one Subject Program, designated as PN–3; and Memory-K, the remaining 15K cells of Memory-T, and the remaining 14K cells of Memory-V are assigned to another Subject Program, designated as PN–4. Generally, Subject Programs requiring more than 24K read-write cells are assigned PN–3 or PN–4 during scheduling. Each PN–3 program must provide all Symbolic Addresses 00000–32767 to make full use of the Memories assigned thereto. Each PN–4 program is permitted the capability of providing any one of thirty Symbolic Block Addresses. As described previously, if the PN–3 program is to make most effective use of Memory-J and the portions of Memory-N and T assigned thereto and PN–4 is to make most effective use of Memory-K and the portion of Memory-T assigned therto, certain specific groups of Symbolic Block Addresses must be employed in these programs in order to be translated to identify cells in these particular Memories.

Figure 93:
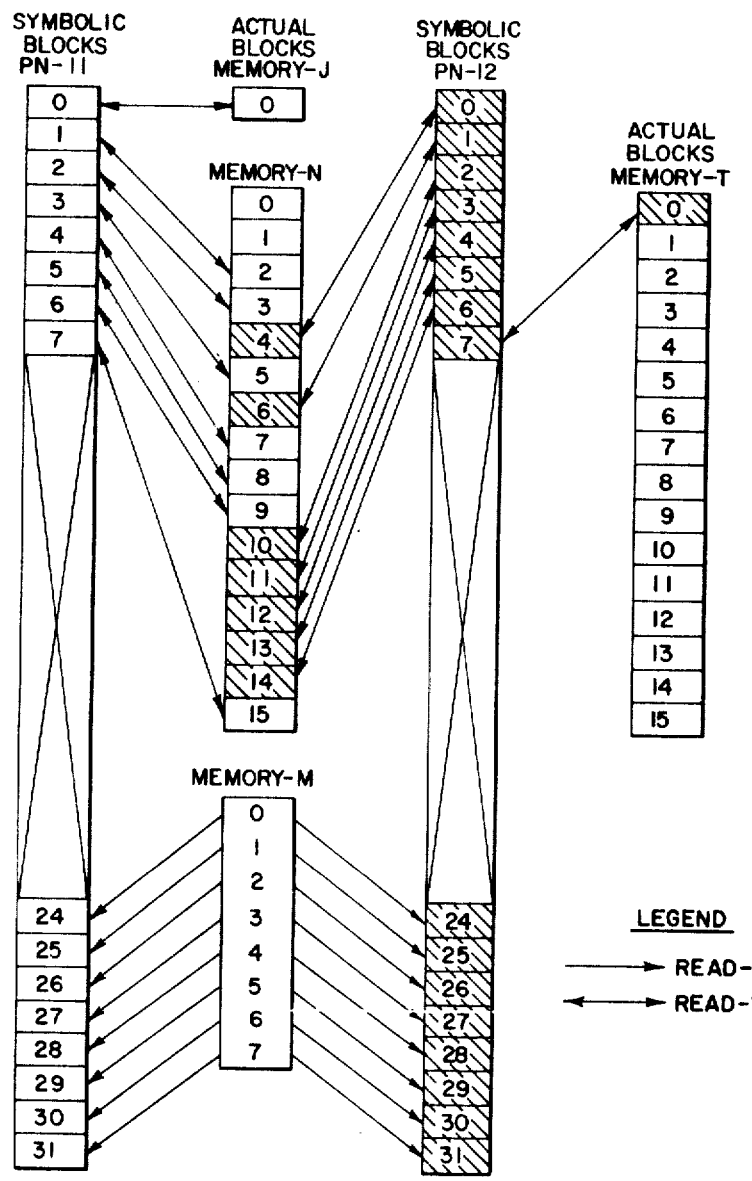

The remaining topologies #2–#5 provide that each program thereof has access to the common routines stored in Memory-M. Each of these programs will reserve a particular group of eight Symbolic Block Addresses for uniform translation to the Actual Block Addresses of Memory-M. To illustrate additional details of the functions and structure of the Address Translator, a "magnification" of a portion of topology #4 of FIG. 92 is shown in FIG. 93. FIGURE 93 illustrates the individual block topology Translator structure for PN—11 and PN–12 programs.

The Translator assigns Memory-J and seven blocks of Memory-N to PN–11, and assigns seven blocks of Memory-N and one block of Memory-T to PN–12. Additionally, each of these two 16K programs is provided the capability of communicating with the common routines stored in Memory-M. Symbolic block 0 of PN–11 is translated to actual block 0 of Memory-J. Symbolic blocks 1–7 are translated to actual blocks in Memory-N intersperced with the actual blocks allocated to PN–12. Thus, symbolic blocks 1 and 2 of PN–11 are translated to respective actual blocks 2 and 3 of Memory-N, symbolic block 3 is translated to actual block 5, symbolic blocks 4, 5 and 6 are translated to respective actual blocks 7, 8 and 9, and symbolic block 7 is translated to actual block 15. Symbolic block 0 of PN–12 is translated to actual block 4 of Memory-N, symbolic block 1 is translated to actual block 6 and symbolic blocks 2–6 are translated to the respective actual blocks 10–14. Finally, symbolic block 7 of PN–12 is translated to actual block 0 of Memory-T.

Additionally, symbolic blocks 24–31 of both PN–11 and PN–12 are translated to respective actual blocks 0–7 of Memory-M to provide read-only access for both programs to the common routines stored in Memory-M.

In addition to illustrating the distribution of block translation, FIG. 93 illustrates the capability of the Address Translator to translate a series of continguous Symbolic Addresses into a set of noncontiguous Actual Addresses in a particular Memory. Further, the figure illustrates the translation of a series of contiguous Symbolic Addresses into a set of noncontiguous Actual Addresses distributed throughout several Memories. The following table describes the complete Symbolic Address translation provided for PN–11.

TABLE 5

| Symbolic Block Address | Inclusive Sym Addresses | Memory | Actual Block Address | Inclusive Act Add |
|---|---|---|---|---|
| 0 | 0–1023 | J | 0 | 0–1023 |
| 1 | 1024–2047 | N | 2 | 2048–3071 |
| 2 | 2048–3071 | N | 3 | 3072–4095 |
| 3 | 3072–4095 | N | 5 | 5120–6143 |
| 4 | 4096–5119 | N | 7 | 7168–8191 |
| 5 | 5120–6143 | N | 8 | 8192–9215 |
| 6 | 6144–7167 | N | 9 | 9216–10239 |
| 7 | 7168–8191 | N | 15 | 15360–16383 |

Accordingly, the Address Translator functions to translate a series of contiguous symbolic blocks into a set of noncontiguous actual blocks. Thus, although the instructions of a Subject Program are operationally related to a set of contiguous symbolically addressed Memory cells, the Address Translator provides the capability of executing the program with respect to a set of noncontiguous actual Memory cells or with respect to a set of noncontiguous actual Memory blocks, the contents of each such block being a predetermined number of contiguous cells.

By providing each Subject Program the capability of execution with respect to a noncontiguous distribution of action blocks throughout the Memory group, the Translator provides the System an additional flexibility in scheduling programs for execution. Thus, if the Address Translator comprises the read-write form described heretofore, the stored contents are alterable to allocate the free Memory blocks for the next program requiring execution.

Consider the following simple example of this capability with reference to the topologies of FIG. 90. Assume that topology #5 is being executed and that a Subject Program requiring 2K cells has next priority for execution. If, now PN–17, being executed with respect to actual block 1 of Memory-K is first completed and then PN–25, being executed with respect to actual block 3 of Memory-M, is next completed, these two free blocks can next be allocated to the waiting program. The Scheduler routine adjusts the contents of the Address Translator to translate symbolic block 0 of the waiting Subject Program to actual block 1 of Memory-K and symbolic block 1 to actual block 3 of Memory-M. At the same time the Scheduler assigns an available PN number, such as PN–11, to this waiting Subject Program. The 2K Subject Program can then be executed at once, and does not have to wait either for a contiguous block pair to be released or for the release of the block pair allocated to PN–11 by the read-only Translator illustrated in FIG. 90. Therefore, this additional capability provides a more continuous and efficient use of the Memory group and a greater flexibility in executing waiting programs.

CENTRAL INTERLACE CONTROLLER, REQUEST SCANNER

Figure 17:
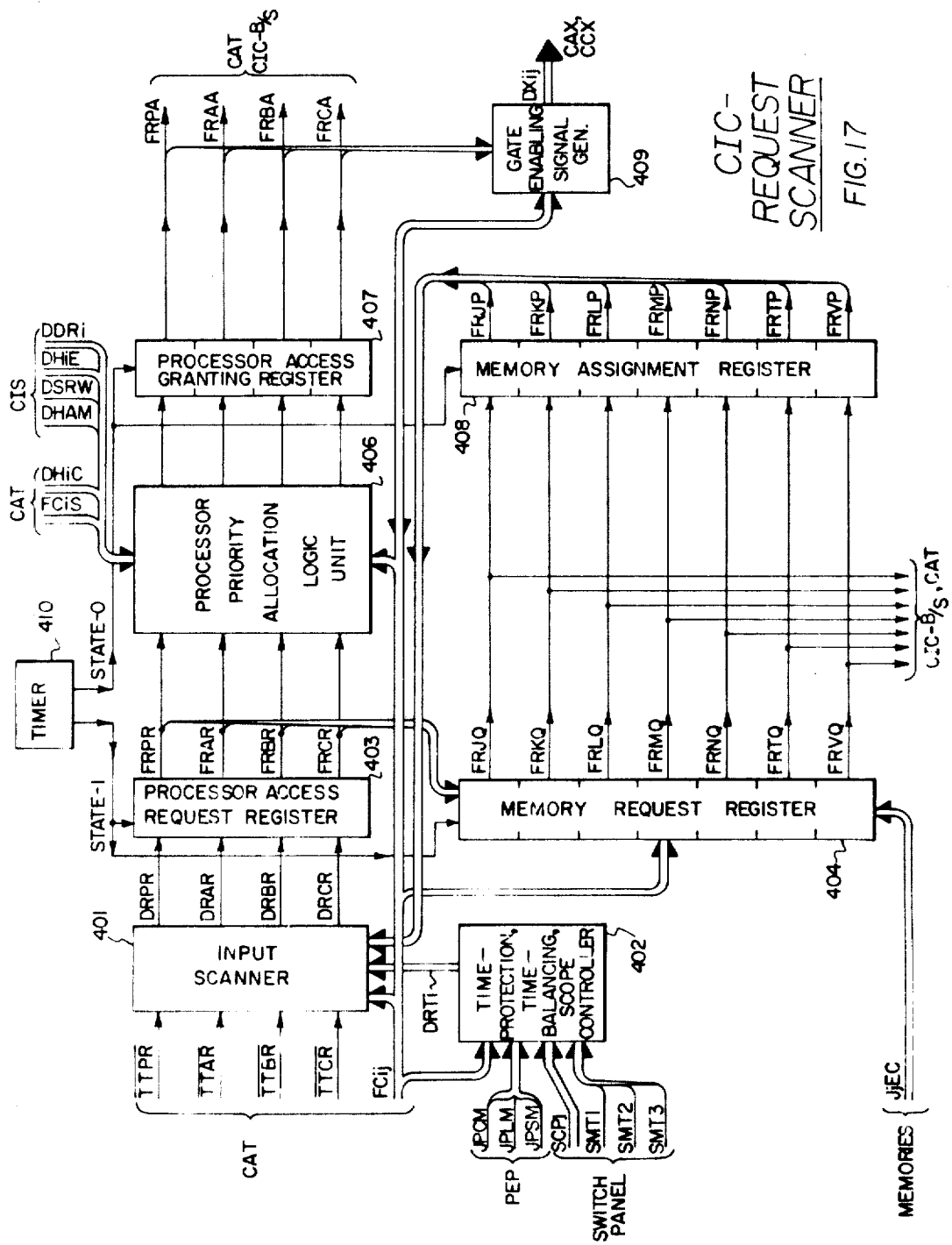
FIGURE 17 is a block diagram of the Central Interlace Controller, Request Scanner of the System.

The primary function of the CIC-R/S, FIG. 17, is to initiate memory cycles in each Memory assigned by the CAT for communication with a respective Processor. The CIC-R/S receives CAT output signals designating Processors making Memory requests and CAT output signals identifying the specific Memory assigned to each such requesting Processor. Upon recognizing each Processor-designating signal, the CIC-R/S stores an identification of the requesting Processor and reserves the corresponding assigned Memory. The CIC-R/S subsequently grants the Memory requests by controlling the CAX to initiate memory cycles in the corresponding Memories. The CIC-R/S thereupon delivers output signals to the CIC-B/S to denote requests for assignment of the Data Bus for communication between each Processor granted memory communication by the CIC-R/S and the corresponding assigned Memory.

Additionally, the CIC-R/S responds to Service Mode requests from the PEP and limits communication for each DAP assigned a Memory within the reserved Scope of the PEP.

The CIC-R/S comprises an Input Scanner 401 for sensing CAT output signals identifying requesting Processors and for recognizing each of these signals according to the availability of the corresponding assigned Memory; a Time-Protection, Time-Balancing, Scope Controller 402 for controlling recognition of signals by Input Scanner 401 when the PEP is operating in the Service Mode; a Processor Access Request Register 403 for storing identifications of the Processors corresponding to the signals recognized by Input Scanner 401; and a Memory Request Register 404 for reserving the Memories assigned to the Processors identified in Register 403. Additionally, the CIC-R/S comprises a Processor Priority Allocation Logic Unit 406 for responding to the Processor-identifying output signals of Register 403 and for delivering output signals designating processors for which a unique Memory can be assigned; a Processor Access Granting Register 407 for storing identifications of the Processors designated by the output signals of Logic Unit 406; and a Memory Assignment Register 408 for denoting as "busy" the Memories reserved by Register 404. The CIC-R/S also comprises a Gate Enabling Signal Generator 409 for enabling the gates in the CAX and CCX that correspond to each Processor-Memory combination for which communication is granted by the CIC-R/S. Finally, the CIC-R/S includes a Timer 410 for controlling the sequence of the individual operations which take place within the CIC-R/S.

Overall operation

The overall operation of the CIC-R/S will be first described. The CAT requests that the CIC-R/S assign a designated Memory-$j$ to a Processor-$i$ for communication by supplying the corresponding $\overline{TTiR}$ signal to identify such Processor and by supplying the corresponding FC$ij$ signal, which identifies the CAT assignment of Memory-$j$ to the request of Processor-$i$. The CIC-R/S interprets the $\overline{TTiR}$ signal as a request signal from Processor-$i$ for assignment of the Memory-$j$ designated by the corresponding FC$ij$ signal. At the same time, Controller 402 receives one of the JPCM, JPLM, or JPSM signals when the PEP is to operate in a Service Mode; the SCP$j$ signals representing the Memories assigned to the reserved Scope of the PEP; and, if the DAP's are to have the capability of communicating with those reserved Memories during a Service Mode, one of the SMT1–3 signals. Controller 402 delivers DRT$i$ output signals to Input Scanner 401, these signals determining whether the Input Scanner may recognize the request signals.

The Input Scanner recognizes a request $\overline{TTiR}$ signal if the corresponding assigned Memory is not busy and, further, provided:

(1) That if the request signal is made for a DAP,
  (a) The PEP is not operating in a Service Mode, or
  (b) The PEP is operating in a Service Mode but either
    (i) The corresponding assigned Memory is not within the reserved Scope of the PEP or,
    (ii) The request signal is generated during the portion of the Time-Balancing cycle allotted to the DAP's; or
(2) That if the request signal is made for a PEP,
  (a) The PEP is not operating in a Service Mode, or
  (b) The PEP is operating in a Service Mode but the request signal is generated during the portion of the Time-Balancing Cycle allotted to the PEP.

The DR$i$R output signals delivered by Input Scanner 401 represent the respective Processor requests recognized by Scanner 401 under control of Controller 402.

When Timer 410 is in State-1 the requests recognized by Input Scanner 401, evidenced by the DR$i$R signals, are stored in the respective FR$i$R flip-flops of the Processor Access Request Register 403. Memory Request Register 404 thereupon stores an identification in a respective FR$j$Q flip-flop of each Memory assigned by the CAT to the Processors for which requests are stored in Register 403.

Processor Priority Allocation Logic Unit 406 responds to the FR$i$R output signals of Register 403 to deliver output signals for setting corresponding FR$i$R flip-flops in Register 407. The output signals delivered by Logic Unit 406 represent:

(a) The requesting Processors for which a unique Memory has been assigned by the CAT; and
(b) The highest priority Processor of a group of two or more requesting Processors which have been assigned the same Memory.

When Timer 410 is in State-0, Processor Access Granting Register 407 stores in a respective FR$i$A flip-flop an identification of each Processor for which an output signal is provided by Logic Unit 406. Additionally, during State-0 Memory Assignment Register 408 stores an identification in a respective FR$j$P flip-flop of each Memory identified by Register 404.

Gate Enabling Signal Generator 409 delivers DX$ij$ output signals to control the CAX to transmit Actual Addresses and control signals to the Memory-$j$ assigned to each Processor-$i$ identified in Register 407. The DX$ij$ output signals of Signal Generator 409 also control the CCX to transmit control signals to the Processors identified in Register 407.

The output signals of Registers 404 and 407 are also transmitted to the CIC-B/S to control granting the Data Bus sequentially to the identified Processors and their respective assigned Memories.

Input scanner

The detailed structure of Input Scanner 401 is shown in FIG. 49.

The Input Scanner receives the CAT request output signals, recognizes a request signal if certain conditions are met, and generates output signals which correspond to the Processors having recognized requests.

FIGURE 49 shows the logical schematic diagrams of the circuits which receive the TT$i$R CAT request output signals and in response thereto generate corresponding DR$i$R recognition signals if the requisite conditions are met. For example, the logical schematic diagram for the circuit generating the DRAR recognition signal is:

$(FCAJ\ FRJP+FCAK\ FRKP+FCAL\ FRLP$
$+FCAM\ FRMP+FCAN\ FRNP+FCAT$
$FRTP+FCAV\ FRVP)DRTA\ \overline{TTAR}=DRAR$ Thus, the DRAR signal denotes recognition of the Memory request of DAP-A, designated by the $\overline{TTAR}$ signal being a binary 1, provided that:

(1) The particular Memory-$j$ assigned by the CAT to Processor-A (denoted by the respective FCA$j$ signal representing a binary 1) is not busy, denoted by the corresponding FR$j$P signal representing a binary 1; and
(2) This Memory-$j$ is not currently reserved for communication with the PEP, denoted by the DRTA signal representing a binary 1.

Accordingly, the request of a Processor-$i$ is recognized by Input Scanner 401 when the respective $\overline{TTiR}$ and DRT$i$ signals represent a binary 1, and if the one of the FC$ij$ signals of the CAT Output Register assigned to this Processor-$i$ and the corresponding FR$j$P signal both represent binary 1's.

FIGURE 49 further illustrates that from one to four CAT request output signals may be received simultaneously and that Input Scanner 401 may recognize simultaneously any one or more of these signals, delivering the corresponding DR$i$R output signals.

Time-protection, time-balancing, scope controller

The detailed structure of Time-Protection, Time-Balancing, Scope Controller 402 is shown in FIGS. 42 and 49.

Controller 402 receives one of the JPCM, JPLM, or JPSM signals when the PEP is to operate in a corresponding one of the Service Modes, and in response to any one of these signals, the Controller normally inhibits Input Scanner 401 from recognizing the $\overline{TTiR}$ request signal of a DAP requiring communication with a Memory within the reserved Scope of the PEP.

When a PEP is to process real-time events, it must receive or transmitt data at a rate determined by one or more external devices coupled thereto. When such external devices supply data, each such item of data must be accepted by the PEP for storage in the Memory group within a predetermined time, or it will be lost. Similarly, when these external devices receive data, each required item of data must be retrieved from the Memory group and transmitted by the PEP within a predetermined time, or the functioning of this external device may become ineffective. Therefore, a PEP processing real-time events must be granted communication with the Memory group at the requisite real-time rate.

Although the CAT Input Scanner 301 allocates highest priority to the PEP for communication with the Memory group when the PEP requests such communication at the same time as a DAP, and although it will be shown subsequently that the CIC-R/S also allocates highest priority to the PEP when the PEP and a recognized DAP have been assigned the same Memory by the CAT, nevertheless Input Scanner 401 of the CIC-R/S does not permit the PEP to pre-empt a Memory once that Memory has been assigned by the CIC-R/S for communication with a DAP. Once the CIC-R/S has recognized a DAP request and granted communication for this DAP with the Memory assigned thereto by the CAT, the assigned Memory is reserved for the DAP until it completes its requested communication with the assigned Memory.

Therefore, to insure the requisite communication with the Memory group for real-time processing, the PEP reserves certain Memories by providing one of the Service Mode signals. A Service Mode signal normally reserves one or more Memories for exclusive communication with the PEP for the duration of the signal. Each Service Mode signal continues until a respective number of data transfers between the PEP and the Memory group have been effected. For example, the JPCM signal may subsist while four single Data Words are transferred between the PEP and the Memory group, the JPLM signal may subsist while six single Data Words are so transferred and the JPSM signal may subsist for eight doubleword data transfers. This function of the CIC-R/S in reserving certain Memories for exlusive communication with the PEP is termed Time-Protection herein.

A Service Mode JPxM signal initiates the Time-Protection mode of the System by generating the RSAM signal, FIG. 49. So long as the RASM signal is in the 0-state, the corresponding $\overline{RASM}$ signal is a binary 1 and controls each DRT$i$ signal to be a binary 1, enabling Input Scanner 401 to recognize all CAT request signals. However, if the RASM signal is a binary 1, whenever the CAT assigns to the DAP-$i$ a Memory within the reserved Scope of the PEP, the respective DRTA, DRTB, or DRTC signal normally becomes a binary 0. (For simplicity, the optional Time-Balancing function to be described hereinafter will be assumed to be nonoperative in the instant description. Therefore, all of the TRT1–3 signals are binary 0's.)

Figure 24:
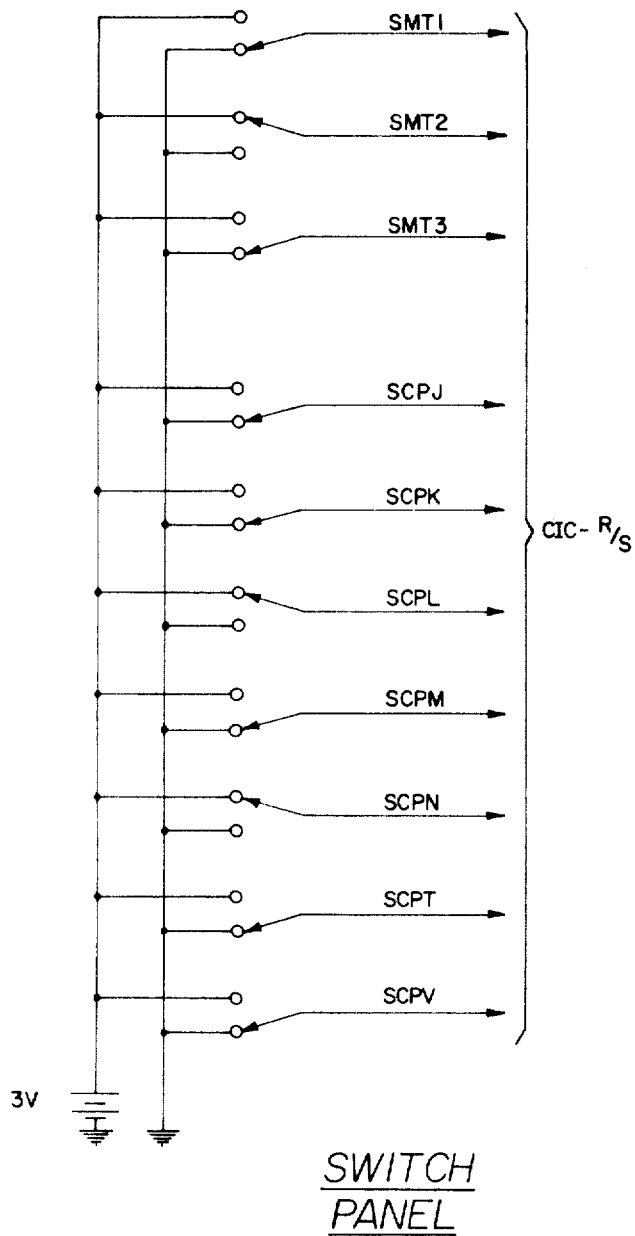
FIGURE 24 is a diagram of a portion of the Switch Panel of the System.

A Memory-$j$ is assigned to the reserved Scope of the PEP by the setting, either manually or automatically, of a respective one of the Scope switches on the Switch Panel (FIG. 24). When a Scope switch is set, it controls the respectice SCP$j$ signal to represent a binary 1. Thereupon, whenever the PEP is operating in the Time-Protection mode, the Memories within the reserved Scope of the PEP are normally prevented from communicating with a DAP. For example, the logical schematic diagram for the circuit which generates the DRTA signal comprises the following conjunctively related OR-gates:

$(\overline{FCAJ}+\overline{SCPJ})(\overline{FCAK}+\overline{SCPK})(\overline{FCAL}+\overline{SCPL})$
$(\overline{FCAM}+\overline{SCPM})(\overline{FCAN}+\overline{SCPN})(\overline{FCAT}+\overline{SCPT})$
$(\overline{FCAV}+\overline{SCPV})$ If any one of the OR-gates $(\overline{FCAj}+\overline{SCPj})$ delivers a binary 0 output signal, the DRTA signal normally will be a binary 0 during the Time-Protection mode and requests from DAP-A will not be recognized by Input Scanner 401. When a CAT request for DAP-A is received by Input Scanner 401, all but one of the FCA$j$ signals represent binary 0's so that six of the seven OR-gates in the above logical schematic diagram receive $\overline{FCAj}$ signals representing a binary 1 and therefore deliver binary 1 output signals. The remaining one of these OR-gates receives a binary 0 $\overline{FCAj}$ signal. This latter OR-gate, which corresponds to the Memory assigned to DAP-A can only deliver a binary 1 output signal if the corresponding Memory-$j$ is not within the reserved Scope of the PEP; i.e., the $\overline{SCPj}$ signal represents a binary 1. If, however, this Memory is within the reserved Scope of the PEP, the $\overline{SCPj}$ signal represents a binary 0, and the DRTA signal normally will be a binary 0 in the Time-Protection mode.

Thus, if DAP-A has been assigned Memory-L for communication, the $\overline{FCAL}$ signal represents a binary 0 and the remaining $\overline{FCAj}$ signals represent binary 1's. If Memory-L is within the reserved Scope of the PEP, the $\overline{SCPL}$ signal represents a binary 0 and the OR-gate $(\overline{FCAL}+\overline{SCPL})$ delivers a binary 0 output signal, so that the DRTA signal is normally a binary 0 during the Time-Protection mode. If, however, Memory-L is not within the reserved Scope of the PEP, the $\overline{SCPL}$ signal represents a binary 1, the OR-gate $(\overline{FCAL}+\overline{SCPL})$ continues to deliver a binary 1 output signal when Memory-L is assigned to DAP-A, and even though the PEP enters the Time-Protection mode, the DRTA signal continues to represent a binary 1.

Thus, in the invention described herein, generally when the system is operating in the Time-Protection mode, the Memories selected to be within the reserved Scope of the PEP cannot be communicated with by a DAP. However, those Memories not within the reserved Scope of the PEP are available for communication with any DAP, subject only to the positional priority allocated to the PEP when it makes a request for the same Memory as a DAP. Finally, when the PEP is not in the Service Mode, even those Memories within the reserved Scope of the PEP may be communicated with by any DAP, subject only to the positional priority restrictions.

As has been described above, the Time-Protection mode is initiated when a series of communications with the Memory group must be provided for the PEP within a predetermined time and at a predetermined rate. For example, the PEP may be required to communicate with the Memory at a one megacycle rate, or once every microsecond period, to satisify the real-time requirements of an external device. However, the time needed for the PEP to execute each discrete communication with a Memory may be but a fraction of the requisite real-time period. Thus, a Data Word can be transferred between the PEP and a cell of certain rapidly operating types of Memories in 300 ns. or less, a duration only 0.3 of the real-time period described in the above example.

To operate the System most efficiently it is desirable to utilize a Memory to the fullest extent possible. Therefore, when a Memory is not actually occupied in communicating with the PEP, the Memory should be freed for communication with a DAP, provided that the Memory is available to the PEP at the required real-time rate. Considering, again, the above example, the Memory specified may be freed for communication with one or more DAP's for 700 ns. of each one microsecond Time-Protection period. In this manner, although the System is operating in the Time-Protection mode, the DAP's can execute independent programs utilizing Memories within the reserved Scope of the PEP, can process data as it is stored in these reserved Memories by the PEP, or can provide processed data to these reserved Memories for transmittal by the PEP.

Such a selective modification of the Time-Protection mode is termed Time-Balancing herein. A Time-Balancing cycle is one wherein a PEP first communicates with the Memory group and then Input Scanner 401, for a predetermined interval, is enabled to recognize a DAP for communication with Memories within the reserved Scope of the PEP. This interval terminates in sufficient time for the PEP to be provided its next required Service Mode communication, and once the interval is terminated the request of a DAP for a reserved Memory will not be recognized until once again the PEP executes a communication with the Memory group.

Employment of the Time-Balancing function is optional with the user of the system. The function is activated by the setting, manually or automatically, of one of the three Time-Balancing switches on the Switch Panel (FIG. 24). When a Time-Balancing switch is set it controls the corresponding SMT$n$ signal to represent a binary 1. The particular Time-Balancing switch which is set determines the duration of the portion of the Time-Balancing cycle in which a DAP will be recognized by Input Scanner 401 for communication with reserved Memories. For example, the faster the Memories within the reserved Scope of the PEP, the greater the portion of each Time-Balancing cycle allocable to the DAP's.

Each one of the SMT1-3 signals, when in the 1-state, enables the triggering of a respective TRT$n$, type-F, one-shot, FIG. 42, and this one-shot, when in its unstable state, enables Input Scanner 401 to recognize DAP requests for reserved Memories. If no Time-Balancing switch is set, the Time-Balancing function is nonoperative since none of the TRT1-3 one-shots is triggerable, whereupon a DAP cannot communicate with a reserved Memory during a Time-Protection mode. However, if a SMT$n$ switch is set, the respective TRT$n$ one-shot not only provides recognition of DAP requests for reserved Memories during its unstable period, but prevents recognition of PEP requests in this interval. Each time the PEP initiates a communication with the Memory group during the Time-Balancing mode, the PEP initiates a Time-Balancing cycle by triggering the enabled TRT$n$ one-shot. The triggered TRT$n$ one-shot enables DAP communication with reserved Memories for the duration of its unstable state, but when the one-shot reverts to its stable state, only the PEP can next be provided communication with the reserved Memories.

The following example is provided to illustrate the Time-Balancing form of the Time-Protection mode. Assume that the PEP initiates a Time-Protection mode by delivering the JPLM signal; that only Memory-T is reserved for the PEP, the SCPT signal representing a binary 1 and all other SCP$j$ signals representing binary 0's, and that one of the Time-Balancing switches is set and generates the binary 1 SMT2 signal. The JPLM signal controls the RASM signal to become a binary 1 but the TRT2 one-shot continues in its stable state, the TRT2 signal representing a binary 0. (The TRT1 and TRT3 signals will not change in this example, but will continue to represent binary 0's.) No DAP request for Memory-T will be recognized at this time by Input Scanner 401. Thus, if DAP-B is assigned Memory-T by the CAT, whereby the $\overline{FCBT}$ signal becomes a binary 0, the OR-gate providing the logical function ($\overline{FCBT}+\overline{SCPT}$) will deliver a binary 0 output signal. This OR-gate binary 0 signal controls the DRTB signal, FIG. 49, to represent a binary 0 and thereby disable Input Scanner 401 from recognizing the request of DAP-B.

If, now, the PEP makes its first request for communication with the Memory group, Input Scanner 401 will recognize this request and generate the DRPR signal. The DRPR signal subsequently effects the setting of the FRPA flip-flop in Register 407 and, thereby, the initiation of a Memory cycle for the PEP. The FRPA signal, becoming a binary 1, triggers the TRT2 one-shot, FIG. 42, this one-shot having been enabled by the RASM and SMT2 signals. The TRT2 one-shot transfers to its unstable state for 750 ns., thereby controlling the DRTA, DRTB, and DRTC signals to the binary 1's and the DRTP signal to be a binary 0 for 750 ns., FIG. 49. During this 750 ns., Input Scanner 401 is enabled to recognize the request of DAP-B for Memory-T, and also to recognize the request of other DAP's for this reserved Memory. However, the binary 0 DRTP signal prevents Scanner 401 from recognizing any PEP request. After the 750 ns., interval, the TRT2 one-shot returns to its stable 0-state, disabling any one of the DRTA, DRTB, or DRTC signals from representing a binary 1 when a corresponding DAP-$i$ request is made for Memory-T. Thus, all DAP's are once again prevented from communicating with Memory-T until the PEP next requests and is granted communication with the Memory group and the FRPA signal again becomes a binary 1.

Accordingly, it has been shown above that the Time-Balancing form of the Time-Protection mode of operation comprises a series of Time-Balancing cycles, each cycle being initiated when the PEP is granted communication with the Memory group and each cycle granting the DAP's communication with the reserved Memories for an interval determined by the selected TRT$n$ one-shot. This form of operation continues until the Time-Protection mode is terminated by the initiating JP$x$M signal becoming a binary 0. The reserved Memories thereupon become available for communication with the DAP's on the same basis as the nonreserved Memories.

*Processor access request register*

The detailed structure of Processor Access Request Register 403 is shown in FIG. 43. Register 403 comprises the four FR$i$R flip-flops. Each of these flip-flops, when in the 1-state, denotes the storage of a Memory request for the corresponding Processor-$i$.

Register 403 accepts and stores each request currently recognized by Input Scanner 401 when Timer 410 is in State-1. Input Scanner 401 transmits a binary 1 DR$i$R output signal for each Processor-$i$ having a Memory request recognized thereby. Register 403 receives the DR$i$R signals and responds to each DR$i$R signal representing a binary 1 during State-1 of Timer 410 to control the setting of the respective FR$i$R flip-flop. For example, the logical schematic diagram for the circuit which generates the S-RAR signal for transferring the FRAR flip-flop to the 1-state is:

$$DRAR\ FRCE = S\text{-}RAR$$

The FRCE signal represents a binary 1 during State-1 of Timer 410.

A stored request in Register 403 is cleared in a succeeding State-1 by resetting the FR$i$R flip-flop if the corresponding DR$i$R request signal has dropped to a binary 0.

As will be shown hereinafter, Timer 410 does not transfer to State-0 until, for every DR$i$R signal representing a binary 1, the corresponding FR$i$R flip-flop is transferred to the 1-state.

*Memory request register*

The detailed structure of Memory Request Register 404 is shown in FIGS. 44 and 45. Register 404 comprises the seven FR$j$Q flip-flops. Each of these flip-flops, when in the 0-state, identifies a respective Memory-$j$ that has been assigned by the CAT to at least one of the Processors for which a request is stored in Register 403. Register 404 stores such identifications when Timer 410 is in State-1.

Register 404 receives of the Memory-identifying FC$ij$ output signals delivered by the four CAT Output Registers and receives the output signals of Register 403. Additionally, Register 404 receives the end-of-cycle J$j$EC signals delivered by the Memories. Register 404 responds to the binary 1 FC$ij$ signal of the CAT and the binary 1 Processor-identifying FR$i$R signals of Register 403 during State-1 of Timer 410 to control FR$j$Q flip-flops to transfer to the 0-state, the flip-flops so transferring corresponding to the Memories assigned by the CAT to the Processors for which the FR$i$R signals are binary 1's. Register 404 is enabled to store each Memory identification during the same State-1 of Timer 410 in which the corresponding Processor requests are stored in Register 403. For example, the logical schematic diagram for the circuit which generates the R-RKQ signal for transferring the FRKQ flip-flop to the 0-state is:

$$(FRPR\ FCPK + FRAR\ FCAK + FRBR\ FCBK + FRCR\ FCCK) FRCE = R\text{-}RKQ$$

Thus, the R-RKQ signal becomes a binary 1 during State-1 of Timer 410 if Memory-K is assigned by the CAT to one of the Processors having a request stored in Register 403.

For example, assume that DAP-B has a request recognized by Input Scanner 401, designated by the binary 1 DRBR signal of Scanner 401, and that the CAT has assigned Memory-K to DAP-B, designated by the binary 1 FCBK signal delivered by Output Register 305 of the CAT. In the first-occurring State-1 of Timer 410 following recognition of the request of DAP-B, Register 403 stores an identification of this request by transferring the FRBR flip-flop to the 1-state. The subsequent coincidence of the binary 1 FRBR signal and the binary 1 FCBK signal controls the R-RKQ signal to become a binary 1 during the same Timer State-1. The FRKQ flip-flop thereupon is transferred to the 0-state, denoting the assignment of Memory-K to a Processor identified in Register 403.

The 0-state of an FR$j$Q flip-flop is also employed to denote the assignment of Memory-$j$ to two or more Processors having requests stored in Register 403. Thus, in the above example, if Memory-K is also assigned by the CAT to DAP-C, the recognition of the request of DAP-C and the setting of the FRCR flip-flop also results in a coincidence of the binary 1 FRCR signal and the binary 1 FCCK signal. Therefore, the transfer of the FRKQ flip-flop to the 0-state represents the assignment of Memory-K to both DAP-B and DAP-C.

Each flip-flop in Register 404 is cleared, or transferred to the 1-state, upon the occurrence of the corresponding Memory end-of-cycle. For example, the FRKQ flip-flop is transferred to the 1-state when the JKEC signal is generated by Memory-K at the end of the cycle of Memory-K.

As will be shown hereinafter, Timer 410 does not transfer to State-0 until identifications have been stored in Register 404 for All Memories assigned by the CAT to Processors identified in Register 403.

*Processor priority allocation logic unit*

The detailed structure of Processor Priority Allocation Logic Unit 406 is shown in FIGS. 46 and 49.

Logic Unit 406 receives signals representing the Processor requests stored in Register 403, grants a request if certain conditions are met, and generates output signals which correspond to the Processors having granted requests.

The logical schematic diagrams shown in FIG. 46 of the circuits for supplying output signals to set the FR$i$A flip-flops describe a portion of Logic Unit 406. Each of these circuits generates a respective S-R$i$A granting signal if the requisite conditions are met. For example, the logical schematic diagram for the circuit generating the S-RAA granting signal is:

$$FRAR \; \overline{FRCE}(\overline{DRPA}+\overline{FRPR}) \cdot (\overline{DHAC}+DHAM$$
$$DHAE) \cdot (\overline{FCAS}+DSRW \; DDRA) = S\text{-}RAA$$

Thus, the S-RAA signal denotes granting of the Memory request of DAP-A as represented by the FRAR provided that:

(1) A Processor allocated higher positional priority and requesting Memory communication has not been assigned the same Memory by the CAT. In the above example, if the $\overline{DRPA}$ signal is a binary 0, the CAT has assigned the same Memory to the PEP and DAP-A; if, however, the PEP does not have a request stored in Register 403, the $\overline{FRPR}$ signal is a binary 1 and the $\overline{DRPA}$ signal is not effective to prevent granting the request of DAP-A;

(2) DAP-$i$ has not requested a Translate Mode operation of the CIS, or if such operation has been requested, the CIS has responded and has an Actual Word Address ready ofr addressing the assigned Memory. In the above example, if the $\overline{DHAC}$ signal represents a binary 0, DAP-A has requested the CIS to execute a Translate Mode operation; if, however, the DHAM and DHAE signals both represent binary 1's, the CIS has acknowledged the request of DAP-A and has an Actual Word Address available for addressing the Memory assigned to DAP-A, so that the $\overline{DHAC}$ signal is no longer effective to prevent granting the request of DAP-A; and (3) DAP-$i$ has not requested a Passive Mode operation of the CIS, or if such operation has been requested, the CIS has responded and is ready to proceed with this operation for DAP-$i$. In the above example, if the $\overline{FCAS}$ signal represents a binary 0, DAP-A has requested the CIS to execute a Passive Mode operation; if, however, the DSRW and DDRA signals represent binary 1's, the CIS has acknowledged the request and stands ready to execute a Passive Mode operation for DAP-A, so that the $\overline{FCAS}$ signal is no longer effective to prevent granting the request of DAP-A.

Accordingly, the Memory request of a Processor-$i$ is granted by Logic Unit 406 if: no Processor of higher positional priority and having a request stored in Register 403 has been granted the same Memory by the CAT; Processor-$i$ has not requested a Translate Mode operation of the CIS, or if such operation has been requested, the CIS has an Actual Word Address ready for addressing the assigned Memory; and Processor-$i$ has not requested a Passive Mode operation of the CIS, or if such operation has been requested the CIS is ready to proceed.

FIGURE 49 illustrates the circuits which receive the Memory identifying FC$ij$ signals delivered by the CAT and which respond thereto to generate signals denoting that the CAT has assigned to the same Memory to two Processors. For example, the DRPB signal, when a binary 1, denotes that the PEP and DAP-B have been assigned the same Memory by the CAT. These signals cooperate in preventing the portion of Logic Unit 406 shown in FIG. 46 from generating granting signals for the lower priority Processor.

FIGURE 46 further illustrates that from one to four binary 1 FR$i$R signals may be received simultaneously and that Logic Unit 406 may grant the requests of any one or more of the corresponding Processors by delivering the respective S-R$i$A granting signals.

*Processor access granting register*

The detailed structure of Processor Access Granting Register 407 is shown in FIG. 46. Register 407 comprises the four FR$i$A flip-flops. Each of these flip-flops, when in the 1-state, denotes that the corresponding Processor-$i$ has been granted communication with the Memory assigned thereto by the CAT.

Register 407 accepts and stores a designation of each granting signal delivered by Logic Unit 406 when Timer 410 is in State-0. The S-R$i$A output signal of Logic Unit 406 is a binary 1 for each Processor-$i$ granted Memory communication. Register 407 receives the S-R$i$A signals and responds to each S-R$i$A signal representing a binary 1 during State-0 of Timer 410 to control the setting of the respective FR$i$A flip-flop. For example, if Register 403 receives and stores a request by DAP-B during State-1 of Timer 410, Logic Unit 406 generates the corresponding S-RBA granting signal if the requisite conditions are met, and during the following State-0 the FRBA flip-flop is transferred to the 1-state.

The stored designation of a Processor-$i$ in Register 407 is cleared when the corresponding $\overline{TTiR}$ CAT request output signal becomes a binary 0, the TT$i$R signal becoming a binary 1 and resetting the FR$i$A flip-flop. The $\overline{TTiR}$ signal drops to a binary 0 after the Memory-$j$ assigned to the corresponding Processor-$i$ is granted communication by Register 407, completes its cycle, and delivers the J$j$EC signal.

As will be shown hereinafter, Timer 410 does not transfer to State-1 until, for every request stored in Register 403, the corresponding FR$i$A flip-flop is transferred to the 1-state, unless a higher priority Processor has been assigned the same Memory.

Memory assignment register

The detailed structure of Memory Assignment Register 408 is shown in FIGS. 47 and 48. Register 408 comprises the seven FR$j$P flip-flops. Each of these flip-flops, when in the 0-state, denotes as busy a respective Memory-$j$ that has been assigned by the CAT to at least one of the Processors for which a request is stored in Register 403. Register 408 stores such identifications when Timer 410 is in State-0.

Register 408 receives all of the Memory-identifying FR$j$Q and $\overline{FRjQ}$ output signals delivered by Memory Request Register 404. During State-0 of Timer 410 Register 408 responds to the output signals of Register 404 to control the FR$j$P flip-flops to transfer to the same state as the corresponding FR$j$Q flip-flops. For example, the logical schematic diagram for the circuit which generates the R-RKP signal for transferring the FRKP flip-flop to the 0-state is:

$$\overline{FRKQ}\ \overline{FRCE} = R\text{-}RKP$$

A busy identification in Register 408 is not cleared until the corresponding flip-flop of Register 404 is first cleared by the J$j$EC signal delivered by the corresponding Memory-$j$ at the end of a memory cycle.

As will be shown hereinafter, Timer 410 does not transfer to State-1 until all flip-flops in Register 408 have been transferred to the same state as the corresponding flip-flops in Register 404.

Gate enabling signal generator

The detailed structure of Gate Enabling Signal Generator 409 is shown in FIGS. 50 and 51.

Generator 409 receives the output signals of Register 407 identifying each Processor for which Memory communication has been granted and the Memory-identifying output signals delivered by the CAT Output Registers, and generates output signals corresponding to the Processor-Memory combinations granted communication by the CIC-R/S.

Generator 409 comprises a gate set for each Processor, each set having seven two-input AND-gates. One input lead of all of the AND-gates of each gate set receives the corresponding FR$i$A output signal of Register 407. The other input lead of the seven AND-gates of each gate set receives a respective one of the seven FC$ij$ output signals of the corresponding CAT Output Register. Accordingly, for each Processor-$i$ granted communication with a Memory, designated by the respective FR$i$A signal being a binary 1, one of the AND-gates of the corresponding gate set delivers a binary 1 DX$ij$ output signal, the one of these AND-gates delivering such output signal corresponding to the binary 1 FC$ij$ signal of the corresponding CAT Output Register.

For example, if the FRAA flip-flop of Register 407 represents a binary 1, denoting that DAP-A has been granted a memory communication, and the FCAM signal of CAT Output Register 304 represents a binary 1, denoting that the CAT has assigned Memory-M to DAP-A, Generator 409 delivers a binary 1 DXAM signal. The logical schematic diagram for the circuit generating the DXAM gate enabling signal is:

$$FRAA\ FCAM = DXAM$$

The DX$ij$ output signals control CAX output gates to transmit Actual Addresses and control signals initiated by Processor-$i$ to Memory-$j$. The DX$ij$ output singals also control CCX output gates to transmit control signals initiated by Memory-$j$ to Processor-$i$. Accordingly, in the above example, the DXAM gate enabling signal controls CAX output gates to transmit Actual Addresses and control signals initiated by DAP-A to Memory-M and controls CCX output gates to transmit control signals initiated by Memory-M to DAP-A.

Timer

The detailed structure of Timer 410 is shown in FIGS. 48 and 51. Timer 410 provides a pair of signals for controlling the sequence of the individual operations which take place within the CIC-R/S from the time of recognition of a CAT request signal until the request has been granted and stored in Processor Access Granting Register 407.

The Timer comprises the FRCE flip-flop, which receives and responds to the output signals of Input Scanner 401, Processor Access Request Register 403, Memory Request Register 404, Processor Priority Allocation Logic Unit 406, Processor Access Granting Register 407, Memory Assignment Register 408 and the CAT Registers 303–306. State-1 of the Timer, determined by the FRCE flip-flop being in the 1-state, controls the recognition of CAT requests and the storage of recognized requests in Regiser 403. State-0 of the Timer, determined by the FRCE flip-flop being in the 0-state, controls the granting of requests stored in Register 403 and the storage of granted requests in Register 407.

The FRCE flip-flop is transferred to State-1 by the DRC1 signal and to State-0 by the DRC0 signal. The DRC0 signal issues when: (a) every current request which is recognized by Input Scanner 401 has been stored in Register 403 and (b) an identification of the Memory assigned to each request stored in Register 403 has been stored in Register 404. If, however, a request is not recognized by Scanner 401, the request is ignored by Timer 410 in transferring to State-0. The logical schematic diagram for the circuit which generates the DRC0 signal is shown in FIG. 51.

The DRC1 signal issues when: (a) Register 407 stores an identification of every request stored in Register 403, unless for a particular request a higher priority Processor has been assigned the same Memory and (b) each flip-flop in Register 408 is in the same state as the corresponding flip-flop in Register 404. The logical schematic diagram of the circuit which generates the DRC1 signal is shown in FIG. 51.

CENTRAL INTERLACE CONTROLLER, BUS SCHEDULER

Figure 18:
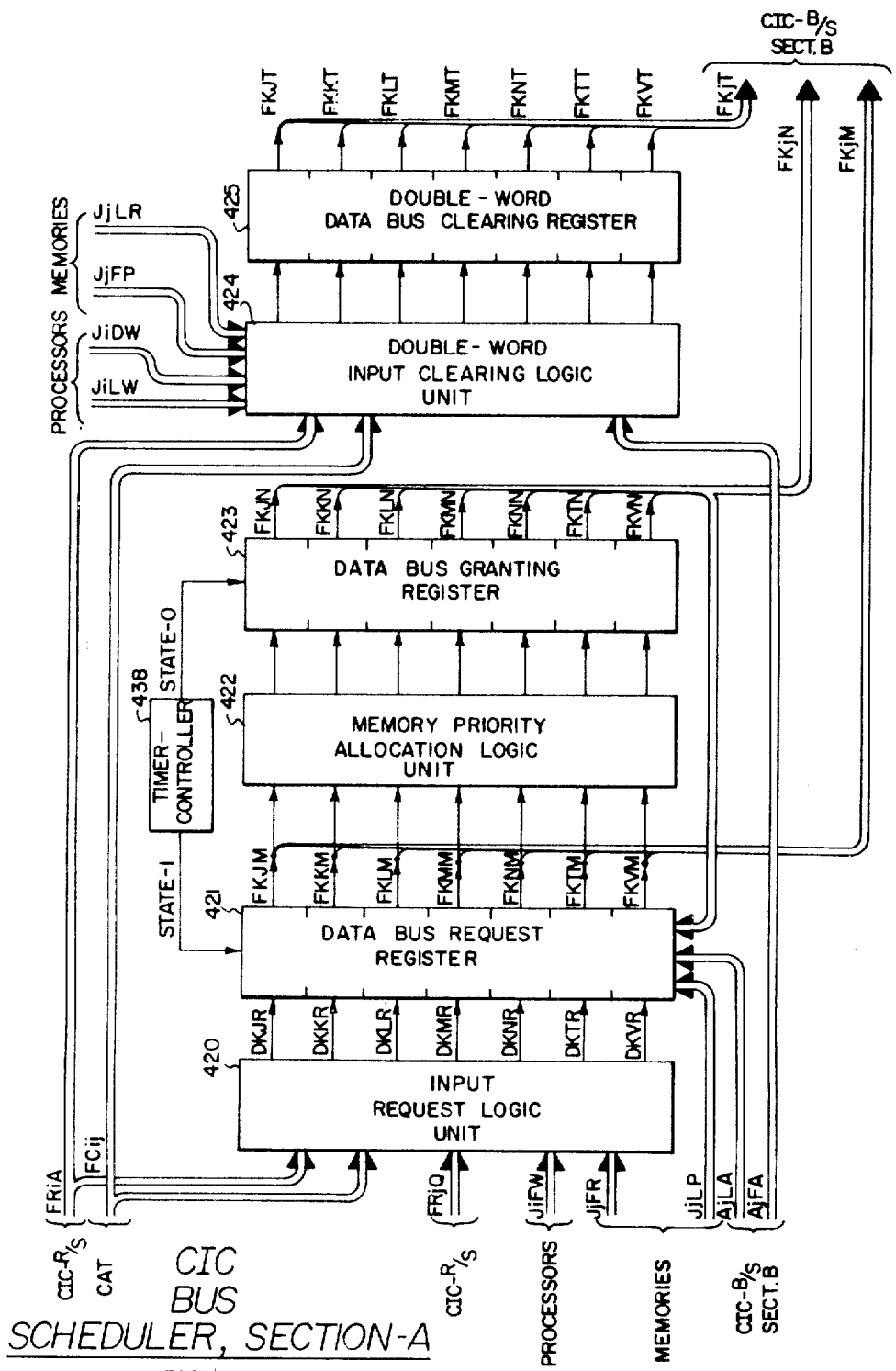
FIGURE 18 is a block diagram of Section A of the Central Interlace Controller, Bus Scheduler (CIC-B/S) of the System.
Figure 19:
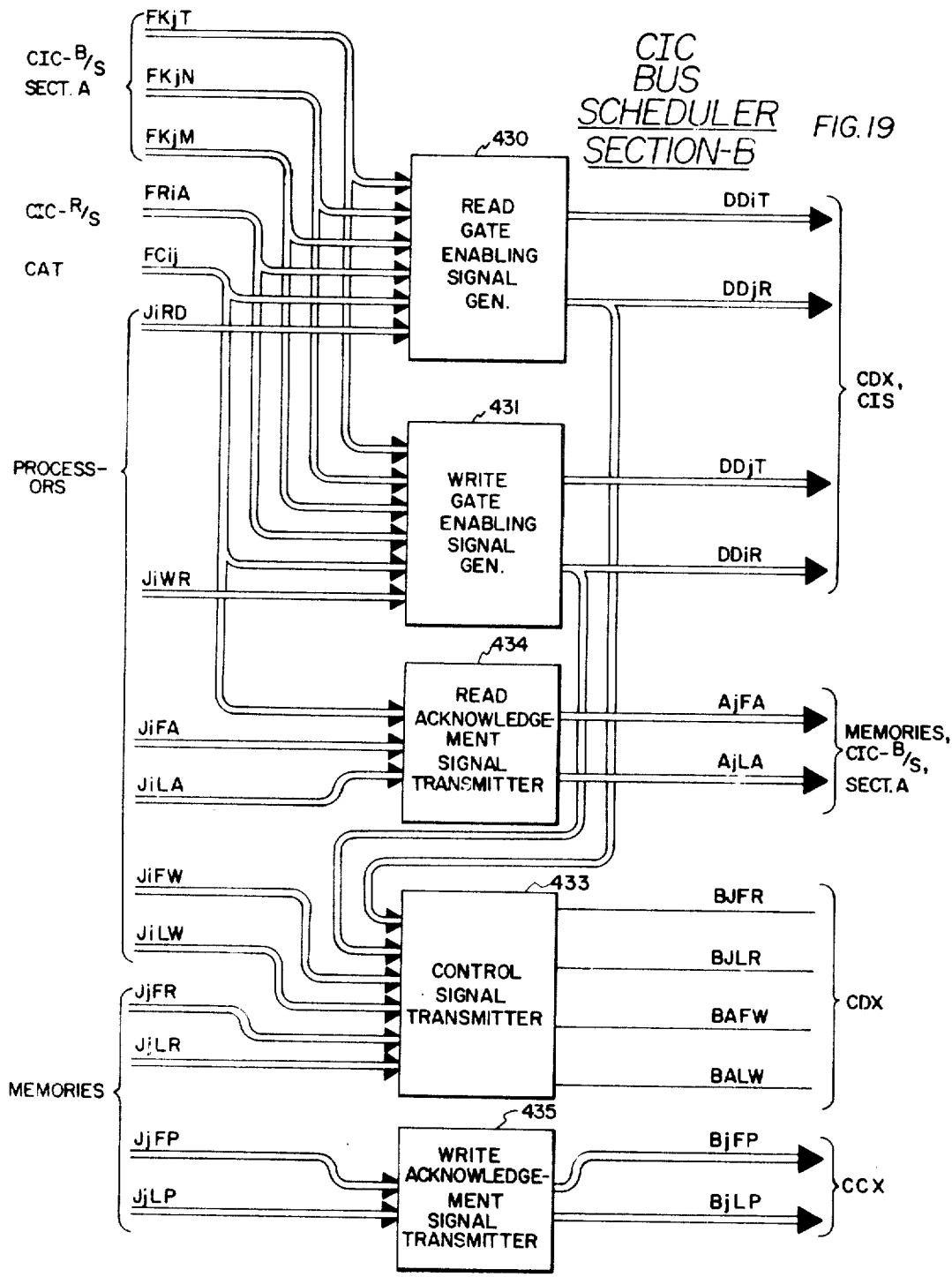
FIGURE 19 is a block diagram of Section B of the CIC-B/S.

The primary function of the CIC-B/S, FIGS. 18 and 19, is to control the CDX to grant the Data Bus in sequence to the requesting Processors for communication with their respective assigned Memories. The CIC-B/S receives Processor output control signals denoting the availability of First and Last Data Words for transmittal to and storage in the Memory group and Memory output control signals denoting the availability of First and Last Data Words for transmittal to a Processor. In response to these control signals, the CIC-B/S stores an identification of each Memory that is to transmit or receive a Data Word denoted as available. The CIC-B/S subsequently grants the Data Bus for transferring a Data Word between each identified Memory and the Processor to which the Memory has been assigned by the CAT. The Data Bus is granted in sequence according to predetermined priorities allocated to the identified Memories. The CIC-B/S also operates to clear the Data Bus of transient signals between the transmission of the two words of each double-word memory cycle.

An additional function of the CIC-B/S is to receive other control signals from the Processors and Memories and to retransmit the information represented by these signals to the Memories, the CDX, and the CCX.

The CIC-B/S comprises an Input Request Logic Unit 420 for sensing Processor and Memory control signals denoting the availability of First Data Words and for delivering output signals identifying each Memory that is to transmit or receive an available First Data Word; and a Data Bus Request Register 421 for storing identification of the Memories corresponding to the signals delivered by Logic Unit 420. The CIC-B/S also comprises a Memory Priority Allocation Logic Unit 422 for responding to the Memory-identifying output signals of Register 421 and for delivering in sequence output signals identifying the particular Memory to which the Data Bus is to be granted; and a Data Bus Granting Register 423 for storing a designation of the Memory currently granted the Data Bus by Logic Unit 422.

Additionally, the CIC-B/S comprises a Double-Word Input Clearing Logic Unit 424 for sensing Processor and Memory control signals denoting the receipt of a First Data Word and for delivering an output signal identifying a Memory for which a First Data Word transmission has been completed during a double-word memory cycle; and a Double-Word Data Bus Clearing Register 425 for receiving each signal delivered by Logic Unit 424 and for delivering a corresponding output signal between the time of transmission of the two Data Words of each double-word memory cycle.

The CIC-B/S further comprises a Read Gate Enabling Signal General 430 for enabling gates in the CDX to transfer a Data Word from the Memory identified by Register 423 to a Processor during a Read-Restore cycle and a Write Gate Enabling Signal Generator 431 for enabling gates in the CDX to transfer a Data Word from a Processor to the Memory identified by Register 423 during a Clear-Write cycle. The CIC-B/S also comprises a Control Signal Transmitter 433, a Read Acknowledgement Signal Transmitter 434, and a Write Acknowledgement Signal Transmitter 435 for receiving control signals supplied by the Processors and Memories and for delivering output control signals corresponding to the information represented by the received signals to the Memories, the CDX, and the CCX. Finally, the CIC-B/S comprises a Timer-Controller 438 for controlling the sequence of the individual operations which take place within the CIC-B/S.

*Overall operation*

The overall operation of the CIC-B/S will be first described. A Processor-$i$ requests that it be assigned the Data Bus by supplying the corresponding J$i$FW signal. The J$i$FW signal denotes that Processor-$i$ has a First Data Word available for transmittal to and storage in the Memory group. A Memory-$j$ requests that it be assigned the Data Bus by supplying the corresponding J$j$FR. The J$j$FR signal denotes that Memory-$j$ has a First Data Word available for transmittal to a Processor. If a requesting Processor-$i$ has been granted communication with a Memory-$j$, or if the Processor to which a requesting Memory-$j$ has been assigned by the CAT has similarly been granted communication, Logic Unit 420 delivers a DK$j$R output signal designating the Memory-$j$ of the Processor-Memory combination requesting the Data Bus for communication. When Timer-Controller 438 is in State-1 the requests represented by the output signals of Logic Unit 420 are stored in the respective FK$j$M flip-flops of Data Bus Request Register 421.

Memory Priority Allocation Logic Unit 422 responds to the Memory-designating request signal of Register 421 for delivering output signals in sequence for the Memories identified by the input request signals. The sequence in which Logic Unit 422 delivers output signals is determined by the positional priority of the Memories identified by the request signals. When the Timer-Controller is in State-0 Data Bus Granting Register 423 stores in a FK$j$N flip-flop an identification of the Memory-$j$ corresponding to the output signal of Logic Unit 422. When one of the flip-flops of Register 423 is in the 1-state, the Data Bus is assigned for communication between the corresponding Memory and the Processor to which the CAT has assigned such Memory.

Following a memory cycle and the delivery of the Memory end-of-cycle signal the flip-flops designating the participating Memory in Registers 421 and 423 are cleared and the Data Bus is granted to the next-lower priority Memory identified in Register 423.

A Processor-$i$ requests that a double word memory cycle be executed by supplying the corresponding J$i$DW signal. Double-Word Input Clearing Logic Unit 424 is enabled by a J$i$DW signal to respond to certain A$j$FA or J$j$FP pulses and deliver an output pulse corresponding to Memory-$j$. The A$j$FA pulse is delivered to Memory-$j$ for denoting that the Processor communicating with Memory-$j$ has received the First Data Word during a Read-Restore cycle. The J$j$FP pulse is delivered by Memory-$j$ for denoting that Memory-$j$ has received and stored a First Data Word during a Clear-Write cycle. The output pulse of Logic Unit 424 is delivered in the interval of a double-word cycle following the transmission of the First Data Word and prior to the transmission of the Last Data Word.

Double-Word Data Bus Clearing Register 425 receives each output pulse delivered by Logic Unit 424 and in response resets a respective FK$j$T flip-flop. When an FK$j$T flip-flop is in the 0-state, the Data Bus is disabled from providing communication between the corresponding Memory-$j$ and the Processor-$i$ with which Memory-$j$ is communicating. The FK$j$T flip-flop is set once again when Processor-$i$ denotes the availability of the Last Data Word, as represented by the J$i$LW signal, during a Clear-Write cycle or when Memory-$j$ denotes the availability of a Last Data Word, as represented by the J$j$LR signal, during a Read-Restore memory cycle. Accordingly, the FK$j$T flip-flop is momentarily transferred to the 0-state, thereby disabling the Data Bus, following the time of transmission of the First Data Word and before the availability of the Last Data Word of a double-word memory cycle. This momentary disabling of the Data Bus functions to clear the Data Bus of transient signals following the First Data Word in order to provide clear and unambiguous signals representing the Last Data Word to follow.

Read Gate Enabling Signal Generator 430 is enabled by the output signals of the CAT Output Registers, by the output signals of Register 407 of the CIC-R/S, and by a J$i$RD signal from Processor-$i$ and responds to the output signals of Registers 421, 423 and 425 of the CIC-B/S for controlling gates in the CDX to assign the Data Bus for transfer of a Data Word from a Memory to Processor-$i$ during a Read-Restore cycle. The J$i$RD signal denotes that the memory cycle involved in the Data Word transfer is to be a Read-Restore cycle. For controlling the CDX gates to transfer a Data Word from a Memory-$j$ to Processor-$i$, Generator 430 delivers the DD$j$R and DD$i$T signals. Write Gate Enabling Signal Generator 431 also is enabled by the output signals of the CAT Output Registers, by the output signals of Register 407, and by a J$i$WR signal from Processor-$i$ and responds to the output signals of Registers 421, 423, and 425 for controlling gates in the CDX to assign the Data Bus for transfer of a Data Word from Processor-$i$ to a Memory during a Clear-Write cycle. The J$i$WR signal denotes that the memory cycle involved in the Data Word transfer is to be a Clear-Write cycle. For controlling the CDX gates to transfer a Data Word from Processor-$i$ to a Memory-$j$, Generator 431 delivers the DD$i$R and DD$j$T signals.

Control Signal Transmitter 433 receives the J$i$FW and J$i$LW control signals from the Processors, these signals denoting the availability of respective First and Last Data Words from a Processor-$i$ during a Clear-Write cycle. Transmitter 433 responds to these received signals and, under control of the DD$i$R signals delivered by Signal Generator 431, delivers the BAFW or BALW signals, these latter signals denoting the availability of a respective First or Last Data Word from the Processor coupled to the Data Bus. Control Signal Transmitter 433 also receives the J$j$FR and J$j$LR signals from the Memories, these signals denoting the availability of respective First and Last Data Words from a Memory-$j$ during a Read-Restore cycle. Transmitter 433 responds to these received signals and, under control of the DD*j*R signals delivered by Signal Generator 430, delivers the B*j*FR and B*j*LR signals, these latter signals denoting the availability of a respective First or Last Data Word from the Memory coupled to the Data Bus.

Read Acknowledgment Signal Transmitter 434 receives the J*i*FA and J*i*LA acknowledgment control pulses from the Processors, these pulses denoting the receipt by Processors, these pulses denoting the receipt by Processor-*i* of respective First and Last Data Words during a Read-Restore cycle. Transmitter 434 responds to these received pulses if enabled by the output signals of the CAT Output Registers, to transmit the A*j*FA and A*j*LA pulses to the corresponding Memory-*j*. The A*j*FA and A*j*LA pulses denote the receipt by a Processor of the respective First and Last Data Words supplied by Memory-*j*. Write Acknowledgment Signal Transmitter 435 receives the J*j*FP and J*j*LP acknowledgment control pulses from the Memories, these pulses denoting the receipt and storage by Memory-*j* of respective First and Last Data Words during a Clear-Write cycle. In response to each J*j*FP and J*j*LP pulse, Transmitter 435 delivers a respective B*j*FP or B*j*LP pulse to the CCX for retransmittal to the Processors.

*Input request logic unit*

The detailed structure of Logic Unit 420 is shown in FIG. 58.

Logic Unit 420 receives signals representing Processor and Memory requests for the Data Bus, recognizes a request signal if the Processor to be coupled to the Data Bus has been granted communication with the Memory group, and generates output signals designating the Memories to be coupled to the Data Bus for the communications requested and recognized. The J*i*FW signal is provided as a request signal by Processor-*i* when this Processor has a First Data Word available for transmittal to and storage in the Memory group. The J*j*FR signal is provided as a request signal by Memory-*j* when this Memory has a First Data Word available for transmittal to a Processor. If the requesting Processor-*i* has been granted communication with the Memory group or if the Processor-*i* to which the requesting Memory has been assigned by the CAT has been granted communication with the Memory group, the grant being denoted by the corresponding FR*i*A signal, Logic Unit 420 delivers a DK*j*R output signal designating Memory-*j* of the Processor-Memory combination requiring the Data Bus.

For example, the logical schematic diagram of the circuit generating the DKKR output signal is:

JPFW FRPA FCPK+JAFW FRAA FCAK+JBFW FRBA FCBK+JCFW FRCA FCCK+$\overline{\text{FRKQ}}$(JKFR +FKKN)·(FRPA FCPK+FRAA FCAK+FRBA FCBK+FRCA FCCK)=DKKR The request of Processor-*i* is denoted by the respective J*i*FW signal being a binary 1. The request of Memory-K is denoted by the JKFR signal being a binary 1. Hence, the DKKR signal becomes a binary 1 to denote recognition of the request of a Processor or of Memory-K for the Data Bus, provided that:

(1) If Processor-*i* is requesting the Data Bus, this Processor has been granted communication with the Memory group, as designated by the respective FR*i*A signal, and Memory-K has been assigned to Processor-*i* by the CAT. Thus, if DAP-A is requesting the Data Bus (JAFW), Memory-K has been assigned to DAP-A by the CAT (FCAK), and the CIC-R/S has granted DAP-A communication with the Memory group (FRAA), each of the three signals applied to the AND-gate represented by

JAFW FRAA FCAK is a binary 1 and the DKKR signal will be a binary 1, and (2) If Memory-*j* is requesting the Data Bus, this Memory has been identified in Register 404 of the CIC-R/S, as designated by the $\overline{\text{FR}j\text{Q}}$ signal, Memory-K has been assigned to a Processor by the CAT, and the Processor to which Memory-K has been assigned has been granted communication with the Memory group by the CIC-R/S. Thus, if Memory-K is requesting the Data Bus (JKFR), Memory-K is identified in Register 404 ($\overline{\text{FRKQ}}$), the CAT has assigned Memory-K to DAP-B (FCBK), and the CIC-R/S has granted DAP-B communication with the Memory group (FRBA), each of the four signals applied to the circuit represented by the logical schematic diagram $\overline{\text{FRKQ}}$ JKFR FRBA FCBK is a binary 1 and the DKKR signal will be a binary 1.

Accordingly, a Data Bus request is received by Input Request Logic Unit 420 when a Processor or Memory provides the respective J*i*FW or J*j*FR signal denoting that a First Data Word is available for transmittal on the Data Bus, and the request is recognized if the requesting Processor or the Processor to which the requesting Memory is assigned has been granted communication with the Memory group by the CIC-R/S.

The request for the Data Bus is always initiated by a binary 1 signal denoting the presence of a First Data Word. If a double-word cycle is involved, this First Data Word signal will drop to a binary 0 following transmittal of the First Data Word. Therefore, to reserve the Data Bus for transmittal of the Last Data Word of a double-word memory cycle, the output signal of the FK*j*N flip-flop of Register 423 is employed as a "locking" signal to maintain the corresponding DK*j*R output signal a binary 1 until Memory-*j* delivers the end-of-cycle signal.

FIGURE 58 further illustrates that from one to four Processor or Memory request signals may be received simultaneously and that Logic Unit 420 can recognize simultaneously any one or more of these received signals, delivering the corresponding DK*j*R output signals.

*Data bus request register*

The detailed structure of Data Bus Request Register 421 is shown in FIGS. 52 and 53. Register 421 comprises the seven FK*j*M flip-flops. Each FK*j*M flip-flop, when in the 1-state, represents a request for the Data Bus to provide communication between a Processor and the Memory-*j* represented by the flip-flop.

Register 421 stores each Data Bus request currently recognized by Logic Unit 420 when Timer-Controller 438 is in State-1. For each Data Bus request it recognizes Logic Unit 420 transmits a binary 1 DK*j*R output signal corresponding to the Memory-*j* of the Processor-Memory combination requiring the Data Bus. Register 421 receives the DK*j*R signals and responds to each DK*j*R signal representing a binary 1 during State-1 of Timer-Controller 438 to control the setting of the respective FK*j*M flip-flop provided, however, that the corresponding FK*j*N flip-flop is in the 0-state. For example, the logical schematic diagram of the circuit which generates the S-KKM signal for transferring the FKKM flip-flop to the 1-state is:

DKKR FKCL $\overline{\text{FKKN}}$=S-KKM

The FKCL signal represents a binary 1 during State-1 of Timer-Controller 438.

A stored request in Register 421 is cleared by resetting the FK*j*M flip-flop when the corresponding DK*j*R request signal drops to a binary 0. The FK*j*M flip-flop is also reset when the requesting Processor-*i* or Memory-*j* initiates the respective A*j*LA or J*j*LP pulse denoting the receipt of a Last Data Word.

As will be shown hereinafter, Time-Controller 438 will not transfer to State-0 until, for every DK*j*R signal representing a binary 1, the respective FK*j*M flip-flop is transferred to the 1-state.

103

Memory priority allocation logic unit

The detailed structure of Memory Priority Allocation Logic Unit 422 is shown in FIGS. 54 and 55.

Logic Unit 422 receives the signals representing the Data Bus requests stored in Register 421, recognizes a request if certain conditions are met, and generates an output signal designating the Memory-$j$ of the Processor-Memory combination that is to be granted the Data Bus.

The logical schematic diagrams of the circuits which supply output signals to set the FK$j$N flip-flops (shown in FIGS. 54 and 55) describe Logic Unit 422. Each of these circuits generates a respective S-K$j$N recognition signal if the requisite conditions are met. For example, the logical schematic diagram for the circuit generating the S-KMN signal is:

$$FKMM\ \overline{FKLM}\ \overline{FKKM}\ \overline{FKJM}\ \overline{FKCL}\ \overline{DKEN}=S\text{-}KMN$$

Thus, the S-KMN signal denotes recognition of the request to grant the Data Bus for communication between a Processor and Memory-M in response to the corresponding FKMM request signal being a binary 1, provided that Memory-M has highest positional priority of the Memories identified by the binary 1 request signals. In the above example, the request involving Memory-M is only recognized if no request involving Memory-J, Memory-K, or Memory-L is present, denoted by the respective $\overline{FKJM}$, $\overline{FKKM}$, and $\overline{FKLM}$ signals.

Each request signal received by Logic Unit 422 inhibits the issuance of output signals corresponding to all requests of lower priority. Therefore, only one output signal at a time is delivered by Logic Unit 422.

Accordingly, Logic Unit 422 delivers in sequence output signals designating in sequence all of the Memories identified by the simultaneously received request signals. The output signal delivered at a particular time corresponds to the Memory-$j$ having highest positional priority among the Memories identified by Register 421.

Data bus granting register

The detailed structure of Data Bus Granting Register 423 is shown in FIGS. 54 and 55. Register 423 comprises the seven FK$j$N flip-flops. Each FK$j$N flip-flop, when in the 1-state, grants the Data Bus to provide communication between a Processor and the Memory-$j$ represented by the flip-flop.

As each recognition signal is delivered by the Logic Unit 422, the corresponding FK$j$N flip-flop of Register 423 is transferred to the 1-state, provided Timer-Controller 438 is in State-0. As each Processor-Memory combination requesting the Data Bus is recognized by Logic Unit 422 the respective S-K$j$N signal becomes a binary 1. Register 423 receives the S-K$j$N signals and responds to each such signal which represents a binary 1 during State-0 of Timer-Controller 438 to control the setting of the respective FK$j$N flip-flop. For example, if Register 421 receives and stores a Data Bus request involving Memory-L during a particular State-1 of the Timer-Controller, in the following State-0 Logic Unit 422 generates the corresponding S-KLN recognition signal when the requisite conditions are met, and the FKLN flip-flop thereupon is transferred to the 1-state.

The stored designation of a Memory-$j$ in Register 423 is cleared when the corresponding DK$j$R signal becomes a binary 0. The DK$j$R signal becomes a binary 0 after the CIC-R/S receives the corresponding J$j$EC end-of-cycle signal from Memory-$j$.

Accordingly, the flip-flops of Data Bus Granting Register 423 are set sequentially according to the positional priority of the corresponding Memories identified by Register 421. When in the 1-state, each FK$j$N flip-flop grants the Data Bus for communication between a Processor and the respective Memory-$j$. Following completion of the communication the corresponding FK$j$N flip-flop is reset, thereby enabling the setting of another FK$j$N flip-flop corresponding to a Memory of lower positional priority.

104

The positional priority assigned to the various Memories is normally determined by their relative speeds. The more rapidly operating Memories are assigned higher positional priorities. Therefore, if the rapid read-only type of Memory described heretofore comprises a portion of the Memory group, this Memory is connected to the CCS to occupy the designated Memory-J position. On the other hand, the lower speed read-write magnetic core Memories are connected to the CCS to occupy the designated Memory-T or Memory-V positions.

As will be shown hereinafter, Timer-Controller 438 will not transfer to State-1 until, for every request stored in Register 421, the corresponding request has been granted by transferring the respective FK$j$N flip-flop to the 1-state, completion of a Memory cycle, and by resetting the respective FK$j$M flip-flop.

Double-word input clearing logic unit

The detailed structure of Double-Word Input Clearing Logic Unit 424 is shown in FIGS. 56 and 57.

Logic Unit 424 receives pulses denoting the receipt of a First Data Word by a Processor or a Memory, recognizes these pulses if the Memory involved is executing a double-word cycle, and delivers an output pulse designating the Memory-$j$ of the Processor-Memory combination for which the First Data Word transmission has been completed. Additionally, Logic Unit 424 receives signals denoting that a Last Data Word is available for transmission by a Processor or Memory and delivers an output signal designating the Memory-$j$ of the Processor-Memory combination for which the Last Data Word of a double-word cycle is available.

The logical schematic diagrams of the circuits for supplying output pulses to reset the FK$j$T flip-flops, shown in FIGS. 56 and 57, describe a portion of Logic Unit 424. Each of these circuits generates a respective R-K$j$T recognition pulse if the requisite conditions are met. For example, the logical schematic diagram for the circuit generating the R-KTT pulse is:

$$(JPDW\ FRPA\ FCPT+JADW\ FRAA\ FCAT+JBDW\ FRBA\ FCBT+JCDW\ FRCA\ FCCT)\cdot(ATFA+JTFP)$$
$$=R\text{-}KTT$$

Thus, the R-KTT pulse is generated to denote recognition of the beginning of the short interval which begins following transmission of the First Data Word during a double-word cycle of Memory-T and ends with the availability of the Last Data Word, provided that:

(1) The Processor-$i$ to which Memory-T is assigned, as designated by the respective FC$i$T signal being a binary 1, has been granted communication with the Memory group, as designated by the respective FR$i$A signal being a binary 1, and (2) The corresponding J$i$DW signal is a binary 1, controlling the Memory cycle to be a double-word cycle.

Accordingly, if the above-noted two conditions occur, the R-KTT pulse issues when either the ATFA pulse is delivered to Memory-T to denote that Processor-$i$ has received the First Data Word during a Read-Restore cycle or the JTFP pulse is delivered by Memory-T to denote that Memory-T has received and stored the First Data Word during a Clear-Write cycle.

Continuing the above example, if Memory-T has been assigned to DAP-A by the CAT (FCAT), DAP-A has been granted communication with the Memory group (FRAA), and DAP-A is controlling a double-word cycle (JADW), each of the three signals applied to the AND-gate represented by $$JADW\ FRAA\ FCAT$$

is a binary 1 and generation of the R-KTT pulse will be enabled. When DAP-A thereupon notifies Memory-T that it has received the First Data Word during a Read- Restore cycle (ATFA) or when Memory-T thereupon notifies DAP-A that it has received and stored the First Data Word during a Clear-Write cycle (JTFP), one of the two input leads of the OR-gate represented by $$ATFA + JTFP$$

receives a pulse and the R-KTT pulse will issue.

Accordingly, Logic Unit 424 delivers a R-K$j$T pulse during each double-word cycle, immediately following notification of the transmission of the First Data Word.

The logical schematic diagrams of the circuits for supplying output signals to set the FK$j$T flip-flops, shown in FIGS. 56 and 57, also describe a portion of Logic Unit 424. Each of these circuits generates a respective S-K$j$T signal if the requisite conditions are met. For example, the logical schematic diagram for the circuit generating the S-KTT signal is:

$$JPLW\ FCPT + JALW\ FCAT + JBLW\ FCBT + JCLW$$
$$FCCT + JTLR + DKTR = S\text{-}KTT$$

Thus, the S-KTT signal becomes a binary 1 to denote the availability of the Last Data Word of a double-word cycle; provided that where the Last Data Word is made available by a Processor-$i$, Memory-T has been assigned to Processor-$i$, by the CAT, as denoted by the respective FC$i$T signal being a binary 1. The J$i$LW signal issues with and identifies the Last Data Word supplied by Processor-$i$ for storage in a Memory during a double-word Clear-Write cycle. (However, if only a single-word cycle is being executed, the J$i$LW signal issues concurrently with the J$i$FW signal and the S-K$j$T signal is similarly controlled.) The JTLR signal denotes the availability from Memory-T of the Last Data Word during a double word Read-Restore cycle. (However, if only a single-word cycle is being executed, the JTLR signal issues concurrently with the JTFR signal and the S-K$j$T signal is similarly controlled.)

Accordingly, Logic Unit 424 delivers an S-K$j$T signal when the Last Data Word is made available during a double-word cycle or when the sole Data Word is made available during a single-word cycle.

Double-word data bus clearing register

The detailed structure of Double-Word Data Bus Clearing Resister 425 is shown in FIGS. 56 and 57. Register 425 comprises the seven FK$j$T flip-flops. Each of these flip-flops is in the 0-state during the short interval of a double-word cycle beginning immediately after transmission of the First Data Word and ending immediately prior to transmission of the Last Data Word. When one of the these flip-flops is in the 0-state the Data Bus is disabled from providing communication, the input and output gates of the Data Bus decoupling it from all Processors and Memories thereby aiding in clearing the Data Bus of transient signals following the First Data Word transmission.

For each R-K$j$T pulse delivered by Logic Unit 424, the respective FK$j$T flip-flop is transferred to the 0-state. For each S-K$j$T signal delivered by Logic Unit 424, the respective FK$j$T flip-flop is transferred to the 1-state. For example, if DAP-A is controlling Memory-K to execute a double-word cycle, immediately after transmission of the First Data Word between DAP-A and Memory-K on the Data Bus, Logic Unit 424 delivers the R-KKT pulse and resets the FKKT flip-flop. When the FKKT flip-flop is in the 0-state, both DAP-A and Memory-K are decoupled from the Data Bus, whereupon transient signals remaining on the Data Bus from transmission of the First Data Word are rapidly attenuated by the decoupling action. When DAP-A or Memory-K then denotes the availability of the Last Data Word, Logic Unit 424 delivers the S-KKT signal and sets the FKKT flip-flop. When the FKKT flip-flop is in the 1-state it is no longer effective to decouple the Data Bus from the DAP-A and Memory-K, and transmission of the Last Data Word may be effected.

Accordingly, the flip-flops of Register 425 are effective in a double-word cycle to decouple the communicating Processor and Memory from the Data Bus in the interval following transmission of the First Data Word and prior to transmission of the Last Data Word.

Gate enabling signal generators

The detailed structure of Read Gate Enabling Signal Generator 430 is shown in FIG. 59 and of Write Gate Enabling Signal Generator 431 is shown in FIG. 60.

Generators 430 and 431 receive from Registors 421, 423, and 425 output signals identifying the Memory-$j$ of the Processor-Memory combination that is to be granted the Data Bus, from the CAT Output Registers output signals indicating the one or more Processors to which this Memory-$j$ is assigned by the CAT, and from Register 407 of the CIC-R/S output signals denoting the one Processor-$i$ of those indicated by the CAT which is granted next communication with Memory-$j$.

Generator 430 is enabled when an output signal from the CAT Output Registers and an output signal from Register 407 of the CIC-R/S identify the same Processor-$i$ and when the J$i$RD signal is supplied by the identified Processor-$i$. When so enabled, Generator 430 responds to the Memory-identifying signals delivered by Registers 421, 423, and 425 to generate output signals corresponding to the Processor-Memory combination granted the Data Bus for communication. Generator 431 is enabled when an output signal from the CAT Output Registers and an output signal from Register 407 identify the same Processor-$i$ and when the J$i$WR signal is supplied by the identified Processor-$i$. When so enabled, Generator 431 responds to the Memory-identifying signals delivered by Registers 421, 423 and 425 to generate output signals corresponding to the Processor-Memory combination granted the Data Bus for communication.

Generator 430 generates a DD$j$R signal and a corresponding DD$i$T signal. The DD$j$R signal enables CDX input gates to transfer a Data Word from Memory-$j$ to the Data Bus and the DD$i$T signal enables CDX output gates to transfer a Data Word from the Data Bus to Processor-$i$. Accordingly, the signal pair delivered by Generator 430 enables the transfer of a Data Word from Memory-$j$ to Processor-$i$ during a Read-Restore cycle. Generator 431 generates a DD$i$R signal and a corresponding DD$j$T signal. The DD$i$R signal enables CDX input gates to transfer a Data Word from Processor-$i$ to the Data Bus and the DD$j$T signal enables CDX output gates to transfer a Data Word from the Data Bus to Memory-$j$. Accordingly, the signal pair delivered by Generator 431 enables the transfer of Data Word from Processor-$i$ to Memory-$j$ during a Clear-Write cycle.

For example, if Generator 430 is controlled to deliver an output signal to transfer a Data Word from Memory-L to the Data Bus, the DDLR signal represents a binary 1. The logical schematic diagram for the circuit generating the DDLR gate enabling signal is:

$$(JPRD\ FRPA\ FCPL + JARD\ FRAA\ FCAL + JBRD$$
$$FRBA\ FCBL + JCRD\ FRCA\ FCCL)FKLM$$
$$FKLN\ FKLT = DDLR$$

The above diagram illustrates that generation of the DDLR signal is enabled when a Processor-$i$ has Memory-L assigned thereto by the CAT (FC$i$L), when the Processor-$i$ has been granted next communication with Memory-L by the CIC-R/S (FR$i$A), and when this Processor-$i$ is requesting a Read-Restore cycle (J$i$RD). The circuit, when so enabled, controls the DDLR signal to become a binary 1 when each of the flip-flops identifying Memory-L in Registers 421, 423, and 425 is in the 1-state (FKLM, FKLN, FKLT).

Continuing the above example, if Generator 430 is controlled to deliver an output signal to transfer the Data Word being transmitted on the Data Bus to DAP-B, the DDBT signal represents a binary 1. The logical schematic diagram for the circuit generating the DDBT gate enabling signal is:

(FCBJ FKJM FKJN FKJT+FCBK FKKM FKKN
FKKT+FCBL FKLM FKLN FKLT+FCBM FKMM
FKMN FKMT+FCBN FKNM FKNN FKNT+FCBT
FKTM FKTN FKTT+FCBV FKVM FKVN
FKVT)JBRD FRBA=DDBT

The above diagram illustrates that generation of the DDBT signal is enabled when CAT Output Register 305 delivers a binary 1 output signal denoting that a Memory-$j$ has been assigned to DAP-B (FCB$j$), when the CIC-R/S grants DAP-B next communication with this Memory-$j$ (FRBA), and when DAP-B is requesting a Read-Restore cycle (JBRD). The circuit, when so enabled, controls the DDBT signal to become a binary 1 when each of the flip-flops identifying the assigned Memory-$j$ in Registers 421, 423 and 425 is in the 1-state (FK$j$M, FK$j$N, FK$j$T).

If, on the other hand, Generator 431 is controlled to deliver an output signal to transfer a Data Word from DAP-B to the Data Bus, the DDBR signal represents a binary 1. The logical schematic diagram for the circuit generating the DDBR gate enabling signal is:

(FCBJ FKJM FKJN FKJT+FCBK FKKM FKKN
FKKT+FCBL FKLM FKLN FKLT+FCBM FKMM
FKMN FKMT+FCBN FKNM FKNN FKNT+FCBT
FKTM FKTN FKTT+FCBV FKVM FKVN
FKVT)JBWR FRBA=DDBR

The above diagram illustrates that generation of the DDBR signal is enabled when CAT Output Register 305 delivers a binary 1 output signal denoting that a Memory-$j$ has been assigned to DAP-B (FCB$j$) when the CIC-R/S grants DAP-B next communication with this Memory-$j$ (FRBA), and when DAP-B is requesting a Clear-Write cycle (JBWR). The circuit, when so enabled, controls the DDBR signal to become a binary 1 when each of the flip-flops identifying the assigned Memory-$j$ in Registers 421, 423, and 425 is in the 1-state (FK$j$M, FK$j$N, FK$j$T).

Continuing the above example, if Generator 431 is controlled to deliver an output signal to transfer the Data Word being transmitted on the Data Bus to Memory-L, the DDLT signal represents a binary 1. The logical schematic diagram for the circuit generating the DDLT gate enabling signal is:

(JPWR FRPA FCPL+JAWR FRAA FCAL+JBWR
FRBA FCBL+JCWR FRCA FCCL)FKLM FKLN
FKLT=DDLT

The above diagram illustrates that generation of the DDLT signal is enabled when a Processor-$i$ has Memory-L assigned thereto by the CAT (FC$i$L), when this Processor-$i$ has been granted next communication with Memory-L by the CIC-R/S (FR$i$A), and when this Processor-$i$ is requesting a Clear-Write cycle (J$i$WR). The circuit, when so enabled, controls the DDLT signal to become a binary 1 when each of the flip-flops identifying Memory-L in Registers 421, 423, and 425 is in the 1-state (FKLM, FKLN, FKLT).

Inasmuch as the requesting Processor must designate whether the memory cycle is to be either a Read-Restore or a Clear-Write cycle, either Generator 430 or Generator 431 enables transmisison of a Data Word, the direction of transmission enabled being determined by the type of memory cycle requested.

*Control signal transmitter*

The detailed structure of Control Signal Transmitter 433 is shown in FIG. 58.

Transmitter 433 receives from the Processors control signals denoting the availability of First and Last Data Words supplied by the Processors during Clear-Write cycles, from the Memories control signals denoting the availability of First and Last Data Words supplied by the Memories during Read-Restore cycles, and from Generators 430 and 431 output signals identifying the Memory or Processor currently coupled to transfer a Data Word to the Data Bus.

During a Read-Restore cycle Transmitter 433 is enabled if Memory-$j$ supplies a J$j$FR or J$j$LR control signal denoting the availability of a respective First or Last Data Word and activated to generate the corresponding BJFR or BJLR signals when Generator 430 delivers an output signal (DD$j$R) denoting that such Memory-$j$ is now coupled to the Data Bus. The BJFR signal indicates that the Memory currently coupled to the Data Bus has a First Data Word available for transmission. The BJLR signal indicates that the Memory currently coupled to the Data Bus has a Last Data Word available for transmission.

During a Clear-Write cycle Transmitter 433 is enabled if a Processor-$i$ supplies a J$i$FW and J$i$LW control signal denoting the availability of a respective First or Last Data Word and activated to generate the corresponding BAFW or BALW signal when Generator 431 delivers an output signal (DD$i$R) denoting that such Processor-$i$ is now coupled to the Data Bus. The BAFW signal indicates that the Processor currently coupled to the Data Bus has a First Data Word available for transmission. The BALW signal indicates that the Processor currently coupled to the Data Bus has a Last Data Word available for transmission.

For example, if Memory-V is coupled to the Data Bus and has a First Data Word available for transmission the BJFR signal represents a binary 1. The logical schematic diagram for the circuit generating the BJFR signal is:

JJFR DDJR+JKFR DDKR+JLFR DDLR+JMFR
DDMR+JNFR DDNR+JTFR DDTR+JVFR
DDVR=BJFR

The above diagram illustrates that the BJFR signal is generated if Memory-V is coupled to the Data Bus (DDVR) and has a first Data Word available for transmission (JVFR).

If, on the other hand, the PEP is coupled to the Data Bus and has a Last Data Word available for transmission the BALW signal represents a binary 1. The logical schematic diagram for the circuit generating the BALW signal is:

JPLW DDPR+JALW DDAR+JBLW DDBR+JCLW
DDCR=BALW

The above diagram illustrates that the BALW signal is generated if the PEP is coupled to the Data Bus (DDPR) and has a Last Data Word available for transmission (JPLW).

*Acknowledgment signal transmitters*

The detailed structure of Read Acknowledgment Signal Transmitter 434 is shown in FIG. 61 and of Write Acknowledgment Signal Transmitter 435 is shown in FIG. 62.

Transmitter 434 receives and is enabled by each signal from the CAT Output Register identifying a Processor-$i$ to which a Memory has been assigned for communication (FC$ij$) and, when enabled, Transmi.ter 434 responds to J$i$FA and J$i$LA acknowledgment control pulses supplied by the corresponding Processor-$i$ to generate acknowledgment pulses (A$j$FA, A$j$LA) for the Memory-$j$ assigned to Processor-$i$. The J$i$FA and J$i$LA pulses acknowledge receipt by Processor-$i$ of a respective First and Last Data Word from a Memory during a Read-Restore cycle. The information represented by these pulses is then transmitted to the assigned Memory-$j$ by the respective A$j$FA and A$j$LA pulses.

For example, if a requesting Processor acknowledges receipt of a First Data Word from Memory-M, the AMFA signal represents a binary 1. The logical schematic diagram for the circuit generating the AMFA signal is:

$$FCPM\ JPFA + FCAM\ JAFA + FCBM$$
$$JBFA + FCCM\ JCFA = AMFA$$

The above diagram illustrates that generation of the AMFA pulse is enabled if a Processor-$i$ has Memory-M assigned thereto by the CAT (FC$i$M). The circuit, when so enabled, generates the AMFA pulse when a pulse is received denoting receipt by such Processor-$i$ of a First Data Word from the Memory group (J$i$FA).

Transmitter 435 receives and amplifies each J$j$FP and J$j$LP acknowledgment control pulse received from a Memory-$j$ to deliver corresponding B$j$FP and B$j$LP acknowledgment pulses to the CCX. The J$j$FP and J$j$LP pulses acknowledge receipt and storage by Memory-$j$ of respective First and Last Data Words supplied by the communicating Processor. The B$j$FP and B$j$LP pulses represent the same information as the corresponding J$j$FP and J$j$LP pulses.

Timer-controller

The detailed structure of Timer-Controller 438 is shown in FIGS. 57 and 58. Timer-Controller 438 provides a pair of signals for controlling the sequence of the individual operations which take place within the CIC-B/S from the time of recognition of a Data Bus request signal until the request has been granted and the required communication completed.

Timer-Controller 438 comprises the FKCL flip-flop, which receives and responds to the output signals of Logic Unit 420 and Register 421. State-1 of the Timer-Controller, determined by the FKCL flip-flop being in the 1-state, controls the recognition of Processor and Memory requests for the Data Bus and controls the storage of recognized requests in Register 421. State-0 of Timer-Controller 438, determined by the FKCL flip-flop being in the 0-state, controls the granting of the requests stored in Register 421 and controls the storage of granted requests in Register 423.

The FKCL flip-flop is enabled to transfer to the 0-state when a first Data Bus request is stored in Register 421, but the transfer is not activated until all currently recognized requests have also been stored in Register 421. If, however, a request is not recognized by Logic Unit 420, the request does not prevent the Timer-Controller from transferring to State-0. The logical schematic diagram for the circuit which generates the R-KCL signal for transferring Timer-Controller 438 to State-0 is shown in FIG. 57.

The FKCL flip-flop is transferred to represent the 1-state after every request stored in Register 421 has been granted and the corresponding communication completed. The logical schematic diagram for the circuit which generates the S-KCL signal for transferring the Timer-Controller to State-1 is shown in FIG. 57.

Timer-Controller 438 also generates the DKEN signal for denoting the enabling of a set of CDX input and output gates in providing a Data Word transfer. The logical schematic diagram for the circuit which generates the DKEN signal is shown in FIG. 58. The DKEN signal is employed as a monitoring signal to prevent inadvertent assignment of the Data Bus for a new communication prior to completion of a previous communication.

CENTRAL INTERRUPT SCHEDULER

The primary function of the CIS, FIGS. 20–23, is to control the initiation and termination of programs being executed by Data Processors 10, 11, and 12, to control the interruption of any one of the programs when a higher priority program requires execution, and to provide for the resumption of each interrupted program.

In performing its primary function, the CIS provides the following more specific functions:

(1) Controlling the interruption of a program being executed by a DAP when an Operating System program allocated higher priority requires execution. An interruption of this kind is termed a Priority Interrupt. The CIS controls two types of Priority Interrupts; namely,
  (a) Request-Interrupt, wherein a Processor requests than an Operating System program of specified priority level be assigned for execution to any DAP, and
  (b) Self-Interrupt, wherein a DAP requests that an Operating System program of specified priority level be assigned to the requesting DAP for execution.
(2) Maintaining a Priority Level Table containing the priority level of the program being executed by each DAP.
(3) Maintaining an identification of the priority level of each Operating System program queued for execution by a DAP.
(4) Maintaining an identification of the value (HQL) of the highest priority level of the Operating System programs queued for execution and an identification of the value (LPL) of the lowest priority level of the programs currently being executed by the DAP's. A comparison of the HQL and LPL values is employed during a Request-Interrupt to interrupt the lowest priority level program being executed by a DAP.
(5) Protecting stored information in a portion of the Operating System Memory by inhibiting direct access from Operating System programs.
(6) Maintaining the addresses of certain cells in the Operating System Memory to provide direct communication between Processors, using these cells as a communication link.
(7) Confining the execution of certain Operating System programs to one DAP so long as requests for the execution of such programs continue uninterrupted.

The CIS functions primarily in two modes of operation, the Translate Mode and the Passive Mode. In the Translate Mode the Symbolic Word Address supplied by the initiating Processor is translated to an Actual Word Address identifying a cell in the Operating System Memory. In executing the Translate Mode the CIS employs certain of the functions enumerated above. In the Passive Mode the PL Table of the CIS is employed as a memory, wherein the initiating DAP stores or retrieves a priority level value. Again, in executing the Passive Mode, certain of the functions set forth above are employed by the CIS.

The Translate Mode operation is executed in response to a DH$i$C signal received from the CAT Output Latches and generated following an Address Translation initiated by the respective Processor-$i$. The Passive Mode operation is executed in response to an FC$i$S signal received from the CAT Output Registers and generated following an Address Translation initiated by the respective DAP-$i$.

Translate mode operations

The following types of Translate Mode operations, described generally, are executed by the CIS:

Self-Interrupt—Controls the interruption of a DAP program when the DAP executing this program requests that it be assigned an Operating System program of a specified higher priority level. The Symbolic Address supplied by the requesting DAP denotes the priority level of the required Operating System program. This priority level is loaded into the Self-Interrupt PL Register. A flip-flop corresponding to the requesting DAP is set in the Self-Interrupt Control Register.

Request-Interrupt—Controls the interruption of a DAP program when a Processor requests that an Operating System program of a specified priority level be assigned to some DAP. The Symbolic Address supplied by the requesting Processor denotes the priority level of the required Operating System program. A representation of this priority level is loaded into the Queued PL Register. The CIS subsequently interrupts the DAP executing the program of lowest priority level, if this level is less than the level specified in the request.

Read/Write X-Register—Controls the communication between a DAP and the index registers provided for the particular Operating System program being executed by the DAP. A DAP executing an Operating System program is permitted to symbolically address any one of six index registers. The CIS translates the Symbolic Word Address to the Actual Word Address of the one of six cells serving as index registers for the priority level of the program which the initiating DAP is executing. Data may be stored in or retrieved from the index register.

Read/Write Status Table—Controls the communication between a DAP and the Status Table provided for the Operating System program being executed by each DAP. A DAP initiating or terminating an Operating System program symbolically addresses the Status Table to respectively store or retrieve the status of the interrupted program. The CIS translates the Symbolic Word Address to the Actual Word Address of the corresponding first of two Status Table cells assigned to the priority level of the program which the requesting DAP is executing and further assigned to the requesting DAP. Each DAP is provided with a Status Table for each Operating System priority level.

Read Processor Mailbox—Controls the communication between a Processor and the Processor Mailbox provided therefor. A Processor executing an Operating System program symbolically addresses its Processor Mailbox to read the contents following an Alert operation. The CIS translates the Symbolic Word Address to the Actual Word Address of the corresponding first of two Processor Mailbox cells assigned to the initiating Processor.

Alert Processor—Controls the alerting of one Processor by another after the alerting Processor has stored information for communication in the Processor Mailbox of the alerted Processor. The alerting Processor supplies a Symbolic Word Address identifying the Processor to be alerted. The CIS translates the Symbolic Word Address and alerts the Processor identified.

Read Transfer Vector—Controls the communication between a DAP and the Transfer Vector Memory cell provided for the Operating System program being executed by each DAP. A Transfer Vector provides the first address of an Operating System program. A DAP initiating an Operating System program symbolically addresses the Transfer Vector cell to read the contents. The CIS translates the Symbolic Word Address to the Actual Word Address of the Transfer Vector cell assigned to the priority level of the program which the requesting DAP is executing and further assigned to the requesting DAP. Each DAP is provided with a Transfer Vector cell for each Operating System priority level.

Set Transfer Address Operation—Initiates the communication between a DAP and a cell of the Operating System Memory normally inaccessible to the DAP while executing its current Operating System program. A DAP executing certain Operating System programs supplies a Symbolic Address to initiate this operation. The CIS translates the Symbolic Word Address and sets a flip-flop of the Transfer Control Register corresponding to the initiating DAP. When this DAP next supplies a Symbolic Word Address to the CIS, the Address will not be translated, but instead will be employed to provide direct communication with the corresponding Operating System Memory cell.

Transfer Address Operation—Controls the direct communication between a DAP and an Operating System Memory cell normally inaccessible to the DAP while executing its current Operating System program. This operation is effected when the flip-flop of the Transfer Control Register corresponding to the initiating DAP has been set in a preceding Set Transfer Address Operation. The CIS transmits an Actual Word Address which is the same as the Symbolic Word Address supplied. Accordingly, a Data Word is stored in or retrieved from the directly addressed cell.

Non-translate Operation—Controls the direct communication between a Processor and certain Operating System Memory cells. A Processor initiates this operation by supplying a Symbolic Word Address not translatable by the CIS. The CIS thereupon transmits an Actual Word Address which is the same as the Symbolic Word Address received.

Read Definer List—Controls the direct communication between a DAP operating at PL 8, 9, or 10, and a pair of cells of the corresponding Definer List. A DAP executing a PL 8, 9, or 10 Operating System program supplies a Symbolic Word Address identifying the Definer cell pair of the Definer List to be read. The CIS thereupon transmits an Actual Word Address which is the same as a Symbolic Word Address received. If this operation is the first of this type by the initiating DAP while executing an Operating System program at priority level 8, 9, or 10 the corresponding flip-flop in the Queued PL Register is cleared.

*Passive mode operations*

The following types of Passive Mode operations described generally, are executed by the CIS:

Write PL Table—Controls the writing of a priority level value into the PL Table. A DAP completing an Operating System program supplies the priority level of the program which was interrupted by the Operating System program or the priority level of a program which is to be initiated. The CIS receives the priority level from the DAP and stores the priority level in the register of the PL Table corresponding to this DAP.

Read PL Table—Controls the reading of a priority level value from the PL Table. A DAP responding to a Priority Interrupt initiates this operation to retrieve from the PL Table the priority level of the program being interrupted. The CIS transmits to the initiating DAP the priority level from the register in the PL Table corresponding to this DAP. Following this transmission, if the DAP is responding to a Self-Interrupt, the priority level stored in the Self-Interrupt PL Register is then transferred into the corresponding PL Table register. However, if the DAP is responding to a Request-Interrupt, the highest priority level represented in the Queued PL Register is then transferred into the corresponding PL Table register. This new priority level in the PL Table is the priority level of the new Operating System program the responding DAP now commences executing.

*General structure*

Figure 20:
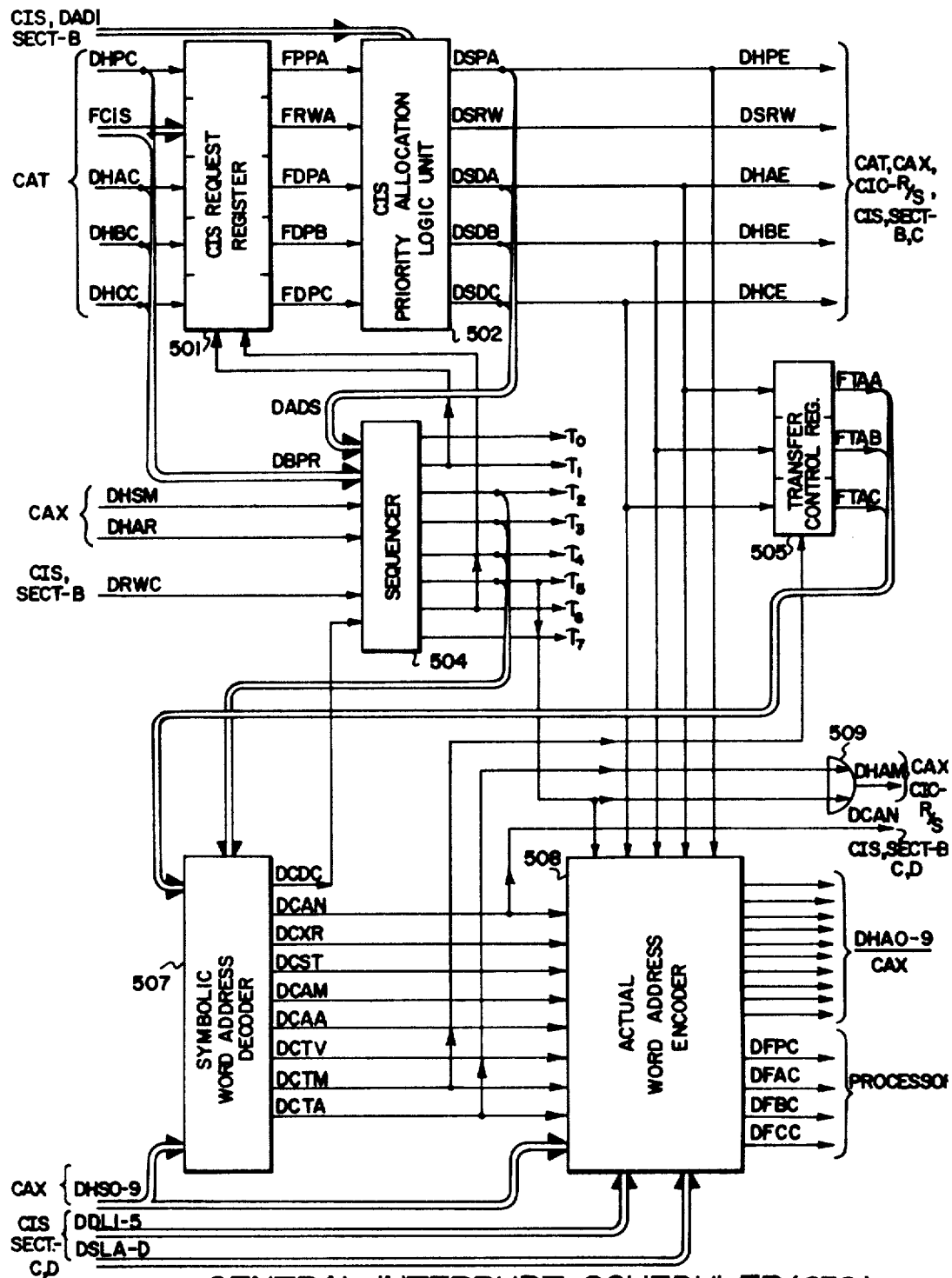
FIGURE 20 is a block diagram of Section A of the Central Interrupt Scheduler.

The CIS comprises, FIG. 20, a Request Register 501 for receiving Processor requests for Translate or Passive Mode operations and for storing all requests which are present at a predetermined time in the CIS cycle, and a Priority Allocation Logic Unit 502 for responding to the request-identifying output signals of Register 501 and for delivering output signals identifying the request granted, the requests being granted according to predetermined priorities allocated to the requesting Processors and according to the operational Mode requested. Additionally, the CIS comprises a Sequencer 504 for controlling the sequence of the individual operations within the CIS cycles. The CIS also comprises Transfer Control Register 505 to identify Data Processors for which a Transfer Address Operation is to be executed. A Symbolic Word Address Decoder 507 receives and decodes Symbolic Word Addresses to provide control signals denoting the type of Translate Mode operation requested of the CIS. An Actual Word Address Encoder 508 responds to the control signals delivered by Decoder 507 for providing a corresponding Actual Word Address for transmission to the CAX or for providing alert signals during an Alert Processor operation.

Figure 21:
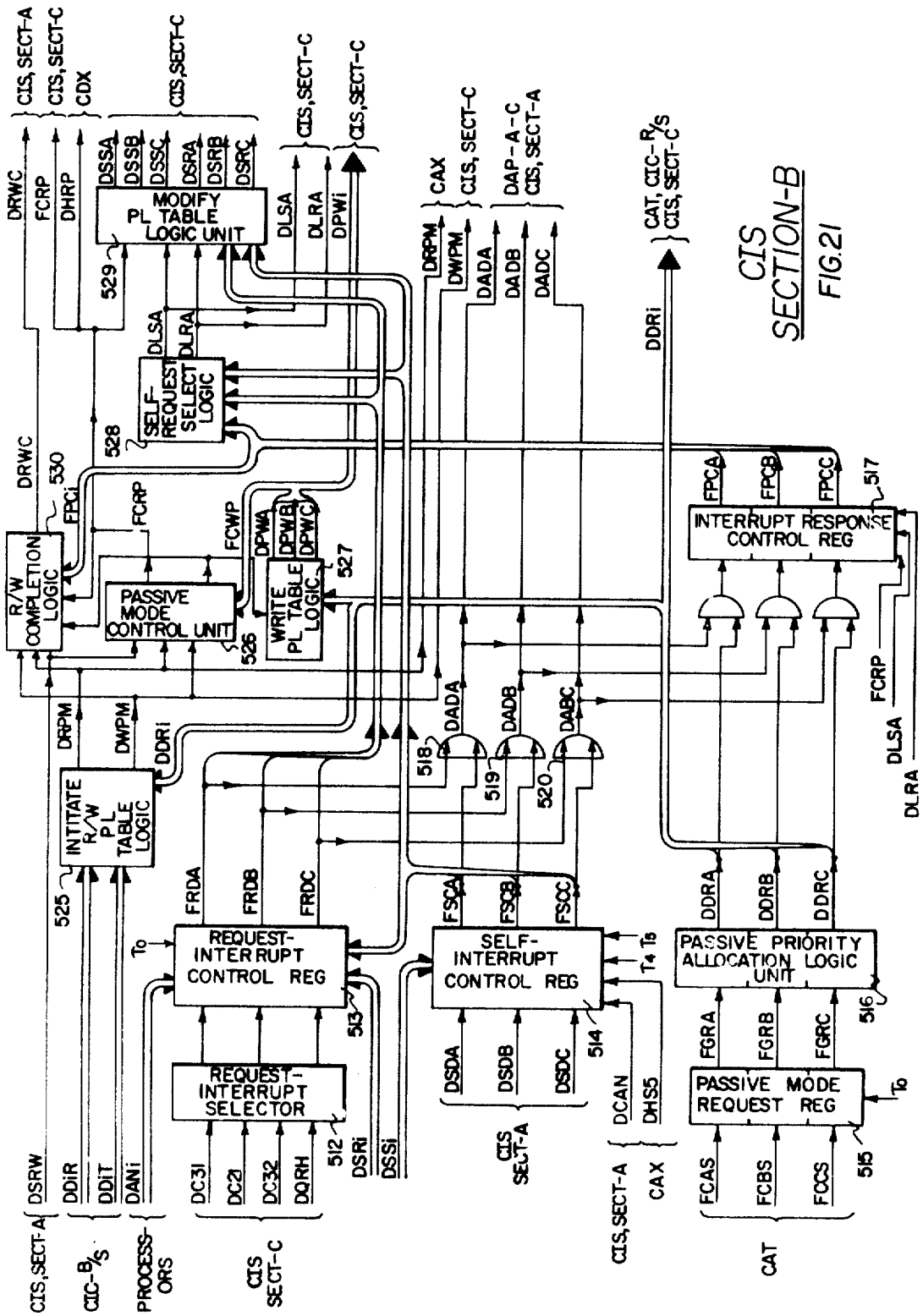
FIGURE 21 is a block diagram of Section B of the CIS.

The CIS further comprises, FIG. 21, a Request-Interrupt Selector 512 for providing signals identifying the DAP which is next to be interrupted as a result of a Request-Interrupt operation; a Request-Interrupt Control Register 513 for responding to the signals delivered by Selector 512 to store an identification of the DAP next to be interrupted as a result of a Request-Interrupt operation; and a Self-Interrupt Control Register 514 for storing an identification of the DAP next to be interrupted as a result of a Self-Interrupt operation. The CIS comprises a Passive Mode Request Register 515 for storing identifications of the Data Rrocessors which have requested Passive Mode operations of the CIS, and a Priority Allocation Logic Unit 516 for responding to the request-identifying output signals of Register 515 and for delivering output signals identifying the request recognized, the Passive Mode requests being recognized according to predetermined priorities allocated to the DAP's. The CIS also comprises an Interrupt Response Control Register 517 for controlling transfer of a priority level value into the PL Table when a DAP responds to a Priority Interrupt notification. Each of OR-gates 518, 519, and 520 transmits a signal to notify a respective DAP that it has been selected for a Priority Interrupt operation. Additionally, the CIS comprises Initiate R/W PL Table Logic Unit 525 for providing a pair of signals to initiate execution of the Passive Mode read and write operations of the CIS; a Passive Mode Control Unit 526 for controlling the primary functions of the CIS during the Passive Mode read and write operations; a Write PL table Logic Unit 527 for providing signals to enable transfer of a priority level value into a PL Table register during a Passive Mode write operation; a Self-Request Select Logic Unit 528 for delivering a pair of signals to distinguish the functioning of the CIS during a Passive Mode read operation according to whether the operation is initiated in response to a Request-Interrupt or Self-Interrupt; a Modify PL Table Logic Unit 529 for providing signals to enable transfer of a new priority level value into a PL Table register during a Passive Mode read operation; and R/W Completion Logic Unit 530 for delivering an output signal denoting the completion of the required functions of a Passive Mode cycle.

Figure 22:
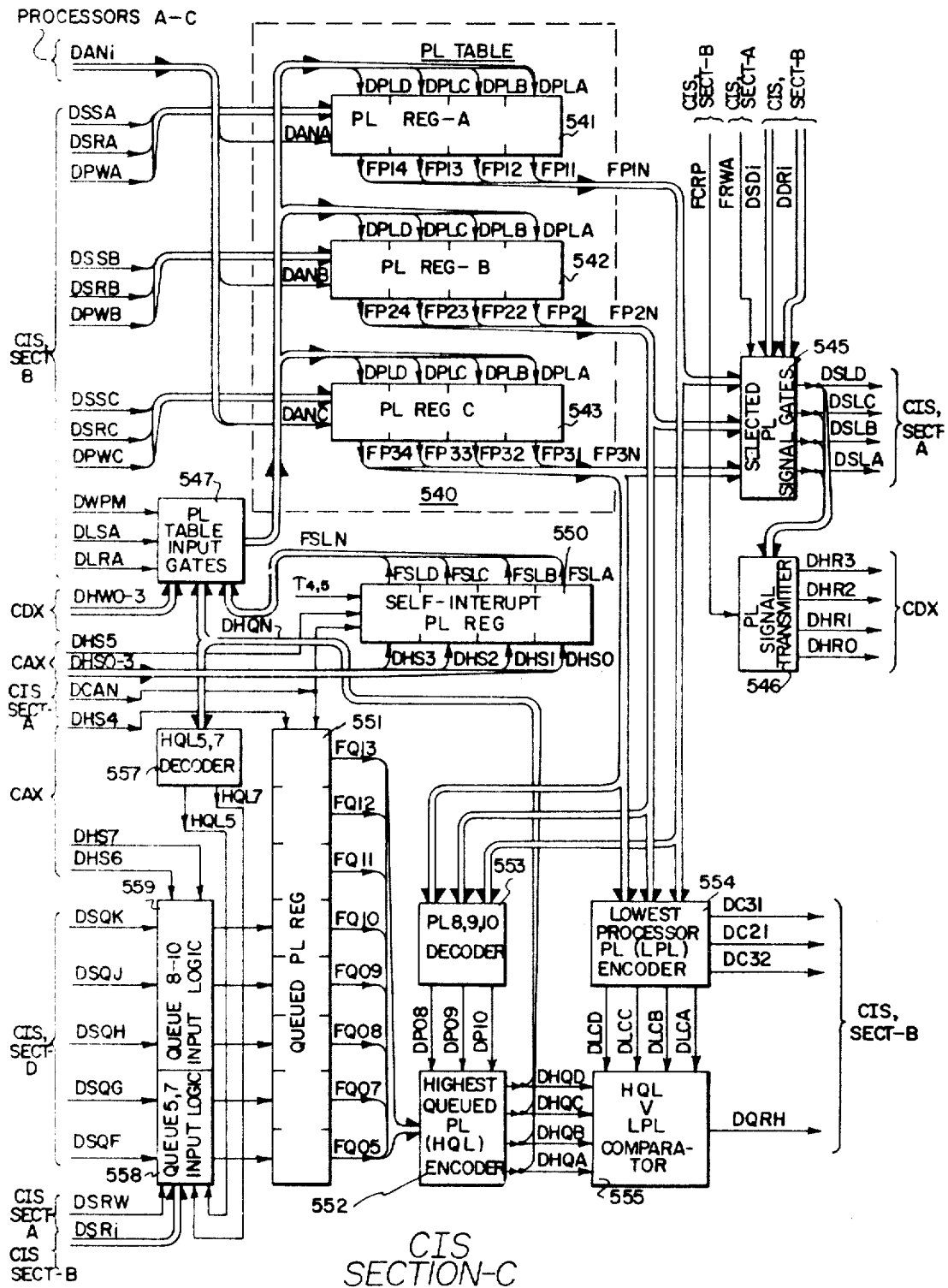
FIGURE 22 is a block diagram of Section C of the CIS.

In addition, the CIS comprises, FIG. 22, a Priority Level Table 540 for storing the priority level of the program currently being executed by each DAP; Selected PL Signal Gates 545 for delivering signals during any CIS operation initiated by a DAP, these signals representing the corresponding priority levels stored in the PL Table; a PL Signal Transmitter 546 for transmitting signals to the CDX for retransmittal to the requesting Processor, the signals provided by Transmitter 546 representing the value of a priority level stored in the PL Table and being transmitted during a Passive Mode read operation; and PL Table Input Gates 547 for delivering signals representing the value of a priority level to be stored in the PL Table during a Passive Mode operation. Further, the CIS comprises a Self-Interrupt PL Register 550 for storing the priority level of the program which a DAP is to execute as a result of a Self-Interrupt operation; a Queued PL Register 551 for storing representations of the different priority levels of programs for which Request-Interrupt operations have been executed; a Highest Queued PL Encoder 552 for responding to the signals delivered by Register 551 to provide output signals representing the value of the highest queued priority level (HQL) stored in Register 551; a PL 8, 9, 10 Decoder 553 for responding to the signals delivered by the registers of PL Table 540 to provide output signals denoting that the programs being executed by the DAP's have one or more of priority levels 8, 9, or 10; a Lowest Processor PL Encoder 554 for responding to the signals delivered by the registers of the PL Table to provide output signals representing the value of the lowest priority level (LPL) stored in the PL Table; and an HQL v LPL Comparator 555 for receiving the signals provided by Encoders 552 and 554 to deliver a signal denoting whether the highest queued priority level stored in Register 551 is greater than the lowest priority level of the programs which the DAP's are current executing. An HQL 5, 7 Decoder 557 provides a pair of signals denoting that the highest queued priority level in Register 551 is respectively 5 or 7; a Queue 5, 7 Input Logic Unit 558 provides signals for controlling the flip-flops in Register 551 that store representations of queued requests for priority levels 5 and 7, and a Queue 8–10 Input Logic Unit 559 provides signals for controlling the flip-flops in Register 551 that store representations of queued requests for priority levels 8, 9 and 10.

Figure 23:
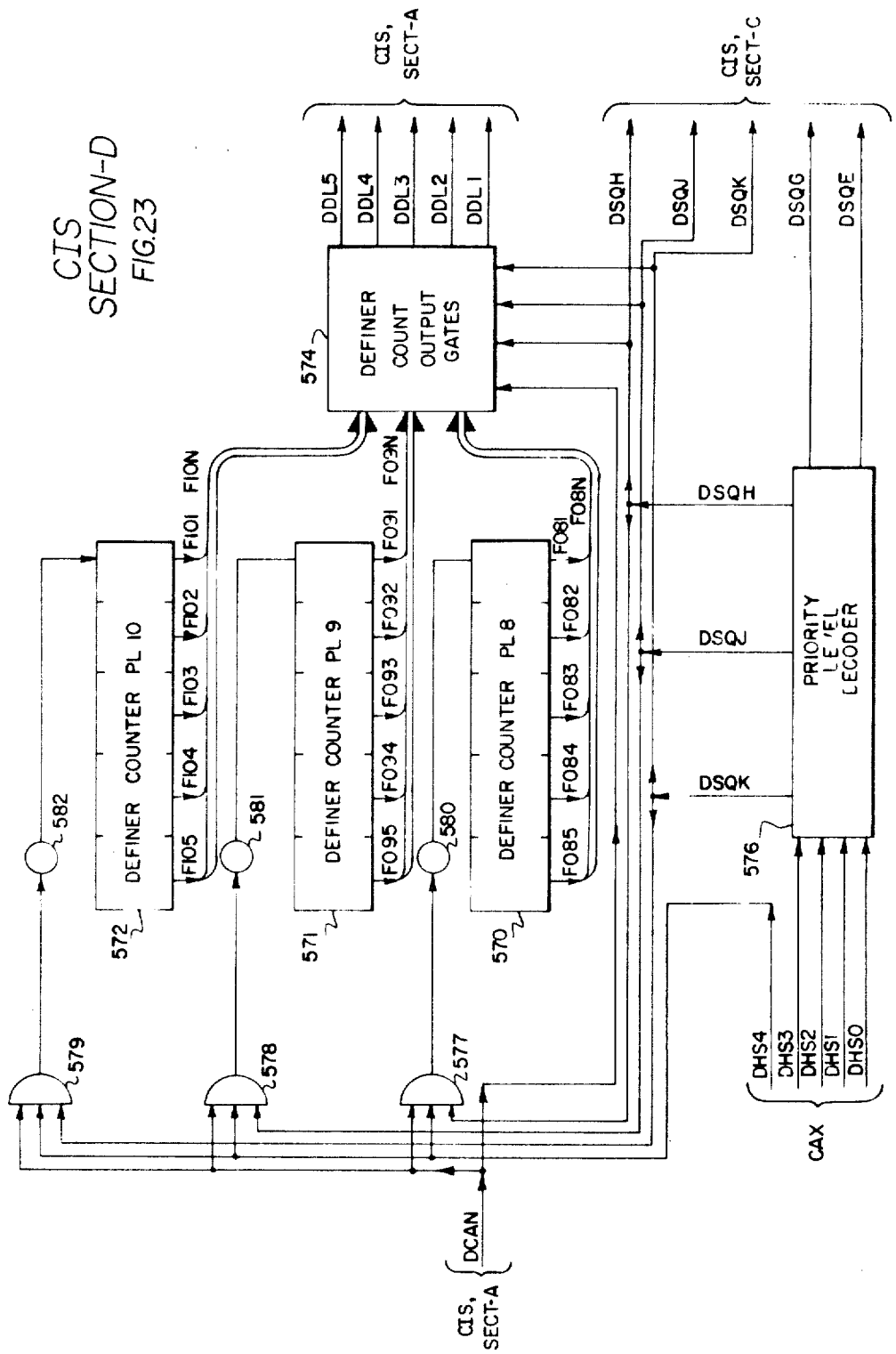
FIGURE 23 is a block diagram of Section D of the CIS.

The CIS also comprises, FIG. 23, Definer Counters 570, 571, and 572 to denote the Memory locations for Definer storage for the respective priority levels 8, 9, and 10. Also provided by the CIS are Definer Count Output Gates 574 for delivering signals representing the count of one of Definer Counters 570, 571, or 572 when a respective one of priority levels 8, 9, or 10 is specified by the Symbolic Word Address in a Request-Interrupt Translate Mode. Additionally, the CIS comprises a Priority Level Decoder 576 for providing signals denoting that the Symbolic Word Address received by the CIS represents a respective one of the priority levels 5, 7, 8, 9, or 10.

*Overall operation*

The Overall Operation of the CIS will be first described. The CAT requests that the CIS execute a Translate Mode operation for a Processor-$i$ by supplying the corresponding DH$i$C signal and requests that the CIS execute a Passive Mode operation for a DAP-$i$ by supplying the corresponding FC$i$S signal. If Sequencer 504 is in state-$\tau_0$, the quiescent state of the CIS, a request signal triggers a Sequencer cycle. When the Sequencer enters state-$\tau_1$, all current request signals are recognized and stored in Request Register 501.

Priority Allocation Logic Unit 502 responds to the request-identifying output signals of Register 501 to grant one of the requests and delivers an output signal identifying the granted request. The requests identified by Register 501 are granted, generally, according to predetermined priorities allocated to the requesting Processors, although other factors are also accorded significance. Because the PEP is employed to process real-time events, as described previously herein, it is allocated highest priority. Therefore, a PEP request for a Translate Mode operation when stored in Register 501 is always granted by Logic Unit 502, this grant being denoted by the DSPA signal. A DAP request for a Passive Mode operation is allocated second highest priority since the Passive Mode operation normally is employed during the critical time when a DAP is changing programs. The granting of a request for a Passive Mode operation is denoted by the DSRW signal. Requests by DAP-A, DAP-B, and DAP-C for Translate Mode operations normally are allocated respectively the remaining orders of priority. However, if a DAP has an unanswered Priority Interrupt notification, its allocated priority for a Translate Mode will be higher than that of any other DAP, unless another DAP of normally higher priority also has an unanswered Priority Interrupt notification. The DSDA, DSDB, and DSDC signals respectively denote the grant of the request for a Translate Mode operation by DAP-A, DAP-B, and DAP-C.

If the request of a Processor-$i$ for a Translate Mode operation is granted by Logic Unit 502, the DADS signal is generated for advancing the Sequencer to state-$\tau_2$. During state-$\tau_2$ a DH$i$E signal corresponding to this Processor-$i$ is transmitted to the CAX for enabling transfer to the CIS of the Symbolic Word Address supplied by Processor-$i$. The arrival of a Symbolic Word Address at the CIS is denoted by the DHSM signal, this signal advancing Sequencer 504 to state-$\tau_3$. The particular type of Translate Mode operation which the CIS now executes is determined by the Symbolic Word Address.

If the request of a DAP for a Passive Mode operation is granted by Logic Unit 502, the DSRW signals issues and is delivered to the CIC-R/S. At the same time Logic Unit 516 also is responding to DAP requests for Passive Mode operations and recognizes these requests according to predetermined priorities allocated the DAP's. Logic Unit 516 allocates decreasing priorities for recognition to DAP-A, DAP-B and DAP-C, respectively. The DAP-$i$ recognized by Logic Unit 516 is identified by a corresponding DDR$i$ signal, this signal, also being delivered to the CIC-R/S. Upon receipt of the DSRW signal and one of the DDR$i$ signals, the corresponding FR$i$A flip-flop of the Processor Access Granting Register 407 in the CIC-R/S is set to denote that DAP-$i$ is to be granted communication with the CIS PL Table. When the CIC-B/S subsequently grants the Data Bus to DAP-$i$ for communication with the PL Table, by generating the corresponding DD$i$R or DD$i$T signal, the Passive Mode operation of the CIS is executed.

Translate mode execution

Upon receipt by the CIS the Symbolic Word Address is immediately decoded by Symbolic Word Address Decoder 507. The particular output control signal provided by Decoder 507, while decoding the Symbolic Word Address, controls the type of Translate Mode operation the CIS executes. The eleven different types of Translate Mode operations provided by the CIS have been briefly described previously in the subsection entitled "Translate Mode Operations." A detailed description of each type of Translate Mode operation is provided hereinafter.

The control signal delivered by Decoder 507 controls issuance of the DCDC signal, which designates completion of the decoding of the Symbolic Word Address. The DCDC signal advances the Sequencer into and through state-$\tau_4$ and state-$\tau_5$. During state-$\tau_4$ and state-$\tau_5$ different types of operations take place within the CIS, as determined by the control signal from Decoder 507.

During state-$\tau_4$ of some Translate Mode operations and during state-$\tau_5$ of others, Actual Word Address Encoder 508 responds to the Symbolic Word Address and to the particular control signal delivered by Decoder 507 to generate an Actual Word Address for addressing the Operating System Memory. At the same time as the Actual Word Address is generated, an OR-gate 509 delivers the DHAM signal to denote the availability of the Actual Word Address on the CIS output lines. The DHAM signal is applied to and activates CAX gates, FIG. 9, to transmit therethrough and to the Operating System Memory the Actual Word Address provided by the CIS.

The DHAM signal is also applied to the CIC-R/S and activates the setting of an FR$i$A flip-flop corresponding to the initiating Processor-$i$ in Processor Access Granting Register 407. The setting of this FR$i$A flip-flop initiates the generation of signals to start a cycle in the Operating System Memory, employing the Actual Address provided, in part, by the CIS.

The initiation of the Operating System Memory cycle controls generation of the A$i$AR signal and its application to the CAX, this signal denoting that the Operating System Memory has received an Actual Address and that a memory cycle has been initiated therein. The A$i$AR signal generated corresponds to the initiating Processor-$i$. Upon receiving an A$i$AR signal, OR-gate 231 in the CAX, FIG. 9, transmits the DHAR signal to the CIS. The DHAR signal notifies the CIS that the Actual Word Address supplied thereby has been accepted by a Memory, so that the CIS may terminate the Translate Mode operation. The DHAR signal advances the Sequencer to state-$\tau_6$. During state-$\tau_6$ the CIS terminates transmission of the Actual Word Address and clears Request Register 501. Clearing Register 501 terminates the DADS signal, this termination, in turn, advancing the Sequencer to state-$\tau_7$.

The clearing of Register 501 also controls termination of the DH$i$E signal, which designated the Processor-$i$ for which the Translate Mode operation was executed. Termination of this DH$i$E signal terminates transfer to the CIS of the Symbolic Word Address supplied by Processor-$i$ and controls termination of the DHSM signal, which denoted the availability of the Symbolic Word Address to the CIS. Termination of the DHSM signal thereupon restores the Sequencer to its quiescent state-$\tau_0$ and the Translate Mode operation has been completed.

Passive mode execution

When the Data Bus is granted to the initiating DAP-$i$ for communication with the PL Table, the corresponding DD$i$R or DD$i$T signal enables respective Data Bus input or output gates in the CDX. The DD$i$R and DD$i$T signals are also transmitted to the CIS to control the respective writing into or reading from the PL Table. Logic Unit 525, FIG. 21, receives and responds to the DD$i$R and DD$i$T signals for generating the respective DWPM or DRPM signal, these latter signals initiating execution of the respective Passive Mode write and read operations. The Sequencer remains in state-$\tau_1$ during the greater portion of the Passive Mode operation.

Passive Mode Control Unit 526 receives and responds to the DWPM or DRPM signal from Logic Unit 525 for controlling the setting of the respective FCWP or FCRP flip-flop. These two flip-flops control the subsequent distinctive functions of the CIS during the respective Passive Mode write and read operations.

If a Passive Mode write operation has been initiated, the output signal of the FCWP flip-flop applied to Logic Unit 527 controls the generation of a DPW$i$ signal to store a priority level in the PL Table. The Data Bus at this time has been receiving a Data Word from the initiating DAP-$i$ in response to the DD$i$R signal, FIG. 13, the four least significant bits of this Data Word representing the priority level to be stored. The four DHW0–3 signals, representing these four bits, are applied to PL Table Input Gates 547, FIG. 22. The DWPM signal enables transfer of the priority level represented by the DHW0–3 signals through Gates 547. The output signals of Gates 547, designated as the DPLA-DPLD signals are applied to all registers of the PL Table. The DPW$i$ signal thereupon gates the priority level value into the register of the PL Table assigned to DAP-$i$.

The FCWP flip-flop is cleared immediately after storage of the priority level in the PL Table. The CIS now awaits completion of the Operating System Memory cycle before terminating the Passive Mode write operation. The initiating DAP, in requesting the Passive Mode write operation, also initiates a Clear-Write memory cycle in the Operating System Memory. When this memory cycle is complete, the FR$i$A flip-flop of Register 407 in the CIC-R/S is cleared, this clearing, in turn, terminating the DD$i$R signal. Termination of the DD$i$R signal controls termination of the DWPM signal. Termination of the FR$i$A signal also controls issuance of the DRWC signal, which denotes that the required functions of the Passive Mode write operation have been completed. The DRWC signal advances the Sequencer from state-$\tau_1$ directly to state-$\tau_6$. In state-$\tau_6$ Request Register 501 is cleared, the FRWA flip-flop thereof being restored to its 0-state, which terminates the DSRW signal provided by Logic Unit 502. Termination of the DSRW signal advances the Sequencer to state-$\tau_7$. Following a period to permit the CIS to select a DAP for a Request-Interrupt as the result of the new priority level in the PL Table, the Sequencer is restored to state-$\tau_0$.

If a Passive Mode read operation has been initiated, the output signal of the FCRP flip-flop applied to PL Signal Transmitter 546, FIG. 22, controls transfer therethrough and to the Data Bus of the selected priority level. The priority level selected corresponds to the DDR$i$ signal generated by Logic Unit 516, this signal identifying the DAP-$i$ for which the Passive Mode read operation is being executed. The DDR$i$ signal is applied to Selected PL Signal Gates 545 and enables transfer therethrough and to Transmitter 546 of the priority level in the corresponding register of the PL Table.

If the Passive Mode read operation has been initiated in response to a Request-Interrupt or a Self-Interrupt, the corresponding DLRA or DLSA signal is generated by Logic Unit 528. The DLRA signal enables transfer through Gates 547 of the signals of Encoder 552 representing the highest queued priority livel (HQL) stored in Register 551. The DLSA signal enables tarnsfer through gates 547 of the priority level stored in Register 550 through Gates 547.

The CIS now awaits completion of the Operating Syster memory cycle before terminating the Passive Mode read operation. The initiating DAP, in requesting the Passive Mode read operation, also initiates a Read-Restore memory cycle in the Operating System Memory. When this memory cycle is complete, the FR$i$A flip-flop of Register 407 in the CIC-R/S is cleared, this clearing, in turn, terminating the DD$i$T signal. Termination of the DD$i$T signal controls termination of the DRPM signal. Termination of the DRPM signal thereupon clears the FCRP flip-flop. Clearing of the FCRP flip-flop enables generation of a DSR$i$ or DSS$i$ signal by Logic Unit 529 according to whether a respective DLRA or DLSA signal is received by Logic Unit 529.

The DSR$i$ and DSS$i$ signals gate the priority level value delivered by Gates 547 into the register of the PL Table assigned to DAP-$i$. Accordingly, if DAP-$i$ is responding to a Request-Interrupt, the highest queued priority level stored in Register 551 is transferred to the corresponding register of the PL Table. However, if DAP-$i$ is responding to a Self-Interrupt, the priority level stored in Register 550 is transferred to the corresponding register of the PL Table.

Clearing of the FCRP flip-flop also controls issuance of the DRWC signal, which denotes that the required functions of the Passive Mode read operation have been completed. The DRWC signal advances the Sequencer from state-$\tau_1$ directly to state-$\tau_6$. In state-$\tau_6$ Request Register 501 is cleared, the FRWA flip-flop thereof being restored to its 0-state, which terminates the DSRW signal provided by Logic Unit 502. Termination of the DSRW signal advances the Sequencer to state-$\tau_7$. Following a period to permit the CIS to select a DAP for a Request-Interrupt as a result of the new priority level in the PL Table, the Sequencer is restored to state-$\tau_0$.

*Request register*

The detailed structure of Request Register 501 is shown in FIGS. 63 and 64. Register 501 comprises the FPPA, FRWA, FDPA, FDPB, and FDPC flip-flops. Each of these flip-flops, when in the 1-state, denotes the storage of a request for a CIS operation. The FPPA flip-flop stores a request by the PEP for a Translate Mode opeartion. The FRWA flip-flop stores a request by any DAP for a Passive Mode operation. The FDPA, FDPB, and FDPC flip-flops store requests by the respective DAP-A, DAP-B, and DAP-C for Translate Mode operations.

Register 501 accepts and stores each request received by the CIS when Sequencer 504 is in state-$\tau_1$. Register 501 receives a DH$i$C signal from the CAT, this signal denoting a request that the CIS execute a Translate Mode operation for the respective Processor-$i$. Register 501 receives an FC$i$S signal from the CAT, this signal denoting a request that the CIS execute a Passive Mode operation for the respective DAP-$i$. The DHPC signal enables the setting of the FPPA flip-flop. The DHAC, DHBC, and DHCC signals enable the setting of the respective FDPA, FDPB, and FDPC flip-flops. For example, the logical schematic diagram for the circuit which generates the S-DPA signal for enabling transfer of the FDPA flip-flop to the 1-state is:

$$DHAC \ \overline{DSDA} = S\text{-}DPA$$

Since Register 501 comprises type-B flip-flops, a clock signal representing a binary 1 must be applied when the flip-flop is enabled in order to change the flip-flop state. A clock signal is applied to all of the flip-flops of Register 501 when each of the two signals applied to the AND-gate represented by $\overline{FSRC}$ FSRA is a binary 1, a condition occurring during state-$\tau_1$ of the Sequencer 504.

Any FC$i$S signal enables the setting of the FRWA flip-flop. The logical schematic diagram for the circuit which generates the S-RWA signal for enabling transfer of the FRWA flip-flop to the 1-state is:

$$FCAS + FCBS + FCCS = S\text{-}RWA$$

The FRWA flip-flop is then transferred to the 1-state during state-$\tau_1$ of the Sequencer.

Each stored request in Register 501 is cleared in state-$\tau_6$ of the Sequencer, all the flip-flops of the Register being reset. The logical schematic diagram of the AND-gate employed to clear Register 501 is represented by $$FSRC \ \overline{FSRB} \ FSRA$$

Each of the three signals applied to this AND-gate represent a binary 1 when the Sequencer is in state-$\tau_6$. The output signal of this AND-gate is applied to the special input lead of each flip-flop of Register 501 and, as described previously, transfers these flip-flops to the 0-state without requiring a simultaneous binary 1 clock signal.

The FDPA, FDPB, and FDPC flip-flops are also cleared if the DAB2 signal issues. The DAB2 signal issues if a DAP requests a Self-Interrupt operation while a previous Self-Interrupt request remains queued in the CIS, not yet having been answered and, if at the same time, a lower priority DAP is also requesting a CIS operation. The detailed operation of the CIS when such an event occurs is described hereinafter, the operation being denoted as the Abort-2 variation of the Self-Interrupt operation.

*Priority allocation logic unit*

The detailed structure of Priority Allocation Logic Unit 502 is shown in FIG. 80.

Logic Unit 502 receives the request-identifying output signals of Register 501, grants one of the requests according to predetermined priorities allocated to the requesting Processors and according to other significant factors, and generates an output signal identifying the request granted.

FIGURE 80 shows the logical schematic diagrams of the circuits which receive and respond to the output signals of Register 501 to deliver one of the DSPA, DSRW, DSDA, DSDB, or DSDC granting signals. Additionally, FIG. 80 illustrates logical schematic diagrams of circuits which respond to the DSPA, DSDA, DSDB, and DSDC signals to generate a corresponding DH$i$E signal and to generate the DADS signal. The DH$i$E signal denotes the granting of a Translate Mode operation for the corresponding Processor-$i$. The DADS signal denotes the granting of a Translate Mode operation for any Processor.

Logic Unit 502 allocates highest priority to the PEP and, accordingly, unconditionally grants a PEP request for a Translate Mode operation. A request for a Passive Mode operation is allocated next highest priority and, therefore, is granted unless the PEP is requesting a Translate Mode operation. The logical schematic diagram for the circuit which generates the DSRW Passive Mode granting signal is:

$$FRWA \ \overline{FPPA} = DSRW$$

The above diagram illustrates the granting of the request for a Passive Mode operation (FRWA), provided that the PEP is not requesting a CIS operation ($\overline{FPPA}$).

Requests by DAP-A, DAP-B, and DAP-C for Translate Mode operations are granted in decreasing order, unless a requesting DAP has an unanswered Priority Interrupt notification. An unanswered Priority Interrupt notification for a DAP-$i$ is represented by the corresponding DAD$i$ signal. For example, the logical schematic diagram for the circuit generating the DSDB granting signal for DAP-B is:

$$FDPB[\overline{FDPA}(\overline{FDPC}+\overline{DADC}+DADB$$
$$(\overline{FDPA}+\overline{DADA})]\overline{FPPA}\ \overline{FRWA}=DSDB$$

The above diagram illustrates that the request by DAP-B for a Translate Mode operation (FDPB) is granted if: (1) the PEP is not requesting a CIS operation ($\overline{FPPA}$) and a Passive Mode operation has not been requested ($\overline{FRWA}$), and (2$a$) DAP-A is not requesting a Translate Mode operation ($\overline{FDPA}$), and either DAP-C is not requesting a Translate Mode operation ($\overline{FDPC}$) or DAP-C does not have an unanswered Priority Interrupt notification ($\overline{DADC}$), or (2$b$) DAP-B has an unanswered Priority Interrupt notification (DADB), and either DAP-A is not requesting a Translate Mode operation ($\overline{FDPA}$) or DAP-A does not have an unanswered Priority Interrupt notification ($\overline{DADA}$).

Accordingly, the requests of the DAP's are normally granted according to their relative positional priorities. However, since a DAP requesting a Translate Mode operation and having an unanswered Priority Interrupt notification may be taking the first step in responding to the Interrupt notification, its priority is modified to be highest among the DAP's unless a DAP of normally higher order also has an unanswered Interrupt notification.

The DH$i$E signal, denoting the granting of a Translate Mode operation for Processor-$i$, is generated when Processor-$i$ has a request granted for a Translate Mode operation. The DH$i$E signal is initiated during the state-$\tau_2$ and terminates in state-$\tau_6$. For example, the logical schematic diagram for the circuit which generates the DHAE signal is:

$$DSDA\ FSRB=DHAE$$

The above diagram illustrates the generation of the DHAE signal, commencing in state-$\tau_2$, in response to the DSDA signal. The FSRB signal is delivered by the Sequencer and represents a binary 1 from state-$\tau_2$ through state-$\tau_5$.

The DADS signal becomes a binary 1 whenever a Translate Mode request is granted by logic Unit 502. The DADS signal advances the Sequencer to state-$\tau_2$.

*Sequencer*

The detailed structure of Sequencer 504 is shown in FIGS. 64 and 80. Sequencer 504 comprises the FSRA, FSRB, and FSRC flip-flops. The aggregate state of these three flip-flops determines the state of the Sequencer. During the Translate Mode the Sequencer advances cyclically through all of its eight different possible states. During the Passive Mode the Sequencer advances cyclically through only four of these states. The Sequencer controls the order of occurrence of the individual operations within the CIS.

Nine different signals are employed to advance the Sequencer through its Translate Mode and Passive Mode cycles. In the description to follow the state of the Sequencer will be denoted by identifying the states of the FSRC, FSRB, and FSRA flip-flops in order. For example, if the FSRC flip-flop is in the 1-state, the FSRB flip-flop is in the 0-state, and the FSRA flip-flop is in the 1-state, the state of the Sequencer will be denoted as the 101 state.

State-$\tau_0$, the 000 state of the Sequencer, is the quiescent state. The Sequencer occupies this state in the interval between completion of a Translate Mode or Passive Mode operation and receipt of a request signal from the CAT.

The Sequencer is advanced to state-$\tau_1$, the 001 state, when either a DH$i$C Translate Mode request signal or an FC$i$S Passive Mode request signal is received by the CIS. Any one of these request signals controls issuance of the DBPR signal, FIG. 80. The DBPR signal thereupon controls generation of a clock signal to transfer the FSRA flip-flop to the 1-state. When the Sequencer is in state-$\tau_0$ and the DBPR signal issues, each of the three signals applied to the AND-gate represented by $$DBPR\ \overline{FSRC}\ \overline{FSRB}$$

is a binary 1 and the C-SRA clock signal is generated to change the state of the FSRA flip-flop and thereby advance the Sequencer to state-$\tau_1$.

The Sequencer is advanced to state-$\tau_2$, the 011 state, whenever a Translate Mode request is recognized. When Logic Unit 502 recognizes a Translate Mode request, the DADS signal issues, denoting the granting of a request for a Translate Mode operation, FIG. 80. The DADS signal thereupon controls generation of a clock signal to transfer the FSRB flip-flop to the 1-state. When the Sequencer is in state-$\tau_1$, and the DADS signal issues, each of the three signals applied to the AND-gate represented by $$DADS\ \overline{FSRC}\ FSRA$$

is a binary 1 and the C-SRB clock signal is generated to change the state of the FSRB flip-flop and thereby advance the Sequence to state-$\tau_2$.

The Sequencer is advanced to state-$\tau_3$, the 010 state, upon receipt of the Symbolic Word Address and its identifying DHSM signal from the CAX. The DHSM signal thereupon controls generation of a clock signal to transfer the FSRA flip-flop to the 0-state. When the Sequencer is in state-$\tau_2$, and the DHSM signal issues, each of the three signals applied to the AND-gate represented by $$DHSM\ \overline{FSRC}\ FSRB$$

is a binary 1 and the C-SRA clock signal is generated to change the state of the FSRA flip-flop and thereby advance the sequencer to state-$\tau_3$.

The Sequencer is advanced to state-$\tau_4$, the 110 state, when the Symbolic Word Address is decoded. When Decoder 507 decodes the Symbolic Word Address and delivers the consequent control signal, the DCDC signal issues, FIG. 81. The DCDC signal thereupon controls generation of a clock signal to transfer the FSRC flip-flop to the 1-state. When the Sequencer is in state-$\tau_3$, and the DCDC signal issues, each of the five signals applied to the AND-gate represented by $$DCDC\ FSRB\ \overline{FSRA}\ \overline{DAB1}\ \overline{DAB2}$$

is normally a binary 1 and the C-SRC clock signal is generated to change the state of the FSRC flip-flop and thereby advance the Sequencer to state-$\tau_4$. In certain circumstances, to be described in detail hereinafter, either the DAB1 or the DAB2 signal may be a binary 1 during state-$\tau_3$, preventing the Sequencer from advancing to state-$\tau_4$.

The Sequencer is automatically advanced to state-$\tau_5$, the 111 state, from state-$\tau_4$. When the Sequencer advances into state-$\tau_4$, generation of a clock signal to transfer the FSRA flip-flop to the 1-state is immediate and unconditional. Thus, as the Sequencer enters state-$\tau_4$, each of the two signals applied to the AND-gate represented by $$FSRC\ FSRB$$

is a binary 1 and the C-SRA clock signal is generated to change the state of the FSRA flip-flop and thereby advance the Sequencer to state-$\tau_5$.

The Sequencer is advanced to state-$\tau_6$, the 101 state, when either the CIS is notified that the Actual Word Address supplied thereby during a Translate Mode operation has been received by the Operating System Memory or the required functions of a Passive Mode operation are complete. When the Operating System Memory cycle is initiated, following receipt by the Operating System Memory of an Actual Address, the A*i*AR signal is transmitted to notify the initiating Processor-*i*. During a Translate Mode Operation the A*i*AR signal controls the CAX to deliver the DHAR signal for notifying the CIS that the Operating System Memory has received the Actual Word Address. The DHAR signal thereupon controls generation of a clock signal to transfer the FSRB flip-flop to the 0-state. When the Sequencer is in state-$\tau_5$, and the DHAR signal issues, each of the three signals applied to the AND-gate represented by

DHAR FSRC FSRB is a binary 1 and the C-SRB clock signal is generated to change the state of the FSRB flip-flop and thereby advance the Sequencer to state-$\tau_6$.

When the required functions of a Passive Mode operation have been completed, the DRWC signal issues. The DRWC signal thereupon controls generation of a clock signal to transfer the FSRC flip-flop to the 1-state. When the Sequencer is in state-$\tau_1$, and the DRWC signal issues, each of the three signals applied to the AND-gate represented by DRWC $\overline{FSRB}$ FSRA is a binary 1 and the C-SRC clock signal is generated to change the state of the FSRC flip-flop and thereby advance the Sequencer to state-$\tau_6$.

The Sequencer is advanced to state-$\tau_7$, the 100 state, when Request Register 501 is cleared. If a Translate Mode operation is being executed the DADS signal reverts to the 0-state when Register 501 is cleared, FIG. 80. If a Passive Mode operation is being executed the DSRW signal reverts to the 0-state when Register 501 is cleared. Transfer of either the DADS signal or the DSRW signal to the 0-state controls generation of a clock signal to transfer the FSRA flip-flop to the 0-state. When the Sequencer is in state-$\tau_6$, and either the DADS signal, or the DSRW signal become a binary 0, each of the four signals applied to the AND-gate represented by $\overline{DADS}$ $\overline{DSRW}$ FSRC $\overline{FSRB}$ is a binary 1 and the C-SRA clock signal is generated to change the state of the FSRA flip-flop and thereby advance the Sequencer to state-$\tau_7$.

The Sequencer is restored to state-$\tau_0$, following completion of a Translate Mode or Passive Mode operation. When Register 501 is cleared during a Translate Mode operation the DH*i*E signal identifying the Processor-*i* having its request granted reverts to a binary 0, FIG 80. The DHSM signal, denoting the presence of a Symbolic Word Address, has been activated for issuance by the DH*i*E signal and, therefore, the DHSM signal now also reverts to a binary 0. If a Passive Mode operation is being executed, the TRCA one-shot, FIG. 66, may be temporarily in the unstable 1-state, to permit the CIS to select a DAP for a Request-Interrupt as a result of modification of the data in the PL Table. If, however, the TRCA one-shot remains in the 0-state, or when the TRCA one-shot returns to the 0-state, a clock signal is generated to transfer the FSRC flip-flop to the 0-state. When the Sequencer is in state-$\tau_7$, and both the DSHM and TRCA signals are binary 0's, each of the four signals applied to the AND-gate represented by $\overline{DHSM}$ $\overline{TRCA}$ $\overline{FSRB}$ $\overline{FSRA}$ is a binary 1 and the C-SRC clock signal is generated to change the state of the FSRC flip flop and thereby restore the Sequencer to state-$\tau_0$.

The Sequencer is also restored to state-$\tau_0$ from state-$\tau_3$ if the DAB1 signal is generated. The DAB1 signal is generated by the Sequencer, FIG. 80. If a DAP requests a Self-Interrupt operation while a previous Self-Interrupt request remains queued in the CIS, not yet having been answered, the DAB1 signal issues during $\tau_3$, provided that no other DAP is at the same time requesting a CIS operation. The DAB1 signal thereupon controls generation of a clock signal to transfer the FSRB flip-flop to the 0-state. When the Sequencer is in state-$\tau_3$, and a DAB1 signal issues, the C-SRB clock signal is generated to change the state of the FSRB flip-flop and thereby restore the Sequencer to state-$\tau_0$. The Sequencer also generates the DBPR, DRWC, and DAB2 signals, described elsewhere herein.

*Symbolic word address decorder*

The detailed structure of Symbolic Word Address Decoder 507 is shown in FIG. 81.

Decoder 507 receives and decodes the Symbolic Word Address supplied by the initiating Processor to deliver one of eight different control signals. These control signals direct the type of Translate Mode operation the CIS is to execute and are designated as the DCAN, DCXR, DCST, DCAM, DCAA, DCTV, DCTM and DCTA control signals. Each control signal is delivered as a direct result of the decoding of the Symbolic Word Address, and, therefore, depends on the binary digital structure of the Symbolic Word Address. Decoder 507 delivers a control signal from Sequencer state-$\tau_3$ through state-$\tau_5$.

The Symbolic Word Address is not decoded and, consequently, the CIS does not effect an Address Translation unless the DCT0 signal represents a binary 0. If the DCT0 signal represent a binary 1 the Symbolic Word Address is not decoded, but instead is retransmitted from the CIS as the Actual Word Address. The logical schematic diagram for the circuit generating the DCT0 signal is:

$FTAA\ DSDA + FTAB\ DSDB + FTAC\ DSDC +$
$\quad DHS5\ DHS4\ DHSM + DHS9 + DHS8 + DHS7$
$\quad\quad + DHS6 + DHSM = DCT0$ The above diagram illustrates that the DCT0 signal represents a binary 1 if (1) any one of the four most significant bits of the Symbolic Word Address (DHS6–9) represents a binary 1, or if both the fourth and fifth order bits (DHS4, DHS5) represent a binary 1, or (2) a flip-flop (FTA*i*) of the Transfer Control register corresponding to the DAP-*i* granted the Translate Mode operation (DSD*i*) has been set in a preceding Set Transfer Address operation, whereupon the current operation is a Transfer Address operation.

The $\overline{DHSM}$ signal also controls the DCT0 signal to be a binary 1 to prevent Decoder 507 from falsely generating one of the eight control signals until the Symbolic Word Address is received in state-$\tau_3$, at which time the $\overline{DHSM}$ signal becomes a binary 0.

An example of the generation of a control signal by the decoding action of Decoder 507 will be provided. Assume that none of the seven most significant bits (DHS3–8) of the Symbolic Word Address represents a binary 1 and that each of the least significant bits (DHS0–2) represents a binary 1. In this event, the DCAM control signal is delivered by Decoder 507. The logical schematic diagram for the circuit which generates the DCAM control signal is:

$\overline{DHS5}\ \overline{DHS4}\ \overline{DHS3}\ DHS2\ DHS1\ DHS0$
$\overline{DCT0}\ FSRB = DCAM$ The above diagram illustrates the generation of the DCAM signal commencing in state-$\tau_3$ in response to the Symbolic Word Address. The $\overline{DCT0}$ signal is a binary 1 because the most significant seven bits (DHS3–9) of the Symbolic Word Address all represent a binary 1. Although the FSRB signal becomes a binary 1 in state-$\tau_2$, the DCT0 signal does not become a binary 1 until state-$\tau_3$. Therefore, the FSRB signal is not effective to control generation of the DCAM control signal until state-$\tau_3$.

The following Table 6 illustrates the bit structure of the various types of Symbolic Word Addresses which are received and decoded by Decoder 507. The ten bits of the Symbolic Word Address are shown in descending order of significance from left to right, the leftmost bit representing the DHS9 signal and the rightmost bit representing the DHS0 signal. The symbol "PL" in the Addresses of operations #1 and #2 identifies the priority level of the program requested by the initiating Processor, the four least significant bits identifying the priority level. A request for interruption can only be made to priority levels 4–15. The symbol "X" in the Address of operation #3 designates the number of the index registers to be communicated with, the three least significant bits identifying the index register. Six index registers, identified by the numbers 1–6, are employed for each Operating System priority level. The symbol "PR" in the Address of operation #6 symbolically identifies the Processor to be alerted, the two least significant bits identifying the four different Processors. The symbol "DEFNR" in the Addresses of operation #9 symbolically identifies one of the 32 different Definer cell pairs of the corresponding Definer List, five bits identifying the Definer cell pair.

retransmission of the Symbolic Word Address as the Actual Word Address.

FIGURE 82 shows the logical schematic diagrams of the circuits which receive the Symbolic Word Address and which respond to the control signals of Decoder 507 to deliver an Actual Word Address or to deliver alert signals. Other logical schematic diagrams shown in FIG. 82 illustrate circuits which respond to the control signals to generate the DPL4, DUL8, and DGDC signals, which are employed in the generation of the Actual Word Address by Encoder 508.

For example, the logical schematic diagram for the circuit generating the DHA9 signal, which represents the most significant bit in the Actual Word Address, is:

$$[DCST\ (DSDB+DSDC)]\ FSRC\ FSRB\ FSRA + DCTA\ DHS9 = DHA9$$

The above diagram illustrates that the DHA9 signal represents a binary 1 during state-$\tau_5$ if either DAP-B or DAP-C (DSDB, DSDC) has initiated an R/W Status Table operation (DSCT). The above diagram also illustrates that the DHA9 signal represents a binary 1 if the most significant bit (DHS9) of the Symbolic Word Address represents a binary 1 during a Translate Mode operation wherein the CIS does not effect an address translation, this type of operation being directed by the DCTA control signal.

The logical schematic diagrams for the circuits that generate the Actual Word Address signals provide that the Actual Word Address is delivered only during state-$\tau_5$ if the Symbolic Word Address is being translated, where-

TABLE 6

| OP # | Operation | Symbolic word address | Actual word address (significance) | Actual word address, operating system memory cells (octal) |
| --- | --- | --- | --- | --- |
| 1 | Self-Interrupt | 000010(PL)PL=4–15 | DUMMY | 0456 |
| 2a | | | DUMMY for PL 5, 7 | 0456. |
| 2b | Request-Interrupt | 000001(PL) PL=4–15 | 00(PL)(DEFNR)0 {PL8=01, PL9:10, PL10:11} | 0100–0376 |
| 2c | | | | |
| 2d | | | | |
| 3 | R/W X-Register | 0000000(X) X=1–6 | 010(PL–4)(X–1) | 400–405→530–535 |
| 4a | | | 0111(PL–4)00:DAP-A | 0700–0754 |
| 4b | R/W Status Table | 0000000000 | 1000(PL–4)00:DAP-B | 1000–1054 |
| 4c | | | 100(PL+8)00:DAP-C | 1060–1134 |
| 5 | Read Processor Mailbox | 0000000111 | 000011(PR)00 | 0060–0074 |
| 6 | Alert Processor | 00000010(PR) | DUMMY | 0456 |
| 7 | Read Transfer Vector | 0000001100 | 0000(PL–4)(DP) {DAP-A:10, DAP-B:11, DAP-C:00} | 0000–0057 |
| 8 | Set Transfer Address | 0000001101 | DUMMY | 0456 |
| 9a | Read Definer List (PL 8) | 0001(DEFNR)0 | AWA=SWA | 0100–0176 |
| 9b | Read Definer List (PL 9) | 0010(DEFNR)0 | AWA=SWA | 0200–0276 |
| 9c | Read Definer List (PL 10) | 0011(DEFNR)0 | AWA=SWA | 0300–0376 |
| 10 | R/W PL Mailbox | 010(PL–4)110 PL=4–7, 11–15 | AWA=SWA | 0406, 0416 … 0436 / 0476, 0506 … 0536 |

The Symbolic Word Address Decoder also supplies the DCDC signal for advancing the Sequencer to state-$\tau_4$ after the Symbolic Word Address has been received and decoded. Accordingly, the DCDC signal is controlled to issue by any one of the eight control signals delivered by the Symbolic Word Address Decoder.

*Actual word address encoder*

The detailed structure of Actual Word Address Encoder 508 is shown in FIG. 82.

Encoder 508 receives the Symbolic Word Address and the control signals delivered by Decoder 507 and responds to certain of the control signals to translate the Symbolic Word Address into an Actual Word Address for the Operating System Memory or to provide alert signals during an Alert Processor operation. Encoder 508 also responds to others of the control signals to provide as the Actual Word Address is delivered from state-$\tau_3$ to state-$\tau_5$, FIG. 81, if the Symbolic Word Address is not being translated.

The preceding Table 6 illustrates the significance and bit structures of the Actual Word Addresses for the various types of Symbolic Word Addresses which are received by the CIS. Additionally, the following Table 7 identifies the Operating System Memory cells represented by the Actual Word Addresses. The operating System Memory cells are designated according to their addresses in the octal number system notation.

The symbols employed in FIG. 6 to represent the significance of the Actual Word Addresses are the same as those employed for the Symbolic Word Addresses. The additional symbol "DP" in the Actual Address of operation #7 symbolically identifies the initiating DAP, the two least significant bits identifying the three different DAP's.

TABLE 7

| Cell | Data* | Cell | Data* | Cell | Data* | Cell | Data* |
|---|---|---|---|---|---|---|---|
| 0000 | 7:PL4, DAP-C | 0100 | 2b, 9a:PL8 | 0440 | 3:PL8, X1 | 0700 | 4:PL4, DAP-A |
| 0001 | ---------- | ↓ | ↓ | . | | 0701 | |
| 0002 | 7:PL4, DAP-A | 0177 | | . | | 0702 | |
| 0003 | 7:PL4, DAP-B | | | . | | 0703 | |
| 0004 | 7:PL5, DAP-C | 0200 | 2c, 9b:PL9 | | | 0704 | 4:PL5, DAP-A |
| 0005 | ---------- | ↓ | ↓ | 0445 | 3:PL8, X6 | 0705 | |
| 0006 | 7:PL5, DAP-A | 0277 | | 0446 | ---------- | 0706 | |
| 0007 | 7:PL5, DAP-B | | | 0447 | ---------- | 0707 | |
| 0010 | 7:PL6, DAP-C | 0300 | 2d, 9c:PL10 | 0450 | 3:PL9, X1 | 0710 | 4:PL6, DAP-A |
| 0011 | ---------- | ↓ | ↓ | . | | . | |
| 0012 | 7:PL6, DAP-A | 0377 | | . | | . | |
| . | | 0400 | 3:PL4, X1 | . | | . | |
| . | | 0401 | 3:PL4, X2 | | | | |
| . | | 0402 | 3:PL4, X3 | 0455 | 3:PL9, X6 | 0754 | 4:PL15, DAP-A |
| 0054 | 7:PL15, DAP-C | 0403 | 3:PL4, X4 | 0456 | Dummy | 0755 | |
| 0055 | ---------- | 0404 | 3:PL4, X5 | 0457 | ---------- | 0756 | |
| 0056 | 7:PL15, DAP-A | 0405 | 3:PL4, X6 | 0460 | 3:PL10, X1 | 0757 | |
| 0057 | 7:PL15, DAP-B | 0406 | 10:PL4 | . | | 0760 | ---------- |
| 0060 | 5:DAP-C | 0407 | ↓ | . | | . | |
| ↓ | | 0410 | 3:PL5, X1 | . | | . | |
| 0063 | | 0411 | 3:PL5, X2 | 0465 | 3:PL10, X6 | . | |
| 0064 | 5:PEP | 0412 | 3:PL5, X3 | 0466 | ---------- | 0777 | ---------- |
| ↓ | | 0413 | 3:PL5, X4 | 0467 | ---------- | | |
| 0067 | | 0414 | 3:PL5, X5 | 0470 | 3:PL11, X1 | 1000 | 4:PL4, DAP-B |
| 0070 | 5:DAP-A | 0415 | 3:PL5, X6 | . | | 1001 | |
| ↓ | | 0416 | 10:PL5 | . | | 1002 | |
| 0073 | | 0417 | ↓ | . | | 1003 | |
| 0074 | 5:DAP-B | 0420 | 3:PL6, X1 | | | 1004 | 4:PL5, DAP-B |
| ↓ | | . | | 0475 | 3:PL11, X6 | . | |
| 0077 | | . | | 0476 | 10:PL11 | . | |
| | | . | | 0477 | ↓ | . | |
| | | | | 0500 | 3:PL12, X1 | | |
| | | | | . | | 1054 | 4:PL15, DAP-B |
| | | 0435 | 3:PL7, X6 | . | | 1055 | |
| | | 0436 | 10:PL7 | . | | 1056 | |
| | | 0437 | ↓ | | | 1057 | |
| | | | | 0533 | 3:PL15, X6 | | |
| | | | | 0536 | 10:PL15 | 1060 | 4:PL4, DAP-C |
| | | | | 0537 | ↓ | 1061 | |
| | | | | | | 1062 | |
| | | | | 0540 | ---------- | 1063 | |
| | | | | . | | 1064 | 4:PL5, DAP-C |
| | | | | . | | . | |
| | | | | . | | . | |
| | | | | 0677 | ---------- | . | |
| | | | | | | 1134 | 4:PL15, DAP-C |
| | | | | | | 1135 | |
| | | | | | | 1136 | |
| | | | | | | 1137 | |

*The numerals preceding the colon under "Data" refer to the OP # in Table 6.

The symbol "DEFNER" in the Actual Address of operation #2 symbolically identifies one of the 32 different Definer cell pairs of a Definer List, the five bits identifying the Definer cell pair being provided by the corresponding one of Definer Counters 570, 571, or 572. The symbol "PL" in the Actual Address of operation #2 symbolically identifies the one of the priority levels 8, 9, or 10 specified by the Request-Interrupt operation. The symbol "PL" in the Actual Addresses of operations #3, #4, and #7 represent the priority level, stored in the PL Table, of the initiating Processor. The "Dummy" Actual Word Address identifies the Operating System Memory cell which is addressed during certain operations involving the CIS, but whose contents are not significant. This cell may be used to receive or to supply a Data Word having no significance. The bit structure of the Actual Word Address for addressing the dummy cell in the Operating System Memory is:

0100101110

The Operating System Memory cells having octal addresses from 0000 through 0057 and which contain the transfer vectors, are only directly addressable by a Transfer Address operation. The remaining Operating System Memory cells, commencing with the cell having the octal address 0060 may be either directly or symbolically addressed during a Translate Mode operation; for example, cells 0100-0176.

The DPL4 signal is generated within Encoder 508 during an R/W Status Table operation initiated by DAP-A or DAP-B or during a Read Transfer Vector operation to provide for the Actual Word Addresses four bits representing a number four less than the priority level of the initiating DAP. Similarly, the DPL8 signal is generated within Encoder 508 during an R/W Status Table operation initiated by DAP-C to provide for the Actual Word Address five bits representing a number eight greater than the priority level of the initiating DAP. The DGDC signal is generated within Encoder 508 to provide the Actual Word Address of the dummy cell during all Self-Interrupt operations, during Request-Interrupt operations other than for priority levels 8, 9, and 10, during Alert Processor operations, and during Set Transfer Address operations.

The DFiC signal for alerting Processor-i that information has been stored in its Processor Mailbox is generated during an Alert Processor operation. For example, the logical schematic diagram for the circuit generating the DFPC signal, for alerting the PEP, is:

$$\overline{DHS1} \; DHS0 \; DCAA = DFPC$$

The above diagram illustrates that the DFPC signal represents a binary 1 during an Alert Processor operation (DCAA) if the PEP is symbolically identified by the two least significant bits of the Symbolic Word Address ($\overline{DHS1}$ DHS0).

Transfer control register

The detailed structure of Transfer Control Register 505 is shown in FIG. 65. Register 505 comprises the three FTAi flip-flops. When an FTAi flip-flop is in the 1-state, the Symbolic Word Address provided in the next-following CIS Translate Mode operation initiated by the corresponding DAP-i will not be translated but, instead, the Symbolic Word Address will be transmitted directly to the Operating System Memory as an Actual Word Address.

An FTAi flip-flop is set during a Set Transfer Address

127 operation. The particular FTA$i$ flip-flop which is set corresponds to the DAP-$i$ which is granted the Translate Mode operation by Logic Unit 502. For example, if DAP-B is recognized for a Translate Mode operation, the corresponding DSDB granting signal delivered by Logic Unit 502 will become a binary 1. If the Symbolic Word Address supplied by DAP-B is intended to initiate a Set Transfer Address operation, Decoder 507 delivers the DCTM signal to Register 505, thereupon controlling issuance of the S-TAB signal for enabling transfer of the FTAB flip-flop to the 1-state. When the Sequencer advances to state-$\tau_6$, Request Register 501 is cleared and the DSDB granting signal reverts to a binary 0. The $\overline{\text{DSDB}}$ signal, which is applied to the FTAB flip-flop as a clock signal, thereupon activates the transfer of this enabled flip-flop to the 1-state.

A FTA$i$ flip-flop remains in the 1-state until the request of the corresponding DAP-$i$ for a subsequent Translate Mode operation is granted. The FTA$i$ output signal delivered by the FTA$i$ flip-flop is coupled to the 0-input lead thereof and when the flip-flop is in the 1-state, resetting of the flip-flop is continuously enabled. When the Sequencer advances to state-$\tau_6$ in the subsequent Translate Mode operation for DAP-$i$, the corresponding DSD$i$, signal delivered by Logic Unit 502 reverts to the 0-state and activates clearing of the respective FTA$i$ flip-flop.

Self-interrupt control register

The detailed structure of Self-Interrupt Control Register 514 is shown in FIG. 66. Register 514 comprises the three FSC$i$ flip-flops. Each of these flip-flops, when in the 1-state, identifies the corresponding DAP-$i$ next to be interrupted as a result of a Self-Interrupt operation.

An FSC$i$ flip-flop is set during a Self-Interrupt operation initiated by the corresponding DAP-$i$. The particular FSC$i$ flip-flop which is set corresponds to the DAP-$i$ which is granted the Translate Mode operation. Register 514 receives from Logic Unit 502 each DSD$i$ signal, which denotes the granting of a Translate Mode operation to the respective DAP-$i$. The DSD$i$ signals enable the setting of the respective FSC$i$ flip-flops. Register 514 also receives the DCAN control signal from Decoder 507 and the DHS5 signal provided by the Symbolic Word Address. A clock signal is supplied to all the flip-flops of Register 514 when each of the four signals applied to the AND-gate represented by $$\text{DCAN DHS5 FSRC FSRB}$$

is a binary 1. Accordingly, a binary 1 clock signal is received by the flip-flops of Register 514 when the Sequencer is in state-$\tau_4$ (FSRC FSRB), if the recognized DAP is requesting a Priority Interrupt operation (DCAN), and if this operation is to be a Self-Interrupt operation (DHS5). This clock signal thereupon activates the enabled FSC$i$ flip-flop to transfer to the 1-state.

Only one Self-Interrupt notification can be stored in Self-Interrupt Control Register 514. If a DAP requests a Self-Interrupt while a preceding Self-Interrupt request remains queued in Register 514, not yet having been answered, the request will not be effective to initiate another Self-Interrupt operation and, therefore, will not be effective to set one of the FSC$i$ flip-flops. The detailed operation operation of the CIS when such an event occurs is described hereinafter, this operation being denoted as either the Abort-1 or the Abort-2 variation of the Self-Interrupt operation.

A stored identification of a DAP-$i$ in Register 514 is cleared during a subsequent Passive Mode read operation initiated by this DAP-$i$. The FSC$i$ output signal delivered by the FSC$i$ flip-flop is coupled to the 0-input lead thereof and when the flip-flop is in the 1-state, resetting of the flip-flop is continuously enabled. When the subsequent Passive Mode read operation is executed by DAP-$i$, the corresponding DSS$i$ signal is generated to gate the new priority level of the interrupted DAP-$i$ from Register 550 into the corresponding register of the PL Table, the DSS$i$ signal also functioning as a clock signal to activate clearing of the corresponding enabled FSC$i$ flip-flop.

Request-interrupt selector

The detailed structure of Request-Interrupt Selector 512 is shown in FIGS. 66 and 67.

Selector 512 receives signals denoting the particular DAP that is operating at the lowest priority level and a signal denoting whether the highest queued priority level stored in Register 551 is greater than the lowest priority level of the programs which the DAP's are currently executing. When a Request-Interrupt or Passive Mode operation is executed by the CIS, Selector 512 responds to the received signals to deliver signals identifying the DAP next to be interrupted for a Request-Interrupt.

The logical schematic diagrams of the circuits which supply output signals to control the flip-flops of Register 513, shown in FIG. 67, describe a portion of Selector 512. These circuits generate the S-RD$i$ signals to enable the setting of the FRD$i$ flip-flops of Register 513 and the C-RD$i$ clock signals for activating the change of state of these flip-flops. For example, the logical schematic diagram for the circuit generating the S-RDB signal is $$DQRH\ DC32\ \overline{DC21}\ \overline{FRDA}\ \overline{FRDB}\ \overline{FRDC} = S\text{-}RDB$$

The above diagram illustrates the generation of the S-RDB signal when the highest priority level queued in Register 551 is greater than the lowest priority level stored in the PL Table (DQRH) and when DAP-C is executing a program of higher priority than DAP-B (DC32) and DAP-B is executing a program of lower priority than DAP-A ($\overline{DC21}$), provided that Register 513 is clear ($\overline{FRDA}$ $\overline{FRDB}$ $\overline{FRDC}$).

Selector 512 generates a clock signal for all the flip-flops of Register 513 when each of the four signals applied to the AND-gate represented by $$\overline{TRCA}\ \overline{FRDA}\ \overline{FRDB}\ \overline{FRDC}$$

is a binary 1. Thus, the C-RD$i$ clock signal is generated if Register 513 is clear and if the TRCA one-shot is in the 0-state. Thic lock signal is employed to activate the setting of an enabled FRD$i$ flip-flop.

Accordingly, when a flip-flop of Interrupt Control Register 513 is in the 1-state, Selector 512 is inhibited from delivering an S-RD$i$ or C-RD$i$ signal.

The TRCA one-shot, FIG. 66, is provided to permit the DC31, DC21, DC32, and DQRH signals applied to Selector 512 to settle into their steady levels, following a change in the contents of Register 551 or the PL Table, before Selector 512 is enabled to respond to these signals to deliver a new Request-Interrupt designation. As was shown above, the TRCA one-shot must be in its 0-state before a clock signal is provided to activate transferring an enabled FRD$i$ flip-flop to the 1-state. If Register 513 is clear, so that its state may be changed, the TRCA one-shot is triggered to its unstable 1-state prior to the conclusion of a Request-Interrupt or Passive Mode operation. The logical schematic diagram for the circuit generating the T-RCA signal for triggering the TRCA one-shot is:

$$(DCAN\ DHS4 + DRWC)\overline{FRDA}\ \overline{FRDB}\ \overline{FRDC} = T\text{-}RCA$$

The above diagram illustrates the generation of the T-RCA signal during a Request-Interrupt operation (DCAN DHS4) or immediately prior to the completion of a Passive Mode operation (DRWC), provided that Register 513 is clear ($\overline{FRDA}\ \overline{FRDB}\ \overline{FRDC}$). Accordingly, whenever a change is made in the contents of the Queued PL Register 551, as during a Request-Interrupt operation, or a change is made in the contents of the PL Table, as during a Passive Mode operation, the TRCA one-shot is triggered to its unstable state. In the unstable state, the TRCA one-shot prevents setting one of the flip-flops of Register 513 until sufficient time has elapsed for the transient signals resulting from these changes to disappear and for the signals applied to Selector 512 to correctly represent the new states of Register 551 and the PL Table.

Selector 512 also delivers a clock signal to all flip-flops of Register 513 when any one of the signals applied to the OR-gate respresented by $$DSRA + DSRB + DSRC$$

is a binary 1. Accordingly, the C-RD$i$ clock signal is generated during a Passive Mode read operation initiated in response to a Request-Interrupt, wherein a DSR$i$ signal is generated to gate the highest queued priority level into the PL Table. This clock signal is employed to activate clearing of the FRD$i$ flip-flops.

Request-interrupt control register

The detailed structure of Request-Interrupt Control Register 513 is shown in FIG. 67. Register 513 comprises the three FRD$i$ flip-flops. Each of these flip-flops, when in the 1-state, identifies the corresponding DAP-$i$ next to be interrupted as a result of a Request-Interrupt operation.

An FRD$i$ flip-flop may be transferred to the 1-state, provided Register 513 is clear, during any CIS operation wherein the contents of Register 551 or the PL Table are altered. As each C-RD$i$ clock signal is delivered by Selector 512, following a Request-Interrupt or a Passive Mode operation, the corresponding FRD$i$ flip-flop is set if Selector 512 is also delivering the respective S-RD$i$ enabling signal. The S-RD$i$ enabling signal is delivered when Register 513 is clear, if the corresponding DAP-$i$ is executing the lowest priority level program among the DAP's and if this lowest priority level is less than the highest priority level queued in Register 551.

An FRD$i$ flip-flop is reset during a Passive Mode read operation initiated by the corresponding DAP-$i$ during which DAP-$i$ accepts execution of a program at the highest priority level then queued in Register 551. The FRD$i$ output signal delivered by the FRD$i$ flip-flop is coupled to the 0-input lead thereof, and when the flip-flop is in the 1-state resetting of the flip-flop is continuously enabled. When the Passive Mode read operation is initiated by DAP-$i$, the corresponding DSR$i$ signal is generated to gate the new priority level for DAP-$i$ from Encoder 552 into the corresponding Register of the PL Table. The DSR$i$ signal also controls delivery of the corresponding C-RD$i$ clock signal by Selector 512 to thereupon clear Register 513.

An FRD$i$ flip-flop is also reset if the corresponding DAP-$i$ is identified for a Self-Interrupt operation (FSC$i$) by Register 514 or if DAP-$i$ becomes not fully operational (DAN$i$). The logical schematic diagram of the OR-gate employed to clear and FRD$i$ flip-flop in these two instances is represented by $$FSCi + DANi$$

The output signal of this OR-gate is applied to the special input lead of the corresponding FRD$i$ flip-flop of Register 513 for transferring this flip-flop to the 0-state without requiring a simultaneous binary 1 clock signal. Furthermore, if any one of the two signals applied to this OR-gate represents a binary 1 when Selector 512 delivers corresponding S-RD$i$ and C-RD$i$ signals, the FRD$i$ flip-flop cannot be transferred to the 1-state. Accordingly, whenever a DAP-$i$ becomes queued for a Self-Interrupt operation or becomes not fully operational, the corresponding FRD$i$ flip-flop is cleared or prevented from setting.

Priority interrupt gates

The detailed structure of Priority Interrupt, Gates 518, 519, and 520 is shown in FIG. 81.

Gates 518 comprise three two-input OR-gates, each such OR-gate receiving notifications that a respective DAP-$i$ has been selected for a Self-Interrupt (FSC$i$) or a Request-Interrupt (FRD$i$) and for delivering the corresponding DAD$i$ signal to provide notification that DAP-$i$ has been selected for a Priority Interrupt.

For example, OR-gate 519 is coupled to receive the output signal of the FSCB flip-flop of Register 514 on one of the input leads thereof and the output signal of the FRDB flip-flop of Register 513 on the other input lead. The DADB output signal of OR-gate 519 is delivered to DAP-B to provide notification that this DAP has been selected for a Self-Interrupt operation, as designated by Register 514, or for a Request-Interrupt operation, as designated by Register 513.

Passive mode request register

The detailed structure of Passive Mode Request Register 515 is shown in FIG. 68. Register 515 comprises the three FGR$i$ flip-flops. Each of these flip-flops, when in the 1-state, represents a request by the corresponding DAP-$i$ for a Passive Mode operation.

An FGR$i$ flip-flop is set during the quiescent state of the Sequencer, following a Translation operation performed by the CAT when the respective DAP-$i$ requests a Passive Mode operation. Register 515 receives from the CAT the FC$i$S signals, which denote the requests of each DAP for a Passive Mode operation. The FC$i$S signals enable the setting of the respective FGR$i$ flip-flops. A clock signal is applied to all of the flip-flops of Register 515 during the quiescent state of the Sequencer ($\overline{FSRC}\ \overline{FSRB}\ \overline{FSRA}$) to activate any one of the FGR$i$ flip-flops which are enabled by the corresponding FC$i$S signals.

Register 515 may store simultaneously representations of requests for Passive Mode operations by any two or by all three of the DAP's.

All stored representations in Register 515 are cleared in state-$\tau_6$ of the Sequencer, when all the FGR$i$ flip-flops in the 1-state are reset. The logical schematic diagram of the AND-gate employed to clear Register 515 is represented by $$FSRC\ \overline{FSRB}\ FSRA$$

Each of the three signals applied to this AND-gate represents a binary 1 when the Sequencer is in state-$\tau_6$. The output signal of this AND-gate is applied to the special input lead of all FGR$i$ flip-flops and transfers each of these flip-flops to the 0-state without requiring a simultaneous clock signal.

Passive mode priority allocation logic unit

The detailed structure of Passive Mode Priority Allocation Logic Unit 516 is shown in FIG. 83.

Logic Unit 516 receives the request-identifying output signals of Register 515, recognizes one of the requests according to predetermined priorities allocated to the requesting DAP's and generates an output signal identifying the request recognized.

Logic Unit 516 receives and responds to the FGR$i$ output signals of Register 515 to deliver one of the DDR$i$ recognition signals. Priorities in descending order for DAP-A, DAP-B and DAP-C are allocated by Logic Unit 516 for Passive Mode requests. For example, the logical schematic diagram for the circuit generating the DDRB recognition signal for DAP-B is:

$$FGRB\ \overline{FGRA} = DDRB$$

The above diagram illustrates that the request by DAP-B for a Passive Mode operation (FGRB) is recognized if a Passive Mode operation is not also being requested by DAP-A ($\overline{FGRA}$). Accordingly, the requests of the DAP's for Passive Mode operations are recognized according to their relative positional priorities.

Interrupt response control register

The detailed structure of Interrupt Response Control Register 517 is shown in FIG. 69. Register 517 comprises the three FPC$i$ flip-flops. Each of these flip-flops, when in the 1-state, denotes that the corresponding DAP-$i$ is responding to a Priority Interrupt.

An FPC$i$ flip-flop is set during a Passive Mode read operation initiated by the corresponding DAP-$i$. Register 517 receives from Logic Unit 516 the DDR$i$ signals, which identify the DAP-$i$ recognized for a Passive Mode operation; from gates 518, 519 and 520 the DAD$i$ signals, which identify each DAP selected for a Priority Interrupt operation; and the FCRP signal, which denotes that the CIS is executing a Passive Mode read operation. For example, the logical schematic diagram for the circuit generating the S-PCC signal is:

$$DADC\ DDRC\ \overline{FPCA}\ \overline{FPCB}\ \overline{FPCC} = S\text{-}PCC$$

The above diagram illustrates the generation of the S-PCC signal when the request of DAP-C for a Passive Mode operation is recognized by Logic Unit 516 (DDRC) and when DAP-C is responding to a Priority Interrupt notification (DADC), provided that Register 517 is clear at the time ($\overline{FPCA}\ \overline{FPCB}\ \overline{FPCC}$). A clock signal is applied to all of the flip-flops of Register 517 when the FCRP flip-flop enters the 1-state. This clock signal thereupon activates the enabled FPC$i$ flip-flop to transfer to the 1-state.

Only one flip-flop of Register 517 can be in the 1-state. Thus, an FPC$i$ flip-flop cannot be enabled for transfer to the 1-state if Register 517 is not clear and, in addition, Logic Unit 516 recognizes only the highest priority DAP requesting a Passive Mode operation.

An FPC$i$ flip-flop is cleared during the concluding steps of a Passive Mode read operation that has been initiated by the corresponding DAP-$i$. The FPC$i$ output signal delivered by the FPC$i$ flip-flop is coupled to the 0-input lead thereof, and when the flip-flop is in the 1-state resetting of the flip-flop is continuously enabled. When the particular Passive Mode read operation that initiated the setting of an FPC$i$ flip-flop is substantially concluded, one of the DSLA or DLRA signals reverts to a binary 0, the other one of these signals continuing as a binary 0. These two signals are employed to distinguish the functioning of the CIS during the Passive Mode read operation according to whether the operation is initiated in response to a Request-Interrupt or Self-Interrupt. Thus, when the one of the DLSA or DLRA signals employed in a particular Passive Mode read operation becomes a binary 0, the circuit represented by the logical schematic diagram $$\overline{DLSA}\ \overline{DLRA}(FPCA+FPCB+FPCC)$$

delivers a binary 1 output signal to control generation of the C-PC$i$ clock signal and thereupon activates clearing of Register 517.

Initiate R/W PL table logic unit

The detailed structure of Initiate R/W PL Table Logic Unit 525 is shown in FIG. 83.

Logic Unit 525 receives from Logic Unit 516 the DDR$i$ signals, which identify the DAP-$i$ recognized for a Passive Mode operation; and from the CIC-B/S the DD$i$R and DD$i$T gate enabling signals; and delivers a pair of signals to initiate execution of the Passive Mode read and write operations of the CIS.

Logic Unit 525 generates the DRPM signal for initiating execution of the Passive Mode read operation and the DWPM signal for initiating execution of the Passive Mode write operation. The logical schematic diagram for the circuit generating the DRPM signal is:

$$DDRA\ DDAT+DDRB\ DDBT+DDRC$$
$$DDCT=DRPM$$

The above diagram illustrates the generation of the DRPM signal when a DAP-$i$ has requested and been recognized for a Passive Mode operation by Logic Unit 516 (DDR$i$) and when the CIC-B/S delivers the corresponding DD$i$T gate enabling signal for transferring a Data Word from the Data Bus to DAP-$i$. The DD$i$T signal, as employed by Logic Unit 525, denotes that the requesting DAP-$i$ has commenced executing a Passive Mode read operation to retrieve a priority level value from the PL Table.

The logical schematic diagram for the circuit generating the DWPM signal is:

$$DDRA\ DDAR+DDRB\ DDBR+DDRC$$
$$DDCR=DWPM$$

The above diagram illustrates the generation of the DWPM signal when a DAP has requested and been recognized for a Passive Mode operation and when the CIC-B/S delivers the corresponding DD$i$R gate enabling signal for transferring a Data Word from DAP-$i$ to the Data Bus. The DD$i$R sginal, as employed by Logic Unit 525, denotes that the requesting DAP-$i$ has commenced executing a Passive Mode write operation to supply a priority level for storage in the PL Table.

Passive mode control unit

The detailed structure of Passive Mode Control Unit 526 is shown in FIGS. 67 and 69. Control Unit 526 comprises the FCRP and FCWP flip-flops. The FCRP and FCWP flip-flops control the distinctive functions of the CIS during the respective Passive Mode read and write operations.

The FCPR and FCWP flip-flops are transferred to the 1-state during the respective Passive Mode read and write operations. Control Unit 526 receives the DRPM and DWPM signals from Logic Unit 525 and the DSRW signal from Logic Unit 502. The logical schematic diagram for the circuit generating the enabling S-CRP signal is:

$$DSRW\ \overline{FCRP}=S\text{-}CRP$$

The above diagram illustrates the generation of the S-CRP signal, provided that the FCRP flip-flop is in the 0-state, when Logic Unit 502 grants a request for a Passive Mode operation (DSRW). A clock signal is applied to activate the enabled FCRP flip-flop to transfer to the 1-state when each of the two signals applied to the AND-gate represented by $$DRPM\ \overline{FCRP}$$

is a binary 1, a condition which occurs, provided that the FCRP flip-flop is the 0-state, when the DRPM signal becomes a binary 1, denoting that the CIS has initiated a Passive Mode read operation.

The FCRP flip-flop is reset during the termination of the Passive Mode read operation. The FCRP output signal delivered by the FCRP flip-flop is coupled to the 0-input lead thereof, and when the flip-flop is in the 1-state resetting of the flip-flop is continuously enabled. When the particular Passive Mode read operation that initiated the setting of the FCRP flip-flop is substantially concluded the DRPM signal reverts to a binary 0. The $\overline{DRPM}$ signal controls delivery of the C-CRP clock signal to clear the FCRP flip-flop.

The logical schematic diagram for the circuit generating the enabling S-CWP signal is:

$$DSRW\ \overline{FCWP}$$

The above diagram illustrates generation of the S-CWP signal, provided that the FCWP flip-flop is in the 0-state, when logic Unit 502 delivers the DSRW signal. The clock signal is supplied to activate the enabled FCWP flip-flop to transfer to the 1-state when each of the three signals applied to the AND-gate represented by $$DWPM\ DSRW\ \overline{FCWP}$$

is a binary 1, a condition which occurs, provided that the FCWP flip-flop is in the 0-state, when Logic Unit 502 delivers the DSRW signal and when the DWPM signal becomes a binary 1, denoting that the CIS has initiated a Passive Mode write operation.

The FCWP flip-flop is reset during the termination of the Passive Mode write operation. The FCWP output signal deliver by the FCWP flip-flop is coupled to the 0-input lead thereof, and when the flip-flop is in the 1-state resetting of the flip-flop is continuously enabled. When the particular Passive Mode write operation that initiated the setting of the FCWP flip-flop is substantially concluded a DPW*i* signal issues to gate the priority level supplied by the initiating DAP-*i* into the register of the PL Table assigned to DAP-*i*. At this time one of the three signals applied to the OR-gate represented by $$DPWA + DPWB + DPWC$$

is a binary 1, and the OR-gate delivers a binary 1 output signal for controlling generation of the C-CWP clock signal to clear the FCWP flip-flop.

Write PL table logic unit

The detailed structure of Write PL Table Logic Unit 527 is shown in FIG. 83.

Logic Unit 527 receives from Logic Unit 516 output signals which identify a DAP recognized for a Passive Mode operation, and from Control Unit 526 the output signal of the FCWP flip-flop, which controls the distinctive functions of the CIS during a Passive Mode write operation. In response to the received signals Logic Unit 527 generates output signals to enable storage of a priority level in a PL Table register during a Passive Mode write operation.

Logic Unit 527 is enabled when one of the DDR*i* signals of Logic Unit 516 becomes a binary 1 and is activated to deliver a corresponding DPW*i* output signal when the FCWP flip-flop is in the 1-state. For example, the logical schematic diagram for the circuit generating the DPWA signal, which enables entry of the priority level supplied by DAP-A during a Passive Mode write operation into Register 541 of the PL Table, is:

$$FCWP\ DDRA = DPWA$$

The above diagram illustrates the generation of the DPWA signal when DAP-A is recognized for a Passive Mode operation (DDRA) and when the FCWP flip-flop is in the 1-state.

Self-request select logic unit

The detailed structure of Self-Request Select Logic Unit 528 is shown in FIG. 83.

Logic Unit 528 receives from Register 514 signals which identify the DAP next to be interrupted as a result of a Self-Interrupt operation, from Register 513 signals which identify the DAP next to be interrupted as a result of a Request-Interrupt operation, and from Register 517 signals which identify the DAP responding to a Priority Interrupt. In response to the received signals Logic Unit 528 delivers a pair of signals to control the distinctive functions of the CIS during a Passive Mode read operation initiated in response to a Self-Interrupt or a Request-Interrupt.

Logic Unit 528 generates the DLSA signal for controlling certain distinctive functions of the CIS during a Passive Mode read operation initiated in response to a Self-Interrupt. The logical schematic diagram for the circuit generating the DLSA signal is:

$$FPCA\ FSCA + FPCB\ FSCB + FPCC\ FSCC = DLSA$$

The above diagram illustrates the generation of the DLSA signal when a DAP-*i* has been designated as next to be interrupted as the result of a Self-Interrupt operation (FSC*i*) and when this DAP-*i* has requested and has been recognized for a Passive Mode read operation in response to the Self-Interrupt (FPC*i*).

Logic Unit 528 generates to DLRA signal for controlling certain distinctive functions of the CIS during a Passive Mode read operation initiated in response to a Request-Interrupt. The logical schematic diagram for the circuit generating the DLRA signal is:

$$FPCA\ FRDA + FPCB\ FRDB + FPCC\ FRDC = DLRA$$

The above diagram illustrates the generation of the DLRA signal when a DAP-*i* has been designated as next to be interrupted as the result of a Request-Interrupt operation (FRD*i*) and when this DAP-*i* has requested and has been recognized for a Passive Mode read operation in response to the Request-Interrupt (FPC*i*).

Modify PL table logic unit

The detailed structure of Modify PL Table Logic Unit 529 is shown in FIG. 83.

Logic Unit 529 receives from Register 514 signals which identify the DAP next to be interrupted as a result of a Self-Interrupt operation, from Register 513 signals which identify the DAP next to be interrupted as a result of a Request-Interrupt operation, and from Logic Unit 528 output signals which control certain distinctive functions of the CIS during a Passive Mode read operation in response to a Self-Interrupt or Request-Interrupt. In response to the received signals Logic Unit 529 generates a set of signals to enable storage of a new priority level in a PL Table register during a Passive Mode read operation.

Logic Unit 529 generates the DSS*i* signal for enabling entry into the PL Table of the priority level stored in Register 550, the priority level being entered into the PL Table register that corresponds to the DAP-*i* initiating the Passive Mode read operation. For example, the logical schematic diagram for the circuit generating the DSSB signal, which enables entry into PL Table register 542 of the priority level stored in Register 550, is:

$$DLSA\ \overline{FCRP}\ FSCB = DSSB$$

The above diagram illustrates the generation of the DSSB signal when DAP-B has been designated as next to be interrupted as the result of a Self-Interrupt operation (FSCB); when Logic Unit 528 delivers the DLSA signal for controlling certain distinctive functions of the CIS during a Passive Mode read operation initiated in response to a Self-Interrupt; and when the FCRP flip-flop clears, which follows the transfer to DAP-B of the original priority level stored in register 542 of the PL Table.

Logic Unit 529 generates the DSR*i* signal for enabling entry into the PL Table of the highest recognized priority level queued in Register 551, the priority level being entered into the PL Table register that corresponds to the DAP-*i* initiating the Passive Mode read operation. For example, the logical schematic diagram for the circuit generating the DSRB signal, which enables entry into PL Table register 542 of the highest recognized priority level queued in Register 551, is:

$$DRA\ \overline{FCRP}\ FRDB = DSRB$$

The above diagram illustrates the generation of the DSRB signal when DAP-B has been designated as next to be interrupted as the result of a Request-Interrupt operation (FRDB); when Logic Unit 528 delivers the DLRA signal for controlling certain distinctive functions of the CIS during a Passive Mode read operation initiated in response to a Request-Interrupt; and when the FCRP flip-flop clears, which follows the transfer to DAP-B of the original priority level stored in register 542 of the PL Table.

R/W completion logic unit

The detailed structure of R/W Completion Logic Unit 530 is shown in FIG. 80. Logic Unit 530 may be considered to be a portion of Sequencer 504, although the Logic Unit is illustrated separately in FIG. 21 for convenience.

Logic Unit 530 receives the FC*i*S signals from the CAT, the FR*i*A signals from the CIC-R/S, the DSRW output signal of Logic Unit 502, and the output signals of Control Unit 526. In response to the received signals, Logic Unit 530 delivers an output signal denoting the completion of the required functions of a Passive Mode operation.

Logic Unit 530 generates the DRWC signal to denote that the required functions of the Passive Mode operation currently being executed have been completed. The logical schematic diagram for the circuit generating the DRWC signal is:

$$DSRW \ \overline{FCRP} \ \overline{FCWP}[DDRA(\overline{FCAS}$$
$$\overline{FRAA}) + DDRB)\overline{FCBS} \ \overline{FRBA})$$
$$+ DDRC(\overline{FCCS} \ \overline{FRCA})]$$

The above diagram illustrates the generation of the DRWC signal when a Passive Mode operation is being executed by the CIS (DSRW); when the one of the FCRP or FCWP flip-flops which controlled the distinctive functions of the CIS according to whether the operation was a Passive read or write operation has been cleared; and after the FriA flip-flop granting a memory communication to the DAP-*i* recognized (DDR*i*) for a Passive Mode operation has been cleared.

*Priority level table*

The detailed structure of Priority Level Table 540 is shown in FIGS. 70, 71 and 72. PL Table 540 comprises registers 541, 542 and 543, designated respectively as Register-A, Register-B, and Register-C. Register-A comprises the four FF1*n* flip-flops for storing the priority level of the program being executed by DAP-A, Register-B comprises the four FP2*n* flip-flops for storing the priority level of the program being executed by DAP-B, and Register-C comprises the four FP3*n* flip-flops for storing the priority level of the program being executed by DAP-C.

The four bits representing a priority level are entered into a Register-*i* of the PL Table during a Passive Mode write operation initiated by DAP-*i* or during a Passive Mode read operation initiation by DAP-*i* in response to a request for a Self-Interrupt or Request-Interrupt. The PL Table receives from PL Table Input Gates 547 the four DPLK signals, which represent a priority level; from Logic Unit 527 the DPW*i* signals, which enable entry of a priority level into the corresponding Register-*i* during a Passive Mode write operation; and from Logic Unit 529 the DSS*i* signals, which enable entry of a priority level into the corresponding Register-*i* during a Passive Mode read operation initiated in response to a Self-Interrupt, and the DSR*i* signals, which enable entry of a priority level into the corresponding Register-*i* during a Passive Mode read operation initiated in response to a Request-Interrupt. For example, the logical schematic diagrams for the circuits generating the signals for enabling a change of state of the FP23 flip-flop, FIG. 71, are:

$$\overline{DPLC} = S\text{-}P23$$
$$\overline{DCLP} = R\text{-}P23$$

The above diagrams illustrate the generation of the signals to enable changing the state of the flip-flop of Register-B that stores the third order bit of the priority level at which DAP-B is operating to correspond to the third order bit of the priority level received from Gates 547, as represented by the DPLC signal.

Continuing the above example, the logical schematic diagram for the circuit generating the clock signal to activate the enabled FP23 flip-flop to transfer to the state represented by the DPLC signal is:

$$DPWB + DSSB + DSRB = C\text{-}P23$$

The above diagram illustrates generation of the clock signal, which is applied to all flip-flops of Register-B, when any one of the DPWB, DSSB or DSRB signals becomes a binary 1.

Accordingly, whenever a Passive Mode write operation initiated by DAP-B or a Passive Mode read operation initiated by DAP-B in response to a Priority Interrupt is executed, the FP23 flip-flop samples the third order bit signal delivered by Gates 547 and assumes the corresponding state. More generally, during any Passive Mode write operation or Passive Mode read operation initiated in response to a Priority Interrupt, the Register-*i* of the PL Table corresponding to the initiating DAP-*i* stores the priority level delivered by Gates 547.

The flip-flops of Register-*i* in the PL Table are also set if the corresponding DAN*i* signal issues. The DAN*i* signal issues when the corresponding DAP-*i* is not fully operational. The DAN*i* signal is applied to the special input lead of all flip-flops of the corresponding Register-*i* for transferring these flip-flops to the 1-state without requiring a simultaneous binary 1 clock signal. Accordingly, when a DAP-*i* is not fully operational, it is prevented from being selected for a Request-Interrupt operation by forcing a simulated priority level 15 into the corresponding Register-*i*. Since the value 15 can never be less than the priority level required by any Request-Interrupt, the inoperative DAP-*i* cannot be selected to execute a program. When DAP-*i* once again becomes operational, the DAN*i* signal reverts to a binary 0, permitting the corresponding Register-*i* to accept a new priority level during a succeeding Passive Mode operation.

*Selected PL signal gates*

The detailed structure of Selected PL Signal Gates 545 is shown in FIG. 84.

Gates 545 receive from PL Table 540 output signals representing the three priority levels stored; from Logic Unit 502 each DSD*i* signal, which denotes the granting of a Translate Mode operation to the respective DAP-*i*; from Register 501 the FRWA signal, which denotes the request of a DAP for a Passive Mode operation; and from Logic Unit 516 the DDR*i* signals, which identify the DAP-*i* recognized for a Passive Mode operation. In response to the received signals, Gates 545 deliver signals representing the priority level stored in a selected register of the PL Table.

Gates 545 deliver the four DSL*k* signals, representing the priority level stored in a Register-*i* of the PL table, when the corresponding DAP-*i* is granted a Translate Mode operation (DSD*i*) or requests and is recognized for a Passive Mode operation (FRWA DDR*i*). For example, the logical schematic diagram for the circuit generating the DSLC signal, which represents the third order bit of the priority level in the selected Register-*i*, is:

$$FP13(DSDA + FRWA \ DDRA) + FP23$$
$$(DSDB + FRWA \ DDRB) + FP33$$
$$(DSDC + FRWA \ DDRC) = DSLC$$

The above diagram illustrates the generation of the DSLC signal when DAP-A is recognized for a CIS operation, if the third order bit (FP13) stored in Register-A is a binary 1; when DAP-B is recognized for a CIS operation, if the third order bit (FP23) in Register B is a binary 1, and when DAP-C is recognized for a CIS operation, if the third order bit (FP33) in Register-C is a binary 1.

*PL signal transmitter*

The detailed structure of PL Signal Transmitter 546 is shown in FIG. 84.

Transmitter 546 receives from Gates 545 the four DSL*k* signals representing the priority level stored in a selected register of the PL Table and from Control Unit 526 the output signal of the FCRP flip-flop. In response to the received signals, Transmitter 546 delivers output signals for transmittal to the CDX, representing the priority level received.

Transmitter 546 transmits the four DHR*n* output signals, representing the received priority level, when the FCRP flip-flop is in the 1-state. For example, the logical schematic diagram for the circuit generating the DHR0 signal, which represents the least significant bit of the priority level received by Transmitter 546, is:

$$DSLA\ FCRP = DHR0$$

The above diagram illustrates the generation of the DHR0 signal when the FCRP flip-flop is in the 1-state, if the least significant bit (DLSA) of the priority level delivered by Gates 545 is a binary 1.

PL table input gates

The detailed structure of PL Table Input Gates 547 is shown in FIG. 84.

Gates 547 receive the DWPM signal from Logic Unit 525, the DLSA and DLRA signals from Logic Unit 528, the DHW0–3 signals from the CDX, the FSL$k$ signals from Register 550, and the DHQ$k$ signals from Encoder 552. In response to the received signals, Gates 547 deliver the four DPL$k$ signals representing the priority level to be stored in the PL Table.

Gates 547 deliver the priority level supplied by the initiating DAP when the DWPM signal is a binary 1, the priority level stored in Register 550 when the DLSA signal is a binary 1, and the priority level delivered by Encoder 552 when the DLRA signal is a binary 1. For example, the logical schematic diagram for the circuit generating the DPLD signal, which represents the most significant bit of the priority level delivered, is:

$$DWPM\ DHW3 + DLSA + FSLD + DLRA\ DHQD = DPLD$$

The above diagram illustrates the generation of the DPLD signal (1) during a Passive Mode write operation (DWPM), if the most significant bit (DHW3) of the priority level provided by the initiating DAP is a binary 1; (2) during a Passive Mode read operation initiated in response to a Self-Interrupt (DLSA), if the most significant bit (FSLD) of the priority level stored in Register 550 is a binary 1; and (3) during a Passive Mode read operation initiated in response to a Request-Interrupt (DLRA), if the most significant bit (DHQ) of the priority level delivered by Encoder 552 is a binary 1.

Accordingly, Gates 547 deliver the priority level supplied by the initiating DAP during a Passive Mode write operation, the priority level stored in Register 550 during a Passive Mode read operation in response to a Self-Interrupt, and the highest recognized priority level queued in Register 551 during a Passive Mode read operation in response to a Request-Interrupt.

Self-interrupt PL register

The detailed structure of Self-Interrupt PL Register 550 is shown in FIG. 73. Register '550 comprises the four FSL$k$ flip-flops. The FSL$k$ flip-flops store the priority level of the Operating System program which a DAP is to be interrupted to execute as a result of a Self-Interrupt operation.

A priority level is entered into Register 550 during a Self-Interrupt operation. Register 550 receives from the CAX the DHS0–3 and DHS5 signals of the Symbolic Word Address and from Decoder 507 the DCAN control signal. The DHS0–3 signals represent the priority level of the required Operating System program. For example, the logical schematic diagrams for the circuits generating the signals for enabling change of the state of the FSLA flip-flop are:

$$DHS0 = S\text{-}SLA$$
$$\overline{DHS0} = R\text{-}SLA$$

The above diagrams illustrate the generation of the signals for controlling the state of the flip-flop that stores the least significant bit of the priority level required during a Self-Interrupt, when the least significant bit of the Symbolic Word Address is received from the CAX.

Continuing the above example, the logical schematic diagram for the circuit generating the clock signal to activate the FSLA flip-flop to transfer to the state represented by the DHS0 signal is:

$$DCAN\ DHS5\ FSRC\ FSRB = C\text{-}SLA$$

The above diagram illustrates the generation of the clock signal, which is applied to all flip-flops of Register 550, when the Sequencer enters state-$\tau_4$, if the initiating DAP is requesting a Self-Interrupt operation (DCAN DHS5).

Thus, during a Self-Interrupt operation Register 550 receives and stores the priority level specified in the Symbolic Word Address.

PL 8, 9, 10 decoder and HQL 5, 7 decoder

The detailed structure of PL 8, 9, 10 Decoder 553 is shown in FIG. 86. The detailed structure of HQL 5, 7 Decoder 557 is shown in FIG. 75.

Decoder 553 receives from PL Table 540 output signals representing the priority levels of the programs being executed by the DAP's. In response to the received signals, Decoder 553 delivers signals denoting the execution by the DAP's of programs assigned priority levels 8, 9, or 10.

Decoder 553 delivers a DP08, DP09, or DP10 signal when any one of the registers in the PL Table stores a respective priority 8, 9, or 10. For example, the logical schematic diagram for the circuit generating the DP09 signal, denoting execution by a DAP of a program assigned priority level 9, is:

$$FP14\ \overline{FP13}\ \overline{FP12}\ FP11 + FP24\ FP23\ FP22\ FP21 + FP34\ \overline{FP33}\ \overline{FP32}\ FP31 = DP09$$

The above diagram illustrates the generation of the DP09 signal when the four flip-flops of either Register-A, Register-B, or Register-C store a representation of the number 9.

Decoder 557 receives from Encoder 552 output signals representing the value of the highest recognized priority level queued in Register 551. In response to the received signals, Decoder 557 delivers either the HQL5 signal or HQL7 signal if the highest recognized priority level queued in Register 551 is respectively priority level 5 or priority level 7. The logical schematic diagrams of the circuits for supplying the HQL5 and HQL7 signals to control flip-flops of Register 551, shown in FIG. 75, describe Decoder 557. The logical schematic diagram for the AND-gate generating the HQL5 signal is:

$$\overline{DHQD}\ DHOC\ \overline{DHQB}\ DHQA$$

The AND-gate represented by the above diagram delivers a binary 1 output signal, representing the HQL5 signal, when the DHQ$k$ signal set represents priority level 5. The logical schematic diagram for the AND-gate generating the HQL7 signal is:

$$\overline{DHQD}\ DHQC\ DHQB\ DHQA$$

The AND-gate represented by the above diagram delivers a binary 1 output signal, representing the HQL7 signal, when the DHQ$k$ signal set represents priority level 7.

Queue 5, 7 input logic unit and queue 8–10 input logic unit

The detailed structure of Queue 5, 7 Input Logic Unit 558 is shown in FIG. 75 and the detailed structure of Queue 8–10 Input Logic Unit 559 is shown in FIGS. 74 and 75.

Logic Unit 558 receives from Decoder 557 output signals rednoting whether the highest recognized priority level queued for a Request-Interrupt is priority level 5 or 7; from Logic Unit 502 the DSRW signal; and from Priority Level Decoder 576, FIG. 23, output signals denoting whether the Symbolic Word Address represents one of priority levels 5 or 7. In response to the received signals, Logic Unit 558 provides output signals for controlling certain flip-flops of Register 551.

The logical schematic diagrams of the circuits for supplying output signals to control the FO05 and FO07 flip-flops of Register 551 describe Logic Unit 558. These circuits generate the signals for enabling the setting and resetting of the FQ05 and FQ07 flip-flops. For example, the DSQF and DSQG signals of Decoder 576, which denote that the four least significant bits of the Symbolic Word Address represent respectively priority levels 5 and 7, control the issuance of the respective S-Q05 and S-Q07 signals.

As another example, the logical schematic diagram for the circuit generating the R-Q05 signal is:

HQL5 DSRW=R-Q05

The first four signals illustrated in FIG. 75 as participating in controlling the circuit for resetting the FQ05 flip-flop represent the AND-gate of Decoder 557 that delivers the HQL5 signal. The above diagram, therefore, illustrates the generation of the R-O05 signal when a Passive Mode operation is being executed by the CIS (DSRW), if the highest recognized priority level queued in Register 551 is priority level 5. Similarly, the FQ07 flip-flop is enabled for resetting during a Passive Mode operation if the highest recognized priority level queued in Register 551 is priority level 7.

Logic Unit 559 receives from Decoder 576 output signals denoting whether the Symbolic Word Address represents priority levels 8, 9, or 10, and receives the DHS7 and DHS6 signals of the Symblic Word Address. In response to the received signals, Logic Unit 559 provides output signals for controlling certain flip-flops of Register 551.

The logical schematic diagrams of the circuits for supplying output signals to control the FQ08, FQ09, and FQ10 flip-flops of Register 551 describe Logic Unit 559. These circuits generate the signals for enabling the setting and resetting of the FQ08, FQ09, and FQ10 flip-flops. For example, the DSQH signal of Decoder 576, which denotes that the Symbolic Word Address represents priority level 8, controls the issuance of the S-Q08 signal. Similarly, the DSQJ and DSQK signals control the issuance of the respective S-Q09 and S-Q10 signals.

The states of the DHS7 and DHS6 signals of the Symbolic Word Address determine which one of the FQ08 FQ09, or FQ10 flip-flops is enabled for resetting by Encoder 559. For example, if the DHS7 signal represents a binary 1 and the DHS6 signal represents a binary 0, the R-Q09 signal is generated by Encoder 559.

*Queued PL register*

The detailed structure of Queued PL Register 551 is shown in FIGS. 74 and 75. Register 551 comprises the eight FQ$mn$ flip-flops. Each of these flip-flops, when in the 1-state, denotes an existing request by a Processor for a DAP to accept a Request-Interrupt to the priority level designated by the flip-flop.

An FQ$mn$ flip-flop is set during the execution of a Request-Interrupt operation wherein the Symbolic Word Address represents the corresponding priority level. Register 551 receives from Logic Units 558 and 559 the S-Q$mn$ signals for enabling transfer of the corresponding FQ$mn$ flip-flops to the 1-state. A clock signal is supplied to all of the flip-flops of Register 551 when each of the two signals applied to the AND-gate represented by

DCAN DHS4 is a binary 1, a condition occurring during a Request-Interrupt operation. Accordingly, a flip-flop of Register 551 is transferred to the 1-state, if it is not already in the 1-state, during a Request-Interrupt operation wherein a Processor requests that an Operating System program of the corresponding priority level be assigned to some DAP.

The FQ05 or FQ07 flip-flop is reset during execution of a Passive Mode read operation in response to a Request-Interrupt, if the highest recognized priority level queued in Register 551 is respectively priority level 5 or 7. Register 551 receives from Logic Unit 558 an R-Q$mn$ signal for enabling resetting of the FQ05 or FQ07 flip-flop during a Passive Mode operation if the highest recognized priority level queued for a Request-Interrupt is priority level 5 or priority level 7. A clock signal is supplied to the FQ05 and FQ07 flip-flops when any one of three signals applied to the OR-gate represented by $$DSRA + DSRB + DSRC$$

is a binary 1, a condition occurring when the CIS is executing a Passive Mode read operation initiated by a DAP in response to a Request-Interrupt. Accordingly, the FQ05 or FQ07 flip-flop is cleared when a DAP responds to a Request-Interrupt operation to accept execution of a program at the respective priority level 5 or 7.

The FQ08, FQ09, or FQ10 flip-flop is reset during execution of a Read Definer List operation, in which a DAP executing a priority level 8, 9, or 10 Operating System program supplies a Symbolic Address identifying a Definer cell pair of the corresponding Definer List. Register 551 receives from Logic Unit 559 an R-Q$mm$ signal for enabling resetting of the one of the FQ08, FQ09, or FQ10 flip-flops corresponding to the Definer List being read. A clock signal is supplied to the FQ08, FQ09, and FQ10 flip-flops when the logical circuit represented by $$\overline{DHS9}\ \overline{DHS8}\ \overline{DHS0}(DHS7 + DHS6)$$

delivers a binary 1 output signal, a condition occurring whenever a Read Definer List operation is being executed by the CIS. Accordingly, the FQ08, FQ09, or FQ10 flip-flop is cleared when a DAP initiates a Read Definer List operation for reading one of the Definer Lists assigned to the respective one of priority levels 8, 9, and 10.

In the instant embodiment, the FQ11, FQ12, and FQ13, flip-flops are provided to enable expansion of the System. Although the FQ11–13 flip-flops will be transferred to the 1-state in the manner of the lower level FQ$mn$ flip-flops, described previously, the circuits for transferring these flip-flops to the 0-state will be determined by the manner in which they are to be employed. Thus, the FQ11–13 flip-flops may be transferred to the 0-state during responses to Request-Interrupts as the FQ05 or FQ07 flip-flops are reset, or during Read Definer List operations, as the FQ08–10 flip-flops are reset.

*Highest queued PL (HQL) encoder*

The detailed structure of Highest Queued PL Encoder 552 is shown in FIG. 85.

Encoder 552 receives from Register 551 output signals identifying all priority levels queued in the Register and from Decoder 553 output signals denoting that the DAP's are executing programs having one or more of the priority levels 8, 9, and 10. In response to the received signals, Encoder 552 delivers signals representing the highest recognized priority level (HQL) queued in Register 551.

Normally, Encoder 552 is controlled by the one of the FQ$mm$ output signals that represents the highest priority level stored in Register 551 to deliver the four DHQ$k$ output signals representing this level. However, if the highest level stored in Register 551 is one of priority levels 8, 9, or 10 and a DAP is currently executing a program having this priority level, Encoder 552 does not recognize this highest stored level but, instead, recognizes a lower level stored in Register 551. For example, if Register 551 stores priority levels 10, 9, and 7, but one DAP is executing a priority level 10 program and another DAP is executing a priority level 9 program, Encoder 552 delivers output signals representing priority level 7.

This function provided by Encoder 552 confines the execution of a succession of programs of priority level 8, 9, or 10 to one DAP so long as the next request for execution of a program of this priority level is received prior to completion of the similar level program currently being executed. For example, if a Request-Interrupt for a priority level 9 program is made while a DAP is busy executing a priority level 9 program, no other DAP will be interrupted to execute the newly requested program but, instead, when the DAP executing the current priority level 9 program completes such program, it will immediately repeat execution of the program for the new request. Accordingly, the logical schematic diagram for the circuit generating the DHQD signal, which represents the most significant bit of the priority level delivered by Encoder 552, is:

$$FQ13 + FQ12 + FQ11 + FQ10 \ \overline{DP10} \\ + FQ09 \ \overline{DP09} + FQ08 \ \overline{DP08} = DHQD$$

The above diagram illustrates the generation of the DHQD signal if Register 551 stores a representation of priority levels 13, 12, or 11. However, if the highest level stored in Register 551 is priority level 10 (FQ10), the DHQD signal will only be generated if a DAP is not currently executing a priority level 10 program ($\overline{DP10}$). The representation by Encoder 552 of priority levels 9 and 8 as the highest queued levels is limited similarly to the representation of priority level 10.

*Lowest processor PL (LPL) encoder*

The detailed structure of Lowest Processor PL Encoder 554 is shown in FIG. 85.

Encoder 554 receives from PL Table 540 output signals representing the three priority levels stored, and responds to the received signals to deliver signals representing the value of the lowest priority level (LPL) at which a DAP is operating. Additionally, Encoder 554 delivers signals identifying the DAP which is executing the lowest priority level program.

Encoder 554 is controlled directly by the output signals of the PL Table to deliver the DC31, DC32 and DC21 signals, these three signals collectively identifying the particular DAP operating at the lowest priority level. Each of these three signals identifies the one of a respective pair of DAP's operating at the higher priority level. The DC31 signal denotes that DAP-C is executing a higher priority level program than DAP-A, the DC32 signal denotes that DAP-C is executing a higher priority level program than DAP-B, and the DC21 signal denotes that DAP-B is executing a higher priority level program than DAP-A. For example, one instance when the DC31 signal is a binary 1 is when each of the two signals applied to the AND-gate represented by $$FP34 \ \overline{FP14}$$

is a binary 1. The signal representing the most significant bit of the priority level of DAP-C (FP34) is a binary 1 when the value of this priority level is 8 or greater. The signal representing the most significant bit of the priority of level of DAP-A (FP14) is a binary 0 and, accordingly, the $\overline{FP14}$ signal is a binary 1, when the value of this priority level is 7 or less. Therefore, the above-illustrated AND-gate controls generation of the DC31 signal, denoting that the current priority level of DAP-C is greater than the current priority level of DAP-A, when the priority level of the program being executed by DAP-C is 8 or greater and the priority level of the program being executed by DAP-A is 7 or less.

Encoder 554 is jointly controlled by the output signals of the PL Table and the DC31, DC32, and DC21 signals to deliver the four DLCk signals, which represent the lowest priority level at which a DAP is operating. For example, the logical schematic diagram for the circuit generating the DLCD signal, which represents the most significant bit of the priority level delivered by Encoder 554, is:

$$FP34 \ \overline{DC31} \ \overline{DC32} + FP24 \ DC32 \ \overline{DC21} + FP14 \\ DC31 = DLCD$$

The above diagram illustrates the generation of the DLCD signal if:

(a) The most significant bit represented in Register-C of the PL Table (FP34) is a binary 1 when DAP-C is executing the lowest priority level program ($\overline{DC31} \ \overline{DC32}$), the $\overline{DC31}$ signal denotes that DAP-C is executing a program of lower priority than DAP-A and the $\overline{DC32}$ signal denotes that DAP-C is executing a program of lower priority than DAP-B;

(b) The most significant bit represented in Register-B of the PL Table (FP24) is a binary 1 when DAP-B is executing the lowest priority level program (DC32 $\overline{DC21}$), the DC32 signal denotes that DAP-C is executing a program of higher priority than DAP-B and the $\overline{DC21}$ signal denotes that DAP-B is executing a program of lower priority than DAP-A; or (c) The most significant bit represented in Register-A of the PL Table (FP14) is a binary 1 when DAP-A is executing the lowest priority level program (DC21 DC31), the DC21 signal denotes that DAP-B is executing a program of higher priority than DAP-A and the DC31 signal denotes that DAP-C is executing a program of higher priority than DAP-A.

Accordingly, the four DLC*k* signals delivered by Encoder 554 represent the contents of the Register-*i* of the PL Table corresponding to the DAP-*i* executing the lowest priority program.

*HQL v LPL comparator*

The detailed structure of HQL v LPL Comparator 555 is shown in FIG. 85.

Comparator 555 receives the encoder 552 output signals representing the highest recognized priority level (HQL) stored in Queued PL Register 551 and from Encoder 554 output signals representing the lowest priority level program (LPL) being executed by a DAP. In response to the received signals, Comparator 555 delivers a signal denoting whether the highest recognized priority level stored in Register 551 is greater than the lowest priority level of the programs which the DAP's are currently executing.

Comparator 555 compares bits of corresponding binary order for the HQL value received from Encoder 552 and the LPL value received from Encoder 554 to deliver the DQRH signal. The DQRH signal is a binary 1 only when the highest recognized priority level queued in Register 551 is greater than the lowest priority level stored in the PL Table. For example, one instance when the DQRH signal is a binary 1 is when each of the two signals applied to the AND-gate represented by $$DHQD \ \overline{DLCD}$$

is a binary 1. The signal representing the most significant bit (DHQD) among the output signals of Encoder 552 is a binary 1 when the HQL value is 8 or greater. The signal representing the most significant bit (DLCD) among the output signals of Encoder 554 is a binary 0, and, accordingly, the $\overline{DLCD}$ signal is a binary 1, when the LPL value is 7 or less. Therefore, the above-illustrated AND-gate controls generation of the DQRH signal, denoting that the highest recognized priority level queued in Register 551 is greater than the lowest priority level in PL Table 550, when the HQL value is 8 or greater and the LPL value is 7 or less.

The DQRH signal is employed to control the interruption of a DAP. If the DQRH signal is a binary 1 it will control the interruption of a DAP; but if the DQRH signal is a binary 0 it will not exert such control, inasmuch as no DAP is executing a program of lower priority level than that requested by an unanswered Request-Interrupt operation.

Definer counters

The detailed structure of Definer Counters 570, 571, and 572 is shown in FIGS. 76, 77, 78, and 79. Register 570 comprises the five F081–F085 flip-flops for providing a Definer count for priority level 8, Register 571 comprises the five F091–F095 flip-flops for providing a Definer count for priority level 9 and Register 572 comprises the five F101–F105 flip-flops for providing a Definer count for priority level 10.

The count stored in a Definer Counter is incremented during a Request-Interrupt operation specifying one of priority levels 8, 9, or 10. The Definer Counter set receives from Priority Level Decoders 576 the DSQH, DSQJ, and DSQK output signals, which denote that the four least significant bits of the Symbolic Word Address represent respectively priority levels 8, 9, or 10; the DCAN control signal from Decoder 507; and DHS4 signal of the Symbolic Word Address. When a Request-Interrupt operation specifying one of priority levels 8, 9, or 10 is being completed, the lower order flip-flop of the corresponding one of the Definer Counters receives an input signal for incrementing by 1 the value of the count stored therein. For example, the logical schematic diagram for the circuit generating the clock signal for the F091 flip-flop is:

$$(\overline{DSQJ} \; \overline{DCAN} \; \overline{DHS4}) = C\text{-}091$$

The above diagram illustrates the generation of the C-091 clock signal for activating the incrementation by 1 of the count in Definer Counter 571, when a Request-Interrupt operation (DCAN DHS4) specifying execution of a program at priority level 9 (DSQJ) has been substantially completed by entry into state-$\tau_6$, wherein the three signals become binary.

The circuit generating the clock signal for the F091 flip-flop comprises an AND-gate 578 of Counter 571 coupled to receive the DSQJ, DCAN, and DHS4 signals, an Inverter 581 of Counter 571 for inverting the output signal delivered by AND-gate 578 to control issuance of the C-091 clock signal.

Similarly, AND-gate 577 and Inverter 580 generate the clock signal for incrementing Definer Counter 570 during a Request-Interrupt specifying priority level 8, and AND-gate 579 and Inverter 582 generate the clock signal for incrementing Definer Counter 572 during a Request-Interrupt specifying priority level 10.

Definer count output gates

The detailed structure of Definer Count Output Gates 574 is shown in FIG. 86.

Gates 574 receive from the Definer Counters output signals representing the three different counts stored; from Decoder 576 signals denoting whether the Symbolic Word Address represents one of priority levels 8, 9, or 10; from Decoder 507 the DCAN control signal; and the DHS0–4 signals of the Symbolic Word Address. In response to the received signals, Gates 574 delivers signals representing the count stored in a selected one of the Definer Counters.

Gates 574 deliver the five DDL$n$ signals, representing the count provided by a selected one of Definer Counters 570, 571, or 572, during a Request-Interrupt operation specifying one of priority levels 8, 9, or 10. Delivery of the DDL$n$ count signals by Gates 574 is controlled by the DDDC signal, which is generated within Gates 574. The DDDC signal, FIG. 86, becomes a binary 1 during a Request-Interrupt specifying one of priority levels 8, 9, or 10 and thereupon enables the issuance of the DDL1–5 signals. For example, the logical schematic diagram for the circuit generating the DDL5 signal, which represents the most significant bit of the count in the selected Definer Counter, is:

$(F105 \; DSQK + F095 \; DSQJ$
$\qquad + F085 \; DSQH) DDDC = DDL5$

The above diagram illustrates the generation of the DDL5 signal during a Request-Interrupt operation specifying one of priority levels 8, 9, or 10 (DDDC); if the most significant bit (F085) stored in Counter 570 is a binary 1 and priority level 8 (DSQH) is specified, if the most significant bit (F095) stored in Counter 571 is a binary 1 and priority level 9 (DSQJ) is specified, or if the most significant bit (F105) stored in Counter 572 is a binary 1 and priority level 10 (DSQK) is specified.

Accordingly, Gates 574 deliver output signals representing the count provided by the Definer Counter corresponding to the priority level specified by a Request-Interrupt operation to one of priority levels 8, 9, or 10.

Priority level decoder

The detailed structure of Priority Level Decoder 576 is shown in FIG. 86.

Decoder 576 receives the four DHS0–3 signals of the Symbolic Word Address from the CAX and responds to the received signals to deliver signals denoting whether the DHS0–3 signals represent one of the priority levels 5, 7, 8, 9, or 10.

Decoder 576 responds to the four least significant bit signals of the Symbolic Word Address (DHS0–3) to deliver one of the DSQF, DSQG, DSQH, DSQJ or DSQK signals if the DHS0–3 signals represent one of priority levels 5, 7, 8, 9, or 10. For example, the logical schematic diagram for the circuit generating the DSQH signal is:

$$DHS3 \; \overline{DHS2} \; \overline{DHS1} \; \overline{DHS0} = DSQH$$

The above diagram illustrates the generation of the DSQH signal if the bit configuration represented by the four DHS0–3 signals corresponds to the code employed for representing priority level 8.

Only during a Self-Interrupt or a Request-Interrupt operation are the four least significant bits of the Symbolic Word Address recognized as representing a priority level. However, only during a Request-Interrupt operation are the output signals of Decoder 576 recognized and, at such time, if one of the output signals of Decoder 576 is a binary 1, such signal is effective to represent that the corresponding priority level is specified by the Request-Interrupt.

CIS PARTICIPATION IN SYSTEM OPERATION

The operations of the CIS are closely interwoven with the operations of the remainder of the Multicomputer System. The CIS exercises a dominant role in the System when a DAP changes programs through control of the termination procedures of the old program and the initiation procedures of the new program. The CIS also exercises a dominant role when a DAP program is interrupted, to be supplanted by a higher priority program. Additionally, the CIS plays a significant role when a DAP program is resumed from the point of interruption and during execution of all Operating System programs.

The participation of the CIS in the operation of the Multicomputer System will be described primarily with reference to four operational sequences of the Multicomputer System; namely, the Priority Interrupt Initiation Sequence, the Priority Interrupt Acceptance Sequence, the Return-from-Interrupt Sequence, and the Alert Sequence. Each of these sequences is described in detail in the succeeding subsections. For clarity, a flow-chart is provided to illustrate the significant steps in each sequence.

Priority interrupt initiation sequence

The Priority Interrupt Initiation Sequence is entered after a Processor encounters an instruction or condition of operation requiring execution of a program of higher priority than the program the Processor is currently executing, the required program being an Operating System program. Execution of the Priority Interrupt Initiation Sequence provides for transmission of information with respect to the causative instruction or condition of operation from the initiating program to the required program. The Sequence is concluded when a Priority Interrupt operation is executed by the CIS to provide acceptance of the required program by a DAP.

The first step of the Priority Interrupt Initiation Sequence is executed after certain instructions or conditions of operation are encountered by a DAP or PEP executing a Subject Program, block 1 of Chart I, or by a DAP executing an Operating System program, block 17 of Chart II. Certain of these instructions or condiitons of operation encountered by a DAP preclude continuation of the program in which they appear and, therefore, the required Operating System program will be assigned to this DAP, by initiation of a Self-Interrupt operation at the conclusion of the Sequence. Others of these instructions or conditions of operation do not preclude continuation of the program in which they appear and, therefore, the required Operating System program will be assigned to a DAP selected by the CIS, by initiation of a Request-Interrupt operation at the conclusion of the Sequence.

ecuted by a DAP can specify that a Self-Interrupt to priority level 7 is required. This instruction may be encountered when a DAP commences execution of a new Subject Program, but execution cannot continue until data is first received from an external device for processing, or the instruction may be encountered when a DAP is providing data in a real-time environment. Additionally, an instruction of a program being executed by a DAP can specify that a Request-Interrupt to priority level 5 is required. This instruction may be encountered when a Subject Program being executed no longer requires the full complement of Memories or external devices and, therefore, the System is notified that these Memories or external devices may be allocated to Scheduled Programs (see "Program Structure" section). An instruction of a program being executed by a DAP can specify that a Request-Interrupt to priority level 7 is required. This instruction may be encountered during execution of a Subject Program when new data for processing must be transferred from an external device to the Memory group, but wherein the Memory group is presently storing sufficient data for the DAP involved to continue.

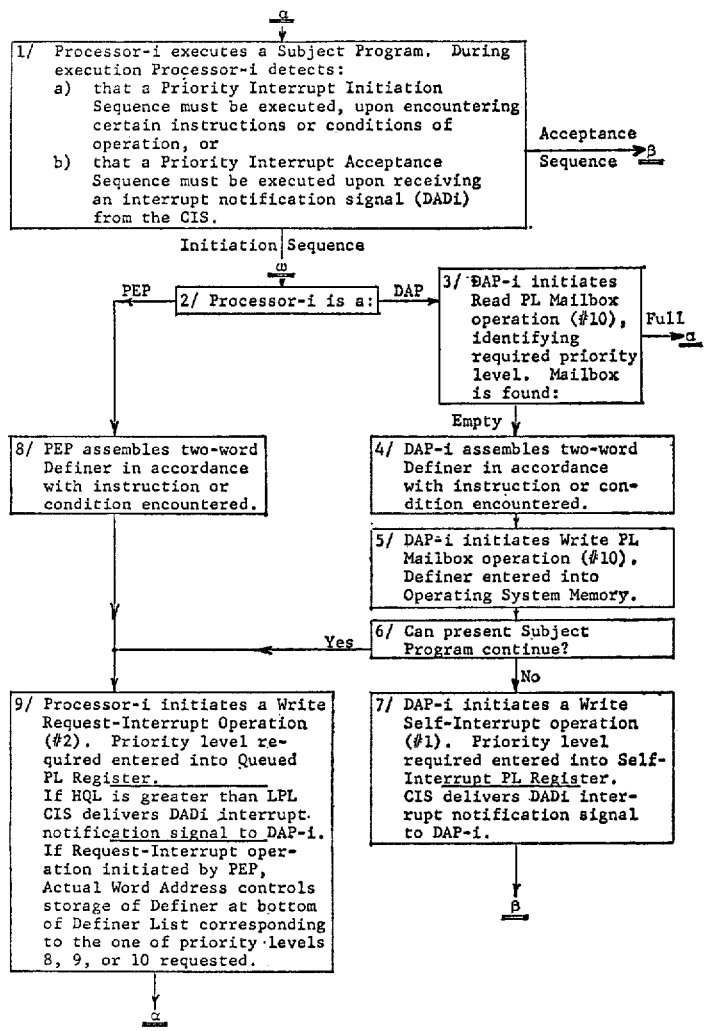

CHART I - PRIORITY INTERRUPT INITIATION SEQUENCE

Among the types of instructions which require initiation of a Priority Interrupt operation are those that expressly specify the operation. For example, an instruction of a program being executed by a DAP can specify that a Self-Interrupt to priority level 5 is required. This instruction may be encountered at the conclusion of a Subject Program, for initiating execution of an Operating System program to assign a new Subject Program to the DAP involved. An instruction of a program being ex- Other instructions that require initiation of a Self-Interrupt operation are employed by a DAP designed specifically to operate independently, rather than to tbe supported in its operation by the System of this invention. This type of DAP is assigned a permanent set or configuration of external devices and Memories. One type of instruction employed by this type of DAP provides direct control of the transfer of Data Words between a specified external device and a specified Memory. However, in the instant System, no DAP is continuously assigned a particular configuration of external devices and Memories but, instead, is assigned the minimum configuration required by the Subject Program being executed. Moreover, the particular external devices and Memory blocks assigned depends on those available at the time of assignment by the Allocator routine. Direct control of the transfer of data between the Memory group and the external devices is provided by the I/O Initiation programs of the Operating System and certain other Operating System programs. Hence, when instructions of the type intended to directly control a data transfer to or from an external device are encountered while a DAP is executing a Subject Program, a Priority Interrupt Initiation Sequence must be performed to provide a Self-Interrupt to priority level 4. The priority level 4 programs of the Operating System provide for translation of instructions intended for other systems to instructions intelligible to the other programs of the Operating System.

Another type of instruction employed by the independently operable DAP is one requiring manual intervention. This type of instruction may specify that the DAP halt its execution of the program currently being executed or may specify that a manual operation be provided to set switches for providing control information or data insetion. When this type of instruction is encountered by a DAP in the instant System, a Self-Interrupt to priority level 5 is required. The Operating System program automatically provides the required response, such as by responding to the halt instruction to terminate the program involved and to initiate another program.

Among the conditions of operation which require initiation of a Self-Interrupt operation are those involving real-time data transfer requirement sand those involving error conditions. For example, each DAP executing a Subject Program provides for the continuous advancement of a "clock" or counter. This clock is reset at regular intervals if the program proceeds in an orderly manner. However, if the program by error enters a loop that prevents its termination, the clock will not be reset, but will exceed a predetermined value or "overflow." Overflow of the clock requires initiation of a Self-Interrupt to priority level 14 to correct or eliminate the error condition in the Subject Program. This action prevents the DAP, because of the program error, from effectively becoming unavailable to the System. Other program errors detected by a DAP, such improper address or command codes, require a Self-Interrupt to priority level 6. Detected hardware malfunctions require a Self-Interrupt to priority level 15 to effectively remove the DAP from availability for execution of any programs until the error is eliminated. Finally, certain real-time data transfer signals, when detected by a DAP, require a Self-Interrupt to priority level 7.

The class of conditions of operation that requires initiation of a Request-Interrupt operation includes exceptional and erroneous conditions detected by the PEP. For example, when a data transfer operation by an external device terminates, when an external device is not ready to intiate a data transfer operation upon command, or when errors are detected in data being transferred, a Request-Interrupt to one of priority levels 8, 9, or 10 is required.

After a DAP encounters an instruction or condition of operation requiring execution of a higher priority program, the Priority Interrupt Initiation Sequence is entered by the DAP initiating a Read PL Mailbox operation, block 3 of Chart I. When a PEP encounters an instruction or condition of operation requiring execution of a higher priority program, the Priority Interrupt Initiation Sequence is entered by the PEP assembling a two-word Definer, block 8 of Chart I. The objective of both the DAP and the PEP in these first steps of the Priority Interrupt Initiation Sequence is to indirectly transfer to the DAP that will execute the required Operating System program information relating to the instruction or condition of operation that requires the Priority Interrupt. A PL Mailbox is the medium of communication in the instances wherein the DAP accepting the required Operating System program is to execute the program but once and then immediately resume its previous task. The Definer List is the medium of communication in the instances wherein the DAP accepting the required Operating System program is to repeatedly execute the program so long as requests for the program are queued prior to completion of each execution. The operation of the System when the Definer List is employed has been described previously; in one instance, in a general manner in the CIS section and in more detail in the subsection of the CIS section entitled "Highest Queued PL Encoder."

The Read PL Mailbox operation of block 3, Chart I, is executed to determine whether the PL Mailbox to be employed is "full" or "empty." The Read PL Mailbox operation is initiated when a DAP supplies a Symbolic Address wherein both the Program Number and the Symbolic Block Address represent zero and wherein the Symbolic Word Address has the bit structure $$010(PL-4)110$$

the notation "$PL-4$" representing a number four less than the priority level of the Operating System program required, Table 6. The CAT translates as an entity the Program Number and Symbolic Block Address into an identification of a particular block in the Operating System Memory and at the same time the CAT notifies the CIS that a Translate Mode operation is required. The CIS thereupon receives the Symbolic Word Address and, without translation, transfers this Address as the Actual Word Address to the Operating System Memory. The Actual Word Address identifies the first of a pair of cells in the Memory Block designated by the CAT, this cell pair being employed as the PL Mailbox for the priority level to be requested. The contents of the addressed PL Mailbox are thereupon retrieved and transferred to the initiating DAP, where they are interpreted. If a Priority Interrupt request to the same priority level has been made previously by another DAP and the corresponding program has not yet been accepted, the PL Mailbox for this program will be indicated as "full" by the states of certain digits in the PL Mailbox. On the other hand, if the PL Mailbox is "empty," the states of these digits so indicate.

If the addressed PL Mailbox is found to be full, the initiating DAP continues execution of the present program to the extent possible, and then initiates a new Read PL Mailbox operation. On the other hand, if the addressed PL Mailbox is found empty, the initiating DAP executes the next step in the Sequence.

After determining that the required PL Mailbox is empty, the initiating DAP assembles a two-word Definer based on the instruction or condition of operation encountered that requires execution of a Priority Interrupt. The Definer thereby provides information for the DAP that will subsequently accept the required Operating System program. The two words of the Definer directly or indirectly identify the instruction or the condition of operation encountered. For example, if the Priority Interrupt is required to initiate the transfer of data between an external device and the Memory group, the two words of the Definer may indicate the required direction of data transfer and symbolically identify the external unit required. If the Priority Interrupt is required to provide for the translation of an instruction, the Definer may comprise the instruction itself. If, on the other hand, a Subject Program error requires a Priority Interrupt operation, the nature of the error or the error, itself, such as an improper address or command code, may comprise a portion of the Definer. The Definer assembled for the PL Mailbox must also be provided with a digit configuration to indicate that the PL Mailbox is full.

After assembling the required Definer, the DAP initiates a Write PL Mailbox operation, block 5 of Chart I, for storing the Definer in the PL Mailbox of the required Operating System program. The Write PL Mailbox operation is initiated when a DAP supplies a Symbolic Address wherein both the Program Number and the Symbolic Block Address represent zero and wherein the Symbolic Word Address has the same bit structure as employed in the previously described Read PL Mailbox operation. The Symbolic Address is translated to an Actual Address identifying the first of the pair of cells comprising the PL Mailbox of the Operating System program to be requested, the priority level of this program being designated in the Symbolic Word Address. The two-word Definer is thereupon transferred from the originating DAP to the Memory group and stored in the addressed PL Mailbox.

If the instruction or condition of operation encountered precludes continuation of the program in which it appears, the DAP executing this program now requests the CIS to execute a Self-Interrupt; but if the program can be continued the DAP now requests the CIS to execute a Request-Interrupt.

The Self-Interrupt operation of the CIS, block 7 of Chart I, provides for the initiating DAP, itself, to be interrupted to assume execution of the required program. Thus, in initiating the Self-Interrupt a DAP is requesting that it be assigned an Operating System program of a specified higher priority level. The Self-Interrupt operation is initiated when a DAP supplies a Symbolic Address wherein both the Program Number and Symbolic Block Address represent zero and wherein the Symbolic Word Address has the bit structure 000010(PL), the notation "PL" representing the priority level of the Operating System program requested, Table 6. The CIS thereupon stores the requested priority level supplied by the Symbolic Word Address in Self-Interrupt PL Register 550 and stores an identification of the initiating DAP in a corresponding flip-flop of Self-Interrupt Control Register 514. The CIS then generates the corresponding DAD$i$ signal to notify the initiating DAP of the Priority Interrupt request.

Immediately following execution of the Self-Interrupt operation by the CIS, the initiating DAP responds to the DAD$i$ signal to enter the Priority Interrupt Acceptance Sequence.

The Request-Interrupt operation of the CIS, block 9 of Chart I, provides for one of the DAP's to be interrupted to assume execution of the required program. Thus, in initiating the Request-Interrupt a Processor is requesting that an Operating System program of a specified priority level be assigned to some DAP. The Request Interrupt operation is initiated when a Processor supplies a Symbolic Address wherein both the Program Number and the Symbolic Block Address represent zero and wherein the Symbolic Word Address has the bit structure 000001(PL), the notation "PL" representing the priority level of the Operating System program requested. The CIS thereupon stores a representation of the requested priority level supplied by the Symbolic Word Address in Queued PL Register 551. If the priority level representation inserted into Register 551 is the highest priority level queued therein and this level is greater than the priority level of a program being executed by one of the DAP's, Request Interrupt Control Register 513 will now store an identification of the DAP next to be interrupted to accept the requested Operating System program. The CIS thereupon generates the corresponding DAD$i$ signal to notify the DAP identified by Register 513 of the Priority Interrupt request. If, however, the priority level representation inserted into Register 551 is not the highest value queued therein, the requested program will not be accepted for execution by a DAP until all higher queued requests have been so accepted. Additionally, if the highest priority level queued in Register 551 is not greater than the priority level of any of the programs being executed by the DAP's, no DAP will be interrupted until a Current Program terminates and is replaced with a lower priority program.

Following execution of the Request-Interrupt operation by the CIS, the initiating Processor resumes executing its current program from the point where the instruction or condition of operation was encountered that require entry into the Priority Interrupt Initiation Sequence.

The Priority Interrupt Initiation Sequence is entered by the PEP assembling a two-word Definer, block 8 of Chart I. Similarly to the Definer assembled by the DAP during step 4, the Definer assembled by the PEP is based on the instruction or condition of operation encountered that requires execution of a Priority Interrupt. The Definer thereby provides information for the DAP that will subsequently accept the required Operating System program. For example, if the Priority Interrupt is required to complete the termination functions of an external device, the Definer may provide a designation of the external device involved and the channel through which the external device is coupled to the PEP. If the Priority Interrupt is required to provide resolution of an error condition in data being transferred by the PEP, the nature of the error and a designation of the external device involved may comprise the Definer. If the Priority Interrupt is required because an external device is not ready to initiate a data transfer operation upon command, the Definer may provide a designation of the external device involved, the channel through which the external device is coupled to the PEP, and a designation of the reason why the external device is not ready.

The Definer List in which the Definer assembled by the PEP is to be stored comprises sufficient memory storage space that the cells wherein the Definer is to be inserted will normally be empty. Accordingly, these cells need not be tested prior to storing such Definer, as is done when the Definer assembled by the DAP is to be stored in a PL Mailbox.

After assembling the required Definer, the PEP initiates a Write Request-Interrupt operation, block 9, of Chart I. The functions performed by the CIS in responding to this PEP request are substantially the same as those described above with respect to the Request-Interrupt initiated by a DAP. However, additionally, the Symbolic Word Address supplied by the PEP is translated to an Actual Word Address having the bit structure 00(PL)DEFNR)0, the notation "PL" representing the one of priority levels 8, 9, or 10, requested by the PEP and the notation "DEFNR" identifying the next vacant cell pair at the bottom of the corresponding Definer List. The Definer assembled by the PEP is thereupon transferred from the PEP to the Operating System Memory and stored in the Definer List cell pair identified by the Actual Address.

Following execution of the Request-Interrupt operation by the CIS, the initiating PEP resumes executing its current program from the point where the instruction or condition of operation was encountered that required entry into the Priority Interrupt Initiation Sequence.

*Priority interrupt acceptance sequence*

The Priority Interrupt Acceptance Sequence is entered after the CIS delivers a DAD$i$ signal, notifying the corresponding DAP-$i$ that it has been selected to interrupt its current program and accept for execution a higher priority program. During the Priority Interrupt Acceptance Sequence the responding DAP-$i$ interrupts its current program and initiates execution of the required higher priority program. The Sequence is concluded when this new higher priority program retrieves the corresponding Definer to determine the instruction or condition of operation that required initiation of this new program.

The first step of the Priority Interrupt Acceptance Sequence is executed after a DAP-$i$, while executing a Subject Program, block 1 of Chart I, or an Operating System program, block 17 of Chart II, receives the corresponding DAD$i$ signal, notifying DAP-$i$ that it has been selected to interrupt its current program and accept for execution a higher priority program. In the first step of the Priority Interrupt Acceptance Sequence, a DAP responds to the interrupt notification by initiating a Passive Mode, Read PL Table operation, block 10 of Chart II, to obtain the priority level of the program it is currently executing and to initiate operation at the priority level of the new program. The Read PL Table operation is initiated when a DAP supplies an appropriate Symbolic Address; for example, a Symbolic Address wherein the Program Number represents zero and the Symbolic Block Address represents one. The DAP also supplies the corresponding J/RD control signal denoting that the Passive Mode read operation is intended. The CAT translates as an entity the Program Number and Symbolic Block Address and at the same time notifies the CIS that a Passive Mode operation is required. The CIS thereupon transmits to the initiating DAP the priority level value in the corresponding PL Table register. If the DAP is responding to a Self-Interrupt, the priority level stored in Self-Interrupt PL Register 550 is then transferred into the corresponding PL Table register. However, if the DAP is responding to a Request-Interrupt, the higest recognized priority level represented in Queued PL Register 551 is transferred into the corresponding PL Table register. The newly stored priority level in the PL Table identifies the new Operating System program the responding DAP is to commence executing.

After receiving the priority level of the program it has been executing, the responding DAP assembles a two-word status set representing the current status of the program being interrupted. The status set provides information for subsequently resuming execution of the program from the point of interruption. The current status of the program being interrupted includes the following items of information:

(a) The Program Number,
(b) The priority level, which has been retrieved from the PL Table,
(c) The Instruction Counter contents, comprising the Symbolic Address of the next instruction to be executed,
(d) The count of the DAP "clock,"
(e) The collective state of a set of "indicators," which represents the current status of certain conditions of the program being executed, and
(f) The contents of the Accumulator, if the Accumulator is a register apart from the Memory group, or the Symbolic Address of the memory location of the Accumulator, if the Accumulator comprises cells within the Memory group.

If two Data Words are insufficient to represent this status information, a four-word status set may be employed. To accommodate a four-word status set, it is within the scope of the instant invention to provide for the retrieval or storage of four Data Words in successive Memory locations with a single memory request.

Following assembly of the required status set, the DAP initiates a Write Status Table operation, block 12 of Chart II, for storing the status set in the status table provided for the initiating DAP. The Write Status Table operation is initiated when a DAP supplies a Symbolic Address wherein the Program Number, the Symbolic Block Address, and the Symbolic Word Address each represents zero, Table 6. The initiating DAP-*i* also supplies the cor-

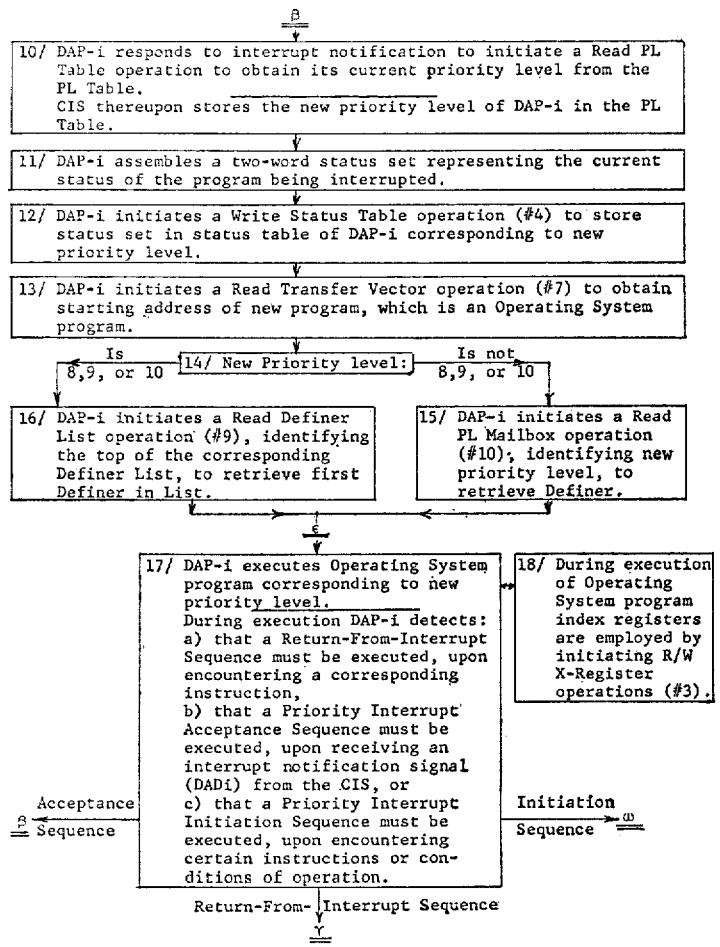

CHART II - PRIORITY INTERRUPT ACCEPTANCE SEQUENCE responding J*i*WR Clear-Write control signal. The Symbolic Address is translated to an Actual Address identifying the first cell of one of the sets of cells in the status table of the Operating System Memory assigned to the initiating DAP, the particular cell set corresponding to the new priority level, Tables 6 and 7. The status set is thereupon transferred from the originating DAP to the Memory group and stored in the addressed status table cells. Accordingly, the status table provided for the responding DAP now stores the status of the interrupted program in the status table portion corresponding to the new priority level.

Following storage of the status set, the responding DAP commences execution of the new program by initiating a Read Transfer Vector operation, block 13 of Chart II, to obtain the transfer vector, or starting address of the new program. The Read Transfer Vector operation is initiated when a DAP supplies a Symbolic Address wherein both the Program Number and the Symbolic Block Address represent zero and wherein the Symbolic Word Address has the bit structure 0000001100. The Symbolic Address is translated to an Actual Address identifying a cell in the Operating System Memory assigned to the responding DAP, the particular cell corresponding to the priority level of the new Operating System program, Table 6. The identified cell contains the Symbolic Address of the first instruction of the Operating System program being initiated. The transfer vector in the addressed cell is thereupon retrieved and transferred to the initiating DAP, where it is inserted into the Instruction Counter to provide the symbolic memory location of the first instruction of the new program.

When the new program is commenced, information must be obtained as to the reason why execution of the program was requested. Accordingly, the Definer providing this information is retrieved from its loaction in the Operating System Memory. If the new program is opearting at priority level 8, 9 or 10 the required Definer is stored in a Definer List, so that the DAP executing this new program requests the CIS to initiate a Read Definer List operation. However, if the new program is not operating at priority level 8, 9 or 10 the required Definer is stored in a PL Mailbox, so that the DAP executing this new program requests the CIS to initiate a Read PL Mailbox operation.

The Read PL Mailbox operation of block 15, Chart II, is executed to retrieve the Definer prepared for a newly initiated Operating System program of priority level other than priority levels 8, 9 or 10. The Read PL Mailbox operation is initiated when a DAP supplies a Symbolic Address wherein both the Program Number and the Symbolic Block Address represent zero and wherein the Symbolic Word Address has the bit structure 010(*PL*—4)110, the notation "*PL*—4" representing a number four less than the priority level of the Operating System program initiating the instant operation. The CIS transfers the Symbolic Word Address, untranslated, as an Actual Word Address to the Operating System Memory. The Actual Address designates the first of the pair of cells in the Operating System Memory employed as the PL Mailbox for the Operating System program involved. The Definer contents of the addressed PL Mailbox are thereupon retrieved and transferred to the initiating DAP, the Definer providing direction for the Operating System program to effect the functions for which the program was initiated. The Read PL Mailbox operation of block 15, Chart II, may be followed at once by a corresponding Write PL Mailbox operation, not shown, to modify the digit configuration in the PL Mailbox from which the Definer was retrieved to indicate that this PL Mailbox is now empty and, therefore, can be used for another Priority Interrupt operation.

The Read Definer List operation of block 16, Chart II, is executed to retrieve the Definer prepared for a newly initiated Operating System program of priority levels 8, 9 or 10. The Read Definer List operation is initiated when a DAP supplies a Symbolic Address wherein both the Program Number and the Symbolic Block Address represent zero and wherein the Symbolic Word Address has one of three different bit structures corresponding to the priority level of the Operating System program, Table 6. Each of these Symbolic Word Addresses comprises a variable quantity, designated by the notation "DEFNR," identifying the cell pair at the top of the corresponding Definer List. The CIS transfers the Symbolic Word Address, untranslated, as an Actual Word Address to the Operating System Memory. The Actual Address identifies the first of the pair of cells at the top of the corresponding Definer List. The top of a Definer List stores the Definer provided by the longest waiting and unanswered Request-Interrupt to the corresponding priority level. The Definer contents of the addressed Definer List cells are thereupon retrieved and transferred to the initiating DAP, the Definer providing direction for the Operating System program to effect the functions for which the program was initiated. The Read Definer List operation of block 16, Chart II, may be followed at once by a corresponding Clear-Write memory cycle, not shown, wherein the same Symbolic Address is provided as in the immediately preceding Read Definer List operation. The Clear-Write operation modifies the digit configuration in the Definer List cell pair from which the Definer was retrieved to indicate that this cell pair is now empty.

Following retrieval of the required Definer, the initiating DAP proceeds with the execution of its current Operating System program, block 17 of Chart II. During execution of an Operating System program, a DAP frequently requires the use of an index register to store information. Six index registers are reserved in the Operating System Memory for the exclusive use of each different priority level Operating System program. A DAP communicates with one of these index registers by initiating a Read X-Register operation or a Write X-Register operation, block 18 of Chart II. A Read or Write X-Register operation is initiated when a DAP supplies a Symbolic Address wherein both the Program Number and Symbolic Block Address represent zero and wherein the Symbolic Word Address has the bit structure 0000000($\underline{X}$), the notation "X" being a number from 1 to 6 for symbolically denoting one of the six index registers assigned to the priority level of the current Operating System program. The Symbolic Word Address is translated to an Actual Word Address designating the symbolically requested one of six index registers in the Operating System Memory portion assigned to the priority level of the initiating Operation System program. A Data Word is then transferred from the initiating DAP-*i* to the Memory group and stored in the addressed index register, if DAP-*i* is delivering the corresponding J*i*WR control signal for directing a Clear-Write memory cycle. A Data Word is retrieved from the addressed index register and transferred to the initiating DAP-*i*, if DAP-*i* is delivering the corresponding J*i*RD control signal for directing a Read-Restore memory cycle.

When a DAP is executing an Operating System program of priority level 8, 9, or 10, a new Priority Interrupt Acceptance Sequence to the same priority level is not required so long as the corresponding Definer List has one or more cell pairs full. A DAP operating at priority level 8, 9, or 10 repeatedly executes the corresponding Operating System program, each time commencing the program by initiating a Read Definer List operation that retrieves the next succeeding Definer cell pair, in the respective Definer List. So long as the program continues to find a Definer in its Definer List the program is repeated, but the program terminates upon reading its Definer List and finding the next Definer List cell pair empty. Accordingly, a DAP executing an Operating System program can service rapidly and efficiently a series of similar recurring conditions; for example, the termination of a data transfer operation by each of a large number of external devices.

Return-from-interrupt sequence

The Return-from-Interrupt Sequence is entered after a return-from-interrupt instruction is encountered during the regular termination of an Operating System program. During the Return-from-Interrupt Sequence a DAP initiates execution, from the point of interruption, of the lower priority program that was interrupted to permit execution of the presently terminating Operating System program. The Sequence is concluded when the DAP commences executing the previously interrupted program.

The first step of the Return-from-Interrupt Sequence is executed after a return-from-interrupt instruction is encountered by a DAP while executing an Operating System program, block 17 of Chart II. In the first step of the Return-from-Interrupt Sequence, a DAP initiates a Read Status Table operation, block 20 of Chart III, to obtain the status set of the program interrupted to permit execution of the presently terminating Operating System program. The Read Status Table operation is initiated when a DAP supplies a Symbolic Address wherein the Program Number, the Symbolic Block Address, and the Symbolic Word Address each represents zero, Table 6. The initiating DAP-*i* also supplies the corresponding J*i*RD Read-Restore control signal. As described previously, the Symbolic Address is translated to an Actual Address identifying the first cell of one of the sets of cells in the status table of the Operating System Memory assigned to the initiating DAP, the particular cell set corresponding to the priority level of the terminating Operating System program. The status set in the addressed status table cells is thereupon retrieved and transferred to the initiating DAP. The initiating DAP thereupon transfers the various items of information represented in the status set to the corresponding registers and memory locations.

that the Passive Mode write operation is intended. The CAT translates as an entity the Program Number and Symbolic Block Address and at the same time notifies the CIS that a Passive Mode operation is required. The initiating DAP thereupon transmits the priority level obtained from the retrieved status set to the CIS, and the CIS stores this priority level in the PL Table register assigned to the initiating DAP. The newly stored priority level in the PL Table is the priority level of the program the DAP is now to commence executing.

Following storage of the priority level in the PL Table, the initiating DAP commences execution of the interrupted program, from the point of interruption, by employing the information provided in the retrieved status set. The interrupted program that is to be executed may be either a Subject Program or an Operating System program.

The Return-from-Interrupt Sequence may also be employed to provide initiation of a new Subject Program when an Operating System program is terminating. For example, when a DAP determines that the Subject Program it is executing is terminating, the DAP initiates a Self-Interrupt to priority level 5. The Executive Routine of the priority level 5, General Control program thereupon provides the required terminating functions for the old Subject Program and prepares to initiate the most urgent and qualified Subject Program of the Scheduled Programs. The Executive Routine thereupon controls storage of a previously prepared status set in the status table of the DAP executing the Executive Routine, the status set being stored in the cells of this status table that correspond to the priority level of the General Control program. The status set may be stored by execution of a Write Status Table operation, thereby overwriting the status set of the now-terminated Subject Program. The Return-from-Interrupt Sequence is then entered for initiating execution of the new Subject Program.

CHART III

RETURN-FROM-INTERRUPT SEQUENCE

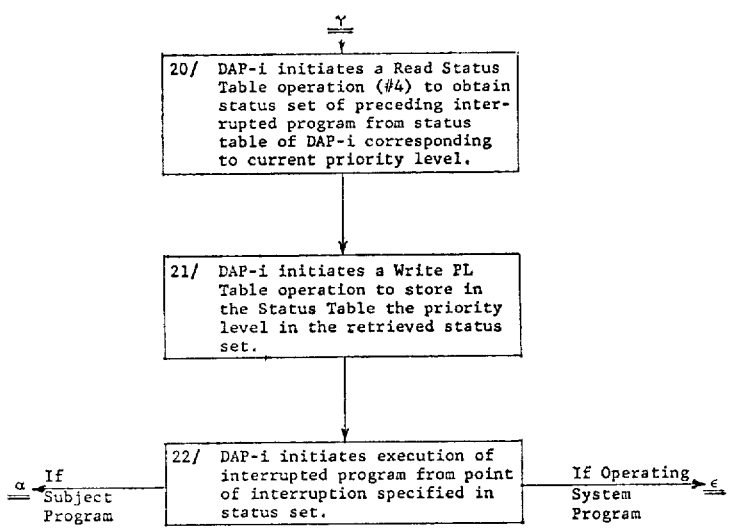

Following retrieval of the status set, the DAP initiates a Passive Mode, Write PL Table operation, block 21 of Chart III, to store in the PL Table the priority level of the program which the DAP is now to commence executing. The Write PL Table operation is initiated, in conformance with the previously described Passive Mode example, when a DAP supplies a Symbolic Address wherein the Program Number represents zero and the Symbolic Block Address represents one. The DAP also supplies the corresponding J*i*WR control signal denoting

Alert sequence

The Alert Sequence is entered after a first one of the Processors encounters an instruction or condition of operation requiring the transmission of information to a second one of the Processors. Execution of the Alert Sequence provides for transmission of the required information from the first Processor to a memory location accessible to the second Processor. The Sequence is concluded when the first Processor delivers a signal to alert the second Processor that the information is now available.

The first step of the Alert Sequence is executed after any Processor-$i_1$, while executing a Subject Program or an Operating System program, encounters an instruction or condition of operation requiring the transmission of information to any other Processor-$i_2$, block 30 of Chart IV. In the first step of the Alert-Sequence, Processor-$i_1$ assembles a two-word communication set comprising the information required to be transmitted, block 31 of Chart IV. For example, in one mode of employment of the Alert Sequence a DAP executing an Input/Output Initiation program, which is an Operating System program of priority level 7, determines that a particular external device must commence a data transfer operation. The communication set assembled in this instance may comprise an identification of the external device, the required direction of data transfer with respect to the device, the amount of data to be transferred, and the starting Symbolic Address in the Memory which is to receive data to be supplied by Processor-$i_2$ or which is to transmit data to be received by Processor-$i_2$.

originating Processor-$i_1$ to the Memory group and stored in the addressed Processor Mailbox. In the example being considered in this subsection, wherein a DAP is required to communicate information with respect to an external device that must commence a data transfer operation, the communication set assembled by the DAP is transferred to the Processor Mailbox of the PEP by the Write Non-Translate Operation described herein.

Although not shown herein, the above-mentioned Clear-Write operation to store a communication set in a Processor Mailbox may be preceded by a Read-Restore operation employing the same Symbolic Address to determine whether the Processor Mailbox is empty; i.e., an operation similar to that of block 3 of Chart I.

Following storage of the communication set, Processor-$i_1$ initiates an Alert Processor operation, block 33 of Chart IV, for notifying Processor-$i_2$ that a communication set has been stored and is now available in the Processor Mailbox of Processor-$i_2$. The Alert Processor operation is initiated when Processor-$i_1$ supplies a Symbolic Address wherein both the Program Number and the Symbolic Block Address represent zero and wherein

CHART IV

ALERT SEQUENCE

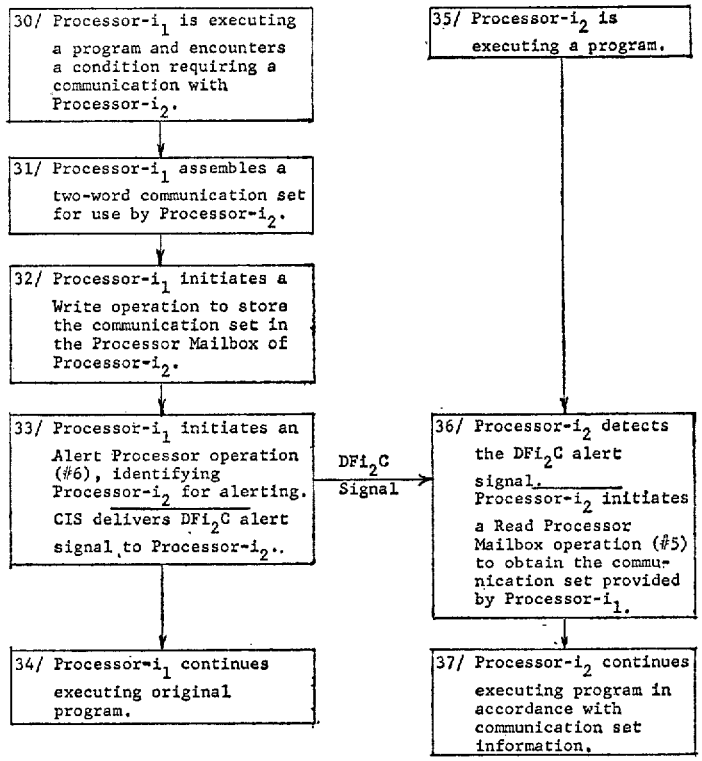

After assembling the communication set, Processor-$i_1$ initiates a Write Non-Translate operation, block 32 of Chart IV, for storing the communication set in the Processor Mailbox of Processor-$i_2$. The Write Non-Translate operation is initiated when Processor-$i_1$ supplies a Symbolic Address wherein both the Program Number and the Symbolic Block Address represent zero and wherein the Symbolic Word Address has the bit structure 000011($\overline{PR}$)00, the notation "PR" symbolically representing the Processor-$i_2$ which is subsequently to receive the required communication, Table 6. The CIS transfers the Symbolic Word Address, untranslated, as an Actual Word Address to the Operating System Memory. The Actual Word Address designates the first of a pair of cells in the Operating System Memory employed as the Processor Mailbox assigned to Processor-$i_2$, the Processor for which the communication is intended. The two-word communication set is thereupon transferred from the the Symbolic Word Address has the bit structure 00000010($\overline{PR}$), the notation "PR" symbolically identifying the Processor-$i_2$ to be alerted. The CIS thereupon delivers the corresponding DF$i_2$C alert signal to notify Processor-$i_2$ that it has been selected to receive a communication through its Processor Mailbox.

Following execution of the Alert Processor operation, the initiating Processor-$i_1$ resumes executing its current program from the point where the instruction or condition of operation was encountered that required entry into the Alert Sequence.

Processor-$i_2$, meanwhile, has been busy executing another program. When the DF$i_2$C alert signal is delivered by the CIS, the signal is detected by Processor-$i_2$, block 36 of Chart IV. Following its detection of the alert signal, Processor-$i_2$ initiates a Read Processor Mailbox operation for retrieving the communication set which the alert signal denoted as having been stored in the Processor Mailbox of Processor-$i_2$. The Read Processor Mailbox operation is initiated when Processor-$i_2$ supplies a Symbolic Address wherein both the Program Number and the Symbolic Block Address represent zero and wherein the Symbolic Word Address has the bit structure 0000000111. The Symbolic Address is translated to an Actual Address designated the first of the pair of cells compirsing the Processor Mailbox of Processor-$i_2$. The communication set contents of the addressed cell pair is thereupon retrieved and transferred to Processor-$i_2$.

Following retrieval of the communication set, Processor-$i_2$ responds to the information therein. In the example being considered, wherein the communication set provides information relating to the initiation of a data transfer operation, the PEP responds to the communication set to control the specified external device to initiate a data transfer operation in accordance with the information provided by the communication set.

Three means of communication between Processors and programs have been described in the instant section. The PL Mailbox and the Definers Lists transmit information from a lower priority program to a higher priority program to a higher priority program, the higher priority program being initiated to perform an operation because of a situation encountered in the lower priority program and specified by the contents of the PL Mailbox or Definer List. The Processor Mailbox transmits information between two Processors, the communication being provided regardless of the priority levels of the programs being executed by the two Processors. The information transmitted by the PL Mailbox is stored therein during a Write PL Mailbox operation and the information transmitted by the Definer List is stored therein during a Request-Interrupt operation. On the other hand, the information transmitted by the Processor Mailbox is stored therein during a Clear-Write memory cycle operation in which the CIS executes a Non-Translate operation.

CIS internal sequences

The immediately preceding subsections describe four operational sequences of the Multicomputer System wherein the CIS participates. In each of these sequences, the CIS executes one or more complete operations, each such operation involving a respective sequence of states within the CIS. The sequence of states of each CIS operation is described in detail in the succeeding subsections. For clarity, timing diagrams are provided to illustrate the significant events in each state of the sequences of the Translate Mode operations, whereas waveforms are provided to illustrate the significant events in each state of the sequences of the Passive Mode operations. The function of each CIS operation has been described previously in the "Central Interrupt Scheduler" section.

Translate mode sequences

All Translate Mode sequences have a common initial phase, FIG. 94, which comprises the first three states of each of the sequences. A Translate Mode sequence is initiated and enters state-$\tau_1$ from state-$\tau_0$, the quiescent state, when one or more Processors request a Translate Mode operation during state-$\tau_0$. The request for a Translate Mode operation by a Processor-$i$ is represented by the corresponding DH$i$C signal delivered by the CAT. In state-$\tau_1$ the Translate Mode requests are entered into Request Register 501. One of the Translate Mode requests stored in Register 501 is thereupon recognized by Priority Allocation Logic Unit 502 and the corresponding Processor is granted the requested Translate Mode operation. The DH$i$E signal delivered by Logic Unit 502 notifies the CCS that the request of Processsor-$i$ for a Translate Mode operation has been granted.

The Translate Mode sequence enters state-$\tau_2$ when Logic Unit 502 delivers a DH$i$E signal, denoting that a Processor-$i$ has been granted a Translate Mode operation. In state-$\tau_2$ the DH$i$E signal is transmitted to the CAX and enables transmission to the CIS of the Symbolic Word Address supplied by the corresponding Processor-$i$.

At the same time the CAX transmits the DHSM signal to notify the CIS of the availability of the Symbolic Word Address.

The Translate Mode operation enters state-$\tau_3$ when the CIS receives the DHSM signal. In state-$\tau_3$ the Symbolic Word Address is decoded by Symbolic Word Address Decoder 507, which thereupon delivers one of the eight different control signals for controlling the distinctive events in the ensuing portion of the current Translate Mode operation. During normal operation, the Translate Mode sequence now leaves the common initial phase and enters state-$\tau_4$. However, in certain circumstances the Translate Mode does not enter state-$\tau_4$ when one of the control signals are delivered by Decoder 507. In these circumstances the operations are identified as the Abort-1 and Abort-2 variations of the Self-Interrupt operation and will be described in detail hereinafter.

Self-interrupt sequence

The Translate Mode sequence is identified as a Self-Interrupt sequence if the Symbolic Word Address has the bit structure 000010(PL). Thus, the Self-Interrupt sequence enters state-$\tau_4$, FIG. 95, when the DHS5 signal of the Symbolic Word Address is a binary 1 and Decoder 507, upon decoding the Symbolic Word Address, generates the DCAN control signal. In state-$\tau_4$ the priority level of the required Operating System program, designated by the Symbolic Word Address, is loaded into Self-Interrupt PL Register 550. At the same time Self-Interrupt Control Register 514 is loaded with an identification of the DAP initiating the instant Self-Interrupt request. Immediately following the loading of Register 514, the CIS responds to the DAP identification therein to deliver the corresponding DADi signal for notifying the corresponding DAP-$i$ of the Priority Interrupt requirement.

The Self-Interrupt sequence automatically enters state-$\tau_5$ from state-$\tau_4$. In state-$\tau_5$ the Symbolic Word Address is translated by Actual Word Address Encoder 508 into the corresponding Actual Word Address, which is transmitted to the CAX. At the same time the CIS transmits the DHAM signal to notify the CCS of the availability of the Actual Word Address provided by the CIS. The CAX subsequently transmits the Actual Word Address provided by the CIS to the Operating System Memory, as designated by the CAT. The Actual Word Address provided in the Self-Interrupt sequence identifies a "Dummy" cell in the Operating System Memory (Table 6 and 7), a cell whose contents normally are not significant. This cell is used to receive or to supply a Data Word normally having no significance, in accordance with whether the initiating DAP requests a Clear-Write or Read-Restore memory cycle in initiating the Self-Interrupt. Following receipt of the Actual Address, the Operating System Memory indirectly controls the CAX to deliver the DHAR signal for notifying the CIS that the Actual Word Address provided thereby has been received by the Operating System Memory.

The Self-Interrupt sequence enters state-$\tau_6$ when the CIS receives the DHAR signal. At this time the required functions of the Self-Interrupt sequence have been substantially completed. Accordingly, in state-$\tau_6$ Request Register 501 is cleared, whereupon the DH$i$E signal being delivered becomes a binary 0. When the DH$i$E signal becomes a binary 0, transmission to the CIS of the Symbolic Word Address is discontinued, and this discontinuance terminates the Actual Word Address transmitted by the CIS.

The clearing of Register 501 controls the Self-Interrupt sequence to enter state-$\tau_7$. The discontinuance of the Symbolic Word Address terminates the Self-Interrupt sequence by restoring the CIS to state-$\tau_0$.

The Abort variations of the Self-Interrupt sequence are provided if a Self-Interrupt operation is queued (DSAQ) at the time a DAP initiates and is granted a Self-Interrupt operation. Once a Self-Interrupt has been requested, the request has been accepted by the CIS, the requesting DAP has been identified in Register 514, and the requested priority level has been stored in Register 550, the CIS is no longer capable of responding to a new Self-Interrupt request until the former request is answered by the identified DAP. Accordingly, if a preceding Self-Interrupt is queued in the CIS when a Self-Interrupt request is made the CIS will not respond, but instead will attempt to execute another type of Translate Mode operation requested by another Processor, or will await a request for another type fo Translate Mode operation or for a Passive Mode operation.

The Abort-1 variation, FIGS. 96 and 97, becomes effective if a Self-Interrupt is queued at the time a DAP requests a Self-Interrupt, and if at this time no other DAP is requesting a Translate Mode operation. The logical schematic diagram for the circuit generating the DAB1 signal for controlling the Abort-1 variation, is:

$$DSAQ\ DCAN\ DHS5\ \overline{DMPR}\ \overline{FSRC}\ FSRB\ \overline{FSRA}=DAB1$$

The above diagram illustrates the generation of the DAB1 signal if a previous Self-Interrupt operation is queued (DSAQ) when a DAP requests a Self-Interrupt (DCAN DHS5), and if at this time no other DAP is requesting a Translate Mode operation ($\overline{DMPR}$). The DAB1 signal issues during state-$\tau_3$ ($\overline{FSRC}$ FSRB $\overline{FSRA}$) and restores the Sequencer to state-$\tau_0$ by providing generation of the C-SRB clock signal to reset the FSRB flip-flop of the Sequencer. The request for the Self-Interrupt that initiated the Abort-1 variation remains queued in Register 501. However, by restoring the CIS to state-$\tau_0$, later occurring requests for CIS operations may also be entered into Register 501, whereupon when the CIS again returns to state-$\tau_3$ the Abort-1 variation may not be necessary. However, until another Processor requests a CIS operation, the CIS continues to cycle repetitively between state-$\tau_0$ and state-$\tau_3$.

The Abort-2 variation, FIGS. 96 and 97, becomes effective if a Self-Interrupt is queued at the time a DAP requests a Self-Interrupt, and if at this time another DAP is requesting a Translate Mode operation. The logical schemataic diagram for the circuit generating the DAB2 signal for controlling the Abort-2 variation, is:

$$DSAQ\ DCAN\ DHS5\ DMPR=DAB2$$

The above diagram illustrates the generation of the DAB2 signal if a previous Self-Interrupt operation is queued (DSAQ) when a DAP requests a Self-Interrupt (DCAN DHS5), and if at this time another DAP is also requesting a Translate Mode operation (DMPR). The DAB2 signal provides clearing of the FDP$i$ flip-flop of Register 501 corresponding to the DAP-$i$ recognized for the current Self-Interrupt operation. Each DSD$i$ signal delivered by Logic Unit 502 is coupled to the 0-input lead of the respective FDP$i$ flip-flop, and when the corresponding DAP-$i$ is granted a Translate Mode operation, resetting of the FDP$i$ flip-flop is continuously enabled. The DAB2 signal controls generation of a clock signal to activate the resetting of the enabled FDP$i$ flip-flop. Thus, the DAB2 signal clears Request Register 501 of the Self-Interrupt request which the CIS cannot execute, thereby permitting one of the remaining DAP requests which has been stored, but not previously recognized, to now be recognized by Logic Unit 502. The DAB2 signal also prevents the Sequencer from advancing to state-$\tau_4$, thereby providing sufficient time for the newly recognized DAP to control transfer of the corresponding Symbolic Word Address to the CIS, for the new Symbolic Word Address to be decoded, and for the corresponding new control signal to be delivered by Decoder 507.

If three DAP requests are stored in Register 501 at the time of the issuance of the DAB2 signal, the newly recognized DAP request either enables completion of the Translate Mode sequence (if not a Self-Interrupt request) or controls a second issuance of the DAB2 signal (if a Self-Interrupt request), FIG. 97. If two DAP requests are stored in Register 501 at the time of the issuance of the DAB2 signal, the newly recognized DAP request either enables completion of the Translate Mode sequence (if not a Self-Interrupt request) or controls the issuance of the DAB1 signal (if a Self-Interrupt request).

Request-interrupt sequence (PL 5 or 7)

The Translate Mode sequence is identified as a Request-Interrupt sequence if the Symbolic Word Address has the bit structure 000001($\underline{PL}$). Thus, the Request-Interrupt sequence enters state-$\tau_4$, FIG. 98, when the DHS4 signal of the Symbolic Word Address is a binary 1 and Decoder 507, upon decoding the Symbolic Word Address, generates the DCAN control signal. In state-$\tau_4$ a representation of the priority level of the required Operating System program, designated by the Symbolic Word Address, is loaded into Queued PL Register 551. At the same time, the TRCA one-shot is triggered to its unstable 1-state if Request-Interrupt Control Register 513 is clear, the TRCA one-shot remaining in the unstable state for 500 ns.

The Request-Interrupt sequence automatically enters state-$\tau_5$ from state-$\tau_4$. In state-$\tau_5$ the Symbolic Word Address is translated by Actual Word Address Encoder 508 into the corresponding Actual Word Address, which is then transmitted to the CAX. At the same time the CIS transmits the DHAM signal to notify the CCS of the availability of the Actual Word Address provided by the CIS. The CAX subsequently transmits the Actual Word Address provided by the CIS of the Operating System Memory, as designated by the CAT. The Actual Word Address provided for the Request-Interrupt to priority level 5 or 7 identifies a "Dummy" cell in the Operating System Memory. The function of the Dummy cell is described in the preceding "Self-Interrupt Sequence" subsection. Following receipt of the Actual Address, the Operating System Memory indirectly controls the CAX to deliver the DHAR signal for notifying the CIS that the Actual Word Address provided thereby has been received.

The Request-Interrupt sequence enters state-$\tau_6$ when the CIS receives the DHAR signal. At this time the required functions of the Request-Interrupt sequence have been substantially completed. Accordingly, in state-$\tau_6$ Request Register 501 is cleared, whereupon the DH$i$E signal being delivered becomes a binary 0. When the DH$i$E signal becomes a binary 0, transmission to the CIS of the Symbolic Word Address is discontinued, and this discontinuance terminates the Actual Word Address transmitted by the CIS.

The clearing of Register 501 controls the Request-Interrupt sequence to enter state-$\tau_7$. The discontinuance of the Symbolic Word Address enables termination of the Request-Interrupt sequence by enabling the Sequencer to transfer to state-$\tau_0$. However, the enabled Sequencer is not activated to return to the 0-state unless the TRCA one-shot is in the 0-state. Therefore, if the TRCA one-shot had been triggered in state-$\tau_4$, the CIS is not restored to state-$\tau_0$ until the TRCA one-shot reverts to the 0-state.

The return of the TRCA one-shot to the 0-state sets an FRD$i$ flip-flop of Register 513 corresponding to the DAP-$i$ executing the lowest priority level program, provided that at this time the highest recognized priority level queued in Register 551 is greater than this lowest priority level program. Immediately following the setting of the FRD$i$ flip-flop, the corresponding DAD$i$ signal is delivered for notifying DAP-$i$ of the Priority Interrupt requirement. An FRD$i$ flip-flop cannot be set if the corresponding FSC$i$ flip-flop of Register 514 is in the 1-state, denoting a queued Self-Interrupt for the same DAP-$i$. Furthermore, if an FRD*i* flip-flop is in the 1-state when the corresponding FSC*i* flip-flop is set, the FRD*i* flip-flop will be reset.

Request-interrupt sequence (PL 8, 9, or 10)

The Translate Mode sequence is identified as a Request-Interrupt sequence if the Symbolic Word Address has the bit structure 000001(PL). Thus, the Request-Interrupt sequence enters state-$\tau_4$, FIG. 99, when the DHS4 signal of the Symbolic Word Address is a binary 1 and Decoder 507, upon decoding the Symbolic Word Address, generates the DCAN control signal. In state-$\tau_4$, a representation of the priority level of the required Operating System program, designated by the Symbolic Word Address, is loaded into Queued PL Register 551 if the Register is not presently storing the representation. At the same time, the TRCA one-shot is triggered to its unstable 1-state if Request-Interrupt Control Register 513 is clear, the TRCA one-shot remaining in the unstable state for 500 ns.

The Request-Interrupt sequence automatically enters state-$\tau_5$ from state-$\tau_4$. In state-$\tau_5$ the Symbolic Word Address is translated by Actual Word Address Encoder 508 into the corresponding Actual Word Address, which is then transmitted to the CAX. At the same time the CIS transmits the DHAM signal to notify the CCS of the availability of the Actual Word Address provided by the CIS. The CAX subsequently transmits the Actual Word Address provided by the CIS to the Operating System Memory, as desginated by the CAT. The Actual Word Address provided for the Request-Interrupt to priority level 8, 9, or 10 has the bit structure 00(PL)(DEFNR)0, the notation "PL" representing the one of priority levels 8, 9, or 10 designated by the Symbolic Word Address and the notation "DEFNR" identifying the next vacant cell pair at the bottom of the Definer List corresponding to the designated priority level. The "DEFNR" representation is supplied by the one of Definer Counters 570, 571, and 572 corresponding to the designated priority level. The cell pair identified by the Actual Word Address will now receive the Defined assembled by the PEP in preparation for the instant Request-Interrupt operation. Following receipt of the Actual Word Address, the Operating System Memory indirectly controls the CAX to deliver the DHAR signal for notifying the CIS that the Actual Word Address provided thereby has been received.

The Request-Interrupt sequence enters state-$\tau_6$ when the CIS receives the DHAR signal. At this time the required functions of the Request-Interrupt sequence have been substantially completed. Accordingly, in state-$\tau_6$ Request Register 501 is cleared, whereupon the DH*i*E signal being delivered becomes a binary 0. When the DH*i*E signal becomes a binary 0, transmission to the CIS of the Symbolic Word Address is discontinued, and this discontinuance terminates the Actual Word Address transmitted by the CIS. At the same time the discontinuance of the Symbolic Word Address increments the count in the Definer Counter that supplied the "DEFNR" representation for the Actual Word Address. This new count, for use in the next-corresponding Request-Interrupt sequence, identifies the Definer List vacant cell pair following the cell pair receiving the Definer during the instant sequence.

The clearing of Register 501 controls the Request-Interrupt sequence to enter state-$\tau_7$. The discontinuance of the Symbolic Word Address enables termination of the Request-Interrupt sequence by enabling the Sequencer to transfer to the state-$\tau_0$. However, the enabled Sequencer is not activated to return to the 0-state unless the TRCA one-shot is in the 0-state. Therefore, if the TRCA one-shot had been triggered in state-$\tau_4$, the CIS is not restored to state-$\tau_0$ until the TRCA one-shot reverts to the 0-state.

The return of the TRCA one-shot to the 0-state sets an FRD*i* flip-flop of Register 513 corresponding to the DAP-*i* executing the lowest priority level program, provided that at this time the highest recognized priority level queued in Register 551 is greater than this lowest priority level program. However, if a DAP is currently executing a priority level 8, 9, or 10 program, the corresponding representation in Register 551 is not recognized in determining the highest queued priority level therein. Instead, a DAP operating at priority level 8, 9, or 10 repeatedly executes the corresponding Operating System program so long as unanswered Request-Interrupts to the priority level of operation exist.

Immediately following the setting of an FRD*i* flip-flop, the corresponding DAD*i* signal is delivered for notifying DAP-*i* of the Priority Interrupt requirement. An FRD*i* flip-flop cannot be set if the corresponding FSC*i* flip-flop of Register 514 is in the 1-state, denoting a queued Self-Interrupt for the same DAP-*i*. Furthermore, if an FRD*i* flip-flop is in the 1-state when the corresponding FSC*i* flip-flop is set, the FRD*i* flip-flop will be reset.

Read/write X-register sequence

The Translate Mode sequence is identified as a Read/Write X-Register sequence if the Symbolic Word Address has the bit structure 0000000(X). Thus, the R/W X-Register sequence enters state-$\tau_4$, FIG. 100, when Decoder 507, upon decoding the Symbolic Word Address, generates the DCXR control signal.

The R/W X-Register sequence automatically enters state-$\tau_5$ from state-$\tau_4$. In state-$\tau_5$ the Symbolic Word Address is translated by Encoder 508 into the corresponding Actual Word Address, which is then transmitted to the CAX. At the same time, the CIS transmits the DHAM signal to notify the CCS of the availability of the Actual Word Address provided by the CIS. The CAX subsequently transmits the Actual Word Address provided by the CIS to the Operating System Memory, as designated by the CAT. The Actual Word Address provided in the R/W X-Register sequence has the bit structure $$010(PL-4)(X-1)$$

the notation "PL—4" representing a number four less than the priority level of the Operating System program initiating the instant sequence, and the notation "X—1" representing a number one less than the symbolic number of the index register designated by the Symbolic Word Address. Since 4 is the lowest possible priority level of an Operating System program and 1 is the lowest allowable symbolic identification of an index register for an Operating System program, 0 is the lowest value that can be assumed by each of the notations "PL—4" and "X—1." The Operating System index register identified by the Actual Word Address is employed to receive or supply a Data Word according to whether a Write or Read X-Register operation is requested.

Following receipt of the Actual Address, the Operating System Memory indirectly controls the CAX to deliver the DHAR signal for notifying the CIS that the Actual Word Address provided thereby has been received. The required functions of the Read/Write X-Register sequence having been substantially completed at this time, the CIS enters state-$\tau_6$ and the sequence is terminated in the manner described in the preceding "Self-Interrupt Sequence" subsection.

Read/write status table sequence

The translate Mode sequence is identified as a Read/Write Status Table sequence if the Symbolic Word Address has the bit structure 0000000000. Thus, the R/W Status Table sequence enters state-$\tau_4$, FIG. 101, when Decoder 507, upon decoding the Symbolic Word Address, generates the DCST control signal.

The R/W Status Table sequence automatically enters state-$\tau_5$ from state-$\tau_4$. In state-$\tau_5$ the Symbolic Word Address is translated by Encoder 508 into the corresponding Actual Word Address, which is then transmitted to the CAX. At the same time, the CIS transmits the DHAM signal to notify the CCS of the availability of the Actual Word Address provided by the CIS. The CAX subsequently transmits the Actual Word Address provided by the CIS to the Operating System Memory, as designated by the CAT. The Actual Word Address provided in the R/W Status Table sequence has one of the following bit structures:

$$0111(PL-4)00:DAP\text{-}A$$
$$1000(PL-4)00:DAP\text{-}B$$
$$100(PL+8)00:DAP\text{-}C$$

The particular Actual Word Address provided corresponds to the DAP initiating the instant sequence. The notation "$PL-4$" represents a number four less than the priority level of the Operating System program initiating the instant sequence, and the notation "$PL+8$" represents a number eight more than the priority level of the initiating Operating System program. Accordingly, the various Actual Word Addresses that are translated from the common Symbolic Word Address provide for the distribution of the different priority level status tables assigned to each DAP throughout a substantial portion of the Operating System Memory, as shown in Table 7, Op. #4. Each of these status tables receives or supplies a status set according to whether a Write or Read Status Table operation is requested.

Following receipt of the Actual Address, the Operating System Memory indirectly controls the CAX to deliver the DHAR signal for notifying the CIS that the Actual Word Address provided thereby has been received. The required functions of the Read/Write Status Table sequence having been substantially completed at this time, the CIS enters state-$\tau_6$ and the sequence is terminated in the manner described in the preceding "Self-Interrupt Sequence" subsection.

Read processor mailbox sequence

The Translate Mode sequence is identified as a Read Processor Mailbox sequence if the Symbolic Word Address has the bit structure 0000000111. Thus, the Read Processor Mailbox sequence enters state-$\tau_4$, FIG. 102, when Decoder 507, upon decoding the Symbolic Word Address, generates the DCAM control signal.

The Read Processor Mailbox sequence automatically enters state-$\tau_5$ from state-$\tau_4$. In state-$\tau_5$ the Symbolic Word Address is translated by Encoder 508 into the corresponding Actual Word Address, which is then transmitted to the CAX. At the same time the CIS transmits the DHAM signal to notify the CCS of the availability of the Actual Word Address provided by the CIS. The CAX subsequently transmits the Actual Word Address provided by the CIS to the Operating System Memory, as designated by the CAT. The Actual Word Address provided in the Read Processor Mailbox sequence has the bit structure 000011($\underline{PR}$)00, the notation "PR" representing the initiating Processor. The Processor Mailbox identified by the Actual Word Address supplies a communication set to the initiating Processor.

Following receipt of the Actual Address, the Operating System Memory indirectly control the CAX to deliver the DHAR signal for notifying the CIS that the Actual Word Address provided thereby has been received. The required functions of the Read Processor Mailbox sequence having been substantially completed at this time, the CIS enters state-$\tau_6$ and the sequence is terminated in the manner described in the preceding "Self-Interrupt Sequence" subsection.

Alert processor sequence

The Translate Mode sequence is identified as an Alert Processor sequence if the Symbolic Word Address has the bit structure 00000010($\underline{PR}$). Thus, the Alert Processor sequence enters state-$\tau_4$, FIG. 103, when Decoder 507, upon decoding the Symbolic Word Address, generates the DCAA control signal. In state-$\tau_4$ the Symbolic Word Address is translated by Encoder 508 to provide the DF$i$C alert signal for notifying the corresponding Processor-$i$ that a communication set has been stored in the Processor Mailbox of Processor-$i$. The Processor-$i$ which is so alerted is designated by the Symbolic Word Address.

The Alert Processor sequence automatically enters state-$\tau_5$ from state-$\tau_4$. In state-$\tau_5$ the Symbolic Word Address is further translated by Encoder 508 into the corresponding Actual Word Address, which is then transmitted to the CAX. At the same time, the CIS transmits the DHAM signal to notify the CCS of the availability of the Actual Word Address provided by the CIS. The CAX subsequently transmits the Actual Word Address provided by the CIS to the Operating System Memory, as designated by the CAT. The Actual Word Address provided for the Alert Processor sequence identifies the "Dummy" cell in the Operating System Memory. The function of the Dummy cell is described in the preceding "Self-Interrupt Sequence" subsection.

Following receipt of the Actual Address, the Operating System Memory indirectly controls the CAX to deliver the DHAR signal for notifying the CIS that the Actual Word Address provided thereby has been received. The required functions of the Alert Processor sequence having been substantially completed at this time, the CIS enters state-$\tau_6$ and the sequence is terminated in the manner described in the preceding "Self-Interrupt Sequence" subsection. During this termination interval the DF$i$C alert signal terminates when transmission of the Symbolic Word Address to the CIS is discontinued.

Read transfer vector sequence

The Translate Mode sequence is identified as a Read Transfer Vector sequence if the Symbolic Word Address has the bit structure 0000001100. Thus, the Read Transfer Vector sequence enters state-$\tau_4$, FIG. 104, when Decoder 507, upon decoding the Symbolic Word Address, generates the DCTV control signal.

The Read Transfer Vector sequence automatically enters state-$\tau_5$ from state-$\tau_4$. In state-$\tau_5$ the Symbolic Word Address is translated by Encoder 508 into the corresponding Actual Word Address, which is then transmitted to the CAX. At the same time, the CIS transmits the DHAM signal to notify the CCS of the availability of the Actual Word Address provided by the CIS. The CAX subsequently transmits the Actual Word Address provided by the CIS to the Operating System Memory, as designated by the CAT. The Actual Word Address provided in the Read Transfer Vector sequence has the bit structure $000(\underline{PL-4})(\underline{DP})$, the notion "$PL-4$" representing a number four less than the priority level of the Operating System program initiating the instant sequence, and the notation "DP" representing the DAP executing the Operating System program. The Operating System Memory cell identified by the Actual Word Address supplies the transfer vector stored therein to the initiating DAP.

Following receipt of the Actual Address, the Operating System Memory indirectly controls the CAX to deliver the DHAR signal for notifying the CIS that the Actual Word Address provided thereby has been received. The required functions of the Read Transfer Vector sequence having been substantially completed at this time, the CIS enters state-$\tau_6$ and the sequence is termminated in the manner described in the preceding "Self-Interrupt Sequence" subsection.

Set transfer address sequence

The Translate Mode sequence is identified as a Set Transfer Address sequence if the Symbolic Word Address has the bit structure 0000001101. Thus, the Set Transfer Address sequence enters state-$\tau_4$, FIG. 105, when Decoder 507, upon decoding the Symbolic Word Address, generates the DCTM control signal.

The Set Transfer Address sequence automatically enters state-$\tau_5$ from state-$\tau_4$. In state-$\tau_5$ the Symbolic Word Address is translated by Encoder 508 into the corresponding Actual Word Address, which is then transmitted to the CAX. At the same time, the CIS transmits the DHAM signal to notify the CCS of the availability of the Actual Word Address provided by the CIS. The CAX subsequently transmits the Actual Word Address provided by the CIS to the Operating System Memory, as designated by the CAT. The Actual Word Address provided for the Set Transfer Address sequence identifies the "Dummy" cell in the Operating System Memory. The function of the Dummy cell is described in the preceding "Self-Interrupt Sequence" subsection. Following receipt of the Actual Address, the Operating System Memory indirectly contols the CAX to deliver the DHAR signal for notifying the CIS that the Actual Word Address provided thereby has been received.

The Set Transfer Address sequence enters state-$\tau_6$ when the CIS receives the DHAR signal. In state-$\tau_6$ Request Register 501 is cleared, whereupon the DH$i$E signal being delivered becomes a binary 0. When the DH$i$E signal becomes a binary 0, transmission to the CIS of the Symbolic Word Address is discontinued, and this discontinuance terminates the Actual Word Address transmitted by the CIS.

The clearing of Register 501 controls the Set Transfer Address sequence to enter state-$\tau_7$. The FTA$i$ flip-flop of the Transfer Control Register, corresponding to the DAP-$i$ that initiated the instant operation, now sets as a consequence of the clearing of Register 501 during state-$\tau_6$.

The discontinuance of the Symbolic Word Address terminates the Set Transfer Address sequence by restoring the CIS to state-$\tau_0$.

Transfer address sequence

The Translate Mode sequence is identified as a Transfer Address sequence if the one of the FTA$i$ flip-flops of the Transfer Control Register corresponding to the initiating DAP-$i$ is in the 1-state when Logic Unit 502 recognizes DAP-$i$ for a Translate Mode operation by delivering the correspoding DSD$i$ granting signal. Accordingly, the Transfer Address sequence enters state-$\tau_4$, FIG. 106, after Decoder 507 generates the DCTA control signal as a consequence of an FTA$i$ flip-flop being in the 1-state when the corresponding DSD$i$ signal issues. The DCTA signal actually issues during and continues from state-$\tau_2$.

In state-$\tau_4$ the Symbolic Word Address is transmitted, untranslated, as an Actual Word Address to the CAX. At the same time, the CIS transmits the DHAM signal to notify the CCS of the availability of the Actual Word Address provided by the CIS. The CAX subsequently transmits the Actual Word Address provided by the CIS to the Operating System Memory, as designated by the CAT. The Actual Word Address, being the same as the Symbolic Word Address, provides direct commuication between the initiating DAP and the addressed Operation System Memory cell. Accordingly, the initiating DAP can now complete a Clear-Write or Read-Restore operation with respect to the addressed cell.

The Transfer Address sequence automatically enters state-$\tau_5$ from state-$\tau_4$. Following receipt of the Actual Address, the Operating System Memory indirectly controls the CAX to deliver the DHAR signal for notifying the CIS that the Actual Word Address provided thereby has been received.

The Transfer Address sequence enters state-$\tau_6$ when the CIS receives the DHAR signal. In state-$\tau_6$ Request Register 501 is cleared, whereupon the DH$i$E signal being delivered becomes a binary 0. When the DH$i$E signal becomes a binary 0, transmission to the CIS of the Symbolic Word Address is discontinued, and this discontinuance terminates the Actual Word Address transmitted by the CIS.

The clearing of Register 501 controls the Transfer Address sequence to enter state-$\tau_7$. The Transfer Control Register flip-flop corresponding to the DAP-$i$ that initiated the instant operation now resets as a consequence of the clearing of Register 501 during state-$\tau_6$.

The discontinuance of the Symbolic Word Address terminates the transfer Address sequence by restoring the CIS to state-$\tau_0$.

Non-translate sequence

The Translate Mode sequence is identified as a Non-Translate sequence if the Symbolic Word Address has a bit structure not translatable by the CIS. Hence, the Non-Translate sequence enters state-$\tau_4$, FIG. 107, after Decoder 507 generates the DCTA control signal upon detecting that any one of the DHS6–9 bits of the Symbolic Word Address is a binary 1 or that both of the DHS4 and DHS5 bits are binary 1's. The DCTA signal actually issues during and continues from state-$\tau_2$.

In state-$\tau_4$ the Symbolic Word Address is transmitted, untranslated, as an Actual Word Address to the CAX. At the same time, the CIS transmits the DHAM signal to notify the CCS of the availability of the Actual Word Address provided by the CIS. The CAX subsequently transmits the Actual Word Address provided by the CIS to the Operating System Memory, as designated by the CAT. The Actual Word Address, being the same as the Symbolic Word Address, provides direct communication between the initiating DAP and the addressed Operating System Memory cell. Accordingly, the initiating DAP can now complete a Clear-Write or Read-Restore operation with respect to the addressed cell.

The Non-Translate sequence automatically enters state-$\tau_5$ from state-$\tau_4$. Following receipt of the Actual Address, the Operating System Memory indirectly controls the CAX to deliver the DHAR signal for notifying the CIS that the Actual Word Address provided thereby has been received. The required functions of the Non-Translate sequence having been substantially completed at this time, the CIS enters state-$\tau_6$ and the sequence is terminated in the manner described in the preceding "Self-Interrupt Sequence" subsection.

Read definer list sequence

The Translate Mode sequence is identified as a Read Definer List sequence if the Symbolic Word Address has one of the bit structures:

$$0001(\overline{DEFNR})0$$
$$0010(\overline{DEFNR})0$$
$$0011(\overline{DEFNR})0$$

None of these Symbolic Word Addresses is translatable by the CIS, and, therefore, the Read Definer List operation is one of the class of Non-Translate operations. Accordingly, the Read Definer List sequence enters state-$\tau_4$, FIG. 108, after Decoder 507 generates the DTCA control signal upon detecting that one of the DHS6 or DHS7 bits of the Symbolic Word Address is a binary 1. The DCTA signal actually issues during and continues from state-$\tau_2$.

In state-$\tau_4$ the Symbolic Word Address is transmitted, untranslated, as an Actual Word Address to the CAX. At the same time, the CIS transmits the DHAM signal to notify the CCS of the availability of the Actual Word Address provided by the CIS. The CAX subsequently transmits the Actual Word Address provided by the CIS to the Operating System Memory, as designated by the CAT. The Actual Word Address, being the same as the Symbolic Word Address, provides direct communication between the initiating DAP and the addressed Operating System Memory cell, which is the first cell of the topfilled cell pair of one of the Definer Lists. The particular Definer List addressed corresponds to the priority level at which the initiating DAP is operating and the topfilled cell pair of this List is identified by the variable quantity designated by the notation "DEFNR." The cell pair identified by the Actual Word Address supplies the Definer stored herein to the initiating DAP.

Additionally, during state-$\tau_4$ the one of the FQ08, FQ09 or FQ10 flip-flops of Queued PL Register 551 that corresponds to the priority level of operation of the initiating DAP is cleared, if the flip-flop was in the 1-state when the Read Definer List sequence was initiated.

The Read Definer List sequence automatically enters state-$\tau_5$ from state-$\tau_4$. Following receipt of the Actual Address, the Operating System Memory indirectly controls the CAX to deliver the DHAR signal for notifying the CIS that the Actual Word Address provided thereby has been received. The required functions of the Read Definer List sequence having been substantially completed at this time, the CIS enters state-$\tau_6$ and the sequence is terminated in the manner described in the preceding "Self-Interrupt Sequence" subsection.

Passive mode sequences

Figure 109:
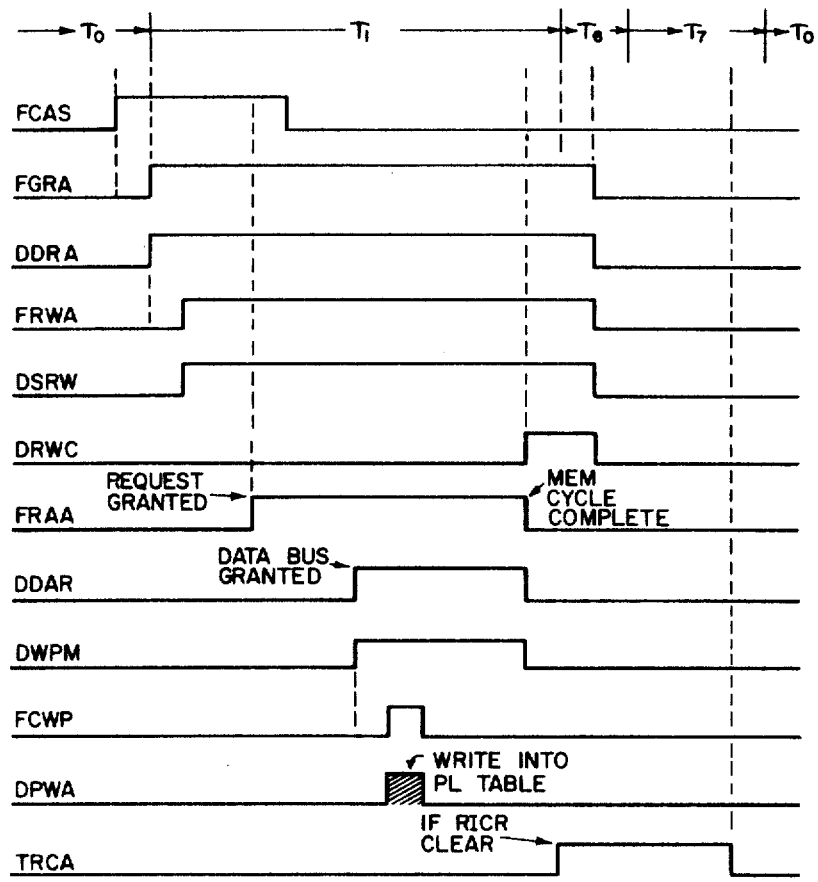
FIGURES 109 and 110 illustrate waveforms of significant signals in the CIS Passive Mode operations.
Figure 110:
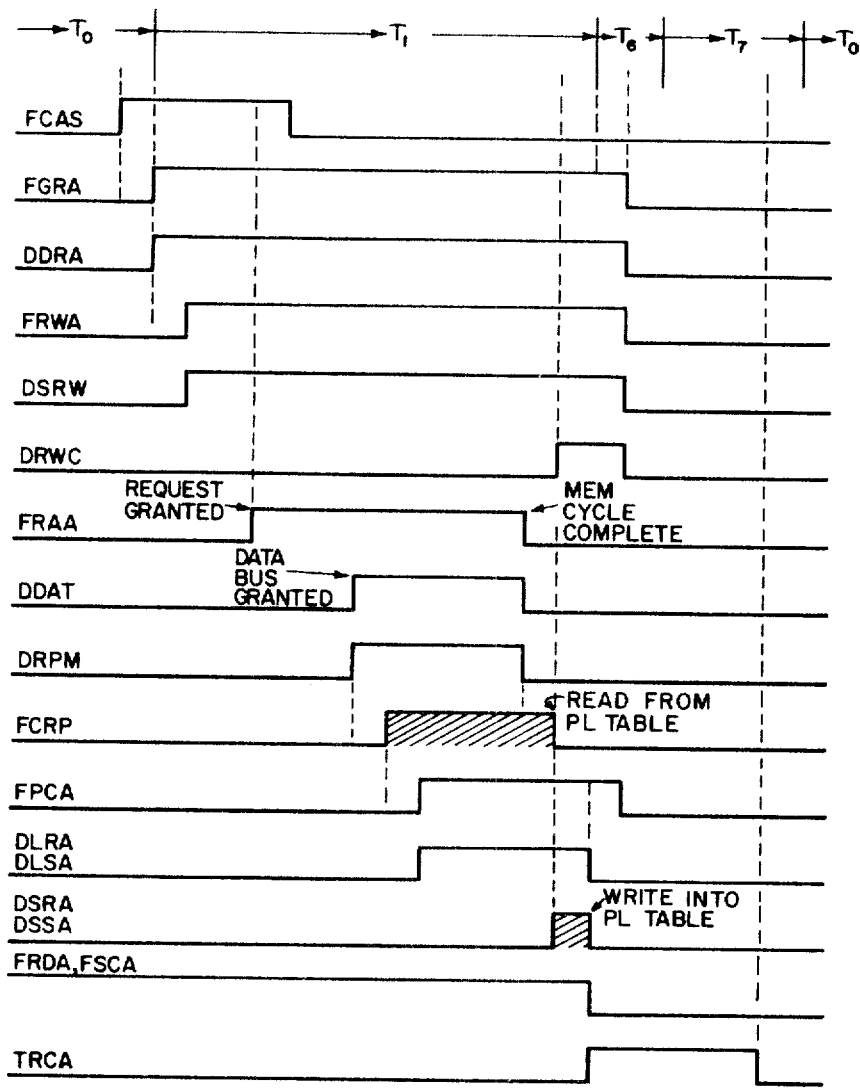

Both Passive Mode sequences have a common initial phase, which comprises the interval between the receipt by the CIS of a Passive Mode request and the granting of the Data Bus to the requesting DAP by the CIC-B/S. FIGURES 109 and 110 illustrate waveforms of Passive Mode operations executed in response to request by DAP-A. A Passive Mode sequence is initiated and enters state-$\tau_1$ from state-$\tau_0$ when one or more DAP's request a Passive Mode operation during state-$\tau_0$. The request for a Passive Mode operation by a DAP-$i$ is represented by the corresponding FC$i$S signal delivered by the CAT. The requests represented by the FC$i$S signals are stored, when received by the CIS, in corresponding FGR$i$ flip-flops of Passive Mode Request Register 515, FIG. 21. Passive Mode Priority Allocation Logic Unit 516 immediately recognizes one of the requests stored in Register 515 and delivers the corresponding DDR$i$ signal identifying the DAP-$i$ for which a Passive Mode request has been recognized.

In state-$\tau_1$ the Passive Mode requests are also entered into Request Register 501, the setting of the FRWA flip-flop in this Register representing all Passive Mode requests being made during state-$\tau_1$. The Passive Mode requests represented by Register 501 are thereupon recognized by Priority Allocation Logic Unit 502 and the corresponding DSRW granting signal is delivered, provided that the PEP is not at the same time requesting a Translate Mode operation.

The CIS now transmits the DDR$i$ and DSRW signals to the CIC-R/W and then awaits the granting of the Data Bus to the initiating DAP-$i$ before continuing with the Passive Mode sequence. The CIC-R/S meanwhile has been awaiting CIS initiation of a Passive Mode operation for DAP-$i$ before granting the Memory request of DAP-$i$. Accordingly, when the CIC-R/S receives the DDR$i$ signal, denoting recognition of DAP-$i$ for a Passive Mode operation, and the DSRW signal, denoting the initiation of a Passive Mode operation by the CIS, the corresponding FR$i$A flip-flop of Processor Access Granting Register 407 sets. The FR$i$A flip-flop in the 1-state denotes, in this instance, that DAP-$i$ must be granted communication with the PL Table of the CIS. The FR$i$A signal immediately controls termination of the corresponding FC$i$S request signal. When the CIC-B/S subsequently responds to the FR$i$A signal by granting the Data Bus to DAP-$i$ for communication with the PL Table, the corresponding DD$i$R or DD$i$T signal issues, and the Passive Mode sequence in the CIS resumes.

Passive mode write sequence

The Passive Mode sequence is identified as a Passive Mode write sequence if the CIC-B/S delivers the DD$i$R signal that controls the CDX to transfer to the Data Bus a Data Word from the DAP-$i$ initiating the current Passive Mode sequence. Thus, the Passive Mode write sequence resumes in state-$\tau_1$ when the CIS receives a DD$i$R signal from the CIC-B/S, if the corresponding DDR$i$ signal and the DSRW signal each represents a binary 1. The CIS now prepares to accept the priority level contents of the Data Word transferred to the Data Bus from the initiating DAP and to store these contents in the PL Table.

The DD$i$R signal controls Initiate R/W PL Table Logic Unit 525 to generate the DWPM signal, which provides that the ensuing portion of the Passive Mode sequence functions as the Passive Mode write variation. The DWPM signal enables PL Table Input Gates 547 to apply the priority level contents of the Data Word on the Data Bus, as represented by the DHW0–3 signals, to each register of the PL Table. Passive Mode Control Units 526 responds to the DWPM signal by transferring the FCWP flip-flop to the 1-state, the FCWP flip-flop initiating the distinctive functions of the CIS during the Passive Mode write sequence. Write PL Table Logic Unit 527 responds to the FCWP signal to generate the DPW$i$ signal corresponding to the DAP-$i$ providing the priority level for storage. The DPW$i$ signal thereupon enters the priority level supplied by DAP-$i$ and transmitted by Gates 547 into the register of the PL Table assigned to DAP-$i$.

Upon the storage of the priority level in the PL Table the primary functions of the Passive Mode write sequence are complete. Therefore, the FCWP flip-flop clears immediately after storage of the priority level, whereupon the DPW$i$ signal terminates. The CIS now awaits completion of the Operating System memory cycle initiated by the DAP involved before completing the Passive Mode write sequence.

DAP-$i$, in requesting the Passive Mode write operation, also initiates a Clear-Write memory cycle in the Operating System Memory, and when this memory cycle is near completion, the FR$i$A flip-flop in Register 407 of the CIC-R/S is reset. The resetting of the FR$i$A flip-flop now provides the terminating phases of the Passive Mode write sequence. When the FR$i$A flip-flop resets, the CIC-B/S immediately terminates the corresponding DD$i$R signal. Termination of the DD$i$R signal disables Logic Unit 525 from generating the DWPM signal. Additionally, termination of the FR$i$A signal controls generation of the DRWC signal, which now denotes that the required functions of the Passive Mode write operation have been completed.

The Passive Mode write sequence enters state-$\tau_6$ when the DRWC signal is generated. In state-$\tau_6$ the TRCA one-shot is triggered to its unstable 1-state, providing that Request-Interrupt Control Register 513 is clear. The TRCA one-shot remains in its unstable state for 500 ns. Additionally, Request Register 501 and Passive Mode Request Register 515 are cleared, whereupon the DSRW signal delivered by Logic Unit 502 and the DDR$i$ signal being delivered by Logic Unit 516 each becomes a binary 0. Termination of the DSRW signal, in turn, controls termination of the DRWC signal.

The Passive Mode write sequence enters state-$\tau_7$ when the DSRW signal terminates. Upon the CIS entering state-$\tau_7$, the Sequencer is enabled to transfer to state-$\tau_0$ to terminate the Passive Mode write sequence. However, the enabled Sequencer is not activated to return to the 0-state unless the TRCA one-shot is in the 0-state. Therefore, if the TRCA one-shot had been triggered earlier in the sequence, the CIS is not restored to state-$\tau_0$ until the TRCA one-shot reverts to the 0-state.

If the TRCA one-shot had been triggered, when it returns to the 0-state an FRD$i$ flip-flop of Register 513 is activated for transfer to the 1-state, provided that the DQRH signal denotes that the highest recognized priority level queued in Register 551 is greater than the lowest priority level program now assigned to a DAP. The FRD$i$ flip-flop which is so activated corresponds to the DAP-$i$ assigned the lowest priority program, and if the flip-flop sets this DAP-$i$ is thereupon notified of a Priority Interrupt requirement by the CIS generating the corresponding DAD$i$ signal. Moreover, if the TRCA one-shot was triggered, Register 513 was clear at the beginning of the Passive Mode write sequence; consequently, the presence of the DQRH signal at this time indicates that the new priority level entered into the PL Table is lower than the other priority levels stored therein. Accordingly, if an FRD*i* flip-flop is now set, it will correspond to the DAP-*i* that initiated the instant Passive Mode write sequence. However, as described previously, if an FSC*i* flip-flop of Register 514 is in the 1-state, the corresponding FRD*i* flip-flop cannot be set.

Passive mode read sequence

The Passive Mode sequence is identified as a Passive Mode read sequence if the CIC-B/S delivers the DD*i*T signal that controls the CDX to transfer a Data Word from the Data Bus to the DAP-*i* initiating the current Passive Mode sequence. Thus, the Passive Mode read sequence resumes in state-$\tau_1$ when the CIS receives a DD*i*T signal from the CIC-B/S, if the corresponding DDR*i* signal and the DSRW signal each represents a binary 1. The CIS now prepares to transfer the priority level of the initiating DAP from the PL Table to the Data Bus for subsequent transfer to such DAP.

The DD*i*T signal controls Initiate R/W PL Table Logic Unit 525 to generate the DRPM signal, which provides that the ensuing portion of the Passive Mode sequence functions as the Passive Mode read variation. Passive Mode Control Unit 526 responds to the DRPM signal by transferring the FCRP flip-flop to the 1-state, the FCRP flip-flop initiating the distinctive functions of the CIS during the Passive Mode read sequence. Selected PL Signal Gates 545 are controlled by the coincidence of the FRWA signal and the DDR*i* signal being delivered to enable transfer of the priority level in the corresponding Register-*i* of the PL Table to PL Signal Transmitter 546. Transmitter 546 responds to the FCRP signal to deliver to the Data Bus the priority level supplied by Gates 545. The priority level delivered by Transmitter 546, and represented by the DHR0–3 signals, is the priority level at which the initiating DAP-*i* has been operating, and this priority level is transmitted from the Data Bus to DAP-*i*.

If the instant Passive Mode read operation has been initiated by a DAP-*i* in response to a Priority Interrupt, the FCRP signal activates the setting of the corresponding FPC*i* flip-flop of Interrupt Response Control Register 577. When the FRC*i* flip-flop sets, Self-Request Select Logic Unit 528 generates the DLSA signal if the sequence is in response to a Self-Interrupt, or the DLRA signal if the sequence is in response to a Request-Interrupt. The DLSA signal enables PL Table Input Gates 547 to apply the priority level contents of Self-Interrupt PL Register 550 to each register of the PL Table. The DLRA signal enables Gates 547 to apply the highest recognized priority level queued in Register 551, represented by the signals delivered by Encoder 552, to each register of the PL Table. However, if the Passive Mode read operation has not been initiated in response to a Priority Interrupt, no FPC*i* flip-flop sets and neither the DLSA nor DLRA signal issues.

The CIS now awaits completion of the Operating System memory cycle initiated by the DAP involved before completing the Passive Mode read sequence. DAP-*i*, in requesting the Passive Mode read operation, also initiates a Read-Restore memory cycle in the Operating System Memory, and when this memory cycle is near completion the FR*i*A flip-flop in Register 407 of the CIC-R/S is reset. The resetting of the FR*i*A flip-flop now provides the terminating phases of the Passive Mode read sequence.

When the FR*i*A flip-flop resets, the CIC-B/S immediately terminates the corresponding DD*i*T signal. Termination of the DD*i*T signal disables Logic Unit 525 from generating the DRPM signal.

The FCRP flip-flop clears when the DRPM signal terminates. If the current sequence has been initiated by a DAP-*i* in response to a Self-Interrupt, the corresponding FSC*i* flip-flop of Register 514 has been in the 1-state. In this instance, the clearing of the FCRP flip-flop activates Logic Unit 529 to deliver the DSS*i* signal corresponding to the initiating DAP-*i*, the issuance of the DSS*i* signal having been enabled by the DLSA signal and the corresponding FSC*i* flip-flop. The DSS*i* signal now enters the priority level delivered by Gates 547 into the corresponding Register-*i* of the PL Table. If the current sequence has been initiated by a DAP-*i* in response to a Request-Interrupt, the corresponding FRD*i* flip-flop of Register 513 has been in the 1-state. In this instance, the clearing of the FCRP flip-flop activates Logic Unit 529 to deliver the DSR*i* signal corresponding to the initiating DAP-*i*, the issuance of the DSR*i* signal having been enabled by the DLRA signal and the corresponding FDR*i* flip-flop. The DSR*i* signal now enters the priority level delivered by Gates 547 into the corresponding Register-*i* of the PL Table.

The new priority level entered into the PL Table is the priority level at which the initiating DAP now is to operate. However, if the instant sequence has not been initiated in response to a Priority Interrupt, no change is effected in the contents of the PL Table.

The primary functions of the Passive Mode read sequence are complete at this time. Therefore, resetting of the FCRP flip-flop controls generation of the DRWC signal, which now denotes that the required functions of the Passive Mode read operation have been compelted.

The Passive Mode read sequence enters state-$\tau_6$ when the DRWC signal is generated. In state-$\tau_6$, if the sequence has been initiated by DAP-*i* in response to a Priority Interrupt, the corresponding FSC*i* or FRD*i* flip-flop that has been in the 1-state, is now cleared. Clearing of an FSC*i* flip-flop terminates the corresponding DSS*i* signal and the DLSA signal, whereas clearing of an FRD*i* flip-flop terminates the corresponding DSR*i* signal and the DLRA signal. Termination of the DLSA or DLRA signal, in turn, controls clearing of Register 517.

Additionally, during state-$\tau_6$ the TRCA one-shot is triggered to its unstable 1-state, providing that Request-Interrupt Control Register 513 is now clear. The TRCA one-shot remains in its unstable state for 500 ns. During state-$\tau_6$ Request Register 501 and Passive Mode Request Register 515 are cleared, whereupon the DSRW signal delivered by Logic Unit 502 and the DDR*i* signal being delivered by Logic Unit 516 each becomes a binary 0. Termination of the DSRW signal, in turn, controls termination of the DRWC signal.

The Passive Mode read sequence enters state-$\tau_7$ when the DSRW signal terminates. Upon the CIS entering state-$\tau_7$, the Sequencer is enabled to transfer to state-$\tau_0$ to terminate the Passive Mode read sequence. However, the enabled Sequencer is not activated to return to the 0-state unless the TRCA one-shot is in the 0-state. Therefore, if the TRCA one-shot had been triggered earlier in the sequence, the CIS is not restored to state-$\tau_0$ until the TRCA one-shot reverts to the 0-state.

If the TRCA one-shot has been triggered, when it returns to the 0-state an FRD*i* flip-flop of Register 513 is activated to transfer to the 1-state, provided that the DQRH signal denotes that the highest recognized priority level queued in Register 551 is greater than the lowest priority level program now assigned to a DAP. The FRD*i* flip-flop which is so activated corresponds to the DAP-*i* assigned the lowest priority program, and if the flip-flop sets this DAP-*i* is thereupon notified of a Priority Interrupt requirement by the CIS generating the corresponding DAD*i* signal. However, as described previously, if any FSC*i* flip-flop of Register 514 is in the 1-state, the corresponding FRD*i* flip-flop cannot be set.

Accordingly, there has been described herein a novel Multicomputer System embodying the instant invention. While the principles of the invention have now been made clear in an illustrative emobidment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover the embrace any such modifications, within the limits only of the true spirit and scope of the invention.

What is claimed is:

1. In combination: a plurality of data processors for executing respective programs independently; each of said processors having a respective program assigned to it for execution; each of said programs comprising a plurality of instructions; a data storage system comprising at least one data storage member; and a central controller coupled to each of said processors and to said data storage system for providing controllable transmission of all data words between said data processors and said data storage system; each one of said data processors supplying a request signal whenever communication is required thereby with said data storage system, said central controller responding to each of said request signals for providing the required communication between the corresponding data processor and the data storage system without interrupting the respective programs being executed by the others of said data processors.

2. A data processing system comprising: a plurality of data processors, each of said processors being adapted to receive data words, to execute a sequence of different processing operations on received data words in response to a corresponding sequence of data words representing instructions, and to generate data words representing the processed results of said operations; a data storage system comprising at least one data storage member; and a central controller coupled to each of said processors and to said data storage system for providing controllable transmission of data words between said all data processors and said data storage system; each one of said data processors supplying a request signal when communication is required thereby with said data storage system, said central controller responding to each of said request signals for providing the required communication between the corresponding data processor and the data storage system without interrupting the respective sequence of operations being executed by the others of said data processors.

3. A data processing system comprising: a plurality of processors, each of said processors being adapted to execute a sequence of operations for receiving and transmitting data words; a storage system comprising at least one data storage member; a central controller coupled to each of said processors and to said data storage system for providing controllable transmission of all data words between said processors and said storage system; and means for assigning a sequence of operation respectively to each of said procedures; each one of said processors supplying a request signal whenever communication is required thereby with said data storage system, said central controller responding to each of said request signals for providing the required communication between the corresponding processor and the data storage system without interrupting the respective sequence of operations being executed by the others of said processors.

4. A data processing system comprising: at least one data processor, each of said data processors being adapted to receive data words, to execute a sequence of different processing operations on received data words in response to a corresponding sequence of data words representing instructions, and to generate data words representing the processed results of said operations; at least one input-output processor, each of said input-output processors being adapted to execute a sequence of operations for receiving and transmitting data words; a data storage system comprising at least one data storage member; a central controller coupled to each of said processors and to said storage system for providing controllable transmission of all data words between said processors and said storage system; and means for assigning sequences of instructions respectively to said data processors; each one of said processors supplying a request signal whenever communication is required thereby with said data storage system, said central controller responding to each of said request signals for providing the required communication between the corresponding processor and the data storage system without interrupting the respective sequence of operations being executed by the others of said processors.

5. A data processing system comprising; at least one data processor, each of said data processors being adapted to receive data words, to execute a sequence of different processing operations on received data words in response to a corresponding sequence of data words representing instructions, and to generate data words representing the processed results of said operations; at least one input-output processor, each of said input-output processors being adapted to execute a sequence of operations for receiving and transmitting data words; a plurality of data storage members; a central controller coupled to each of said processors and to said data storage members for providing controllable transmission of all data words between said processors and said storage members; and means for assigning a sequence of instructions to each of said data processors; each one of said processors supplying a request signal whenever communication is required thereby with said data storage members, said central controller responding to each of said request signals for providing the required communication between the corresponding processor and the data storage members without interrupting the respective sequence of operations being executed by the others of said processors.

6. A data processing system comprising: a central controller including a data word transmission member; at least one data processor, each of said data processors being coupled to said controller and adapted to receive data words from said transmission member, to execute a a sequence of different processing operations on received data words in response to a corresponding sequence of data words representing instructions, to generate data words representing the processed results of said operations, and to transfer said generated data words to said transmission member; at least one input-output processor, each of said input-output processors being coupled to said controller and adapted to execute a sequence of operations for receiving data words from said transmission member and for transferring data words to said transmission member; and at least one data storage member, each of said storage members being coupled to said controller and adapted to store a data word in each one of a respective plurality of addressable storage cells; each one of said processors supplying a signal group representing the address of one of said cells to said controller when said processor is to communicate with said data storage members, said central controller responding to each of said signal groups for controlling said storage members to transfer a data words between a cell corresponding to said signal group and said transmission member without interrupting the respective sequence of operations being executed by the others of said processors.

7. A data processing system comprising: a plurality of processors including at least one program processor primarily adapted for executing programs, and at least one input-output processor primarily adapted for communicating with a plurality of devices external to said data processing system; a data storage system comprising at least one data storage member having addressable cells for storing data words; and a central controller coupled to each of said processors and to said data storage system for providing controllable transmission of all data words between said processors and said storage system;

each one of said processors supplying a request signal when communication is required thereby with said data storage system, said central controller responding to each of said request signals for providing the required communication between the corresponding processor and the data storage system without requiring the cooperation of the others of said processors.

8. A data processing system comprising: at least one data processor, each of said data processors being adapted to receive data words, to execute a sequence of different processing operations on received data words in response to a corresponding sequence of data words representing instructions, and to generate data words representing the processed results of said operations; at least one input-output processor, each of said input-output processors being adapted to execute a sequence of operations for receiving and transmitting data words; a data storage system comprising at least one data storage member; a central controller coupled to each of said processors and to said data storage system for providing controllable transmission of all data words between said processors and said storage system; and means for assigning a sequence of processing operations to each of said data processors; each one of said processors supplying a request signal when communication is required thereby with said data storage system, said central controller responding to each of said request signals for providing the required communication between the corresponding processor and the data storage system without interrupting the respective sequence of operations being executed by the others of said processors, said communication being provided in accordance with respective priorities allocated to said requesting processors when more than one of said request signals are supplied concurrently.

References Cited

UNITED STATES PATENTS

| | | | |
|---|---|---|---|
| 3,242,467 | 3/1966 | Lamy | 340—172.5 |
| 3,223,976 | 12/1965 | Abbott et al. | 340—147 |
| 3,181,121 | 4/1965 | Lösch et al. | 340—147 |
| Re. 26,171 | 3/1967 | Falkoff | 340—172.5 |
| 3,337,854 | 8/1967 | Cray et al. | 340—172.5 |
| 3,328,773 | 6/1967 | Zimmerman | 340—172.5 |
| 3,323,109 | 5/1967 | Hecht et al. | 340—172.5 |
| 3,319,226 | 5/1967 | Mott et al. | 340—172.5 |
| 3,312,953 | 4/1967 | Wang et al. | 340—172.5 |
| 3,312,951 | 4/1967 | Hertz | 340—172.5 |
| 3,312,943 | 4/1967 | McKindles et al. | 340—172.5 |
| 3,302,182 | 1/1967 | Lynch et al. | 340—172.5 |
| 3,287,703 | 11/1966 | Slotnick | 340—172.5 |
| 3,266,023 | 8/1966 | Werme | 340—172.5 |
| 3,263,219 | 7/1966 | Brun et al. | 340—172.5 |

GARETH D. SHAW, *Primary Examiner.*